US008685116B2

(12) United States Patent
Hohener et al.

(10) Patent No.: US 8,685,116 B2
(45) **Date of Patent: *Apr. 1, 2014**

(54) SHADING PROCESS

(75) Inventors: Alfred Hohener, Magden (CH); Frank Bachmann, Freiburg (DE); Adolf Kaser, Bottmingen (CH); Chandrasekhar Dayal Mudaliar, Mumbai (IN); Dinesh Narendra Rele, Mumbai (IN); Sneha Shankar Rane, Mumbai (IN); Georg Roentgen, Freiburg (DE)

(73) Assignee: BASF SE, Ludwigshafen (DE)

( * ) Notice: Subject to any disclaimer, the term of this patent is extended or adjusted under 35 U.S.C. 154(b) by 556 days.

This patent is subject to a terminal disclaimer.

(21) Appl. No.: 12/840,429

(22) Filed: Jul. 21, 2010

(65) Prior Publication Data

US 2010/0299849 A1 Dec. 2, 2010

Related U.S. Application Data

(63) Continuation of application No. 11/661,174, filed as application No. PCT/EP2005/054115 on Aug. 22, 2005, now Pat. No. 7,799,098.

(30) Foreign Application Priority Data

Aug. 30, 2004 (EP) .................................... 04104141

(51) Int. Cl.

| | |
|---|---|
| ***C09B 47/04*** | (2006.01) |
| ***C09B 62/00*** | (2006.01) |
| ***C09B 45/00*** | (2006.01) |

(52) U.S. Cl.
USPC ....... 8/661; 8/574; 8/566; 8/115.56; 540/131; 534/702

(58) Field of Classification Search
USPC ............................................................. 8/661
See application file for complete search history.

(56) References Cited

U.S. PATENT DOCUMENTS

| | | | | |
|---|---|---|---|---|
| 3,100,768 | A | 8/1963 | Gunst | |
| 3,625,936 | A * | 12/1971 | Meininger et al. | 534/620 |
| 4,504,272 | A | 3/1985 | Ong | |
| 6,251,177 | B1 * | 6/2001 | Stawitz | 106/410 |
| 6,291,412 | B1 | 9/2001 | Kvita et al. | |
| 6,444,807 | B1 | 9/2002 | Wolleb et al. | |
| 6,589,325 | B1 * | 7/2003 | Katoh et al. | 106/31.49 |

FOREIGN PATENT DOCUMENTS

| | | |
|---|---|---|
| DE | 3125495 | 5/1982 |
| GB | 916532 | 1/1963 |
| GB | 949502 | 2/1964 |
| GB | 1405132 | 9/1975 |

OTHER PUBLICATIONS

English Language Abstract of DE 312495 Printed on Oct. 25, 2010.

* cited by examiner

*Primary Examiner* — Harold Pyon
*Assistant Examiner* — Katie L Hammer
(74) *Attorney, Agent, or Firm* — Shiela A. Loggins

(57) ABSTRACT

The present invention relates to a shading process characterized by using a composition comprising a phthalocyanine to which at least one dyestuff is attached through a covalent bonding, to shading compositions, to new compounds used in these shading compositions as well as to the production of these new compounds.

16 Claims, No Drawings

SHADING PROCESS

This application is a continuation of application Ser. No. 11/661,174, filed on Feb. 26, 2007 now U.S. Pat. No. 7,799,098 which is the National Stage of International Application PCT/EP05/054115, filed Aug. 22, 2005, the contents of which are herein incorporated by reference.

The present invention relates to a shading process, to shading compositions, to new compounds used in these shading compositions as well as to the production of these new compounds.

A frequently employed method in bleaching and whitening is to use violet or blue dyes concurrently in order to improve the bleaching and whitening effect. If such a dye is used in conjunction with a fluorescent whitening agent, this can serve two different purposes. On one hand, it is possible to try to achieve an increase in the degree of whiteness by compensating for the yellow of the fabric, in which case the white shade produced by the fluorescent whitening agent on the fabric is largely retained. On the other hand, the object can be to effect with the dye in question a change in the shade of the white effect produced by the fluorescent whitening agent on the fabric, in which case too an attempt is made additionally to achieve an increase in the degree of whiteness. It is thus possible to adjust the desired shade of the white effect.

Shading processes of materials such as paper and textile fabrics are known from e.g. DE 3125495.

These disclosed shading processes use a mixture of a photocatalyst and a dyestuff. These disclosed mixtures of photocatalyst and dyestuff are not suitable for a regular use, such as in detergent or softener formulations, because the dyestuffs do accumulate with every use and after a few uses the fabrics are colored. The shading compounds as used in the present invention do not (or only very slightly) color the textile fiber material, even if the textile fiber material is treated repeatedly with the present inventive shading compositions.

Additionally, the use of a mixture of two components always requires the proper ratio of the two components.

Furthermore, the new shading process using compounds, wherein at least one dyestuff is attached through a covalent bonding to the phthalocyanine has also an improved exhaustion onto the fabrics, an improved shade substantivity on fabrics and an improved shade consistency on exposure to light. Further more the new compounds are more efficient photocatalyst by additional light absorption and energy transfer to the phtalocyanine part of the molecule.

Therefore, the present invention relates to a shading process for textile fiber material, wherein the textile fiber material is treated with a composition comprising at least one Zn—, Ca—, Mg—, Na—, K—, Al, Si—, Ti—, Ge—, Ga—, Zr—, In— or Sn-phthalocyanine to which at least one dyestuff is attached through a covalent bonding.

A preferred embodiment of the present invention relates to a shading process for textile fiber material, wherein the textile fiber material is treated with a composition comprising at least one compound of formula (1a) and/or formula (1b)

(1a)

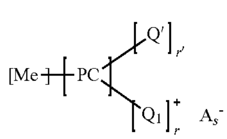

-continued (1b)

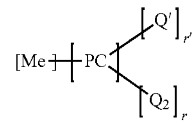

in which

PC is the phthalocyanine ring system,

Me is Zn; Ca; Mg; Na; K; Al—$Z_1$; Si(IV)-$(Z_1)_2$; Ti(IV)-$(Z_1)_2$; Ge(IV)-$(Z_1)_2$; Ga(III)-$Z_1$; Zr(IV)-$(Z_1)_2$; In(III)-$Z_1$ or Sn(IV)-$(Z_1)_2$, $Z_1$ is an alkanolate ion; a hydroxyl ion; $R_0COO^-$; $ClO_4^-$; $BF_4^-$;$PF_6^-$;$R_0SO_3^-$; $SO_4^{2-}$; $NO_3^-$; $F^-$; $Cl^-$; $Br^-$; $I^-$; citrate ion; tartrate ion or oxalate ion, wherein $R_0$ is hydrogen; or unsubstituted $C_1$-$C_{18}$alkyl; or $C_1$-$C_{18}$alkyl, which is substituted by at least one substituent selected from the group consisting of hydroxyl, cyano, carboxyl, —$SO_3H$, —$NH_2$, carb-$C_1$-$C_6$alkoxy, $C_1$-$C_6$alkoxy, phenyl, naphthyl and pyridyl; unsubstituted aryl or aryl, which is substituted by at least one substituent selected from the group consisting of hydroxyl, cyano, carboxyl, —$SO_3H$, —$NH_2$, carb-$C_1$-$C_6$alkoxy, $C_1$-$C_6$alkoxy and $C_1$-$C_4$-alkyl, r is 0; 1; 2; 3 or 4, r' is 1; 2; 3 or 4, each $Q_1$ is independently of each other a sulfo or carboxyl group or a radical of the formula —$SO_2X_2$—$R_1$—$X_3^+$; —O—$R_1$—$X_3^+$ or —$(CH_2)_t$—$Y_1^+$, in which $R_1$ is a branched or unbranched $C_1$-$C_8$alkylene; 1,3-phenylene or 1,4-phenylene, $X_2$ is —NH— or —N($C_1$-$C_5$alkyl)-, $X_3^+$ is a group of the formula

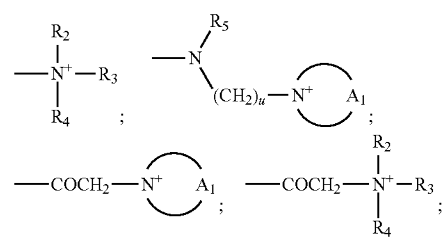

or, in the case where $R_1$=$C_1$-$C_8$alkylene, also a group of the formula

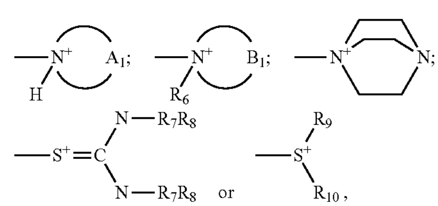

$Y_1^+$ is a group of the formula

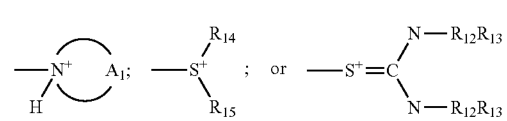

t is 0 or 1, wherein the above formulae $R_2$ and $R_3$ independently of one another are $C_1$-$C_6$alkyl, $R_4$ is $C_1$-$C_6$alkyl; $C_5$-$C_7$cycloalkyl or $NR_7R_8$, $R_5$ and $R_6$ independently of one another are $C_1$-$C_5$alkyl, $R_7$ and $R_8$ independently of one another are hydrogen or $C_1$-$C_5$alkyl, $R_9$ and $R_{10}$ independently of one another are unsubstituted $C_1$-$C_6$alkyl or $C_1$-$C_6$alkyl substituted by at least one substituent selected from the group consisting of hydroxyl, cyano, carboxyl, —$SO_3H$, —$NH_2$, carb-$C_1$-$C_6$alkoxy, $C_1$-$C_6$alkoxy, phenyl, naphthyl and pyridyl, u is from 1 to 6, $A_1$ is a unit which completes an aromatic 5- to 7-membered nitrogen heterocycle, which may where appropriate also contain one or two further nitrogen atoms as ring members, and $B_1$ is a unit which completes a saturated 5- to 7-membered nitrogen heterocycle, which may where appropriate also contain 1 to 2 nitrogen, oxygen and/or sulfur atoms as ring members, each Q' is independently from each other a moiety of formula -L-D, wherein L is a direct bond or a bridging group and D is the radical of a dyestuff, each $Q_2$ is independently from each other hydroxyl; $C_1$-$C_{22}$alkyl; branched $C_3$-$C_{22}$alkyl; $C_2$-$C_{22}$alkenyl; branched $C_3$-$C_{22}$alkenyl and mixtures thereof; $C_1$-$C_{22}$alkoxy; a sulfo or carboxyl radical; a radical of the formula

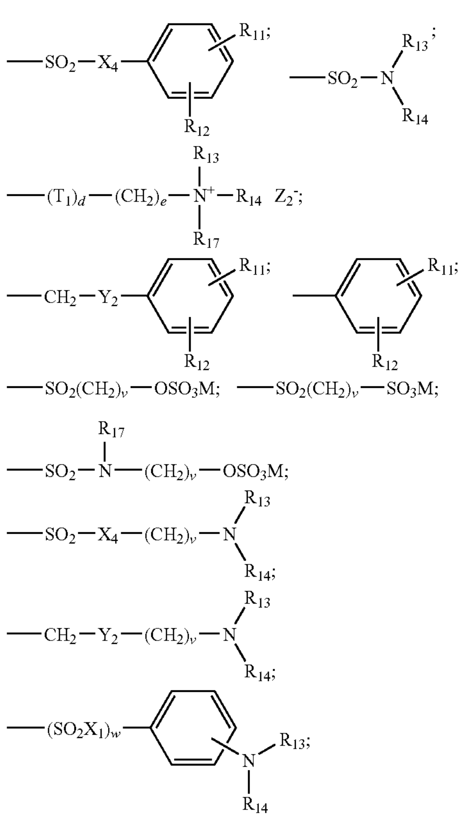

-continued

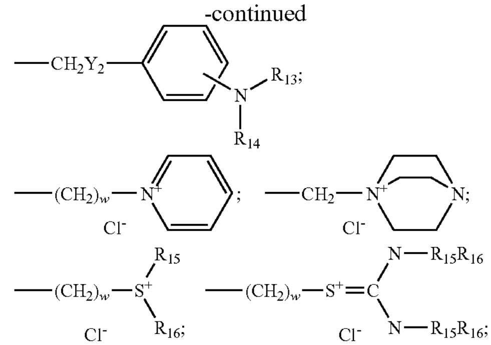

a branched alkoxy radical of the formula

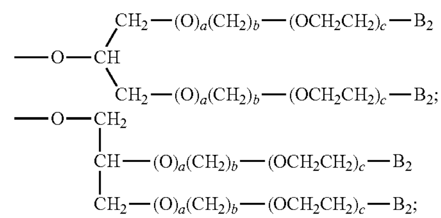

an alkylethyleneoxy unit of the formula $-(T_1)_d-(CH_2)_b(OCH_2CH_2)_a$—$B_3$ or an ester of the formula $COOR_{18}$, in which $B_2$ is hydrogen; hydroxyl; $C_1$-$C_{30}$alkyl; $C_1$-$C_{30}$alkoxy; —$CO_2H$; —$CH_2COOH$; —$SO_3^-M_1$; —$OSO_3^-M_1$; —$PO_3^{2-}M_1$; —$OPO_3^{2-}M_1$; and mixtures thereof, $B_3$ is hydrogen; hydroxyl; —COOH; —$SO_3^-M_1$; —$OSO_3^-M_1$ or $C_1$-$C_6$alkoxy, $M_1$ is a water-soluble cation, $T_1$ is —O— or —NH—, $X_1$ and $X_4$ independently of one another are —O—; —NH— or —N($C_1$-$C_6$alkyl)-, $R_{11}$ and $R_{12}$ independently of one another are hydrogen; a sulfo group and salts thereof; a carboxyl group and salts thereof or a hydroxyl group; at least one of the radicals $R_{11}$ and $R_{12}$ being a sulfo or carboxyl group or salts thereof, $Y_2$ is —O—; —S—; —NH— or —N($C_1$-$C_6$alkyl)-, $R_{13}$ and $R_{14}$ independently of one another other are hydrogen; $C_1$-$C_6$alkyl; hydroxy-$C_1$-$C_6$alkyl; cyano-$C_1$-$C_6$alkyl; sulfo-$C_1$-$C_6$alkyl; carboxy or halo-$C_1$-$C_6$alkyl; unsubstituted phenyl or phenyl substituted by at least one substituent chosen from the group consisting of halogen, $C_1$-$C_4$alkyl, $C_1$-$C_4$alkoxy, sulfo or by carboxy; or $R_{18}$ and $R_{19}$, together with the nitrogen atom to which they are bonded, form a saturated 5- or 6-membered heterocyclic ring that may in addition contain a further nitrogen atom or an oxygen atom as ring member, $R_{15}$ and $R_{16}$ independently of one another are $C_1$-$C_6$alkyl or aryl-$C_1$-$C_6$alkyl radicals, $R_{17}$ is hydrogen; an unsubstituted $C_1$-$C_6$alkyl or $C_1$-$C_6$alkyl substituted by at least one substituent chosen from the group consisting of halogen, hydroxyl, cyano, $SO_3H$, —$NH_2$, phenyl, carboxyl, carb-$C_1$-$C_6$alkoxy and $C_1$-$C_6$alkoxy, $R_{18}$ is $C_1$-$C_{22}$alkyl; branched $C_3$-$C_{22}$alkyl; $C_1$-$C_{22}$alkenyl or branched $C_3$-$C_{22}$alkenyl; $C_3$-$C_{22}$glycol; $C_1$-$C_{22}$alkoxy; branched $C_3$-$C_{22}$alkoxy; and mixtures thereof, M is hydrogen; or an alkali metal ion or ammonium ion, $Z_2$ is a is an alkanolate ion; a hydroxyl ion; $R_0COO^-$; $ClO_4^-$; $BF_4^-$;$PF_6^-$;$R_0SO_3^-$; $SO_4^{2-}$; $NO_3^-$; $F^-$; $Cl^-$; $Br^-$; $I^-$; citrate ion; tartrate ion or oxalate ion, wherein $R_0$ is hydrogen; or unsubstituted $C_1$-$C_{18}$alkyl; or $C_1$-$C_{18}$alkyl, which is substituted by at least one substituent chosen from the group consisting of hydroxyl, cyano, carboxyl, $SO_3H$, —$NH_2$, carb-$C_1$-$C_6$alkoxy, $C_1$-$C_6$alkoxy, phenyl, naphthyl and pyridyl; unsubstituted aryl or aryl, which is substituted by at least one substituent chosen from the group consisting of hydroxyl, cyano, carboxyl, —$SO_3H$, —$NH_2$, carb-$C_1$-$C_6$alkoxy, $C_1$-$C_6$alkoxy and $C_1$-$C_4$-alkyl, a is 0 or 1, b is from 0 to 6, c is from 0 to 100, d is 0 or 1, e is from 0 to 22, v is an integer from 2 to 12, w is 0 or 1, and $A^-$ is an organic or inorganic anion, and s is equal to r in cases of monovalent anions $A^-$ and is ≤r in cases of polyvalent anions, it being necessary for $A_s^-$ to compensate the positive charge; where, when r≠1, the radicals $Q_1$ can be identical or different, and where the phthalocyanine ring system may also comprise further solubilising groups.

The composition comprising at least one compound of formula (1a) and/or (1b) produces a relative hue angle of 220-320° and the compounds of formula (1a) and (1b) are not light stable. That means that the compounds of formula (1a) and/or (1b) of the shading composition are destroyed by light. Visible light (400 to 800 nm) is meant by the term "light". Preferably, it is sunlight.

Color coordinates and color differences are expressed using the internationally standardized CIELAB tristimulus values:

a*=red−green (+, −)

b*=yellow−blue (+, −)

L*=lightness (light=100)

C*=chroma

H*=hue (angle of 0°=red, 90°=yellow, 180°=green, 270°=blue), and the color differences ΔE*, ΔH*, ΔC*, ΔL*, Δa*, and Δb*, together with an identification number of the sample.

This internationally accepted system has been developed by CIE ("Commission Internationale de l'Éclairage"). It is for example part of DIN 6174: 1979-01 as well as DIN 5033-3: 1992-07.

The composition comprising at least one compound of formula (1a) and/or (1b) produces a relative hue angle of 220-320° and the compounds of formula (1a) and (1b) are degraded when the composition is exposed to sunlight. Preferably, the compounds of formula (1a) and (1b) are destroyed by light, preferably sunlight, when they are applied onto the textile fiber material.

The composition comprising at least one compound of formula (1a) and/or (1b) produces a relative hue angle of 220-320° and the decrease rate of the compounds of formula (1a) and/or (1b) is at least 1% per 2 hours, preferably at least 2% when the composition is exposed to (sun)light. Preferably, the compounds of formula (1a) and (1b) are destroyed by light, preferably sunlight, when they are applied onto the textile fiber material and the decrease rate of compounds of formula (1a) and/or (1b) is at least 1% per 2 hours, preferably at least 2%.

For example, the degradation of the components can be determined spectrophotometrically.

Preferably, the degradation of the compound of formula (1a) and formula (1b) when applied onto the textile fiber material does not change the color of the textile fiber material, even if the textile fiber material is treated with these compounds repeatedly.

Examples of suitable textile fiber materials are materials made of silk, wool, polyamide, acrylics or polyurethanes, and, in particular, cellulosic fiber materials and blends of all types. Such fiber materials are, for example, natural cellulose fibers, such as cotton, linen, jute and hemp, and regenerated cellulose. Preference is given to textile fiber materials made of cotton. Also suitable are hydroxyl-containing fibers which are present in mixed fabrics, for example mixtures of cotton with polyester fibers or polyamide fibers.

Halogen means fluorine, bromine or, in particular, chlorine.

Especially suitable groups

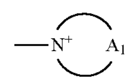

in the formulae (1a) and (1b) are:

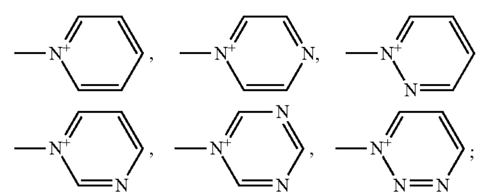

etc.

Preference is given to the group

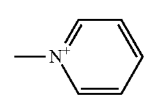

Suitable heterocyclic rings in the group

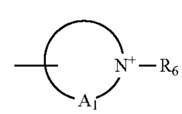

are likewise the groups listed above, the bond to the other substituents merely being via a carbon atom.

In all of these substituents, phenyl, naphthyl and aromatic hetero rings may be substituted by one or two further radicals, for example by $C_1$-$C_6$alkyl, $C_1$-$C_6$alkoxy, halogen, carboxyl, carb-$C_1$-$C_6$alkoxy, hydroxyl, amino, cyano, sulfo, sulfonamido, etc.

Preference is given to a substituent from the group $C_1$-$C_6$alkyl, $C_1$-$C_6$alkoxy, halogen, carboxyl, carb-$C_1$-$C_6$alkoxy or hydroxyl.

Particularly suitable groups

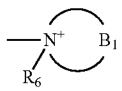

are:

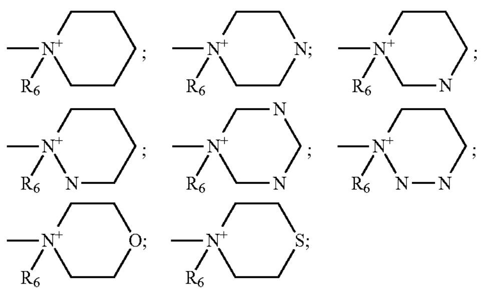

etc, wherein $B_1$ and $R_6$ have the same meaning as defined above.

All of the aforementioned nitrogen heterocycles can also be substituted by alkyl groups, either on a carbon atom or on another nitrogen atom in the ring. The alkyl group is preferably the methyl group.

$A^-_s$ in formula (1a) is, as a counterion to the positive charge on the remainder of the molecule, any anion. In general, it is introduced by the preparation process (quaternization). It is then preferably a is an alkanolate ion; a hydroxyl ion; $R_0COO^-$; $ClO_4^-$; $BF_4^-$;$PF_6^-$;$R_0SO_3^-$; $SO_4^{2-}$; $NO_3^-$; $F^-$; $Cl^-$; $Br^-$; $I^-$; citrate ion; tartrate ion or oxalate ion, wherein $R_0$ is hydrogen; or unsubstituted $C_1$-$C_{18}$alkyl; or $C_1$-$C_{18}$alkyl, which is substituted by at least one substituent chosen from the group consisting of hydroxyl, cyano, carboxyl, —$SO_3H$, —$NH_2$, carb-$C_1$-$C_6$alkoxy, $C_1$-$C_6$alkoxy, phenyl, naphthyl and pyridyl; unsubstituted aryl or aryl, which is substituted by at least one substituent chosen from the group consisting of hydroxyl, cyano, carboxyl, $SO_3H$, —$NH_2$, carb-$C_1$-$C_6$alkoxy, $C_1$-$C_6$alkoxy and $C_1$-$C_4$-alkyl. Arylsulfate ions which may be mentioned are the phenylsulfonate, p-tolylsulfonate and the p-chlorophenylsulfonate ion. The anion can however also be any other anion since the anions can be readily exchanged in a known manner; $A_s^-$ can thus also be a sulfate, sulfite, carbonate, phosphate, nitrate, acetate, oxalate, citrate, lactate ion or another anion of an organic carboxylic acid. The index s is the same as r for monovalent anions. For polyvalent anions, s has a value ≤r, in which case it must be chosen, depending on the conditions, such that it exactly balances the positive charge on the remainder of the molecule.

$C_1$-$C_6$alkyl and $C_1$-$C_6$alkoxy are straight-chain or branched alkyl or alkoxy radicals, such as, for example, methyl, ethyl, n-propyl, isopropyl, n-butyl, sec-butyl, tert-butyl, amyl, isoamyl, tert-amyl or hexyl or methoxy, ethoxy, n-propoxy, isopropoxy, n-butoxy, sec-butoxy, tert-butoxy, amyloxy, isoamyloxy, tert-amyloxy or hexyloxy.

$C_2$-$C_{22}$alkenyl is, for example, allyl, methallyl, isopropenyl, 2-butenyl, 3-butenyl, isobutenyl, n-penta-2,4-dienyl, 3-methyl-but-2-enyl, n-oct-2-enyl, n-dodec-2-enyl, isododecenyl, n-dodec-2-enyl or n-octadec-4-enyl.

Preferably, Me is Zn, $AlZ_1$, Si(IV)-$(Z_1)_2$ or Ti(IV)-$(Z_1)_2$, wherein $Z_1$ has the meanings as defined above.

More preferably, Me is Zn, $AlZ_1$, Si(IV)-$(Z_1)_2$ or Ti(IV)-$(Z_1)_2$, wherein $Z_1$ is chloride, fluorine, bromine or hydroxyl.

Preferably, the sum of r and r' is from 2 to 6, more preferably the sum is 4.

Preferably, $R_1$ is a branched or unbranched $C_1$-$C_4$alkylene; or 1,3- or 1,4-phenylene.

Preferably, $X_2$ is —NH— or —N($C_1$-$C_4$alkyl)-.

Preferably, $R_2$ and $R_3$ independently of one another are $C_1$-$C_4$alkyl.

Preferably, $R_4$ is $C_1$-$C_4$alkyl; pentyl; hexyl or $NR_7R_8$.

Preferably, $R_5$ and $R_6$ independently of one another are $C_1$-$C_4$alkyl.

Preferably, $R_7$ and $R_8$ independently of one another are hydrogen or $C_1$-$C_4$alkyl.

Preferably, $R_9$ and $R_{10}$ independently of one another are unsubstituted $C_1$-$C_4$alkyl or $C_1$-$C_4$alkyl, which is substituted by at least one substituent chosen from the group consisting of hydroxyl, cyano, $SO_3H$, —$NH_2$, carboxyl, carb-$C_1$-$C_4$alkoxy, $C_1$-$C_4$alkoxy, phenyl, naphthyl and pyridyl.

Preferably, u is 1; 2; 3 or 4.

Preferably, $A_1$ is a unit which completes an pyrrole-; imidazol-; pyridine-; pyrazine-; pyrimidine- or pyridazine-ring.

Preferably, $B_1$ is a unit which completes a morpholino-; pyrrolidine-; piperazine- or piperidine-ring.

Preferably, L is a direct bond; —$SO_2$—; —$(CH_2)_{1-4}$—$SO_2$—; —O—; —$(CH_2)_{1-4}$—O—; —$OR_{19}$—; —$(CH_2)_{1-4}$—$OR_{19}$—;

—$OR_{19}O$—; —$(CH_2)_{1-4}$—$OR_{19}O$—; —$OR_{19}N(R_{20})$—; —$(CH_2)_{1-4}$—$OR_{19}N(R_{20})$—; —$N(R_{20})$—; —$(CH_2)_{1-4}$—$N(R_{20})$——$(CH_2CH_2O$—$)_n$—; —C(O)—; —$(CH_2)_{1-4}$—C(O)—; —C(O)$N(R_{20})$—; —$(CH_2)_{1-4}$—C(O)$N(R_{20})$—l —$N(R_{20})$C(O)—; —$(CH_2)_{1-4}$—$N(R_{20})$C(O)—; —OC(O)—; —$(CH_2)_{1-4}$—OC(O)—; —C(O)O—; —$(CH_2)_{1-4}$—C(O)O—; —S—; —$(CH_2)_{1-4}$—S—; unsubstituted, linear or branched $C_1$-$C_{18}$alkylene;

linear or branched $C_1$-$C_{18}$alkylene, which is substituted by at least one substituent chosen from the group consisting of hydroxyl, cyano, $SO_3H$, —$NH_2$, carboxyl, carb-$C_1$-$C_4$alkoxy, $C_1$-$C_4$alkoxy, phenyl, naphthyl and pyridyl;

unsubstituted $C_5$-$C_{18}$arylene;

$C_5$-$C_{18}$arylene, which is substituted by at least one substituent chosen from the group consisting of hydroxyl, cyano, carboxyl, carb-$C_1$-$C_4$alkoxy, $C_1$-$C_4$alkoxy and $C_1$-$C_4$alkyl; unsubstituted, linear or branched $C_1$-$C_{18}$alkylene-$C_5$-$C_{18}$aryl;

linear or branched $C_1$-$C_{18}$alkylene-$C_5$-$C_{18}$aryl, which is substituted by at least one substituent chosen from the group consisting of hydroxyl, cyano, $SO_3H$, —$NH_2$, carboxyl, carb-$C_1$-$C_4$alkoxy, $C_1$-$C_4$alkoxy, $C_1$-$C_4$alkyl, phenyl, naphthyl and pyridyl;

unsubstituted, linear or branched $C_5$-$C_{18}$arylene-$C_1$-$C_{18}$alkyl or linear or branched $C_5$-$C_{18}$arylene-$C_1$-$C_{18}$alkyl, which is substituted by at least one substituent chosen from the group consisting of hydroxyl, cyano, $SO_3H$, —$NH_2$, carboxyl, carb-$C_1$-$C_4$alkoxy, $C_1$-$C_4$alkoxy, $C_1$-$C_4$alkyl, phenyl, naphthyl and pyridyl, wherein $R_{19}$ is unsubstituted, linear or branched $C_1$-$C_{18}$alkylene; linear or branched $C_1$-$C_{18}$alkylene, which is substituted by at least one substituent chosen from the group consisting of hydroxyl, cyano, $SO_3H$, —$NH_2$, carboxyl, carb-$C_1$-$C_4$alkoxy, $C_1$-$C_4$alkoxy, phenyl, naphthyl and pyridyl; unsubstituted $C_5$-$C_{18}$arylene; $C_5$-$C_{18}$arylene, which is substituted by at least one substituent chosen from the group consisting of hydroxyl, cyano, $SO_3H$, —$NH_2$, carboxyl, carb-$C_1$-$C_4$alkoxy, $C_1$-$C_4$alkoxy and $C_1$-$C_4$alkyl; unsubstituted, linear or branched $C_1$-$C_{18}$alkylene-$C_5$-$C_{18}$aryl; linear or branched $C_1$-$C_{18}$alkylene-$C_5$-$C_{18}$aryl, which is substituted by at least one substituent chosen from the group consisting of hydroxyl, cyano, $SO_3H$, —$NH_2$, carboxyl, carb-$C_1$-$C_4$alkoxy, $C_1$-$C_4$alkoxy, $C_1$-$C_4$alkyl, phenyl, naphthyl and pyridyl; unsubstituted, linear or branched $C_5$-$C_{18}$arylene-$C_1$-$C_{18}$alkyl or linear or branched $C_5$-$C_{18}$arylene-$C_1$-$C_{18}$alkyl, which is substituted by at least one substituent chosen from the group consisting of hydroxyl, cyano, carboxyl, carb-$C_1$-$C_4$alkoxy, $C_1$-$C_4$alkoxy, $C_1$-$C_4$alkyl, phenyl, naphthyl and pyridyl, $R_{20}$ is unsubstituted, linear or branched $C_1$-$C_{18}$alkyl; linear or branched $C_1$-$C_{18}$alkyl, which is substituted by at least one substituent chosen from the group consisting of hydroxyl, cyano, $SO_3H$, —$NH_2$, carboxyl, carb-$C_1$-$C_4$alkoxy, $C_1$-$C_4$alkoxy, phenyl, naphthyl and pyridyl; unsubstituted $C_5$-$C_{18}$aryl; $C_5$-$C_{18}$aryl, which is substituted by at least one substituent chosen from the group consisting of hydroxyl, cyano, $SO_3H$, —$NH_2$, carboxyl, carb-$C_1$-$C_4$alkoxy, $C_1$-$C_4$alkoxy and $C_1$-$C_4$alkyl; unsubstituted, linear or branched $C_1$-$C_{18}$alkoxy or linear or branched $C_1$-$C_{18}$alkoxy, which is substituted by at least one substituent chosen from the group consisting of hydroxyl, cyano, $SO_3H$, —$NH_2$, carboxyl, carb-$C_1$-$C_4$alkoxy, $C_1$-$C_4$alkyl, phenyl, naphthyl and pyridyl, n is 1; 2; 3 or 4, Preferably, D is the radical of a azo- (such as for example acid violet dyes); diazo-; trisazo-, polyazo-; azomethin-; methin-; anthrachino-; dioxazine-; phenazine-; diphenylmethane-; triphenylmethane-; carbonyl-; xanthene-; acid- or thioxanthene-dyestuff.

Preferably, $B_2$ is hydrogen; hydroxyl; $C_1$-$C_{18}$alkyl; $C_1$-$C_{18}$alkoxy; —$CO_2H$; —$CH_2COOH$; —$SO_3^-M_1$; —$OSO_3^-M_1$; —$PO_3^{2-}M_1$; —$OPO_3^{2-}M_1$; and mixtures thereof, wherein $M_1$ has the meanings as defined above.

Preferably, $B_3$ is hydrogen; hydroxyl; —COOH; —$SO_3^-M_1$; —$OSO_3^-M_1$ or $C_1$-$C_4$alkoxy.

Preferably, $M_1$ is hydrogen; alkalimetal-ion or an ammonium ion.

Preferably, $X_1$ and $X_4$ independently of one another are —O—; —NH— or —N($C_1$-$C_4$alkyl)-.

Preferably, $Y_2$ is —O—; —S—; —NH— or —N($C_1$-$C_4$alkyl)-.

Preferably, $R_{13}$ and $R_{14}$ independently of one another are hydrogen; $C_1$-$C_4$alkyl; hydroxy-$C_1$-$C_4$alkyl; cyano-$C_1$-$C_4$alkyl; sulfo-$C_1$-$C_4$alkyl; carboxy or halogen-$C_1$-$C_4$alkyl; unsubstituted phenyl or phenyl substituted by at least one substituent chosen from the group consisting of halogen, $C_1$-$C_4$alkyl or $C_1$-$C_4$alkoxy; sulfo and carboxyl; or $R_{13}$ and $R_{14}$ together with the nitrogen atom to which they are bonded form a form morpholino, piperazine or piperidine ring.

Preferably, $R_{15}$ and $R_{16}$ independently of one another are $C_1$-$C_4$alkyl or aryl-$C_1$-$C_4$alkyl radicals.

Preferably, $R_{17}$ is hydrogen; an unsubstituted $C_1$-$C_4$alkyl or $C_1$-$C_4$alkyl substituted at least one substituent chosen from the group consisting of halogen, hydroxyl, cyano, —$SO_3H$, —$NH_2$, phenyl, carboxyl, carb-$C_1$-$C_4$alkoxy and $C_1$-$C_6$alkoxy.

Preferably, $R_{18}$ is $C_1$-$C_{10}$alkyl; branched $C_3$-$C_{10}$alkyl; $C_1$-$C_{10}$alkenyl or branched $C_3$-$C_{10}$alkenyl; $C_3$-$C_{22}$glycol; $C_1$-$C_{10}$alkoxy; branched $C_3$-$C_{10}$alkoxy; and mixtures thereof.

Preferably, M is hydrogen; $Na^+$; $K^+$ or an ammonium ion.

Preferably, $Z_2^-$ is a chlorine; bromine; alkylsulfate or aralkylsulfate ion.

Preferably, a is 0 or 1.

Preferably, b is from 0 to 6.

Preferably, c is from 0 to 100.

Preferably, d is 0 or 1.

Preferably, e is from 0 to 22.

Preferably, v is an integer from 2 to 12.

Preferably, w is 0 or 1.

Preferably, $A^-$ halogen ion; an alkyl sulfate ion; an aryl sulfate ion; sulfate, sulfite, carbonate, phosphate, nitrate, acetate, oxalate, citrate or lactate ion or another anion of an organic carboxylic acid.

Preferred dyestuff radicals D have the following formulae (I)-(XXXII):

(I)

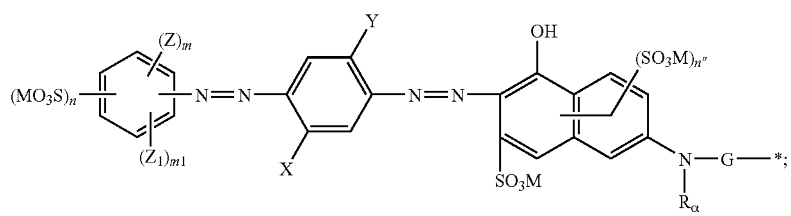

(II)

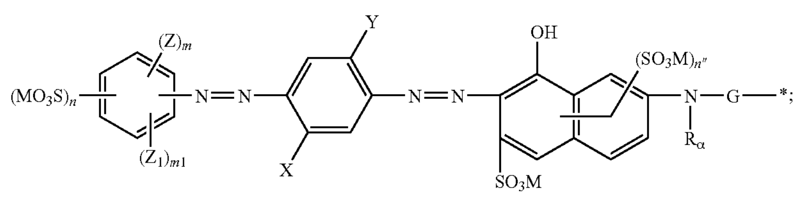

-continued
(III)
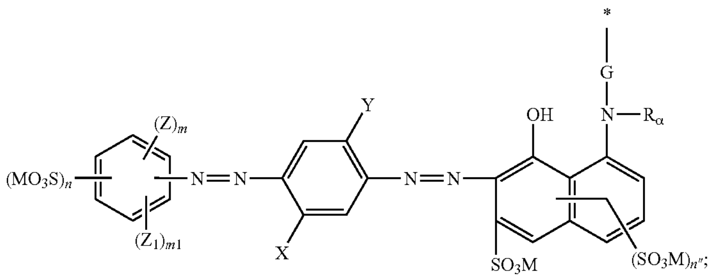
(IV)
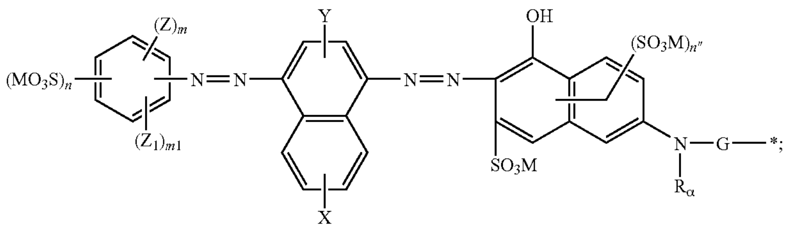
(V)
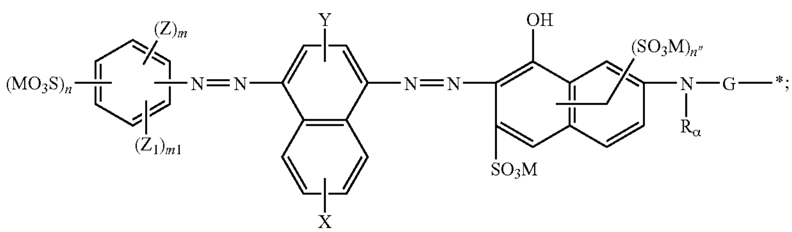
(VI)
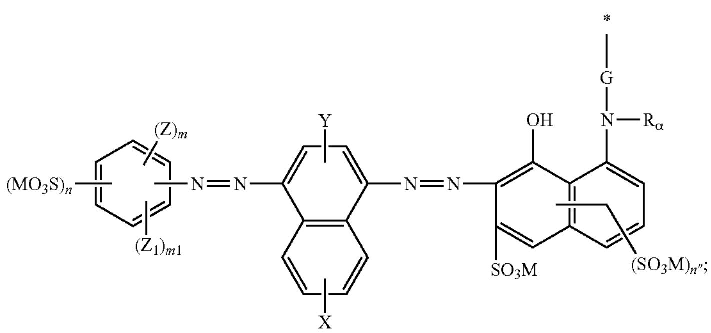
(VII)
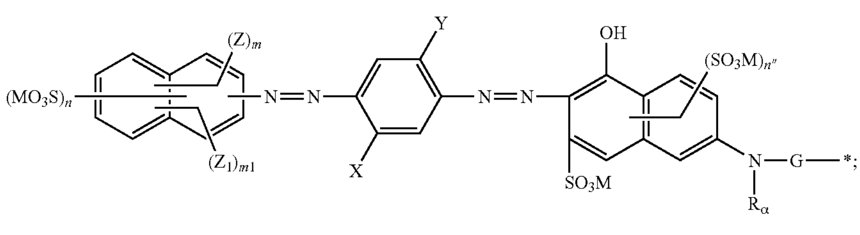
(VIII)
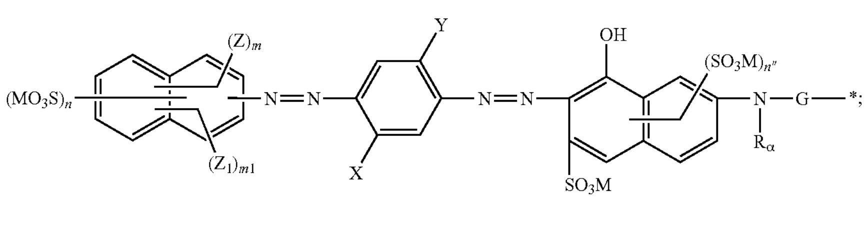

-continued
(IX)
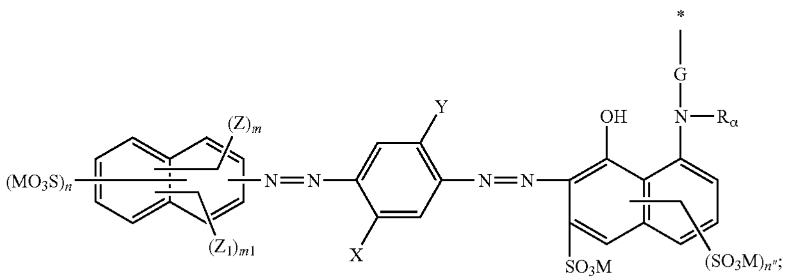
(X)
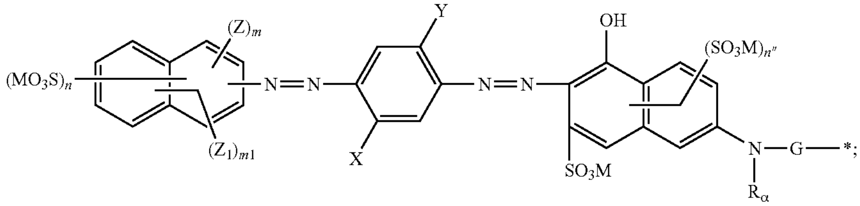
(XI)
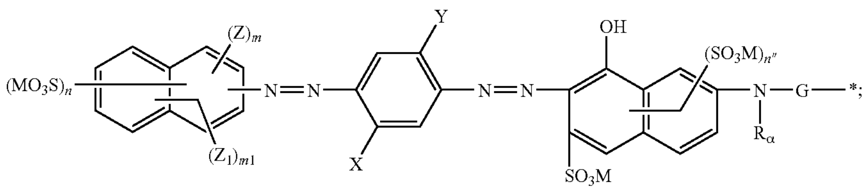
(XII)
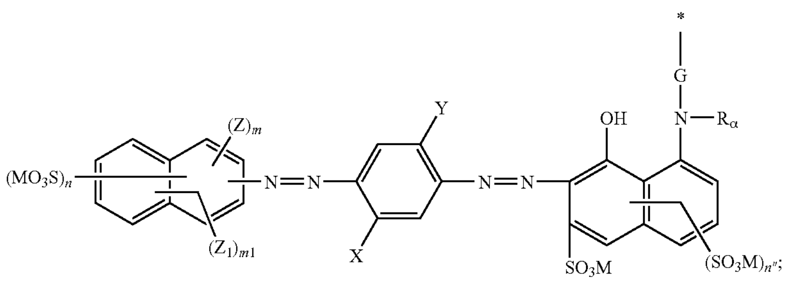
(XIII)
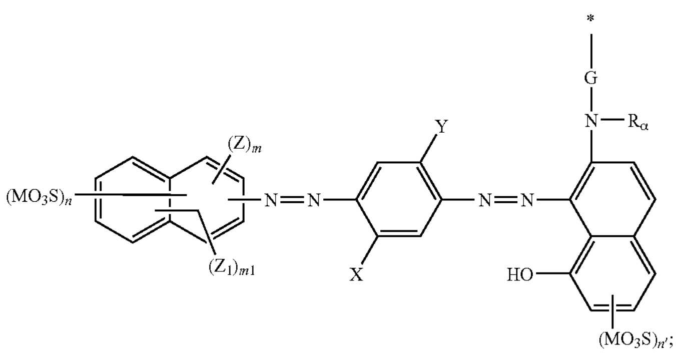
(XIV)
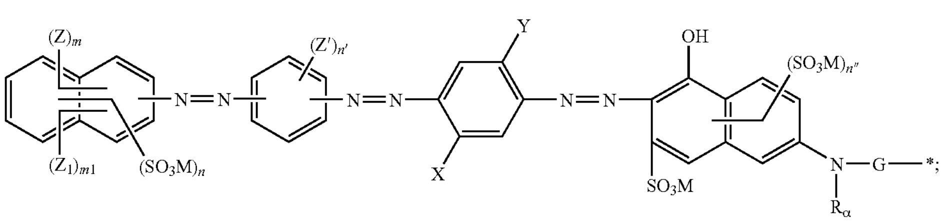

-continued
(XV)
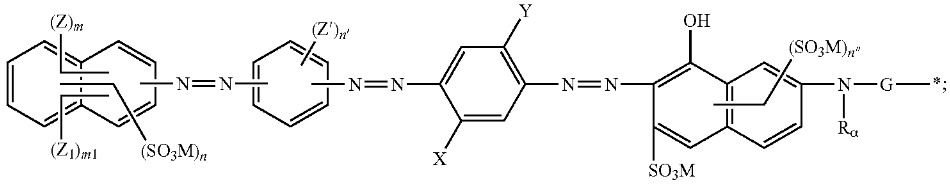
(XVI)
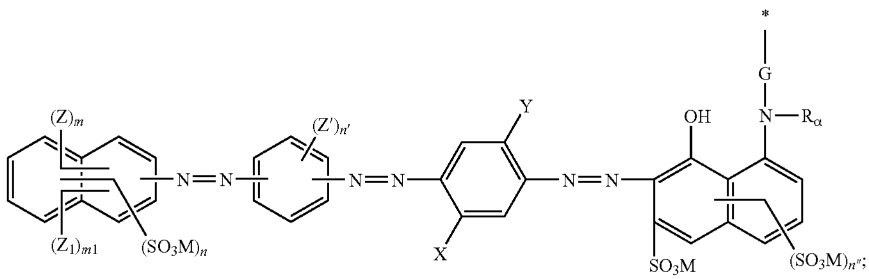
(XVII)
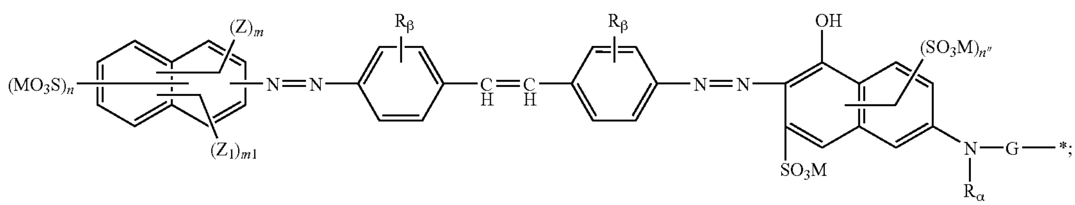
(XVIII)
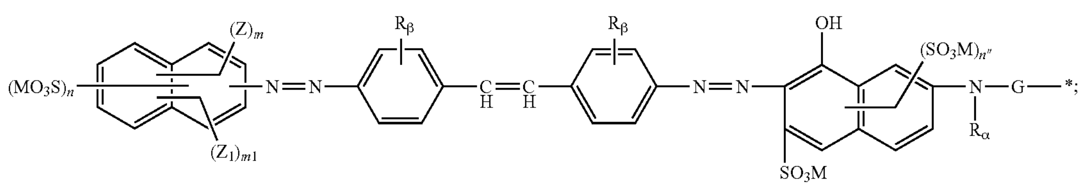
(XIX)
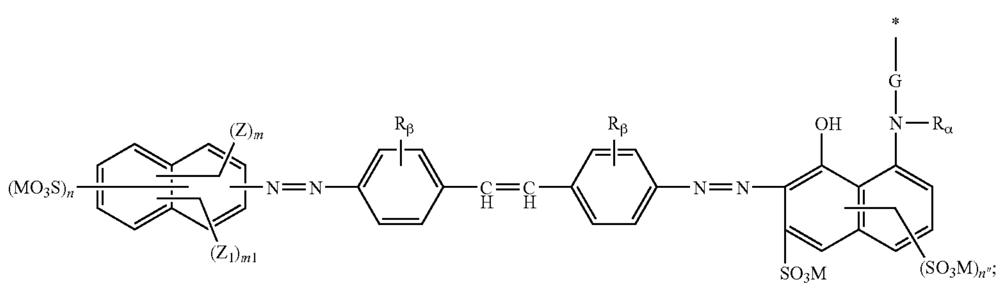
(XX)
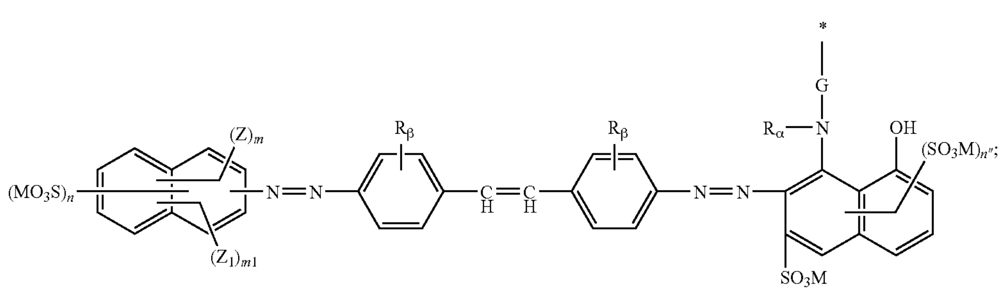

-continued
(XXI)
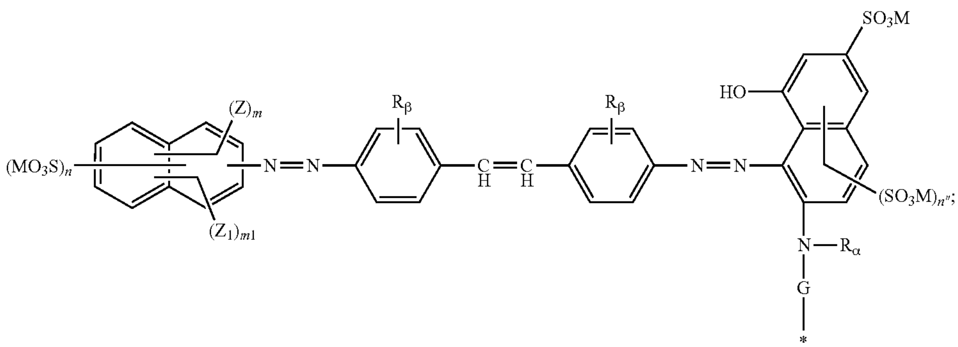
(XXII)
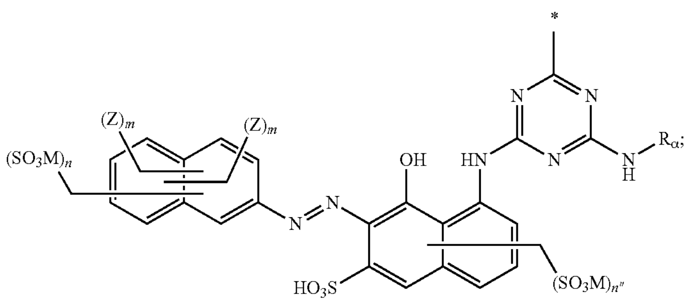
(XXIII)
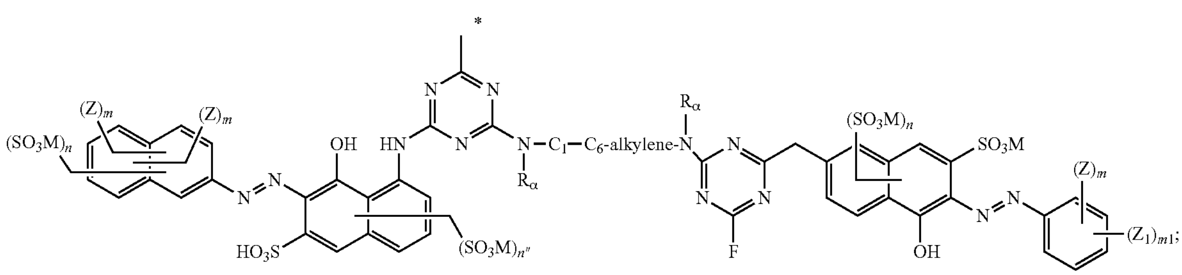
(XXIV)
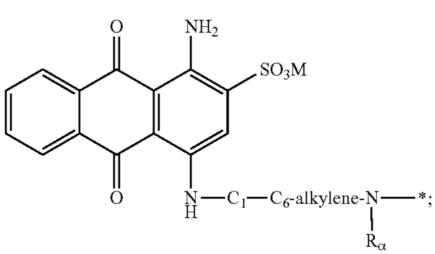
(XXV)
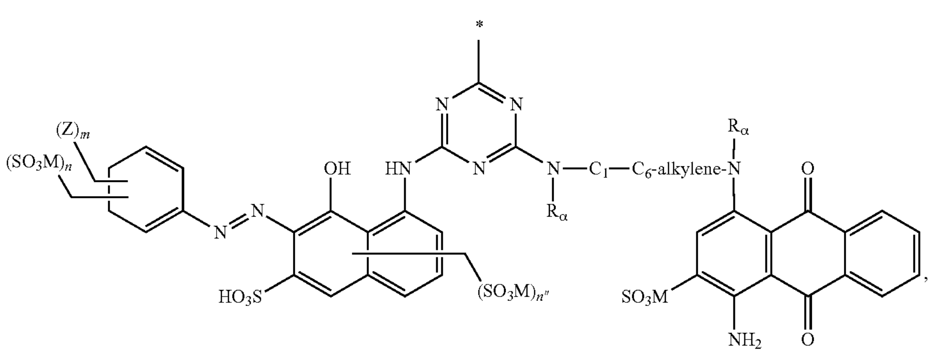

-continued (XXVI)

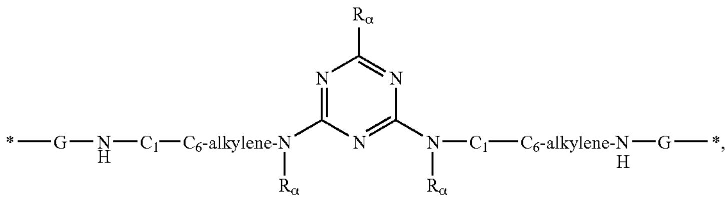

(XXVIIa)

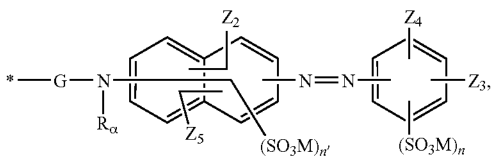

(XXVIIb)

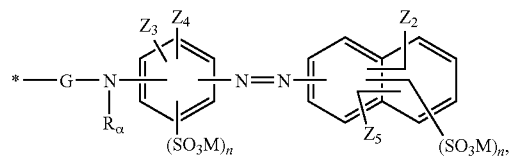

(XXVIIc)

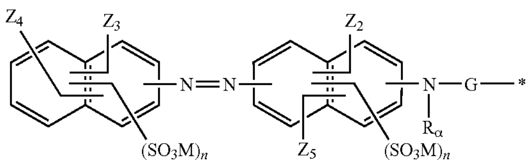

(XXVIId)

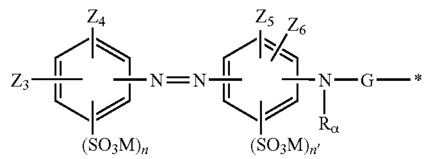

(XXVIII)

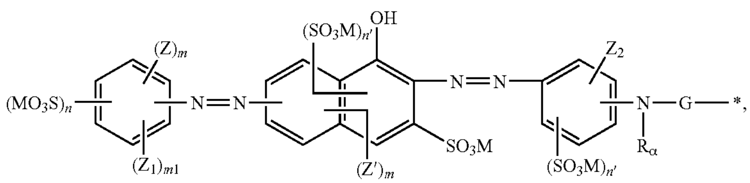

(XXIX)

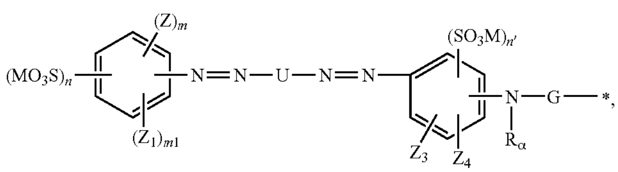

(XXX)

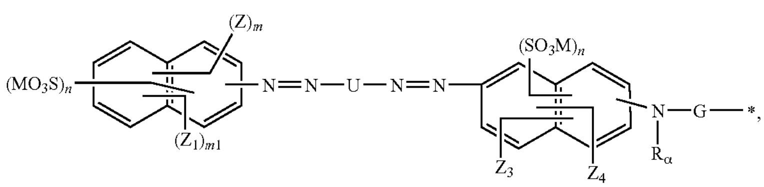

(XXXI)

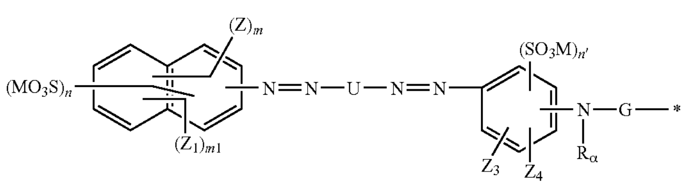

or (XXXII)

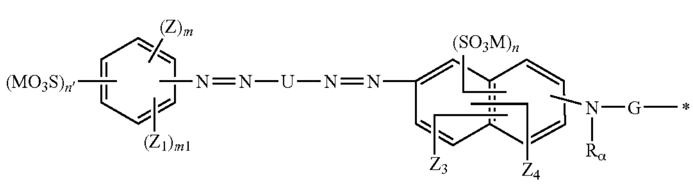

wherein

* marks the bond to the bridging group L,

X and Y independently of one another, are hydrogen; $SO_3M$; linear or branched, unsubstituted $C_1$-$C_4$-alkyl; linear or branched $C_1$-$C_4$-alkyl, which is substituted by at least one substituent chosen from the group consisting of hydroxyl, cyano, $SO_3H$, —$NH_2$, carboxyl, carb-$C_1$-$C_4$alkoxy, $C_1$-$C_4$alkoxy, phenyl, naphthyl and pyridyl; linear or branched, unsubstituted $C_1$-$C_4$-alkoxy; linear or branched, $C_1$-$C_4$-alkoxy, which is substituted by at least one substituent chosen from the group consisting of hydroxyl, cyano, $SO_3H$, —$NH_2$, carboxyl, carb-$C_1$-$C_4$alkoxy, $C_1$-$C_4$alkyl, phenyl, naphthyl and pyridyl; NHCOOH; NHCOOC$_1$-C$_4$alkyl; COOH or COOC$_1$-C$_4$alkyl;

U is a moiety of formula

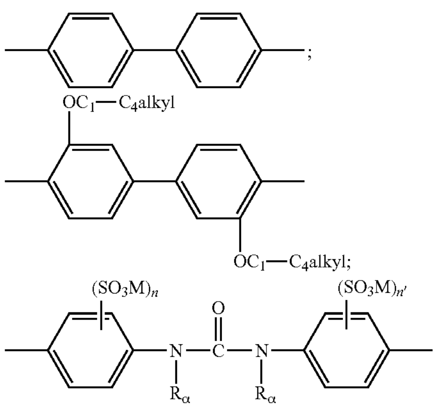

R$_\alpha$ is hydrogen; linear or branched, unsubstituted C$_1$-C$_4$-alkyl; linear or branched C$_1$-C$_4$-alkyl, which is substituted by at least one substituent chosen from the group consisting of hydroxyl, cyano, SO$_3$H, —NH$_2$, carboxyl, carb-C$_1$-C$_4$alkoxy, C$_1$-C$_4$alkoxy, phenyl, naphthyl and pyridyl; unsubstituted aryl or aryl, which is substituted by at least one substituent chosen from the group consisting of hydroxyl, cyano, SO$_3$H, —NH$_2$, carboxyl, carb-C$_1$-C$_4$alkoxy, C$_1$-C$_4$alkoxy and C$_1$-C$_4$alkyl, each R$_\beta$ independently of one another is hydrogen; SO$_3$M; linear or branched, unsubstituted C$_1$-C$_4$-alkyl; linear or branched C$_1$-C$_4$-alkyl, which is substituted by at least one substituent chosen from the group consisting of hydroxyl, cyano, SO$_3$H, —NH$_2$, carboxyl, carb-C$_1$-C$_4$alkoxy, C$_1$-C$_4$alkoxy, phenyl, naphthyl and pyridyl; linear or branched, unsubstituted C$_1$-C$_4$-alkoxy or linear or branched, C$_1$-C$_4$-alkoxy, which is substituted by at least one substituent chosen from the group consisting of hydroxyl, cyano, SO$_3$H, —NH$_2$, carboxyl, carb-C$_1$-C$_4$alkoxy, C$_1$-C$_4$alkyl, phenyl, naphthyl and pyridyl, Z is linear or branched, unsubstituted C$_1$-C$_4$-alkyl; linear or branched C$_1$-C$_4$-alkyl, which is substituted by at least one substituent chosen from the group consisting of hydroxyl, cyano, SO$_3$H, —NH$_2$, carboxyl, carb-C$_1$-C$_4$alkoxy, C$_1$-C$_4$alkoxy, phenyl, naphthyl and pyridyl; linear or branched, unsubstituted C$_1$-C$_4$-alkoxy or linear or branched, C$_1$-C$_4$-alkoxy, which is substituted by at least one substituent chosen from the group consisting of hydroxyl, cyano, SO$_3$H, —NH$_2$, carboxyl, carb-C$_1$-C$_4$alkoxy, C$_1$-C$_4$alkyl, phenyl, naphthyl and pyridyl; halogen; OH; NO$_2$; COOH; COOC$_1$-C$_4$alkyl; NH$_2$; NHC$_1$-C$_4$alkyl, wherein the alkyl group may be substituted by at least one substituent chosen from the group consisting of OH, NH$_2$, C$_1$-C$_4$alkyl, CN and COOH; N(C$_1$-C$_4$alkyl)C$_1$-C$_4$alkyl, wherein the alkyl groups may independently of each other be substituted by at least one substituent chosen from the group consisting of OH, NH$_2$, C$_1$-C$_4$alkyl, CN and COOH; NH-aryl; NH-aryl, wherein the aryl is substituted by at least one substituent chosen from the group consisting of hydroxyl, cyano, SO$_3$H, —NH$_2$, carboxyl, carb-C$_1$-C$_4$alkoxy, C$_1$-C$_4$alkyl and C$_1$-C$_4$alkoxy; NHCOC$_1$-C$_4$alkyl and NHCOOC$_1$-C$_4$alkyl, Z' is SO$_3$M; linear or branched, unsubstituted C$_1$-C$_4$-alkyl; linear or branched C$_1$-C$_4$-alkyl, which is substituted by at least one substituent chosen from the group consisting of hydroxyl, cyano, SO$_3$H, —NH$_2$, carboxyl, carb-C$_1$-C$_4$alkoxy, C$_1$-C$_4$alkoxy, phenyl, naphthyl and pyridyl; linear or branched, unsubstituted C$_1$-C$_4$-alkoxy or linear or branched, C$_1$-C$_4$-alkoxy, which is substituted by at least one substituent chosen from the group consisting of hydroxyl, cyano, SO$_3$H, —NH$_2$, carboxyl, carb-C$_1$-C$_4$alkoxy, C$_1$-C$_4$alkyl, phenyl, naphthyl and pyridyl; halogen; OH; NO$_2$; COOH; COOC$_1$-C$_4$alkyl; NH$_2$; NHC$_1$-C$_4$alkyl, wherein the alkyl group may be substituted by at least one substituent chosen from the group consisting of OH, NH$_2$, C$_1$-C$_4$alkyl, CN or COOH; N(C$_1$-C$_4$alkyl)C$_1$-C$_4$alkyl, wherein the alkyl groups may independently of each other be substituted by at least one substituent chosen from the group consisting of OH, NH$_2$, C$_1$-C$_4$alkyl, CN and COOH; NH-aryl; NH-aryl, wherein the aryl is substituted by at least one substituent chosen from the group consisting of hydroxyl, cyano, SO$_3$H, —NH$_2$, carboxyl, carb-C$_1$-C$_4$alkoxy, C$_1$-C$_4$alkyl and C$_1$-C$_4$alkoxy; NHCOC$_1$-C$_4$alkyl or NHCOOC$_1$-C$_4$alkyl, Z$_1$ is linear or branched, unsubstituted C$_1$-C$_4$-alkyl; linear or branched C$_1$-C$_4$-alkyl, which is substituted by at least one substituent chosen from the group consisting of hydroxyl, cyano, SO$_3$H, —NH$_2$, carboxyl, carb-C$_1$-C$_4$alkoxy, C$_1$-C$_4$alkoxy, phenyl, naphthyl and pyridyl; linear or branched, unsubstituted C$_1$-C$_4$-alkoxy or linear or branched, C$_1$-C$_4$-alkoxy, which is substituted by at least one substituent chosen from the group consisting of hydroxyl, cyano, SO$_3$H, —NH$_2$, carboxyl, carb-C$_1$-C$_4$alkoxy, C$_1$-C$_4$alkyl, phenyl, naphthyl and pyridyl; halogen; OH; NO$_2$; COOH; COOC$_1$-C$_4$alkyl; NH$_2$; NHC$_1$-C$_4$alkyl, wherein the alkyl group may be substituted by at least one substituent chosen from the group consisting of OH, NH$_2$, C$_1$-C$_4$alkyl, CN or COOH; N(C$_1$-C$_4$alkyl)C$_1$-C$_4$alkyl, wherein the alkyl groups may independently of each other be substituted by at least one substituent chosen from the group consisting of OH, NH$_2$, C$_1$-C$_4$alkyl, CN and COOH; NH-aryl; NH-aryl, wherein the aryl is substituted by at least one substituent chosen from the group consisting of hydroxyl, cyano, SO$_3$H, —NH$_2$, carboxyl, carb-C$_1$-C$_4$alkoxy, C$_1$-C$_4$alkyl and C$_1$-C$_4$alkoxy; NHCOC$_1$-C$_4$alkyl or NHCOOC$_1$-C$_4$alkyl, Z$_2$, Z$_3$, Z$_4$, Z$_5$ and Z$_6$ are independently from each other hydrogen; linear or branched, unsubstituted C$_1$-C$_4$-alkyl; linear or branched C$_1$-C$_4$-alkyl, which is substituted by at least one substituent chosen from the group consisting of hydroxyl, cyano, SO$_3$H, —NH$_2$, carboxyl, carb-C$_1$-C$_4$alkoxy, C$_1$-C$_4$alkoxy, phenyl, naphthyl and pyridyl; linear or branched, unsubstituted C$_1$-C$_4$-alkoxy or linear or branched, C$_1$-C$_4$-alkoxy, which is substituted by at least one substituent chosen from the group consisting of hydroxyl, cyano, SO$_3$H, —NH$_2$, carboxyl, carb-C$_1$-C$_4$alkoxy, C$_1$-C$_4$alkyl, phenyl, naphthyl and pyridyl; halogen; OH; SO$_2$CH$_2$CH$_2$SO$_3$H; NO$_2$; COOH; COOC$_1$-C$_4$alkyl; NH$_2$; NHC$_1$-C$_4$alkyl, wherein the alkyl group may be substituted by at least one substituent chosen from the group consisting of OH, NH$_2$, C$_1$-C$_4$alkyl, CN or COOH; N(C$_1$-C$_4$alkyl)C$_1$-C$_4$alkyl, wherein the alkyl groups may independently of each other be substituted by at least one substituent chosen from the group consisting of OH, NH$_2$, C$_1$-C$_4$alkyl, CN and COOH; NH-aryl; NH-aryl, wherein the aryl is substituted by at least one substituent chosen from the group consisting of hydroxyl, cyano, SO$_3$H, —NH$_2$, carboxyl, carb-C$_1$-C$_4$alkoxy, C$_1$-C$_4$alkyl and C$_1$-C$_4$alkoxy; NHCOC$_1$-C$_4$alkyl or NHCOOC$_1$-C$_4$alkyl, G is a direct bond; COOC$_1$-C$_4$alkylene; unsubstituted arylene; arylene which is substituted by at least one substituent chosen from the group consisting of hydroxyl, cyano, NO$_2$, SO$_3$H, —NH$_2$, carboxyl, carb-C$_1$-C$_4$alkoxy, C$_1$-C$_4$alkoxy and C$_1$-C$_4$alkyl; unsubstituted C$_1$-C$_4$alkylene or C$_1$-C$_4$-alkylene which is substituted by at least one substituent chosen from the group consisting of hydroxyl, cyano, NO$_2$, SO$_3$H, —NH$_2$, carboxyl, carb-C$_1$-C$_4$alkoxy, C$_1$-C$_4$alkoxy and C$_1$-C$_4$alkyl; or —CO-arylene, n is 0; 1; 2 or 3, n' is 0; 1 or 2, n" is 0 or 1, m is 0; 1 or 2, m$_1$ is 0; 1 or 2, each M is independently from each other hydrogen; an alkali metal ion or an ammonium ion.

More preferred dyestuff radicals D have the following formulae (I')-(XXXII'):

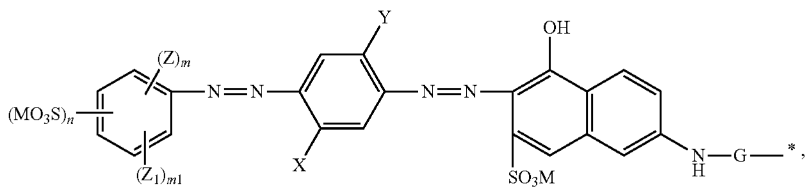

(I')

wherein

X and Y independently of one another are linear or branched, unsubstituted $C_1$-$C_4$-alkyl; linear or branched $C_1$-$C_4$-alkyl, which is substituted by at least one substituent chosen from the group consisting of hydroxyl, cyano, $SO_3H$, —$NH_2$, carboxyl, carb-$C_1$-$C_2$alkoxy, $C_1$-$C_2$alkoxy, phenyl, naphthyl and pyridyl; linear or branched, unsubstituted $C_1$-$C_4$-alkoxy, Z is unsubstituted $C_1$-$C_2$-alkyl; $C_1$-$C_2$-alkyl, which is substituted by at least one substituent chosen from the group consisting of hydroxyl, cyano, $SO_3H$, —$NH_2$, carboxyl, carb-$C_1$-$C_2$alkoxy, $C_1$-$C_2$alkoxy, phenyl, naphthyl and pyridyl; linear or branched, unsubstituted $C_1$-$C_4$-alkoxy; OH; $NO_2$; COOH; $COOC_1$-$C_2$alkyl, $Z_1$ is halogen; OH; $NO_2$; COOH or $COOC_1$-$C_4$alkyl, G is a direct bond; unsubstituted arylene; arylene which is substituted by at least one substituent chosen from the group consisting of hydroxyl, cyano, $NO_2$, $SO_3H$, —$NH_2$, carboxyl, carb-$C_1$-$C_2$alkoxy, $C_1$-$C_2$alkoxy and $C_1$-$C_2$alkyl; unsubstituted $C_1$-$C_4$alkylene or $C_1$-$C_4$-alkylene which is substituted by at least one substituent chosen from the group consisting of hydroxyl, cyano, $NO_2$, $SO_3H$, —$NH_2$, carboxyl, carb-$C_1$-$C_2$alkoxy, $C_1$-$C_2$alkoxy and $C_1$-$C_2$alkyl, n is 0; 1 or 2, m is 0 or 1, $m_1$ is 0 or 1, each M is independently from each other hydrogen; $Na^+$ or $K^+$;

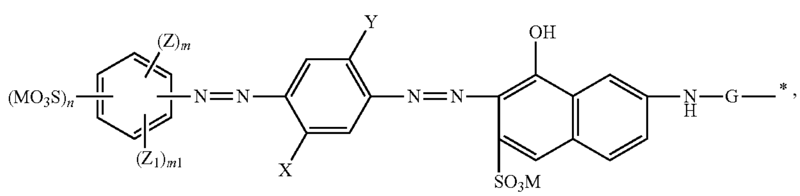

(II')

wherein

X and Y independently of one another are linear or branched, unsubstituted $C_1$-$C_4$-alkyl; linear or branched $C_1$-$C_4$-alkyl, which is substituted by at least one substituent chosen from the group consisting of hydroxyl, cyano, $SO_3H$, —$NH_2$, carboxyl, carb-$C_1$-$C_2$alkoxy, $C_1$-$C_2$alkoxy, phenyl, naphthyl and pyridyl; linear or branched, unsubstituted $C_1$-$C_4$-alkoxy, Z is unsubstituted $C_1$-$C_2$-alkyl; $C_1$-$C_2$-alkyl, which is substituted by at least one substituent chosen from the group consisting of hydroxyl, cyano, $SO_3H$, —$NH_2$, carboxyl, carb-$C_1$-$C_2$alkoxy, $C_1$-$C_2$alkoxy, phenyl, naphthyl and pyridyl; linear or branched, unsubstituted $C_1$-$C_4$-alkoxy; OH; $NO_2$; COOH; $COOC_1$-$C_2$alkyl, $Z_1$ is OH; $NO_2$; COOH or $COOC_1$-$C_2$alkyl, G is a direct bond; unsubstituted arylene; arylene which is substituted by at least one substituent chosen from the group consisting of hydroxyl, cyano, $NO_2$, $SO_3H$, —$NH_2$, carboxyl, carb-$C_1$-$C_2$alkoxy, $C_1$-$C_2$alkoxy and $C_1$-$C_2$alkyl; unsubstituted $C_1$-$C_4$alkylene or $C_1$-$C_4$-alkylene which is substituted by at least one substituent chosen from the group consisting of hydroxyl, cyano, $NO_2$, $SO_3H$, —$NH_2$, carboxyl, carb-$C_1$-$C_2$alkoxy, $C_1$-$C_2$alkoxy and $C_1$-$C_2$alkyl, n is 0; 1 or 2, m is 0 or 1, $m_1$ is 0 or 1, each M is independently from each other hydrogen; $Na^+$ or $K^+$;

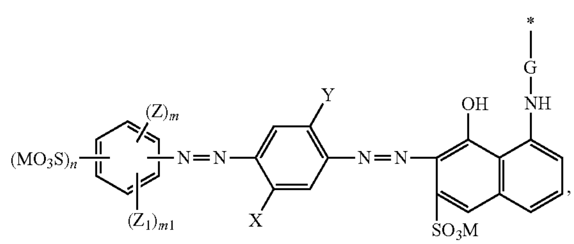

(III')

wherein

X and Y independently of one another are linear or branched, unsubstituted $C_1$-$C_4$-alkyl; linear or branched $C_1$-$C_4$-alkyl, which is substituted by at least one substituent chosen from the group consisting of hydroxyl, cyano, $SO_3H$, —$NH_2$, carboxyl, carb-$C_1$-$C_2$alkoxy, $C_1$-$C_2$alkoxy, phenyl, naphthyl and pyridyl; linear or branched, unsubstituted $C_1$-$C_4$-alkoxy, Z is unsubstituted $C_1$-$C_2$-alkyl; $C_1$-$C_2$-alkyl, which is substituted by at least one substituent chosen from the group consisting of hydroxyl, cyano, $SO_3H$, —$NH_2$, carboxyl, carb-$C_1$-$C_2$alkoxy, $C_1$-$C_2$alkoxy, phenyl, naphthyl and pyridyl; linear or branched, unsubstituted $C_1$-$C_4$-alkoxy; OH; $NO_2$; COOH; $COOC_1$-$C_2$alkyl, $Z_1$ is OH; $NO_2$; COOH or $COOC_1$-$C_4$alkyl, G is a direct bond; unsubstituted arylene; arylene which is substituted by at least one substituent chosen from the group consisting of hydroxyl, cyano, $NO_2$, $SO_3H$, —$NH_2$, carboxyl, carb-$C_1$-$C_2$alkoxy, $C_1$-$C_2$alkoxy and $C_1$-$C_2$alkyl; unsubstituted $C_1$-$C_4$alkylene or $C_1$-$C_4$-alkylene which is substituted by at least one substituent chosen from the group consisting of hydroxyl, cyano, $NO_2$, $SO_3H$, —$NH_2$, carboxyl, carb-$C_1$-$C_2$alkoxy, $C_1$-$C_2$alkoxy and $C_1$-$C_2$alkyl, n is 0; 1 or 2, m is 0 or 1, $m_1$ is 0 or 1, each M is independently from each other hydrogen; $Na^+$ or $K^+$;

(IV′)

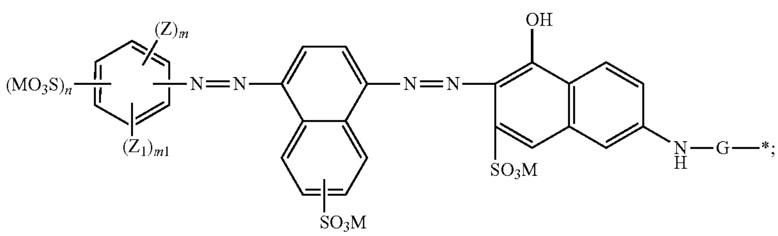

wherein

Z is unsubstituted $C_1$-$C_2$-alkyl; $C_1$-$C_2$-alkyl, which is substituted by at least one substituent chosen from the group consisting of hydroxyl, cyano, $SO_3H$, —$NH_2$, carboxyl, carb-$C_1$-$C_2$alkoxy, $C_1$-$C_2$alkoxy, phenyl, naphthyl and pyridyl; linear or branched, unsubstituted $C_1$-$C_4$-alkoxy; OH; $NO_2$; COOH; $COOC_1$-$C_2$alkyl, $Z_1$ is OH; $NO_2$; COOH or $COOC_1$-$C_2$alkyl, G is a direct bond or $COOC_1$-$C_2$alkylene, n is 0; 1 or 2, m is 0 or 1, $m_1$ is 0 or 1, each M is independently from each other hydrogen; $Na^+$ or $K^+$;

(V′)

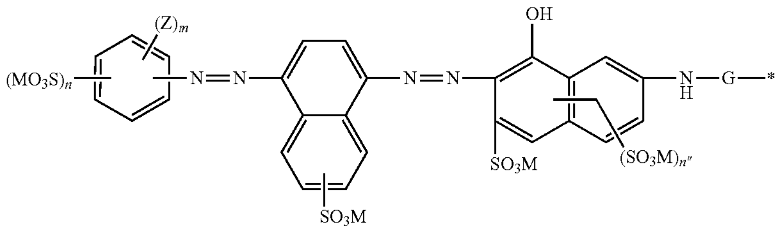

wherein

Z is unsubstituted $C_1$-$C_2$-alkyl; $C_1$-$C_2$-alkyl, which is substituted by at least one substituent chosen from the group consisting of hydroxyl, cyano, $SO_3H$, —$NH_2$, carboxyl, carb-$C_1$-$C_2$alkoxy, $C_1$-$C_2$alkoxy, phenyl, naphthyl and pyridyl; linear or branched, unsubstituted $C_1$-$C_4$-alkoxy; OH; $NO_2$; COOH; $COOC_1$-$C_2$alkyl, G is a direct bond or $COOC_1$-$C_2$alkylene, n is 0; 1 or 2, n" is 0 or 1, m is 0 or 1, each M is independently from each other hydrogen; $Na^+$ or $K^+$;

(VI′)

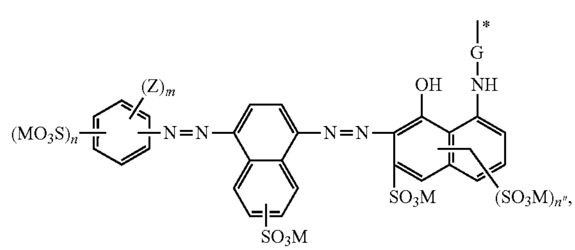

wherein

Z is unsubstituted $C_1$-$C_2$-alkyl; $C_1$-$C_2$-alkyl, which is substituted by at least one substituent chosen from the group consisting of hydroxyl, cyano, $SO_3H$, —$NH_2$, carboxyl, carb-$C_1$-$C_2$alkoxy, $C_1$-$C_2$alkoxy, phenyl, naphthyl and pyridyl; linear or branched, unsubstituted $C_1$-$C_4$-alkoxy; OH; $NO_2$; COOH; $COOC_1$-$C_2$alkyl, G is a direct bond or $COOC_1$-$C_2$alkylene, n is 0; 1 or 2, n" is 0 or 1, m is 0 or 1, each M is independently from each other hydrogen; $Na^+$ or $K^+$;

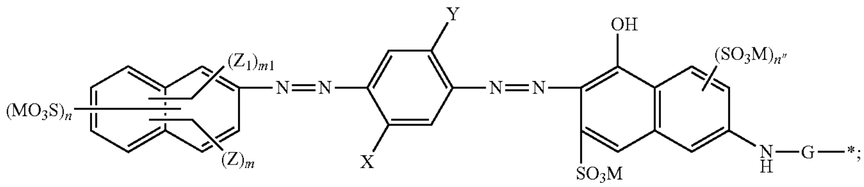

(VIIa')

wherein

* marks the bond to the bridging group L,

X is hydrogen; $SO_3M$; linear or branched, unsubstituted $C_1$-$C_2$-alkyl; linear or branched $C_1$-$C_2$-alkyl, which is substituted by at least one substituent chosen from the group consisting of hydroxyl, cyano, $SO_3H$ and —$NH_2$; linear or branched, unsubstituted $C_1$-$C_2$-alkoxy or linear or branched, $C_1$-$C_2$-alkoxy, which substituted by at least one substituent chosen from the group consisting of hydroxyl, cyano, $SO_3H$ and —$NH_2$, Y is $SO_3M$; linear or branched, unsubstituted $C_1$-$C_2$-alkyl; linear or branched $C_1$-$C_2$-alkyl, which is substituted by at least one substituent chosen from the group consisting of hydroxyl, cyano, $SO_3H$ and —$NH_2$; linear or branched, unsubstituted $C_1$-$C_2$-alkoxy or linear or branched, $C_1$-$C_2$-alkoxy, which substituted by at least one substituent chosen from the group consisting of hydroxyl, cyano, $SO_3H$ and —$NH_2$, Z is $NH_2$ or $NHCOOC_1$-$C_4$alkyl, $Z_1$ is OH or $NHCOC_1$-$C_4$alkyl, G is a direct bond; $COOC_1$-$C_2$alkylene; unsubstituted arylene; arylene which is substituted by at least one substituent chosen from the group consisting of hydroxyl, cyano, $NO_2$, $SO_3H$, —$NH_2$, carboxyl, carb-$C_1$-$C_4$alkoxy, $C_1$-$C_4$alkoxy and $C_1$-$C_4$alkyl; unsubstituted $C_1$-$C_2$alkylene or $C_1$-$C_2$-alkylene which is substituted by at least one substituent chosen from the group consisting of hydroxyl, cyano, $NO_2$, $SO_3H$, —$NH_2$, carboxyl, carb-$C_1$-$C_4$alkoxy, $C_1$-$C_4$alkoxy and $C_1$-$C_4$alkyl, n is 0; 1 or 2, n" is 0 or 1, m is 0 or 1, $m_1$ is 0 or 1, each M is independently from each other hydrogen; $Na^+$ or $K^+$;

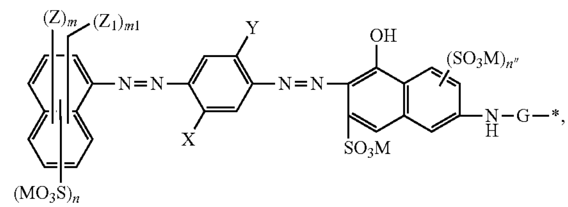

(VIIb')

wherein

* marks the bond to the bridging group L,

X is hydrogen; $SO_3M$; linear or branched, unsubstituted $C_1$-$C_2$-alkyl; linear or branched $C_1$-$C_2$-alkyl, which is substituted by at least one substituent chosen from the group consisting of hydroxyl, cyano, $SO_3H$ and —$NH_2$; linear or branched, unsubstituted $C_1$-$C_2$-alkoxy or linear or branched, $C_1$-$C_2$-alkoxy, which is substituted by at least one substituent chosen from the group consisting of hydroxyl, cyano, $SO_3H$ and —$NH_2$, Y is $SO_3M$; linear or branched, unsubstituted $C_1$-$C_2$-alkyl; linear or branched $C_1$-$C_2$-alkyl, which is substituted by at least one substituent chosen from the group consisting of hydroxyl, cyano, $SO_3H$ and —$NH_2$; linear or branched, unsubstituted $C_1$-$C_2$-alkoxy or linear or branched, $C_1$-$C_2$-alkoxy, which is substituted by at least one substituent chosen from the group consisting of hydroxyl, cyano, $SO_3H$ and —$NH_2$, Z is $NH_2$ or $NHCOOC_1$-$C_4$alkyl, $Z_1$ is OH or $NHCOC_1$-$C_4$alkyl, G is a direct bond; $COOC_1$-$C_2$alkylene; unsubstituted arylene; arylene which is substituted by at least one substituent chosen from the group consisting of hydroxyl, cyano, $NO_2$, $SO_3H$, —$NH_2$, carboxyl, carb-$C_1$-$C_4$alkoxy, $C_1$-$C_4$alkoxy and $C_1$-$C_4$alkyl; unsubstituted $C_1$-$C_2$alkylene or $C_1$-$C_2$-alkylene which is substituted by at least one substituent chosen from the group consisting of hydroxyl, cyano, $NO_2$, $SO_3H$, —$NH_2$, carboxyl, carb-$C_1$-$C_4$alkoxy, $C_1$-$C_4$alkoxy and $C_1$-$C_4$alkyl, n is 1; 2 or 3, n" is 0 or 1, m is 0 or 1, $m_1$ is 0 or 1, each M is independently from each other hydrogen; $Na^+$ or $K^+$;

(VIII')

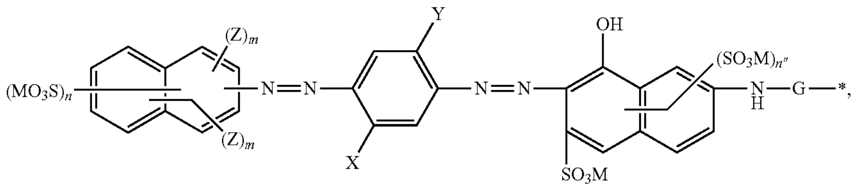

wherein

* marks the bond to the bridging group L,

X is hydrogen; $SO_3M$; linear or branched, unsubstituted $C_1$-$C_2$-alkyl; linear or branched $C_1$-$C_2$-alkyl, which is substituted by at least one substituent chosen from the group consisting of hydroxyl, cyano, $SO_3H$ and —$NH_2$; linear or branched, unsubstituted $C_1$-$C_2$-alkoxy or linear or branched, $C_1$-$C_2$-alkoxy, which is substituted by at least one substituent chosen from the group consisting of hydroxyl, cyano, $SO_3H$ and —$NH_2$, Y is $SO_3M$; linear or branched, unsubstituted $C_1$-$C_2$-alkyl; linear or branched $C_1$-$C_2$-alkyl, which is substituted by at least one substituent chosen from the group consisting of hydroxyl, cyano, $SO_3H$ and —$NH_2$; linear or branched, unsubstituted $C_1$-$C_2$-alkoxy or linear or branched, $C_1$-$C_2$-alkoxy, which is substituted by at least one substituent chosen from the group consisting of hydroxyl, cyano, $SO_3H$ and —$NH_2$, Z is $NH_2$; NH-aryl or NH-aryl, wherein the aryl is substituted by at least one substituent chosen from the group consisting of $SO_3H$, carboxyl, carb-$C_1$-$C_2$alkoxy, $C_1$-$C_2$alkyl and $C_1$-$C_2$alkoxy, $Z_1$ is OH; $NHCOC_1$-$C_2$alkyl or $NHCOOC_1$-$C_2$alkyl, G is a direct bond; $COOC_1$-$C_2$alkylene; unsubstituted arylene; arylene which is substituted by at least one substituent chosen from the group consisting of hydroxyl, cyano, $NO_2$, $SO_3H$, —$NH_2$, carboxyl, carb-$C_1$-$C_2$alkoxy, $C_1$-$C_2$alkoxy and $C_1$-$C_2$alkyl; unsubstituted $C_1$-$C_2$alkylene or $C_1$-$C_2$-alkylene which is substituted by at least one substituent chosen from the group consisting of hydroxyl, cyano, $NO_2$, $SO_3H$, —$NH_2$, carboxyl, carb-$C_1$-$C_2$alkoxy, $C_1$-$C_2$alkoxy and $C_1$-$C_2$alkyl, n is 1; 2 or 3, n" is 0 or 1, m is 0 or 1, $m_1$ is 0 or 1, each M is independently from each other hydrogen; $Na^+$ or $K^+$;

wherein

* marks the bond to the bridging group L,

X is hydrogen; $SO_3M$; linear or branched, unsubstituted $C_1$-$C_2$-alkyl; linear or branched $C_1$-$C_2$-alkyl, which is substituted by at least one substituent chosen from the group consisting of hydroxyl, cyano, $SO_3H$ and —$NH_2$; linear or branched, unsubstituted $C_1$-$C_2$-alkoxy or linear or branched, $C_1$-$C_2$-alkoxy, which is substituted by at least one substituent chosen from the group consisting of hydroxyl, cyano, $SO_3H$ and —$NH_2$, Y is $SO_3M$; linear or branched, unsubstituted $C_1$-$C_2$-alkyl; linear or branched $C_1$-$C_2$-alkyl, which is substituted by at least one substituent chosen from the group consisting of hydroxyl, cyano, $SO_3H$ and —$NH_2$; linear or branched, unsubstituted $C_1$-$C_2$-alkoxy or linear or branched, $C_1$-$C_2$-alkoxy, which is substituted by at least one substituent chosen from the group consisting of hydroxyl, cyano, $SO_3H$ and —$NH_2$, Z is $NH_2$; NH-aryl or NH-aryl, wherein the aryl is substituted by at least one substituent chosen from the group consisting of $SO_3H$, carboxyl, carb-$C_1$-$C_2$alkoxy, $C_1$-$C_2$alkyl and $C_1$-$C_2$alkoxy, $Z_1$ is OH; $NHCOC_1$-$C_2$alkyl or $NHCOOC_1$-$C_2$alkyl, G is a direct bond; $COOC_1$-$C_2$alkylene; unsubstituted arylene; arylene which is substituted by at least one substituent chosen from the group consisting of hydroxyl, cyano, $NO_2$, $SO_3H$, —$NH_2$, carboxyl, carb-$C_1$-$C_2$alkoxy, $C_1$-$C_2$alkoxy and $C_1$-$C_2$alkyl; unsubstituted $C_1$-$C_2$alkylene or $C_1$-$C_2$-alkylene which is substituted by at least one substituent chosen from the group consisting of hydroxyl, cyano, $NO_2$, $SO_3H$, —$NH_2$, carboxyl, carb-$C_1$-$C_2$alkoxy, $C_1$-$C_2$alkoxy and $C_1$-$C_2$alkyl, n is 1; 2 or 3, n" is 0 or 1, m is 0 or 1, $m_1$ is 0 or 1, each M is independently from each other hydrogen; $Na^+$ or $K^+$;

(IX')

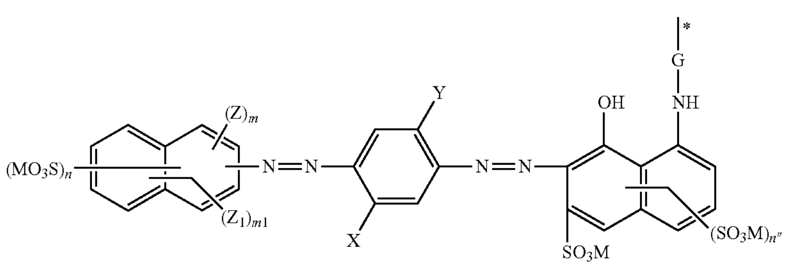

(X')

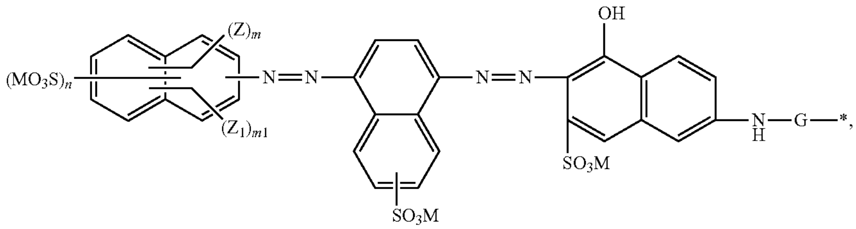

wherein

* marks the bond to the bridging group L,

Z is $NH_2$; $NHCOC_1$-$C_4$alkyl or $NHCOOC_1$-$C_4$alkyl, $Z_1$ is OH; NH-aryl or NH-aryl, wherein the aryl is substituted by at least one substituent chosen from the group consisting of hydroxyl, cyano, $SO_3H$, —$NH_2$, carboxyl, carb-$C_1$-$C_4$alkoxy, $C_1$-$C_4$alkyl and $C_1$-$C_4$alkoxy, G is a direct bond; $COOC_1$-$C_4$alkylene; unsubstituted arylene; arylene which is substituted by at least one substituent chosen from the group consisting of hydroxyl, cyano, $NO_2$, $SO_3H$, —$NH_2$, carboxyl, carb-$C_1$-$C_4$alkoxy, $C_1$-$C_4$alkoxy and $C_1$-$C_4$alkyl; unsubstituted $C_1$-$C_4$alkylene or $C_1$-$C_4$-alkylene which is substituted by at least one substituent chosen from the group consisting of hydroxyl, cyano, $NO_2$, $SO_3H$, —$NH_2$, carboxyl, carb-$C_1$-$C_4$alkoxy, $C_1$-$C_4$alkoxy and $C_1$-$C_4$alkyl, n is 1; 2 or 3, m is 0 or 1, $m_1$ is 0 or 1, each M is independently from each other hydrogen; $Na^+$ or $K^+$;

each M is independently from each other hydrogen; $Na^+$ or $K^+$;

(XII')

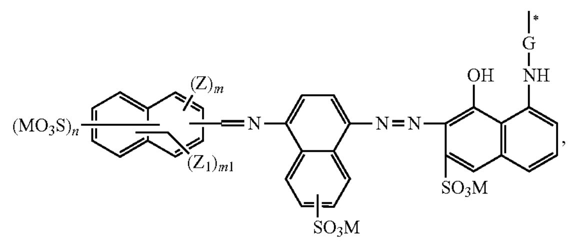

wherein

* marks the bond to the bridging group L,

Z is $NH_2$; $NHCOC_1$-$C_4$alkyl or $NHCOOC_1$-$C_4$alkyl, (XI')

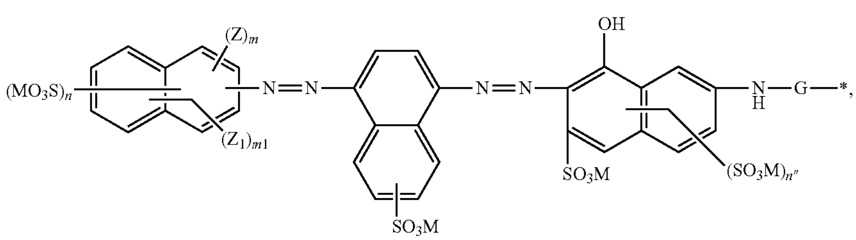

wherein

* marks the bond to the bridging group L,

Z is $NH_2$; $NHCOC_1$-$C_4$alkyl or $NHCOOC_1$-$C_4$alkyl, $Z_1$ is OH; NH-aryl or NH-aryl, wherein the aryl is substituted by at least one substituent chosen from the group consisting of hydroxyl, cyano, $SO_3H$, —$NH_2$, carboxyl, carb-$C_1$-$C_4$alkoxy, $C_1$-$C_4$alkyl and $C_1$-$C_4$alkoxy, G is a direct bond; $COOC_1$-$C_4$alkylene; unsubstituted arylene; arylene which is substituted by at least one substituent chosen from the group consisting of hydroxyl, cyano, $NO_2$, $SO_3H$, —$NH_2$, carboxyl, carb-$C_1$-$C_4$alkoxy, $C_1$-$C_4$alkoxy and $C_1$-$C_4$alkyl; unsubstituted $C_1$-$C_4$alkylene or $C_1$-$C_4$-alkylene which is substituted by at least one substituent chosen from the group consisting of hydroxyl, cyano, $NO_2$, $SO_3H$, —$NH_2$, carboxyl, carb-$C_1$-$C_4$alkoxy, $C_1$-$C_4$alkoxy and $C_1$-$C_4$alkyl, n is 1; 2 or 3, n" is 0 or 1, m is 0 or 1, $m_1$ is 0 or 1, $Z_1$ is OH; NH-aryl or NH-aryl, wherein the aryl is substituted by at least one substituent chosen from the group consisting of hydroxyl, cyano, $SO_3H$, —$NH_2$, carboxyl, carb-$C_1$-$C_4$alkoxy, $C_1$-$C_4$alkyl and $C_1$-$C_4$alkoxy, G is a direct bond; $COOC_1$-$C_4$alkylene; unsubstituted arylene; arylene which is substituted by at least one substituent chosen from the group consisting of hydroxyl, cyano, $NO_2$, $SO_3H$, —$NH_2$, carboxyl, carb-$C_1$-$C_4$alkoxy, $C_1$-$C_4$alkoxy and $C_1$-$C_4$alkyl; unsubstituted $C_1$-$C_4$alkylene or $C_1$-$C_4$-alkylene which is substituted by at least one substituent chosen from the group consisting of hydroxyl, cyano, $NO_2$, $SO_3H$, —$NH_2$, carboxyl, carb-$C_1$-$C_4$alkoxy, $C_1$-$C_4$alkoxy and $C_1$-$C_4$alkyl, n is 1; 2 or 3, m is 0 or 1, $m_1$ is 0 or 1, each M is independently from each other hydrogen; $Na^+$ or $K^+$;

(XIII')

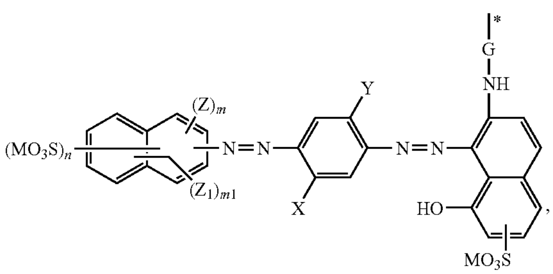

wherein

* marks the bond to the bridging group L,

X is hydrogen; $SO_3M$; linear or branched, unsubstituted $C_1$-$C_2$-alkyl; linear or branched $C_1$-$C_2$-alkyl, which is substituted by at least one substituent chosen from the group consisting of hydroxyl, cyano, $SO_3H$ and —$NH_2$; linear or branched, unsubstituted $C_1$-$C_2$-alkoxy or linear or branched, $C_1$-$C_2$-alkoxy, which is substituted by at least one substituent chosen from the group consisting of hydroxyl, cyano, $SO_3H$ and —$NH_2$, Y is $SO_3M$; linear or branched, unsubstituted $C_1$-$C_2$-alkyl; linear or branched $C_1$-$C_2$-alkyl, which is substituted by at least one substituent chosen from the group consisting of hydroxyl, cyano, $SO_3H$, and —$NH_2$; linear or branched, unsubstituted $C_1$-$C_2$-alkoxy or linear or branched, $C_1$-$C_2$-alkoxy, which is substituted by at least one substituent chosen from the group consisting of hydroxyl, cyano, $SO_3H$ and —$NH_2$, Z is $NH_2$; $NHCOC_1$-$C_4$alkyl or $NHCOOC_1$-$C_4$alkyl, $Z_1$ is OH; NH-aryl or NH-aryl, wherein the aryl is substituted by at least one substituent chosen from the group consisting of hydroxyl, cyano, $SO_3H$, —$NH_2$, carboxyl, carb-$C_1$-$C_4$alkoxy, $C_1$-$C_4$alkyl and $C_1$-$C_4$alkoxy, G is a direct bond; $COOC_1$-$C_4$alkylene; unsubstituted arylene; arylene which is substituted by at least one substituent chosen from the group consisting of hydroxyl, cyano, $NO_2$, $SO_3H$, —$NH_2$, carboxyl, carb-$C_1$-$C_4$alkoxy, $C_1$-$C_4$alkoxy and $C_1$-$C_4$alkyl; unsubstituted $C_1$-$C_4$alkylene or $C_1$-$C_4$-alkylene which is substituted by at least one substituent chosen from the group consisting of hydroxyl, cyano, $NO_2$, $SO_3H$, —$NH_2$, carboxyl, carb-$C_1$-$C_4$alkoxy, $C_1$-$C_4$alkoxy and $C_1$-$C_4$alkyl, n is 1; 2 or 3, m is 0 or 1, $m_1$ is 0 or 1, each M is independently from each other hydrogen; $Na^+$ or $K^+$;

wherein

* marks the bond to the bridging group L,

X is hydrogen; $SO_3M$; linear or branched, unsubstituted $C_1$-$C_2$-alkyl; linear or branched $C_1$-$C_4$-alkyl, which is substituted by at least one substituent chosen from the group consisting of hydroxyl, cyano, $SO_3H$, —$NH_2$, carboxyl, carb-$C_1$-$C_4$alkoxy, $C_1$-$C_4$alkoxy, phenyl, naphthyl and pyridyl; linear or branched, unsubstituted $C_1$-$C_4$-alkoxy; linear or branched, $C_1$-$C_4$-alkoxy, which is substituted by at least one substituent chosen from the group consisting of hydroxyl, cyano, $SO_3H$, —$NH_2$, carboxyl, carb-$C_1$-$C_4$alkoxy, $C_1$-$C_4$alkyl, phenyl, naphthyl and pyridyl; COOH or $COOC_1$-$C_2$alkyl, Y is linear or branched, unsubstituted $C_1$-$C_2$-alkyl; linear or branched $C_1$-$C_4$-alkyl, which is substituted by at least one substituent chosen from the group consisting of hydroxyl, cyano, $SO_3H$, —$NH_2$, carboxyl, carb-$C_1$-$C_4$alkoxy, $C_1$-$C_4$alkoxy, phenyl, naphthyl and pyridyl; linear or branched, unsubstituted $C_1$-$C_4$-alkoxy; linear or branched, $C_1$-$C_4$-alkoxy, which is substituted by at least one substituent chosen from the group consisting of hydroxyl, cyano, $SO_3H$, —$NH_2$, carboxyl, carb-$C_1$-$C_4$alkoxy, $C_1$-$C_4$alkyl, phenyl, naphthyl and pyridyl; COOH or $COOC_1$-$C_2$alkyl, Z is $NH_2$; NH-aryl or NH-aryl, wherein the aryl is substituted by at least one substituent chosen from the group consisting of hydroxyl, cyano, $SO_3H$, —$NH_2$, carboxyl, carb-$C_1$-$C_2$alkoxy, $C_1$-$C_2$alkyl and $C_1$-$C_2$alkoxy, Z' is $SO_3M$; COOH or $COOC_1$-$C_2$alkyl, $Z_1$ is OH; $NHCOC_1$-$C_2$alkyl or $NHCOOC_1$-$C_2$alkyl, G is a direct bond; $COOC_1$-$C_2$alkylene; unsubstituted arylene; arylene which is substituted by at least one substituent chosen from the group consisting of hydroxyl, cyano, $NO_2$, $SO_3H$, —$NH_2$, carboxyl, carb-$C_1$-$C_2$alkoxy, $C_1$-$C_2$alkoxy and $C_1$-$C_2$alkyl; unsubstituted $C_1$-$C_2$alkylene or $C_1$-$C_2$-alkylene which is substituted by at least one substituent chosen from the group consisting of hydroxyl, cyano, $NO_2$, $SO_3H$, —$NH_2$, carboxyl, carb-$C_1$-$C_2$alkoxy, $C_1$-$C_2$alkoxy and $C_1$-$C_2$alkyl, n is 1; 2or3, n' is 0 or 1, n" is 0 or 1, m is 0 or 1, $m_1$ is 0 or 1, each M is independently from each other hydrogen; $Na^+$ or $K^+$;

(XIV')

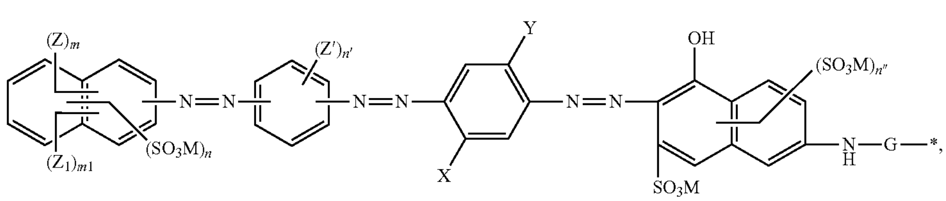

(XV')

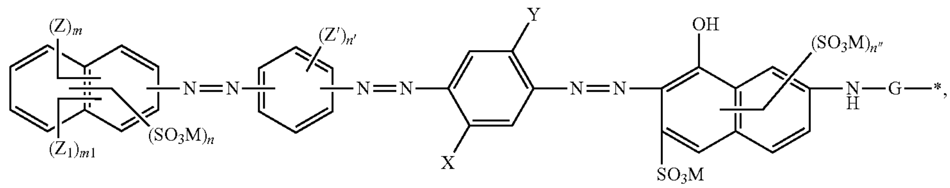

wherein

* marks the bond to the bridging group L,

X is hydrogen; $SO_3M$; linear or branched, unsubstituted $C_1$-$C_2$-alkyl; linear or branched $C_1$-$C_4$-alkyl, which is substituted by at least one substituent chosen from the group consisting of hydroxyl, cyano, $SO_3H$, —$NH_2$, carboxyl, carb-$C_1$-$C_4$alkoxy, $C_1$-$C_4$alkoxy, phenyl, naphthyl and pyridyl; linear or branched, unsubstituted $C_1$-$C_4$-alkoxy; linear or branched, $C_1$-$C_4$-alkoxy, which is substituted by at least one substituent chosen from the group consisting of hydroxyl, cyano, $SO_3H$, —$NH_2$, carboxyl, carb-$C_1$-$C_4$alkoxy, $C_1$-$C_4$alkyl, phenyl, naphthyl and pyridyl; COOH or COO$C_1$-$C_2$alkyl, Y is linear or branched, unsubstituted $C_1$-$C_2$-alkyl; linear or branched $C_1$-$C_4$-alkyl, which is substituted by at least one substituent chosen from the group consisting of hydroxyl, cyano, $SO_3H$, —$NH_2$, carboxyl, carb-$C_1$-$C_4$alkoxy, $C_1$-$C_4$alkoxy, phenyl, naphthyl and pyridyl; linear or branched, unsubstituted $C_1$-$C_4$-alkoxy; linear or branched, $C_1$-$C_4$-alkoxy, which is substituted by at least one substituent chosen from the group consisting of hydroxyl, cyano, $SO_3H$, —$NH_2$, carboxyl, carb-$C_1$-$C_4$alkoxy, $C_1$-$C_4$alkyl, phenyl, naphthyl and pyridyl; COOH or C000$_1$-$C_2$alkyl, Z is $NH_2$; NH-aryl or NH-aryl, wherein the aryl is substituted by at least one substituent chosen from the group consisting of hydroxyl, cyano, $SO_3H$, —$NH_2$, carboxyl, carb-$C_1$-$C_2$alkoxy, $C_1$-$C_2$alkyl and $C_1$-$C_2$alkoxy, Z' is $SO_3M$; COOH or COO$C_1$-$C_2$alkyl, $Z_1$ is OH; NHCO$C_1$-$C_2$alkyl or NHCOO$C_1$-$C_2$alkyl, G is a direct bond; COO$C_1$-$C_2$alkylene; unsubstituted arylene; arylene which is substituted by at least one substituent chosen from the group consisting of hydroxyl, cyano, $NO_2$, $SO_3H$, —$NH_2$, carboxyl, carb-$C_1$-$C_2$alkoxy, $C_1$-$C_2$alkoxy and $C_1$-$C_2$alkyl; unsubstituted $C_1$-$C_2$alkylene or $C_1$-$C_2$-alkylene which is substituted by at least one substituent chosen from the group consisting of hydroxyl, cyano, $NO_2$, $SO_3H$, —$NH_2$, carboxyl, carb-$C_1$-$C_2$alkoxy, $C_1$-$C_2$alkoxy and $C_1$-$C_2$alkyl, n is 1; 2 or 3, n' is 0 or 1, n" is 0 or 1, m is 0 or 1, $m_1$ is 0 or 1, each M is independently from each other hydrogen; $Na^+$ or $K^+$;

wherein

* marks the bond to the bridging group L,

X is hydrogen; $SO_3M$; linear or branched, unsubstituted $C_1$-$C_2$-alkyl; linear or branched $C_1$-$C_4$-alkyl, which is substituted by at least one substituent chosen from the group consisting of hydroxyl, cyano, $SO_3H$, —$NH_2$, carboxyl, carb-$C_1$-$C_4$alkoxy, $C_1$-$C_4$alkoxy, phenyl, naphthyl and pyridyl; linear or branched, unsubstituted $C_1$-$C_4$-alkoxy; linear or branched, $C_1$-$C_4$-alkoxy, which is substituted by at least one substituent chosen from the group consisting of hydroxyl, cyano, $SO_3H$, —$NH_2$, carboxyl, carb-$C_1$-$C_4$alkoxy, $C_1$-$C_4$alkyl, phenyl, naphthyl and pyridyl; COOH or COO$C_1$-$C_2$alkyl, Y is linear or branched, unsubstituted $C_1$-$C_2$-alkyl; linear or branched $C_1$-$C_4$-alkyl, which is substituted by at least one substituent chosen from the group consisting of hydroxyl, cyano, $SO_3H$, —$NH_2$, carboxyl, carb-$C_1$-$C_4$alkoxy, $C_1$-$C_4$alkoxy, phenyl, naphthyl and pyridyl; linear or branched, unsubstituted $C_1$-$C_4$-alkoxy; linear or branched, $C_1$-$C_4$-alkoxy, which is substituted by at least one substituent chosen from the group consisting of hydroxyl, cyano, $SO_3H$, —$NH_2$, carboxyl, carb-$C_1$-$C_4$alkoxy, $C_1$-$C_4$alkyl, phenyl, naphthyl and pyridyl; COOH or COO$C_1$-$C_2$alkyl, Z is $NH_2$; NH-aryl or NH-aryl, wherein the aryl is substituted by at least one substituent chosen from the group consisting of hydroxyl, cyano, $SO_3H$, —$NH_2$, carboxyl, carb-$C_1$-$C_2$alkoxy, $C_1$-$C_2$alkyl and $C_1$-$C_2$alkoxy, Z' is $SO_3M$; COOH or COO$C_1$-$C_2$alkyl, $Z_1$ is OH; NHCO$C_1$-$C_2$alkyl or NHCOO$C_1$-$C_2$alkyl, G is a direct bond; COO$C_1$-$C_2$alkylene; unsubstituted arylene; arylene which is substituted by at least one substituent chosen from the group consisting of hydroxyl, cyano, $NO_2$, $SO_3H$, —$NH_2$, carboxyl, carb-$C_1$-$C_2$alkoxy, $C_1$-$C_2$alkoxy and $C_1$-$C_2$alkyl; unsubstituted $C_1$-$C_2$alkylene or $C_1$-$C_2$-alkylene which is substituted by at least one substituent chosen from the group consisting of hydroxyl, cyano, $NO_2$, $SO_3H$, —$NH_2$, carboxyl, carb-$C_1$-$C_2$alkoxy, $C_1$-$C_2$alkoxy and $C_1$-$C_2$alkyl, n is 1; 2 or 3, n' is 0 or 1, n" is 0 or 1, m is 0 or 1, $m_1$ is 0 or 1, each M is independently from each other hydrogen; $Na^+$ or $K^-$;

(XVI')

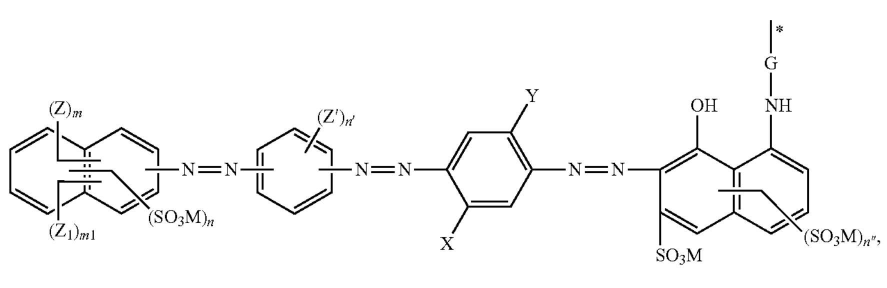

(XVII′)

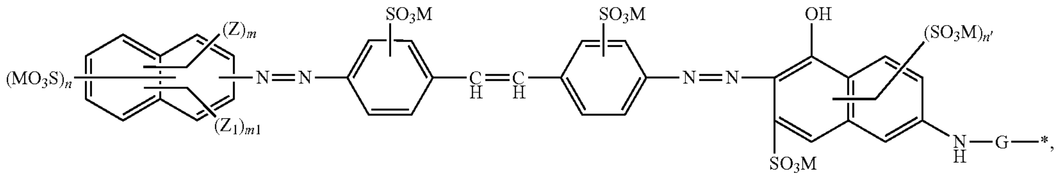

wherein
* marks the bond to the bridging group L,
Z is $NH_2$; NH-aryl or NH-aryl, wherein the aryl is substituted by at least one substituent chosen from the group consisting of hydroxyl, cyano, $SO_3H$, —$NH_2$, carboxyl, carb-$C_1$-$C_2$alkoxy, $C_1$-$C_2$alkyl and $C_1$-$C_2$alkoxy,
$Z_1$ is OH; NHCO$C_1$-$C_2$alkyl or NHCOO$C_1$-$C_2$alkyl,
G is a direct bond; COO$C_1$-$C_2$alkylene; unsubstituted arylene; arylene which is substituted by at least one substituent chosen from the group consisting of hydroxyl, cyano, $NO_2$, $SO_3H$, —$NH_2$, carboxyl, carb-$C_1$-$C_2$alkoxy, $C_1$-$C_2$alkoxy and $C_1$-$C_2$alkyl; unsubstituted $C_1$-$C_2$alkylene or $C_1$-$C_2$-alkylene which is substituted by at least one substituent chosen from the group consisting of hydroxyl, cyano, $NO_2$, $SO_3H$, —$NH_2$, carboxyl, carb-$C_1$-$C_2$alkoxy, $C_1$-$C_2$alkoxy and $C_1$-$C_2$alkyl,
n is 1; 2 or 3,
n' is 0 or 1,
m is 0 or 1,
$m_1$ is 0 or 1,
each M is independently from each other hydrogen; $Na^+$ or $K^+$;

(XVIII′)

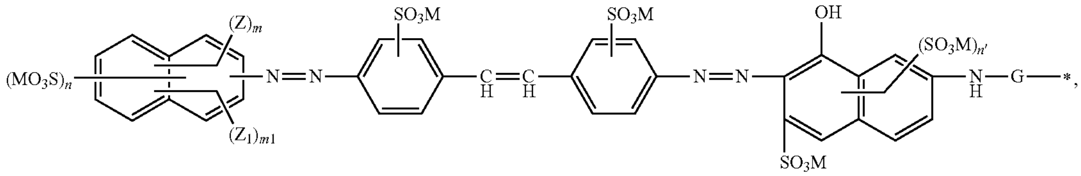

wherein
* marks the bond to the bridging group L,
Z is $NH_2$; NH-aryl or NH-aryl, wherein the aryl is substituted by at least one substituent chosen from the group consisting of hydroxyl, cyano, $SO_3H$, —$NH_2$, carboxyl, carb-$C_1$-$C_2$alkoxy, $C_1$-$C_2$alkyl and $C_1$-$C_2$alkoxy,
$Z_1$ is OH; NHCO$C_1$-$C_2$alkyl or NHCOO$C_1$-$C_2$alkyl,
G is a direct bond; COO$C_1$-$C_2$alkylene; unsubstituted arylene; arylene which is substituted by at least one substituent chosen from the group consisting of hydroxyl, cyano, $NO_2$, $SO_3H$, —$NH_2$, carboxyl, carb-$C_1$-$C_2$alkoxy, $C_1$-$C_2$alkoxy and $C_1$-$C_2$alkyl; unsubstituted $C_1$-$C_2$alkylene or $C_1$-$C_2$-alkylene which is substituted by at least one substituent chosen from the group consisting of hydroxyl, cyano, $NO_2$, $SO_3H$, —$NH_2$, carboxyl, carb-$C_1$-$C_2$alkoxy, $C_1$-$C_2$alkoxy and $C_1$-$C_2$alkyl,
n is 1; 2 or 3,
n' is 0 or 1,
m is 0 or 1,
$m_1$ is 0 or 1,
each M is independently from each other hydrogen; $Na^+$ or $K^+$;

(XIX′)

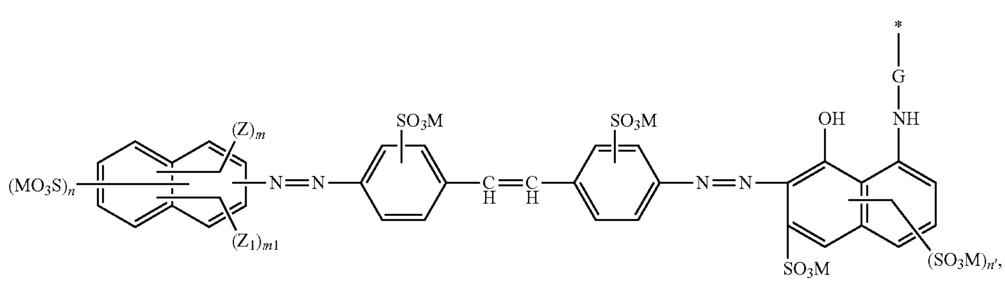

wherein

* marks the bond to the bridging group L,

Z is $NH_2$; NH-aryl or NH-aryl, wherein the aryl is substituted by at least one substituent chosen from the group consisting of hydroxyl, cyano, $SO_3H$, —$NH_2$, carboxyl, carb-$C_1$-$C_2$alkoxy, $C_1$-$C_2$alkyl and $C_1$-$C_2$alkoxy, $Z_1$ is OH; $NHCOC_1$-$C_2$alkyl or $NHCOOC_1$-$C_2$alkyl, G is a direct bond; $COOC_1$-$C_2$alkylene; unsubstituted arylene; arylene which is substituted by at least one substituent chosen from the group consisting of hydroxyl, cyano, $NO_2$, $SO_3H$, —$NH_2$, carboxyl, carb-$C_1$-$C_2$alkoxy, $C_1$-$C_2$alkoxy and $C_1$-$C_2$alkyl; unsubstituted $C_1$-$C_2$alkylene or $C_1$-$C_2$-alkylene which is substituted by at least one substituent chosen from the group consisting of hydroxyl, cyano, $NO_2$, $SO_3H$, carboxyl, carb-$C_1$-$C_2$alkoxy, $C_1$-$C_2$alkoxy and $C_1$-$C_2$alkyl, n is 1; 2 or 3, n' is 0 or 1, m is 0 or 1, $m_1$ is 0 or 1, each M is independently from each other hydrogen; $Na^+$ or $K^+$;

(XX')

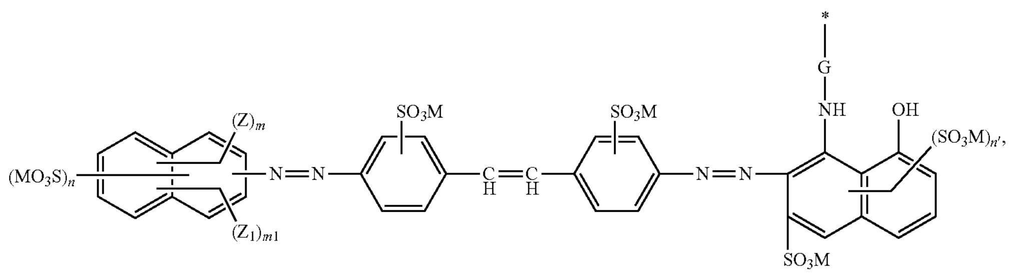

wherein

* marks the bond to the bridging group L,

Z is $NH_2$; NH-aryl or NH-aryl, wherein the aryl is substituted by at least one substituent chosen from the group consisting of hydroxyl, cyano, $SO_3H$, —$NH_2$, carboxyl, carb-$C_1$-$C_2$alkoxy, $C_1$-$C_2$alkyl and $C_1$-$C_2$alkoxy, $Z_1$ is OH; $NHCOC_1$-$C_2$alkyl or $NHCOOC_1$-$C_2$alkyl, G is a direct bond; $COOC_1$-$C_2$alkylene; unsubstituted arylene; arylene which is substituted by at least one substituent chosen from the group consisting of hydroxyl, cyano, $NO_2$, $SO_3H$, —$NH_2$, carboxyl, carb-$C_1$-$C_2$alkoxy, $C_1$-$C_2$alkoxy and $C_1$-$C_2$alkyl; unsubstituted $C_1$-$C_2$alkylene or $C_1$-$C_2$-alkylene which is substituted by at least one substituent chosen from the group consisting of hydroxyl, cyano, $NO_2$, $SO_3H$, —$NH_2$, carboxyl, carb-$C_1$-$C_2$alkoxy, $C_1$-$C_2$alkoxy and $C_1$-$C_2$alkyl, n is 1; 2 or 3, n' is 0 or 1, m is 0 or 1, $m_1$ is 0 or 1, each M is independently from each other hydrogen; $Na^+$ or $K^+$; or (XXI')

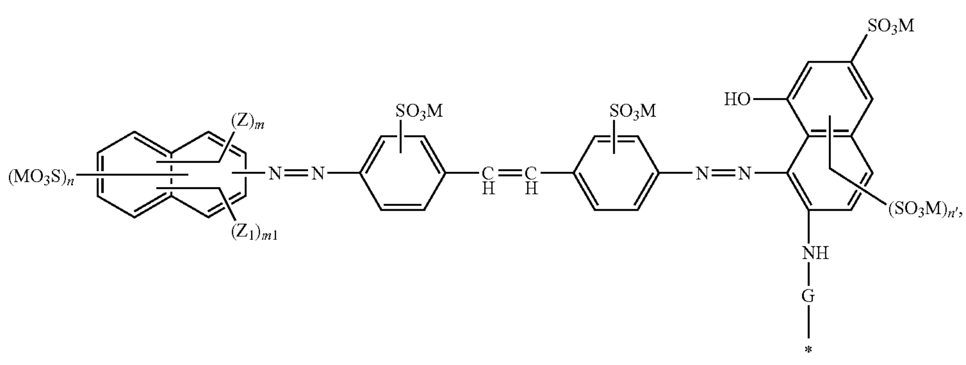

wherein

* marks the bond to the bridging group L,

Z is $NH_2$; NH-aryl or NH-aryl, wherein the aryl is substituted by at least one substituent chosen from the group consisting of hydroxyl, cyano, $SO_3H$, —$NH_2$, carboxyl, carb-$C_1$-$C_2$alkoxy, $C_1$-$C_2$alkyl and $C_1$-$C_2$alkoxy, $Z_1$ is OH; $NHCOC_1$-$C_2$alkyl or $NHCOOC_1$-$C_2$alkyl, G is a direct bond; $COOC_1$-$C_2$alkylene; unsubstituted arylene; arylene which is substituted by at least one substituent chosen from the group consisting of hydroxyl, cyano, $NO_2$, $SO_3H$, —$NH_2$, carboxyl, carb-$C_1$-$C_2$alkoxy, $C_1$-$C_2$alkoxy and $C_1$-$C_2$alkyl; unsubstituted $C_1$-$C_2$alkylene or $C_1$-$C_2$-alkylene which is substituted by at least one substituent chosen from the group consisting of hydroxyl, cyano, $NO_2$, $SO_3H$, —$NH_2$, carboxyl, carb-$C_1$-$C_2$alkoxy, $C_1$-$C_2$alkoxy and $C_1$-$C_2$alkyl, n is 1; 2 or 3, n' is 0 or 1, m is 0 or 1, $m_1$ is 0 or 1, each M is independently from each other hydrogen; $Na^+$ or $K^+$, (XXVIIa')

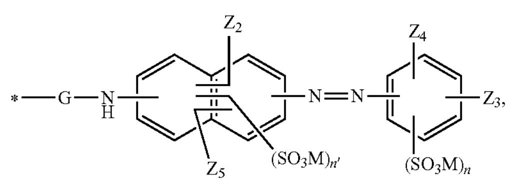

wherein

* marks the bond to the bridging group L, $Z_2$ is linear or branched, unsubstituted $C_1$-$C_2$-alkyl; linear or branched $C_1$-$C_2$-alkyl, which is substituted by at least one substituent chosen from the group consisting of hydroxyl, cyano, $SO_3H$, —$NH_2$, carboxyl, carb-$C_1$-$C_2$alkoxy, $C_1$-$C_2$alkoxy, phenyl, naphthyl and pyridyl; linear or branched, unsubstituted $C_1$-$C_2$-alkoxy or linear or branched, $C_1$-$C_2$-alkoxy, which is substituted by at least one substituent chosen from the group consisting of hydroxyl, cyano, $SO_3H$, —$NH_2$, carboxyl, carb-$C_1$-$C_2$alkoxy, $C_1$-$C_2$alkyl, phenyl, naphthyl and pyridyl or OH, $Z_3$ is hydrogen; linear or branched, unsubstituted $C_1$-$C_2$-alkyl; linear or branched $C_1$-$C_2$-alkyl, which is substituted by at least one substituent chosen from the group consisting of hydroxyl, cyano, $SO_3H$, —$NH_2$, carboxyl, carb-$C_1$-$C_2$alkoxy, $C_1$-$C_2$alkoxy, phenyl, naphthyl and pyridyl; linear or branched, unsubstituted $C_1$-$C_2$-alkoxy or linear or branched, $C_1$-$C_2$-alkoxy, which is substituted by at least one substituent chosen from the group consisting of hydroxyl, cyano, $SO_3H$, —$NH_2$, carboxyl, carb-$C_1$-$C_2$alkoxy, $C_1$-$C_2$alkyl, phenyl, naphthyl and pyridyl; OH; $NO_2$; $NH_2$; $NHC_1$-$C_2$alkyl, wherein the alkyl group may be substituted by at least one substituent chosen from the group consisting of OH, $NH_2$, $C_1$-$C_2$alkyl, CN or COOH; $NHCOC_1$-$C_2$alkyl or $NHCOOC_1$-$C_2$alkyl, $Z_4$ is hydrogen; linear or branched, unsubstituted $C_1$-$C_2$-alkyl; linear or branched $C_1$-$C_2$-alkyl, which is substituted by at least one substituent chosen from the group consisting of hydroxyl, cyano, $SO_3H$, —$NH_2$, carboxyl, carb-$C_1$-$C_2$alkoxy, $C_1$-$C_2$alkoxy, phenyl, naphthyl and pyridyl; linear or branched, unsubstituted $C_1$-$C_2$-alkoxy or linear or branched, $C_1$-$C_2$-alkoxy, which is substituted by at least one substituent chosen from the group consisting of hydroxyl, cyano, $SO_3H$, —$NH_2$, carboxyl, carb-$C_1$-$C_4$alkoxy, $C_1$-$C_4$alkyl, phenyl, naphthyl and pyridyl; OH; $NO_2$; $NH_2$; $NHC_1$-$C_2$alkyl, wherein the alkyl group may be substituted by at least one substituent chosen from the group consisting of OH, $NH_2$, $C_1$-$C_2$alkyl, CN or COOH; $NHCOC_1$-$C_2$alkyl or $NHCOOC_1$-$C_2$alkyl, $Z_5$ is hydrogen; linear or branched, unsubstituted $C_1$-$C_2$-alkyl or linear or branched $C_1$-$C_2$-alkyl, which is substituted by at least one substituent chosen from the group consisting of hydroxyl, cyano, $SO_3H$, —$NH_2$, carboxyl, carb-$C_1$-$C_2$alkoxy, $C_1$-$C_2$alkoxy, phenyl, naphthyl and pyridyl;

G is a direct bond; $COOC_1$-$C_2$alkylene; unsubstituted arylene; arylene which is substituted by at least one substituent chosen from the group consisting of hydroxyl, cyano, $NO_2$, $SO_3H$, —$NH_2$, carboxyl, carb-$C_1$-$C_2$alkoxy, $C_1$-$C_2$alkoxy and $C_1$-$C_2$alkyl; unsubstituted $C_1$-$C_2$alkylene or $C_1$-$C_2$-alkylene which is substituted by at least one substituent chosen from the group consisting of hydroxyl, cyano, $NO_2$, $SO_3H$, —$NH_2$, carboxyl, carb-$C_1$-$C_2$alkoxy, $C_1$-$C_2$alkoxy and $C_1$-$C_2$alkyl, n is 0; 1 or 2, n' is 0 or 1, each M is independently from each other hydrogen; $Na^+$ or $K^+$;

(XXVIIb')

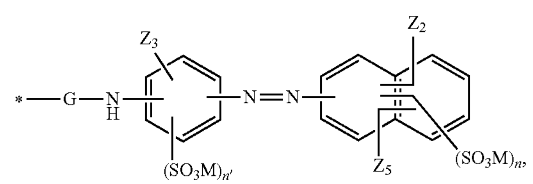

wherein

* marks the bond to the bridging group L, $Z_2$ is linear or branched, unsubstituted $C_1$-$C_2$-alkyl; linear or branched $C_1$-$C_2$-alkyl, which is substituted by at least one substituent chosen from the group consisting of hydroxyl, cyano, $SO_3H$, —$NH_2$, carboxyl, carb-$C_1$-$C_2$alkoxy, $C_1$-$C_2$alkoxy, phenyl, naphthyl and pyridyl; linear or branched, unsubstituted $C_1$-$C_2$-alkoxy or linear or branched, $C_1$-$C_2$-alkoxy, which is substituted by at least one substituent chosen from the group consisting of hydroxyl, cyano, $SO_3H$, —$NH_2$, carboxyl, carb-$C_1$-$C_2$alkoxy, $C_1$-$C_2$alkyl, phenyl, naphthyl and pyridyl or OH, $Z_3$ is hydrogen; linear or branched, unsubstituted $C_1$-$C_2$-alkyl; linear or branched $C_1$-$C_2$-alkyl, which is substituted by at least one substituent chosen from the group consisting of hydroxyl, cyano, $SO_3H$, —$NH_2$, carboxyl, carb-$C_1$-$C_2$alkoxy, $C_1$-$C_2$alkoxy, phenyl, naphthyl and pyridyl; linear or branched, unsubstituted $C_1$-$C_2$-alkoxy or linear or branched, $C_1$-$C_2$-alkoxy, which is substituted by at least one substituent chosen from the group consisting of hydroxyl, cyano, $SO_3H$, —$NH_2$, carboxyl, carb-$C_1$-$C_2$alkoxy, $C_1$-$C_2$alkyl, phenyl, naphthyl and pyridyl; OH; $NO_2$; $NH_2$; $NHC_1$-$C_2$alkyl, wherein the alkyl group may be substituted by at least one substituent chosen from the group consisting of OH, $NH_2$, $C_1$-$C_2$alkyl, CN or COOH; $NHCOC_1$-$C_2$alkyl or $NHCOOC_1$-$C_2$alkyl, $Z_5$ is hydrogen; linear or branched, unsubstituted $C_1$-$C_2$-alkyl or linear or branched $C_1$-$C_2$-alkyl, which is substituted by at least one substituent chosen from the group consisting of hydroxyl, cyano, $SO_3H$, —$NH_2$, carboxyl, carb-$C_1$-$C_2$alkoxy, $C_1$-$C_2$alkoxy, phenyl, naphthyl and pyridyl;

G is a direct bond; $COOC_1$-$C_2$alkylene; unsubstituted arylene; arylene which is substituted by at least one substituent chosen from the group consisting of hydroxyl, cyano, $NO_2$, $SO_3H$, —$NH_2$, carboxyl, carb-$C_1$-$C_2$alkoxy, $C_1$-$C_2$alkoxy and $C_1$-$C_2$alkyl; unsubstituted $C_1$-$C_2$alkylene or $C_1$-$C_2$-alkylene which is substituted by at least one substituent chosen from the group consisting of hydroxyl, cyano, $NO_2$, $SO_3H$, —$NH_2$, carboxyl, carb-$C_1$-$C_2$alkoxy, $C_1$-$C_2$alkoxy and $C_1$-$C_2$alkyl, n is 1; 2 or 3, n' is 0 or 1, each M is independently from each other hydrogen; $Na^+$ or $K^+$;

(XXVIIc')

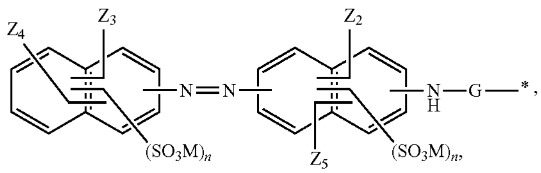

wherein

* marks the bond to the bridging group L, $Z_2$ is hydrogen; linear or branched, unsubstituted $C_1$-$C_2$-alkyl; linear or branched $C_1$-$C_2$-alkyl, which is substituted by at least one substituent chosen from the group consisting of hydroxyl, cyano, $SO_3H$, —$NH_2$, carboxyl, carb-$C_1$-$C_2$alkoxy, $C_1$-$C_2$alkoxy, phenyl, naphthyl and pyridyl; linear or branched, unsubstituted $C_1$-$C_2$-alkoxy or linear or branched, $C_1$-$C_2$-alkoxy, which is substituted by at least one substituent chosen from the group consisting of hydroxyl, cyano, $SO_3H$, —$NH_2$, carboxyl, carb-$C_1$-$C_4$alkoxy, $C_1$-$C_4$alkyl, phenyl, naphthyl and pyridyl; OH; $NO_2$, $Z_3$ is hydrogen; linear or branched, unsubstituted $C_1$-$C_2$-alkyl; linear or branched $C_1$-$C_2$-alkyl, which is substituted by at least one substituent chosen from the group consisting of hydroxyl, cyano, $SO_3H$, —$NH_2$, carboxyl, carb-$C_1$-$C_2$alkoxy, $C_1$-$C_2$alkoxy, phenyl, naphthyl and pyridyl; linear or branched, unsubstituted $C_1$-$C_2$-alkoxy or linear or branched, $C_1$-$C_2$-alkoxy, which is substituted by at least one substituent chosen from the group consisting of hydroxyl, cyano, $SO_3H$, —$NH_2$, carboxyl, carb-$C_1$-$C_2$alkoxy, $C_1$-$C_2$alkyl, phenyl, naphthyl and pyridyl; OH; $NO_2$; $NH_2$; $NHC_1$-$C_2$alkyl, wherein the alkyl group may be substituted by at least one substituent chosen from the group consisting of OH, $NH_2$, $C_1$-$C_2$alkyl, CN or COOH; $NHCOC_1$-$C_2$alkyl or $NHCOOC_1$-$C_2$alkyl, $Z_4$ is hydrogen; linear or branched, unsubstituted $C_1$-$C_2$-alkyl; linear or branched $C_1$-$C_2$-alkyl, which is substituted by at least one substituent chosen from the group consisting of hydroxyl, cyano, $SO_3H$, —$NH_2$, carboxyl, carb-$C_1$-$C_2$alkoxy, $C_1$-$C_2$alkoxy, phenyl, naphthyl and pyridyl; linear or branched, unsubstituted $C_1$-$C_2$-alkoxy or linear or branched, $C_1$-$C_2$-alkoxy, which is substituted by at least one substituent chosen from the group consisting of hydroxyl, cyano, $SO_3H$, —$NH_2$, carboxyl, carb-$C_1$-$C_4$alkoxy, $C_1$-$C_4$alkyl, phenyl, naphthyl and pyridyl; OH; $NO_2$; $NH_2$; $NHC_1$-$C_2$alkyl, wherein the alkyl group may be substituted by at least one substituent chosen from the group consisting of OH, $NH_2$, $C_1$-$C_2$alkyl, CN or COOH; $NHCOC_1$-$C_2$alkyl or $NHCOOC_1$-$C_2$alkyl, $Z_5$ is hydrogen; linear or branched, unsubstituted $C_1$-$C_2$-alkyl; linear or branched $C_1$-$C_2$-alkyl, which is substituted by at least one substituent chosen from the group consisting of hydroxyl, cyano, $SO_3H$, —$NH_2$, carboxyl, carb-$C_1$-$C_2$alkoxy, $C_1$-$C_2$alkoxy, phenyl, naphthyl and pyridyl; linear or branched, unsubstituted $C_1$-$C_2$-alkoxy or linear or branched, $C_1$-$C_2$-alkoxy, which is substituted by at least one substituent chosen from the group consisting of hydroxyl, cyano, $SO_3H$, —$NH_2$, carboxyl, carb-$C_1$-$C_4$alkoxy, $C_1$-$C_4$alkyl, phenyl, naphthyl and pyridyl; $NO_2$, G is a direct bond; $COOC_1$-$C_2$alkylene; unsubstituted arylene; arylene which is substituted by at least one substituent chosen from the group consisting of hydroxyl, cyano, $NO_2$, $SO_3H$, —$NH_2$, carboxyl, carb-$C_1$-$C_2$alkoxy, $C_1$-$C_2$alkoxy and $C_1$-$C_2$alkyl; unsubstituted $C_1$-$C_2$alkylene or $C_1$-$C_2$-alkylene which is substituted by at least one substituent chosen from the group consisting of hydroxyl, cyano, $NO_2$, $SO_3H$, —$NH_2$, carboxyl, carb-$C_1$-$C_2$alkoxy, $C_1$-$C_2$alkoxy and $C_1$-$C_2$alkyl, each n is independently from each other 1; 2 or 3, each M is independently from each other hydrogen; $Na^+$ or $K^+$;

(XXVIId')

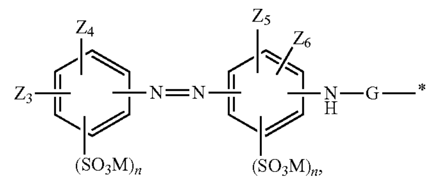

wherein

* marks the bond to the bridging group L, $Z_3$ is hydrogen; linear or branched, unsubstituted $C_1$-$C_2$-alkyl; linear or branched $C_1$-$C_2$-alkyl, which is substituted by at least one substituent chosen from the group consisting of hydroxyl, cyano, $SO_3H$, —$NH_2$, carboxyl, carb-$C_1$-$C_2$alkoxy, $C_1$-$C_2$alkoxy, phenyl, naphthyl and pyridyl; linear or branched, unsubstituted $C_1$-$C_2$-alkoxy or linear or branched, $C_1$-$C_2$-alkoxy, which is substituted by at least one substituent chosen from the group consisting of hydroxyl, cyano, $SO_3H$, —$NH_2$, carboxyl, carb-$C_1$-$C_4$alkoxy, $C_1$-$C_4$alkyl, phenyl, naphthyl and pyridyl; $SO_2CH_2CH_2SO_3H$; or $NO_2$, $Z_4$ is linear or branched, unsubstituted $C_1$-$C_2$-alkyl; linear or branched $C_1$-$C_2$-alkyl, which is substituted by at least one substituent chosen from the group consisting of hydroxyl, cyano, $SO_3H$, —$NH_2$, carboxyl, carb-$C_1$-$C_2$alkoxy, $C_1$-$C_2$alkoxy, phenyl, naphthyl and pyridyl; linear or branched, unsubstituted $C_1$-$C_2$-alkoxy or linear or branched, $C_1$-$C_2$-alkoxy, which is substituted by at least one substituent chosen from the group consisting of hydroxyl, cyano, $SO_3H$, —$NH_2$, carboxyl, carb-$C_1$-$C_4$alkoxy, $C_1$-$C_4$alkyl, phenyl, naphthyl and pyridyl; OH; $SO_2CH_2CH_2SO_3H$; or $NO_2$, $Z_5$ is hydrogen; linear or branched, unsubstituted $C_1$-$C_2$-alkyl; linear or branched $C_1$-$C_2$-alkyl, which is substituted by at least one substituent chosen from the group consisting of hydroxyl, cyano, $SO_3H$, —$NH_2$, carboxyl, carb-$C_1$-$C_2$alkoxy, $C_1$-$C_2$alkoxy, phenyl, naphthyl and pyridyl; linear or branched, unsubstituted $C_1$-$C_2$-alkoxy or linear or branched, $C_1$-$C_2$-alkoxy, which is substituted by at least one substituent chosen from the group consisting of hydroxyl, cyano, $SO_3H$, —$NH_2$, carboxyl, carb-$C_1$-$C_4$alkoxy, $C_1$-$C_4$alkyl, phenyl, naphthyl and pyridyl; OH; $NO_2$; $NH_2$; $NHC_1$-$C_2$alkyl, wherein the alkyl group may be substituted by at least one substituent chosen from the group consisting of OH, $NH_2$, $C_1$-$C_2$alkyl, CN or COOH; $NHCOC_1$-$C_2$alkyl or $NHCOOC_1$-$C_2$alkyl, $Z_6$ is linear or branched, unsubstituted $C_1$-$C_2$-alkyl; linear or branched $C_1$-$C_2$-alkyl, which is substituted by at least one substituent chosen from the group consisting of hydroxyl, cyano, $SO_3H$, —$NH_2$, carboxyl, carb-$C_1$-$C_2$alkoxy, $C_1$-$C_2$alkoxy, phenyl, naphthyl and pyridyl; linear or branched, unsubstituted $C_1$-$C_2$-alkoxy or linear or branched, $C_1$-$C_2$-alkoxy, which is substituted by at least one substituent chosen from the group consisting of hydroxyl, cyano, $SO_3H$, —$NH_2$, carboxyl, carb-$C_1$-$C_4$alkoxy, $C_1$-$C_4$alkyl, phenyl, naphthyl and pyridyl; or $NO_2$, G is a direct bond; $COOC_1$-$C_2$alkylene; unsubstituted arylene; arylene which is substituted by at least one substituent chosen from the group consisting of hydroxyl, cyano, $NO_2$, $SO_3H$, —$NH_2$, carboxyl, carb-$C_1$-$C_2$alkoxy, $C_1$-$C_2$alkoxy and $C_1$-$C_2$alkyl; unsubstituted $C_1$-$C_2$alkylene or $C_1$-$C_2$-alkylene which is substituted by at least one substituent chosen from the group consisting of hydroxyl, cyano, $NO_2$, $SO_3H$, —$NH_2$, carboxyl, carb-$C_1$-$C_2$alkoxy, $C_1$-$C_2$alkoxy and $C_1$-$C_2$alkyl, n is 1 or 2, n' is 0 or 1, each M is independently from each other hydrogen; $Na^+$ or $K^+$, $Z_2$ is hydrogen; linear or branched, unsubstituted $C_1$-$C_2$-alkyl; linear or branched $C_1$-$C_2$-alkyl, which is substituted by at least one substituent chosen from the group consisting of hydroxyl, cyano, $SO_3H$, —$NH_2$, carboxyl, carb-$C_1$-$C_2$alkoxy, $C_1$-$C_2$alkoxy, phenyl, naphthyl and pyridyl; linear or branched, unsubstituted $C_1$-$C_2$-alkoxy or linear or branched, $C_1$-$C_2$-alkoxy, which is substituted by at least one substituent chosen from the group consisting of hydroxyl, cyano, $SO_3H$, —$NH_2$, carboxyl, carb-$C_1$-$C_4$alkoxy, $C_1$-$C_4$alkyl, phenyl, naphthyl and pyridyl; OH; or $NO_2$, G is a direct bond; $COOC_1$-$C_2$alkylene; unsubstituted arylene; arylene which is substituted by at least one substituent chosen from the group consisting of hydroxyl, cyano, $NO_2$, $SO_3H$, —$NH_2$, carboxyl, carb-$C_1$-$C_2$alkoxy, $C_1$-$C_2$alkoxy and $C_1$-$C_2$alkyl; unsubstituted $C_1$-$C_2$alkylene or $C_1$-$C_2$-alkylene which is substituted by at least one substituent chosen from the group consisting of hydroxyl, cyano, $NO_2$, $SO_3H$, —$NH_2$, carboxyl, carb-$C_1$-$C_2$alkoxy, $C_1$-$C_2$alkoxy and $C_1$-$C_2$alkyl, m is 0 or 1, m1 is 0 or 1, n is 0 or 1, each n' is independently from each other 0; 1 or 2, each M is independently from each other hydrogen; $Na^+$ or $K^+$, (XXVIII')

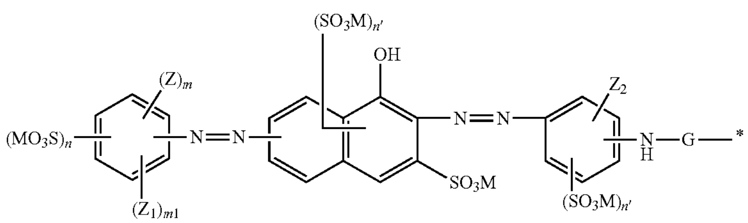

wherein

* marks the bond to the bridging group L,

Z is linear or branched, unsubstituted $C_1$-$C_2$-alkyl; linear or branched $C_1$-$C_2$-alkyl, which is substituted by at least one substituent chosen from the group consisting of hydroxyl, cyano, $SO_3H$, —$NH_2$, carboxyl, carb-$C_1$-$C_2$alkoxy, $C_1$-$C_2$alkoxy, phenyl, naphthyl and pyridyl; linear or branched, unsubstituted $C_1$-$C_2$-alkoxy or linear or branched, $C_1$-$C_2$-alkoxy, which is substituted by at least one substituent chosen from the group consisting of hydroxyl, cyano, $SO_3H$, —$NH_2$, carboxyl, carb-$C_1$-$C_4$alkoxy, $C_1$-$C_4$alkyl, phenyl, naphthyl and pyridyl; $SO_2CH_2CH_2SO_3H$; or $NO_2$, $Z_1$ is linear or branched, unsubstituted $C_1$-$C_2$-alkyl; linear or branched $C_1$-$C_2$-alkyl, which is substituted by at least one substituent chosen from the group consisting of hydroxyl, cyano, $SO_3H$, —$NH_2$, carboxyl, carb-$C_1$-$C_2$alkoxy, $C_1$-$C_2$alkoxy, phenyl, naphthyl and pyridyl; linear or branched, unsubstituted $C_1$-$C_2$-alkoxy or linear or branched, $C_1$-$C_2$-alkoxy, which is substituted by at least one substituent chosen from the group consisting of hydroxyl, cyano, $SO_3H$, —$NH_2$, carboxyl, carb-$C_1$-$C_4$alkoxy, $C_1$-$C_4$alkyl, phenyl, naphthyl and pyridyl; OH; or $NO_2$, (XXIX')

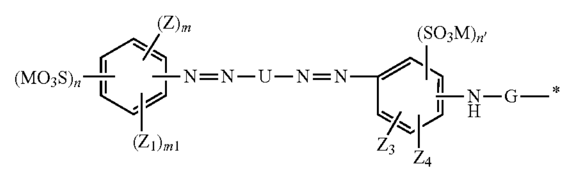

wherein

* marks the bond to the bridging group L,

Z is linear or branched, unsubstituted $C_1$-$C_2$-alkyl; linear or branched $C_1$-$C_2$-alkyl, which is substituted by at least one substituent chosen from the group consisting of hydroxyl, cyano, $SO_3H$, —$NH_2$, carboxyl, carb-$C_1$-$C_2$alkoxy, $C_1$-$C_2$alkoxy, phenyl, naphthyl and pyridyl; linear or branched, unsubstituted $C_1$-$C_2$-alkoxy or linear or branched, $C_1$-$C_2$-alkoxy, which is substituted by at least one substituent chosen from the group consisting of hydroxyl, cyano, $SO_3H$, —$NH_2$, carboxyl, carb-$C_1$-$C_4$alkoxy, $C_1$-$C_4$alkyl, phenyl, naphthyl and pyridyl; $SO_2CH_2CH_2SO_3H$; or $NO_2$, $Z_1$ is linear or branched, unsubstituted $C_1$-$C_2$-alkyl; linear or branched $C_1$-$C_2$-alkyl, which is substituted by at least one substituent chosen from the group consisting of hydroxyl, cyano, $SO_3H$, —$NH_2$, carboxyl, carb-$C_1$-$C_2$alkoxy, $C_1$-$C_2$alkoxy, phenyl, naphthyl and pyridyl; linear or branched, unsubstituted $C_1$-$C_2$-alkoxy or linear or branched, $C_1$-$C_2$-alkoxy, which is substituted by at least one substituent chosen from the group consisting of hydroxyl, cyano, $SO_3H$, —$NH_2$, carboxyl, carb-$C_1$-$C_4$alkoxy, $C_1$-$C_4$alkyl, phenyl, naphthyl and pyridyl; OH; or $NO_2$, $Z_3$ is hydrogen; linear or branched, unsubstituted $C_1$-$C_2$-alkyl; linear or branched $C_1$-$C_2$-alkyl, which is substituted by at least one substituent chosen from the group consisting of hydroxyl, cyano, $SO_3H$, —$NH_2$, carboxyl, carb-$C_1$-$C_2$alkoxy, $C_1$-$C_2$alkoxy, phenyl, naphthyl and pyridyl; linear or branched, unsubstituted $C_1$-$C_2$-alkoxy or linear or branched, $C_1$-$C_2$-alkoxy, which is substituted by at least one substituent chosen from the group consisting of hydroxyl, cyano, $SO_3H$, —$NH_2$, carboxyl, carb-$C_1$-$C_4$alkoxy, $C_1$-$C_4$alkyl, phenyl, naphthyl and pyridyl; OH; or $NO_2$, $Z_4$ is hydrogen; linear or branched, unsubstituted $C_1$-$C_2$-alkyl; linear or branched $C_1$-$C_2$-alkyl, which is substituted by at least one substituent chosen from the group consisting of hydroxyl, cyano, $SO_3H$, —$NH_2$, carboxyl, carb-$C_1$-$C_2$alkoxy, $C_1$-$C_2$alkoxy, phenyl, naphthyl and pyridyl; linear or branched, unsubstituted $C_1$-$C_2$-alkoxy or linear or branched, $C_1$-$C_2$-alkoxy, which is substituted by at least one substituent chosen from the group consisting of hydroxyl, cyano, $SO_3H$, —$NH_2$, carboxyl, carb-$C_1$-$C_4$alkoxy, $C_1$-$C_4$alkyl, phenyl, naphthyl and pyridyl; OH; or $NO_2$, G is a direct bond; $COOC_1$-$C_2$alkylene; unsubstituted arylene; arylene which is substituted by at least one substituent chosen from the group consisting of hydroxyl, cyano, $NO_2$, $SO_3H$, —$NH_2$, carboxyl, carb-$C_1$-$C_2$alkoxy, $C_1$-$C_2$alkoxy and $C_1$-$C_2$alkyl; unsubstituted $C_1$-$C_2$alkylene or $C_1$-$C_2$-alkylene which is substituted by at least one substituent chosen from the group consisting of hydroxyl, cyano, $NO_2$, $SO_3H$, —$NH_2$, carboxyl, carb-$C_1$-$C_2$alkoxy, $C_1$-$C_2$alkoxy and $C_1$-$C_2$alkyl, U is a moiety of formula

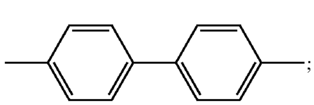

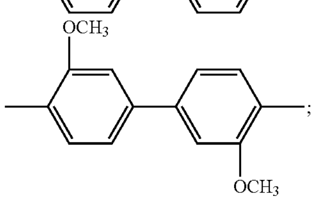

-continued

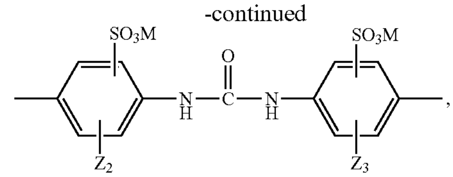

wherein $Z_2$ and $Z_3$ have the meanings as defined above, m is 0 or 1, m1 is 0 or 1, n is 0 or 1, n' is 0; 1 or 2, each M is independently from each other hydrogen; $Na^+$ or $K^+$, (XXX')

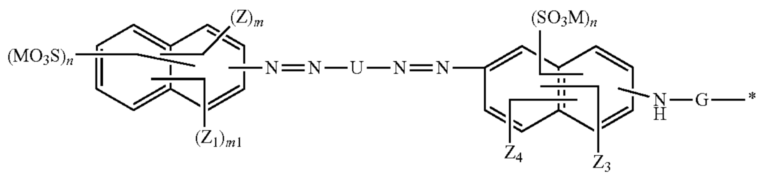

wherein

* marks the bond to the bridging group L,

Z is linear or branched, unsubstituted $C_1$-$C_2$-alkyl; linear or branched $C_1$-$C_2$-alkyl, which is substituted by at least one substituent chosen from the group consisting of hydroxyl, cyano, $SO_3H$, —$NH_2$, carboxyl, carb-$C_1$-$C_2$alkoxy, $C_1$-$C_2$alkoxy, phenyl, naphthyl and pyridyl; linear or branched, unsubstituted $C_1$-$C_2$-alkoxy or linear or branched, $C_1$-$C_2$-alkoxy, which is substituted by at least one substituent chosen from the group consisting of hydroxyl, cyano, $SO_3H$, —$NH_2$, carboxyl, carb-$C_1$-$C_4$alkoxy, $C_1$-$C_4$alkyl, phenyl, naphthyl and pyridyl; $SO_2CH_2CH_2SO_3H$; or $NO_2$, $Z_1$ is linear or branched, unsubstituted $C_1$-$C_2$-alkyl; linear or branched $C_1$-$C_2$-alkyl, which is substituted by at least one substituent chosen from the group consisting of hydroxyl, cyano, $SO_3H$, —$NH_2$, carboxyl, carb-$C_1$-$C_2$alkoxy, $C_1$-$C_2$alkoxy, phenyl, naphthyl and pyridyl; linear or branched, unsubstituted $C_1$-$C_2$-alkoxy or linear or branched, $C_1$-$C_2$-alkoxy, which is substituted by at least one substituent chosen from the group consisting of hydroxyl, cyano, $SO_3H$, —$NH_2$, carboxyl, carb-$C_1$-$C_4$alkoxy, $C_1$-$C_4$alkyl, phenyl, naphthyl and pyridyl; OH; or $NO_2$, $Z_3$ is hydrogen; linear or branched, unsubstituted $C_1$-$C_2$-alkyl; linear or branched $C_1$-$C_2$-alkyl, which is substituted by at least one substituent chosen from the group consisting of hydroxyl, cyano, $SO_3H$, —$NH_2$, carboxyl, carb-$C_1$-$C_2$alkoxy, $C_1$-$C_2$alkoxy, phenyl, naphthyl and pyridyl; linear or branched, unsubstituted $C_1$-$C_2$-alkoxy or linear or branched, $C_1$-$C_2$-alkoxy, which is substituted by at least one substituent chosen from the group consisting of hydroxyl, cyano, $SO_3H$, —$NH_2$, carboxyl, carb-$C_1$-$C_4$alkoxy, $C_1$-$C_4$alkyl, phenyl, naphthyl and pyridyl; $NH_2$; or $NO_2$, $Z_4$ is hydrogen; linear or branched, unsubstituted $C_1$-$C_2$-alkyl; linear or branched $C_1$-$C_2$-alkyl, which is substituted by at least one substituent chosen from the group consisting of hydroxyl, cyano, $SO_3H$, —$NH_2$, carboxyl, carb-$C_1$-$C_2$alkoxy, $C_1$-$C_2$alkoxy, phenyl, naphthyl and pyridyl; linear or branched, unsubstituted $C_1$-$C_2$-alkoxy or linear or branched, $C_1$-$C_2$-alkoxy, which is substituted by at least one substituent chosen from the group consisting of hydroxyl, cyano, $SO_3H$, —$NH_2$, carboxyl, carb-$C_1$-$C_4$alkoxy, $C_1$-$C_4$alkyl, phenyl, naphthyl and pyridyl; OH; or $NO_2$, G is a direct bond; $COOC_1$-$C_2$alkylene; unsubstituted arylene; arylene which is substituted by at least one substituent chosen from the group consisting of hydroxyl, cyano, $NO_2$, $SO_3H$, —$NH_2$, carboxyl, carb-$C_1$-$C_2$alkoxy, $C_1$-$C_2$alkoxy and $C_1$-$C_2$alkyl; unsubstituted $C_1$-$C_2$alkylene or $C_1$-$C_2$-alkylene which is substituted by at least one substituent chosen from the group consisting of hydroxyl, cyano, $NO_2$, $SO_3H$, —$NH_2$, carboxyl, carb-$C_1$-$C_2$alkoxy, $C_1$-$C_2$alkoxy and $C_1$-$C_2$alkyl, U is a moiety of formula

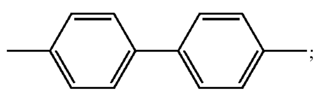

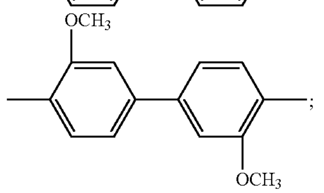

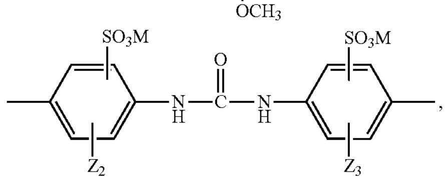

wherein $Z_2$ and $Z_3$ have the meanings as defined above, m is 0 or 1, m1 is 0 or 1, each n is independently from each other 0; 1 or 2, each M is independently from each other hydrogen; $Na^+$ or $K^+$, substituent chosen from the group consisting of hydroxyl, cyano, $SO_3H$, —$NH_2$, carboxyl, carb-$C_1$-$C_2$alkoxy, $C_1$-$C_2$alkoxy, phenyl, naphthyl and pyridyl; linear or branched, unsubstituted $C_1$-$C_2$-alkoxy or linear or branched, $C_1$-$C_2$-alkoxy, which is substituted by at least one substituent chosen from the group consisting of hydroxyl, cyano, $SO_3H$, —$NH_2$, carboxyl, carb-$C_1$-$C_4$alkoxy, $C_1$-$C_4$alkyl, phenyl, naphthyl and pyridyl; OH; or $NO_2$, $Z_3$ is hydrogen; linear or branched, unsubstituted $C_1$-$C_2$-alkyl; linear or branched $C_1$-$C_2$-alkyl, which is substituted by at least one substituent chosen from the group consisting of hydroxyl, cyano, $SO_3H$, —$NH_2$, carboxyl, carb-$C_1$-$C_2$alkoxy, $C_1$-$C_2$alkoxy, phenyl, naphthyl and pyridyl; linear or branched, unsubstituted $C_1$-$C_2$-alkoxy or linear or branched, $C_1$-$C_2$-alkoxy, which is substituted by at least one substituent chosen from the group consisting of hydroxyl, cyano, $SO_3H$, —$NH_2$, carboxyl, carb-$C_1$-$C_4$alkoxy, $C_1$-$C_4$alkyl, phenyl, naphthyl and pyridyl; $NH_2$; or $NO_2$, $Z_4$ is hydrogen; linear or branched, unsubstituted $C_1$-$C_2$-alkyl; linear or branched $C_1$-$C_2$-alkyl, which is substituted by at least one substituent chosen from the group consisting of hydroxyl, cyano, $SO_3H$, —$NH_2$, carboxyl, carb-$C_1$-$C_2$alkoxy, $C_1$-$C_2$alkoxy, phenyl, naphthyl and pyridyl; linear or branched, unsubstituted $C_1$-$C_2$-alkoxy or linear or branched, $C_1$-$C_2$-alkoxy, which is substituted by at least one substituent chosen from the group consisting of hydroxyl, cyano, $SO_3H$, —$NH_2$, carboxyl, carb-$C_1$-$C_4$alkoxy, $C_1$-$C_4$alkyl, phenyl, naphthyl and pyridyl; OH; or $NO_2$, G is a direct bond; $COOC_1$-$C_2$alkylene; unsubstituted arylene; arylene which is substituted by at least one substituent chosen from the group consisting of hydroxyl, cyano, $NO_2$, $SO_3H$, —$NH_2$, carboxyl, carb-$C_1$-$C_2$alkoxy, $C_1$-$C_2$alkoxy and $C_1$-$C_2$alkyl; unsubstituted $C_1$-$C_2$alkylene or $C_1$-$C_2$-alkylene which is substituted by at least one substituent chosen from the group consisting of hydroxyl, cyano, $NO_2$, $SO_3H$, —$NH_2$, carboxyl, carb-$C_1$-$C_2$alkoxy, $C_1$-$C_2$alkoxy and $C_1$-$C_2$alkyl, (XXXI')

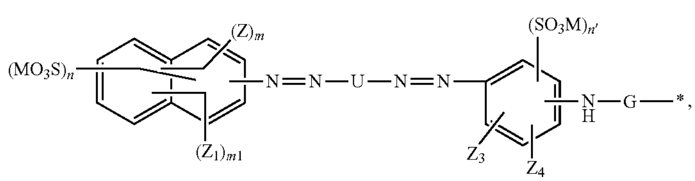

wherein

* marks the bond to the bridging group L,

Z is linear or branched, unsubstituted $C_1$-$C_2$-alkyl; linear or branched $C_1$-$C_2$-alkyl, which is substituted by at least one substituent chosen from the group consisting of hydroxyl, cyano, $SO_3H$, —$NH_2$, carboxyl, carb-$C_1$-$C_2$alkoxy, $C_1$-$C_2$alkoxy, phenyl, naphthyl and pyridyl; linear or branched, unsubstituted $C_1$-$C_2$-alkoxy or linear or branched, $C_1$-$C_2$-alkoxy, which is substituted by at least one substituent chosen from the group consisting of hydroxyl, cyano, $SO_3H$, —$NH_2$, carboxyl, carb-$C_1$-$C_4$alkoxy, $C_1$-$C_4$alkyl, phenyl, naphthyl and pyridyl; $SO_2CH_2CH_2SO_3H$; $NH_2$ or $NO_2$, $Z_1$ is linear or branched, unsubstituted $C_1$-$C_2$-alkyl; linear or branched $C_1$-$C_2$-alkyl, which is substituted by at least one U is a moiety of formula

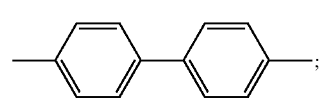

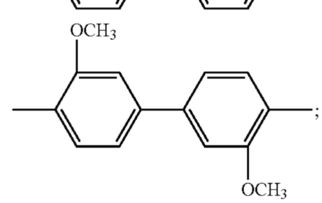

-continued

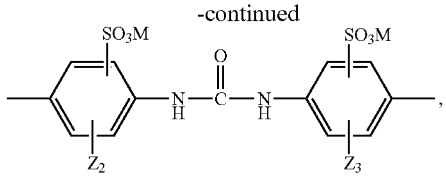

wherein $Z_2$ and $Z_3$ have the meanings as defined above, m is 0 or 1, m1 is 0 or 1,0 n is 1; 2 or 3, n' is 0; 1 or 2, each M is independently from each other hydrogen; $Na^+$ or $K^+$, (XXXII')

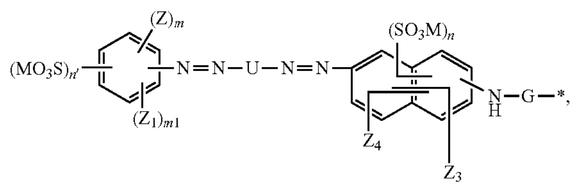

wherein

* marks the bond to the bridging group L,

Z is linear or branched, unsubstituted $C_1$-$C_2$-alkyl; linear or branched $C_1$-$C_2$-alkyl, which is substituted by at least one substituent chosen from the group consisting of hydroxyl, cyano, $SO_3H$, —$NH_2$, carboxyl, carb-$C_1$-$C_2$alkoxy, $C_1$-$C_2$alkoxy, phenyl, naphthyl and pyridyl; linear or branched, unsubstituted $C_1$-$C_2$-alkoxy or linear or branched, $C_1$-$C_2$-alkoxy, which is substituted by at least one substituent chosen from the group consisting of hydroxyl, cyano, $SO_3H$, —$NH_2$, carboxyl, carb-$C_1$-$C_4$alkoxy, $C_1$-$C_4$alkyl, phenyl, naphthyl and pyridyl; $SO_2CH_2CH_2SO_3H$; $NH_2$ or $NO_2$, $Z_1$ is linear or branched, unsubstituted $C_1$-$C_2$-alkyl; linear or branched $C_1$-$C_2$-alkyl, which is substituted by at least one substituent chosen from the group consisting of hydroxyl, cyano, $SO_3H$, —$NH_2$, carboxyl, carb-$C_1$-$C_2$alkoxy, $C_1$-$C_2$alkoxy, phenyl, naphthyl and pyridyl; linear or branched, unsubstituted $C_1$-$C_2$-alkoxy or linear or branched, $C_1$-$C_2$-alkoxy, which is substituted by at least one substituent chosen from the group consisting of hydroxyl, cyano, $SO_3H$, —$NH_2$, carboxyl, carb-$C_1$-$C_4$alkoxy, $C_1$-$C_4$alkyl, phenyl, naphthyl and pyridyl; OH; or $NO_2$, $Z_3$ is hydrogen; linear or branched, unsubstituted $C_1$-$C_2$-alkyl; linear or branched $C_1$-$C_2$-alkyl, which is substituted by at least one substituent chosen from the group consisting of hydroxyl, cyano, $SO_3H$, —$NH_2$, carboxyl, carb-$C_1$-$C_2$alkoxy, $C_1$-$C_2$alkoxy, phenyl, naphthyl and pyridyl; linear or branched, unsubstituted $C_1$-$C_2$-alkoxy or linear or branched, $C_1$-$C_2$-alkoxy, which is substituted by at least one substituent chosen from the group consisting of hydroxyl, cyano, $SO_3H$, —$NH_2$, carboxyl, carb-$C_1$-$C_4$alkoxy, $C_1$-$C_4$alkyl, phenyl, naphthyl and pyridyl; $NH_2$; or $NO_2$, $Z_4$ is hydrogen; linear or branched, unsubstituted $C_1$-$C_2$-alkyl; linear or branched $C_1$-$C_2$-alkyl, which is substituted by at least one substituent chosen from the group consisting of hydroxyl, cyano, $SO_3H$, —$NH_2$, carboxyl, carb-$C_1$-$C_2$alkoxy, $C_1$-$C_2$alkoxy, phenyl, naphthyl and pyridyl; linear or branched, unsubstituted $C_1$-$C_2$-alkoxy or linear or branched, $C_1$-$C_2$-alkoxy, which is substituted by at least one substituent chosen from the group consisting of hydroxyl, cyano, $SO_3H$, —$NH_2$, carboxyl, carb-$C_1$-$C_4$alkoxy, $C_1$-$C_4$alkyl, phenyl, naphthyl and pyridyl; OH; or $NO_2$, G is a direct bond; $COOC_1$-$C_2$alkylene; unsubstituted arylene; arylene which is substituted by at least one substituent chosen from the group consisting of hydroxyl, cyano, $NO_2$, $SO_3H$, —$NH_2$, carboxyl, carb-$C_1$-$C_2$alkoxy, $C_1$-$C_2$alkoxy and $C_1$-$C_2$alkyl; unsubstituted $C_1$-$C_2$alkylene or $C_1$-$C_2$-alkylene which is substituted by at least one substituent chosen from the group consisting of hydroxyl, cyano, $NO_2$, $SO_3H$, —$NH_2$, carboxyl, carb-$C_1$-$C_2$alkoxy, $C_1$-$C_2$alkoxy and $C_1$-$C_2$alkyl, U is a moiety of formula

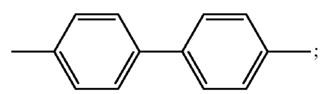

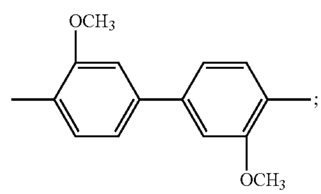

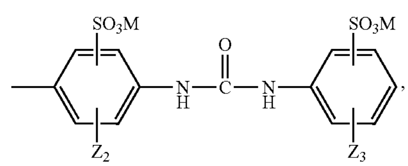

wherein $Z_2$ and $Z_3$ have the meanings as defined above, m is 0 or 1, m1 is 0 or 1, n is 1; 2 or 3, n' is 0; 1 or 2, each M is independently from each other hydrogen; $Na^+$ or $K^+$.

Especially preferred dyestuff radicals D are those of the following formulae (XXXIII)-(XXXV):

(XXXIII)

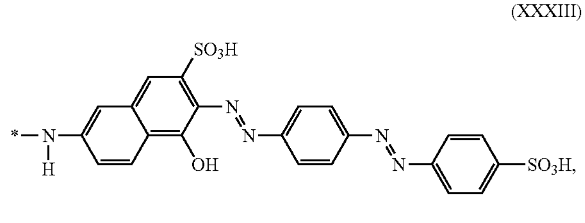

which is the radical of Direct Red 254.

(XXXIV)
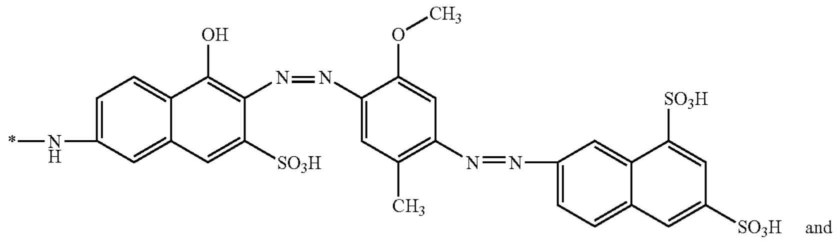
and
(XXXV)
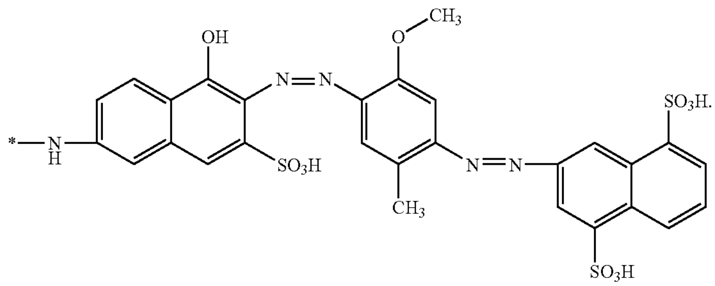
The mixture of the dyestuff formula (XXXIV) and (XXXV) is known as Direct Violet 99 (trade name: Pontamine Brilliant Violet.)
The following dyestuffs are also suitable:
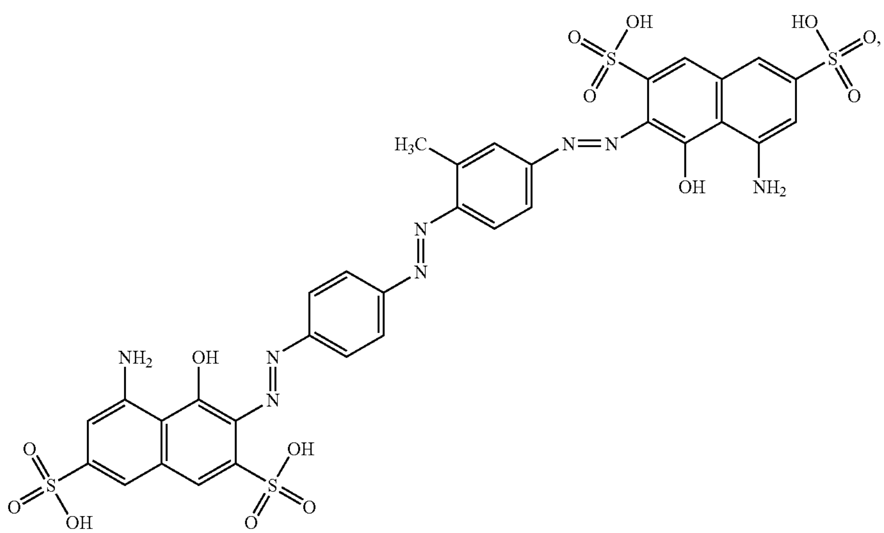
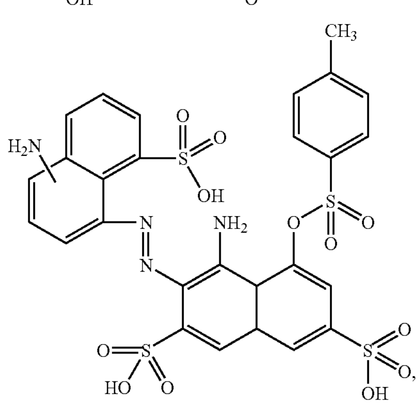
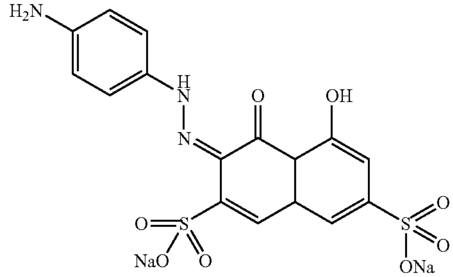
, -continued
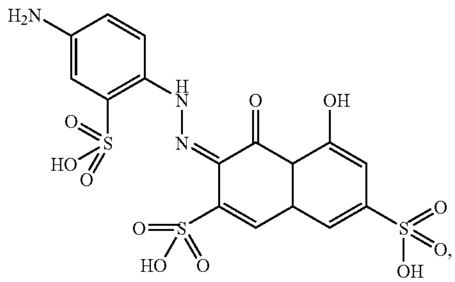
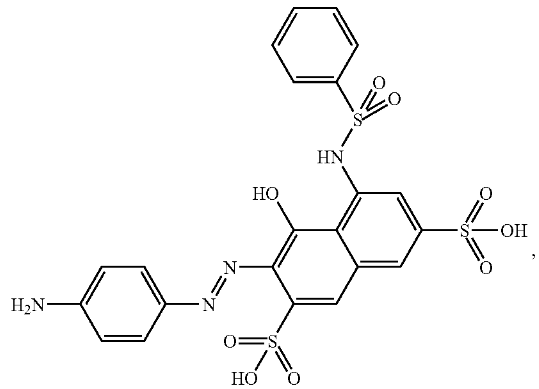
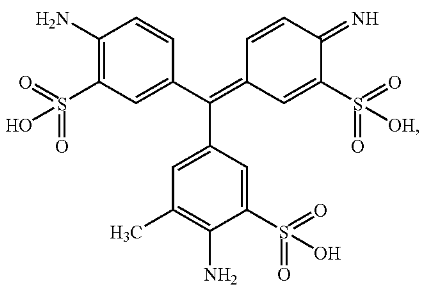
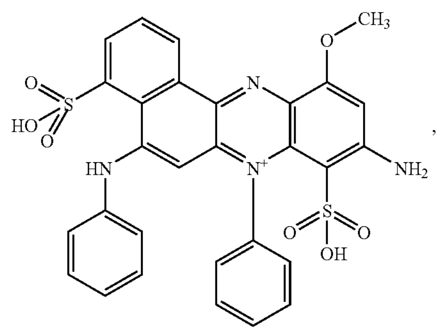
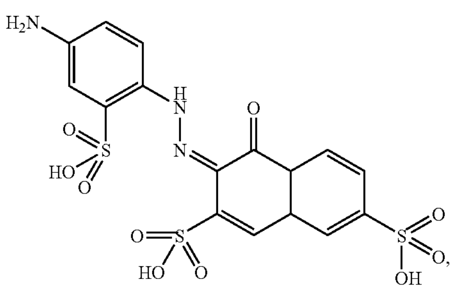
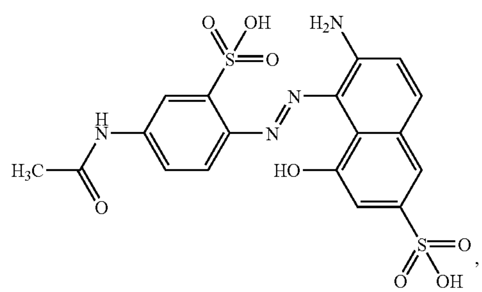
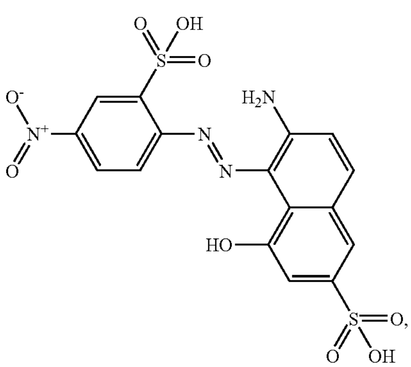
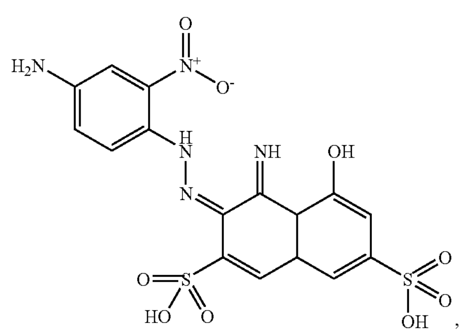
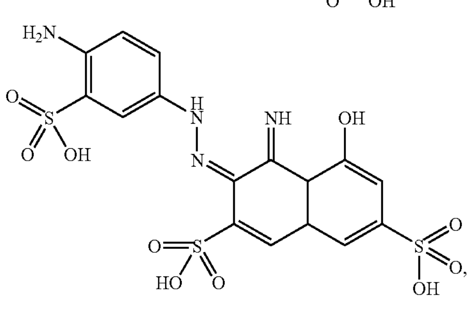
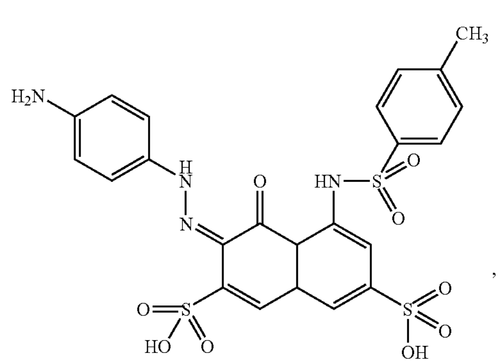

-continued

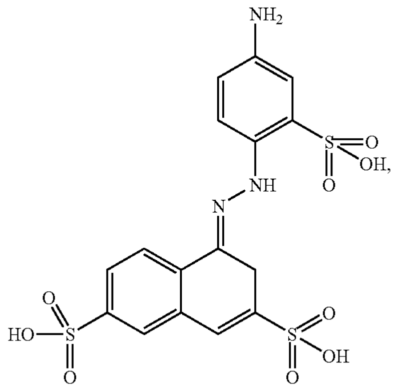

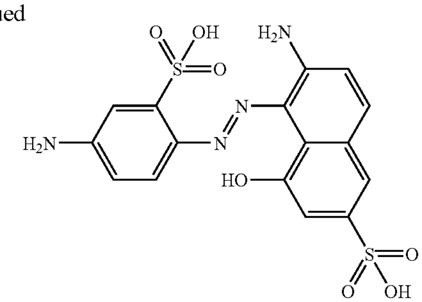
,

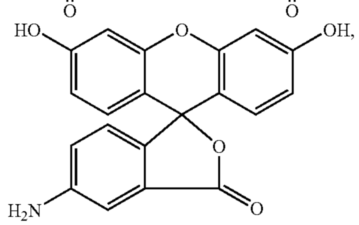

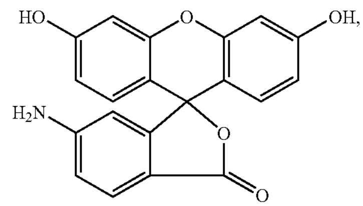

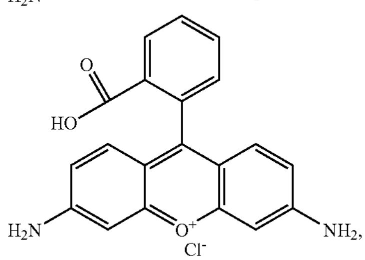

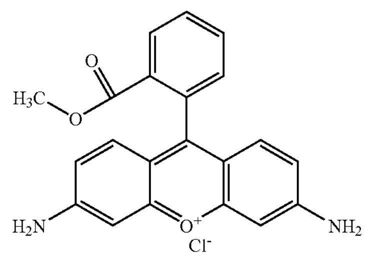
and

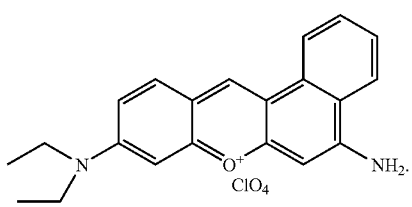

Preferred photobleaching agents of the formula (1a) have the formula $$[Me]-PC\begin{matrix}(SO_3M)_{r_1} \\ (SO_2X_2-R_1-X_3^+)_{r_2}\end{matrix} \quad A_s^- \qquad \text{with } [L\text{-}D]_{r'} \text{ on PC} \tag{2a}$$

in which

PC, $X_2$, $X_3$, $R_1$, L, D, $r_1$, $r_2$ and r' are as defined above (including the preferences), Me is Zn, $AlZ_1$, Si(IV)-$(Z_1)_2$ or Ti(IV)-$(Z_1)_2$, wherein $Z_1$ is chloride, fluorine, bromine or hydroxyl, M is hydrogen; an alkali metal ion; ammonium ion or amine salt ion, and the sum of the numbers $r_1$, $r_2$ and r' is from 1 to 8 and $A_s^-$ balances exactly the positive charge on the remainder of the molecule.

More preferred photobleaching agents of the formula (1a) have the formula $$[Me]-[PC]-[SO_2NHR_1'-X_3'^+A'^-]_{r_1}, \qquad \text{with } [L-D]_{r'} \text{ on PC} \tag{3}$$

in which

PC, L and D are as defined above (including the preferences),

Me is Zn, $AlZ_1$, Si(IV)-$(Z_1)_2$ or Ti(IV)-$(Z_1)_2$, wherein $Z_1$ is chloride, fluorine, bromine or hydroxyl, $R_1'$ is $C_2$-$C_6$alkylene, $r_1$ is a number from 0 to 4, preferably 1 to 4, r' is a number from 1 to 4, $X_3'^+$ is a group of the formula

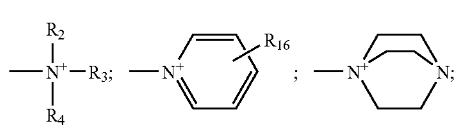
or

-continued

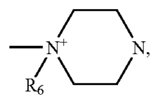

in which $R_2$ and $R_3$ independently of one another are unsubstituted linear or branched $C_1$-$C_4$alkyl or linear or branched $C_1$-$C_4$alkyl substituted by at least one substituent chosen from the group consisting of hydroxyl, cyano, halogen and phenyl, $R_4$ is $R_2$; cyclohexyl or amino, $R_6$ is $C_1$-$C_4$alkyl, $R_{16}$ is $C_1$-$C_4$alkyl; $C_1$-$C_4$alkoxy; halogen; carboxyl; carb-$C_1$-$C_4$alkoxy or hydroxyl, and $A'^-$ is a halide; alkylsulfate or arylsulfate ion, it being possible for the radicals —$SO_2NHR'_1$—$X_3'^+A'^-$ to be identical or different.

Other photobleaching agents which can be used according to the invention have the formula

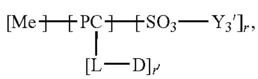

(4)

in which

PC, L and D are as defined above (including the preferences),

Me is Zn; Ca; Mg; Na; K; Al—$Z_1$; Si(IV)-$(Z_1)_2$; Ti(IV)-$(Z_1)_2$; Ge(IV)-$(Z_1)_2$; Ga(III)-$Z_1$; Zr(IV)-$(Z_1)_2$; In(III)-$Z_1$ or Sn(IV)-$(Z_1)_2$, $Z_1$ is a alkanolate; a hydroxyl ion; $R_0COO^-$; $ClO_4^-$; $BF_4^-$; $PF_6^-$;$R_0SO_3^-$; $SO_4^{2-}$; $NO_3^-$; $F^-$; $Cl^-$; $Br^-$; $I^-$; citrate ion; tartrate ion or oxalate ion, wherein $R_0$ is hydrogen; or unsubstituted $C_1$-$C_{18}$alkyl; or $C_1$-$C_{18}$alkyl, which is substituted by at least one substituent chosen from the group consisting of hydroxyl, cyano, carboxyl, $SO_3H$, —$NH_2$, carb-$C_1$-$C_6$alkoxy, $C_1$-$C_6$alkoxy, phenyl, naphthyl and pyridyl; unsubstituted aryl or aryl, which is substituted by at least one substituent chosen from the group consisting of hydroxyl, cyano, carboxyl, $SO_3H$, —$NH_2$, carb-$C_1$-$C_6$alkoxy, $C_1$-$C_6$alkoxy and $C_1$-$C_4$-alkyl, $Y_3'$ is hydrogen; an alkali metal ion or ammonium ion, and r is any number from 0 to 4, preferably any number from 1 to 4, r' is any number from 1 to 4.

Very particularly preferred phthalocyanine compounds have the formula (4a),

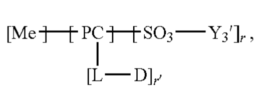

(4a)

in which

PC, L and D are as defined above (including the preferences),

Me is Zn or Al—$Z_1$, $Z_1$ is a alkanolate; a hydroxyl ion; $R_0COO^-$; $ClO_4^-$; $BF_4^-$; $PF_6^-$;$R_0SO_3^-$; $SO_4^{2-}$; $NO_3^-$; $F^-$; $Cl^-$; $Br^-$; $I^-$; citrate ion; tartrate ion or oxalate ion, wherein $R_0$ is hydrogen; or unsubstituted $C_1$-$C_{18}$alkyl; or $C_1$-$C_{18}$alkyl, which is substituted by at least one substituent chosen from the group consisting of hydroxyl, cyano, carboxyl, $SO_3H$, —$NH_2$, carb-$C_1$-$C_6$alkoxy, $C_1$-$C_6$alkoxy, phenyl, naphthyl and pyridyl; unsubstituted aryl or aryl, which is substituted by at least one substituent chosen from the group consisting of hydroxyl, cyano, carboxyl, $SO_3H$, —$NH_2$, carb-$C_1$-$C_6$alkoxy, $C_1$-$C_6$alkoxy and $C_1$-$C_4$-alkyl, $Y_3'$ is hydrogen; an alkali metal ion or ammonium ion, and r is any number from 0 to 4, preferably any number from 1 to 4, r' is any number from 1 to 4.

Other interesting phthalocyanine compounds which can be used according to the invention have the formula (5)

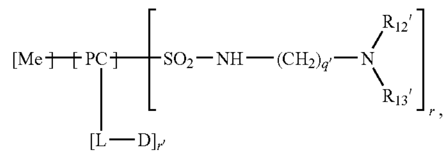

in which

PC, Me, L and D are as defined in formula (4), $R_{12}'$ and $R_{13}'$ independently of one another are hydrogen; phenyl; sulfophenyl; carboxyphenyl; $C_1$-$C_6$alkyl; hydroxy-$C_1$-$C_6$alkyl; cyano-$C_1$-$C_6$alkyl; sulfo-$C_1$-$C_6$alkyl; carboxy-$C_1$-$C_6$alkyl or halogen-$C_1$-$C_6$alkyl or $R_{12}'$ and $R_{13}'$ together with the nitrogen atom form the morpholine ring, q' is an integer from 2 to 6, r is a number from 1 to 4, and r' is any number from 1 to 4, where, if r is >1, the radicals

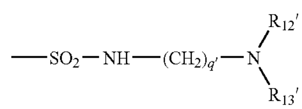

present in the molecule may be identical or different.

Further interesting phthalocyanine compounds which can be used according to the invention have the formula (6)

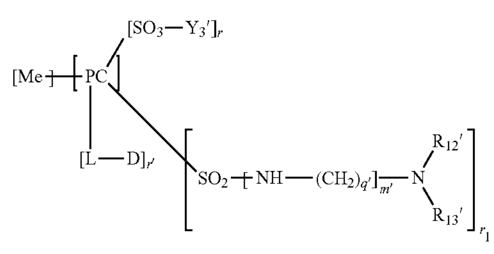

in which

PC, Me, L and D are as defined in formula (4), $Y'_3$ is hydrogen; an alkali metal ion or ammonium ion, q' is an integer from 2 to 6, $R_{12}'$ and $R_{13}'$ independently of one another are hydrogen; phenyl; sulfophenyl; carboxyphenyl; $C_1$-$C_6$alkyl; hydroxy-$C_1$-$C_6$alkyl; cyano-$C_1$-$C_6$alkyl; sulfo-$C_1$-$C_6$alkyl; carboxy-$C_1$-$C_6$alkyl or halogen-$C_1$-$C_6$alkyl or $R_{12}'$ and $R_{13}'$ together with the nitrogen atom form the morpholine ring, m' is 0 or 1; and r' is any number from 1 to 4 r and $r_1$ independently of one another are any number from 0.5 to 2, the sum $r+r_1$ being at least 1, but no more than 3.

If the central atom Me in the phthalocyanine ring is Si(IV), the phthalocyanines used according to the invention may also have axial substituents ($=R_{21}$) in addition to the substituents on the phenyl ring of the phthalocyanine ring. Such phthalocyanines have, for example, the formula (7)

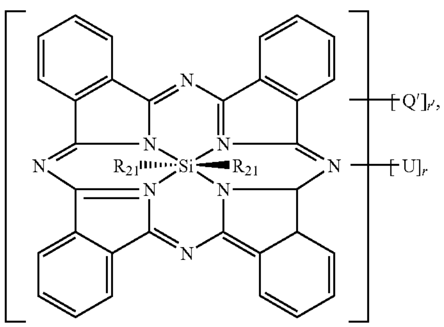

in which $R_{21}$ is hydroxyl; $C_1$-$C_{22}$alkyl; branched $C_3$-$C_{22}$alkyl; $C_1$-$C_{22}$alkenyl; branched $C_3$-$C_{22}$alkenyl and mixtures thereof; $C_1$-$C_{22}$alkoxy; a sulfo or carboxyl radical; a radical of the formula

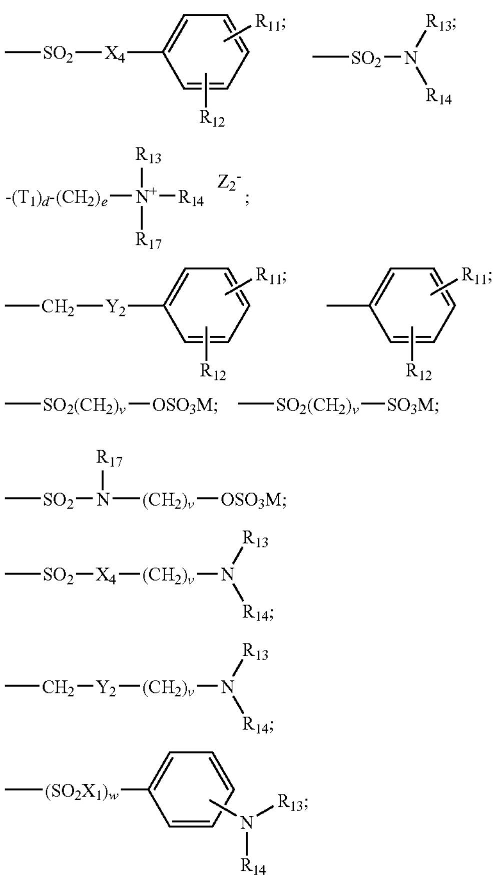

-continued

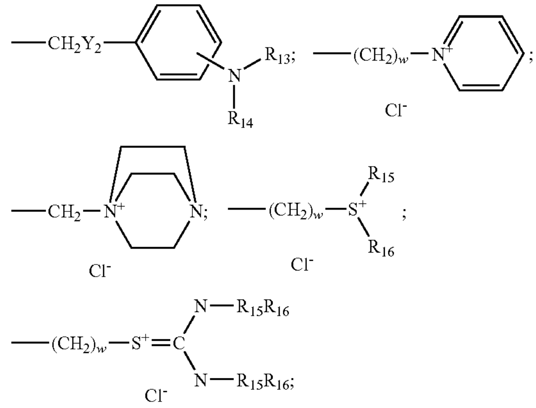

a branched alkoxy radical of the formula

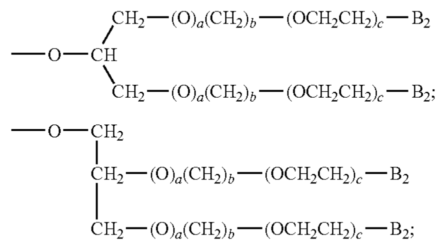

an alkylethyleneoxy unit of the formula $-(T_1)_d-(CH_2)_b(OCH_2CH_2)_a—B_3$ or an ester of the formula $COOR_{18}$, and U is $[Q_1]^+A_s^-$ or $Q_2$, wherein $R_{11}$, $R_{12}$, $R_{13}$, $R_{14}$, $R_{15}$, $R_{16}$, $R_{17}$, $R_{18}$, $B_2$, $B_3$, M, $Q_1$, $Q_2$, $A^-$, $T_1$, $X_1$, $X_4$, $Y_2$, $Z_2^-$, a, b, c, d, e, r, r', s, v and w are as defined above (including the preferences).

Especially preferred compounds of formula (1a) and (1b) have formula (8)

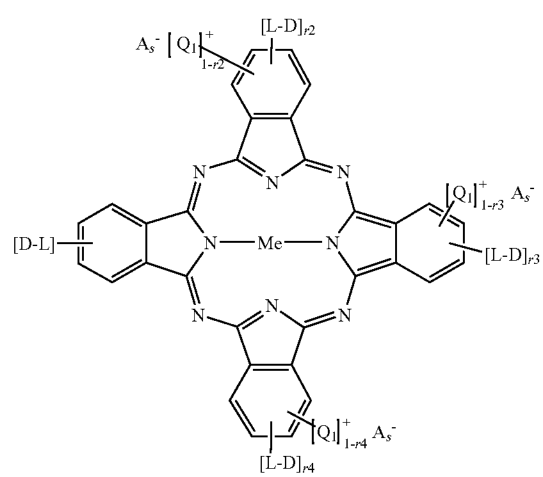

-continued (9)

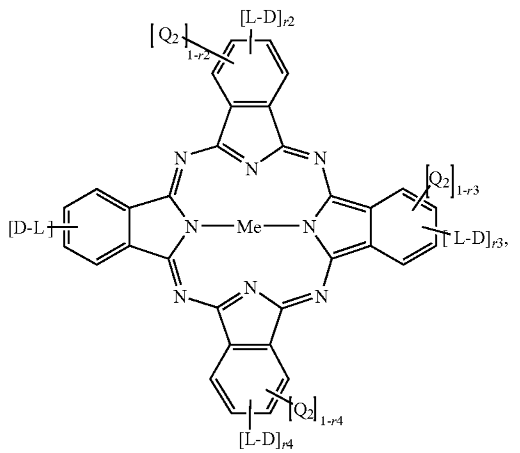

wherein

Me is Zn, $AlZ_1$, $Si(IV)-(Z_1)_2$ or $Ti(IV)-(Z_1)_2$, wherein $Z_1$ is chloride, fluorine, bromine or hydroxyl, each $Q_1$ is independently of each other a sulfo or carboxyl group; or a radical of the formula $—SO_2X_2—R_1—X_3^+$; $—O—R_1—X_3^+$ or $—(CH_2)_t—Y_1^+$, in which $R_1$ is a branched or unbranched $C_1$-$C_4$alkylene; 1,3-phenylene or 1,4-phenylene, $X_2$ is —NH— or $—N(C_1$-$C_4alkyl)$-, $X_3^+$ is a group of the formula

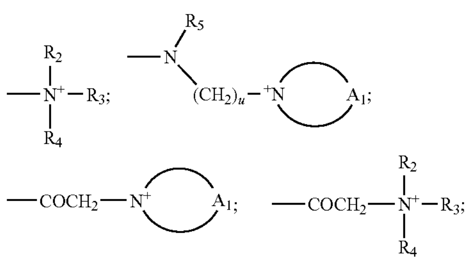

or, in the case where $R_1$=$C_1$-$C_4$alkylene, also a group of the formula

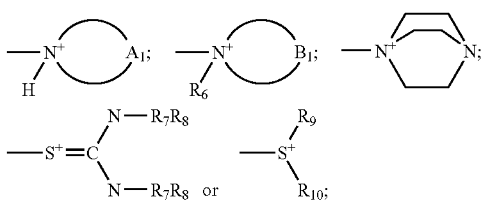

$Y_1^+$ is a group of the formula

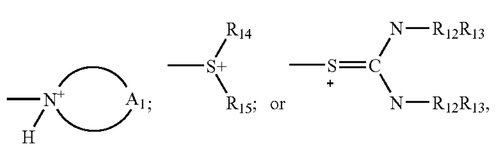

t is 0 or 1, wherein the above formulae $R_2$ and $R_3$ independently of one another are $C_1$-$C_6$alkyl, $R_4$ is $C_1$-$C_4$alkyl; pentyl; hexyl or $NR_7R_8$, $R_5$ and $R_6$ independently of one another are $C_1$-$C_4$alkyl, $R_7$ and $R_8$ independently of one another are hydrogen or $C_1$-$C_4$alkyl, $R_9$ and $R_{10}$ independently of one another are unsubstituted $C_1$-$C_4$alkyl or $C_1$-$C_4$alkyl substituted by at least one substituent chosen from the group consisting of hydroxyl, cyano, carboxyl, $SO_3H$, carb-$C_1$-$C_4$alkoxy, $C_1$-$C_4$alkoxy, phenyl, naphthyl and pyridyl, u is from 1 to 6, $A_1$ is a unit which completes an pyrrole-; imidazol-; pyridine-; pyrazine-; pyrimidine-; pyridazine-ring, and $B_1$ is a unit which completes a morpholino-; pyrrolidine-; piperazine- or piperidine-ring, each $Q_2$ is independently from each other hydroxyl; $C_1$-$C_{10}$alkyl; branched $C_3$-$C_{10}$alkyl; $C_2$-$C_{10}$alkenyl; branched $C_3$-$C_{10}$alkenyl and mixtures thereof; $C_1$-$C_{10}$alkoxy; a sulfo or carboxyl radical; a radical of the formula

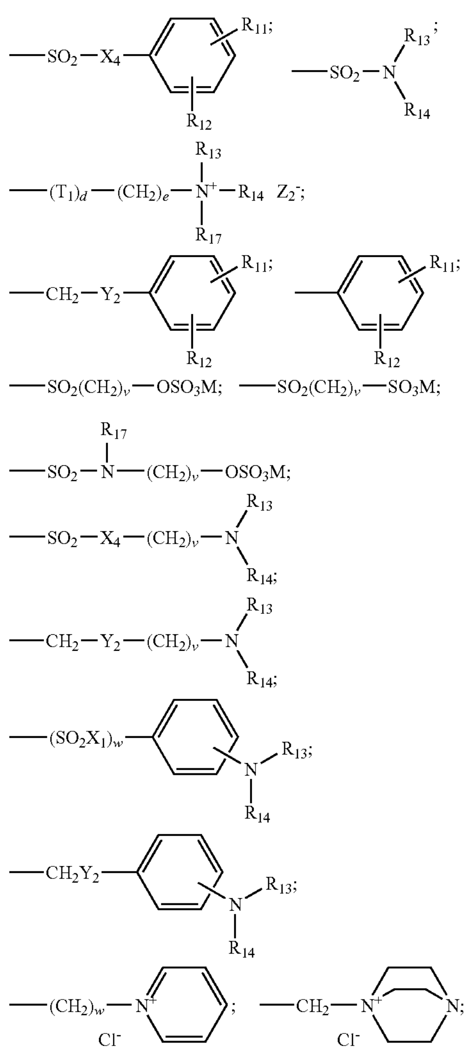

-continued

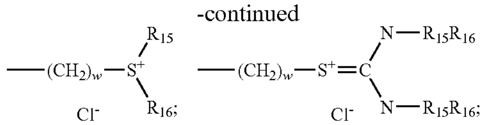

a branched alkoxy radical of the formula

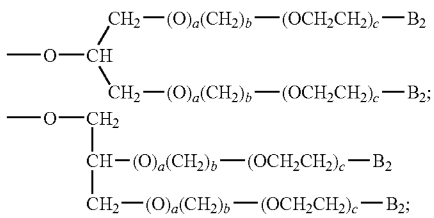

an alkylethyleneoxy unit of the formula $-(T_1)_d-(CH_2)_b(OCH_2CH_2)_a$—$B_3$ or an ester of the formula $COOR_{18}$, in which $B_2$ is hydrogen; hydroxyl; $C_1$-$C_{18}$alkyl; $C_1$-$C_{18}$alkoxy; —$CO_2H$; —$CH_2COOH$; —$SO_3^-M_1$; —$OSO_3^-M_1$; —$PO_3^{2-}M_1$; —$OPO_3^{2-}M_1$; and mixtures thereof, $B_3$ is hydrogen; hydroxyl; —COON; —$SO_3^-M_1$; —$OSO_3^-M_1$ or $C_1$-$C_4$alkoxy, $M_1$ is hydrogen; alkalimetal-ion or an ammonium ion, $T_1$ is —O— or —NH—, $X_1$ and $X_4$ independently of one another are —O—; —NH— or —N($C_1$-$C_4$alkyl)-, $R_{11}$ and $R_{12}$ independently of one another are hydrogen; a sulfo group and salts thereof; a carboxyl group and salts thereof or a hydroxyl group; at least one of the radicals $R_{11}$ and $R_{12}$ being a sulfo or carboxyl group or salts thereof, $Y_2$ is —O—; —S—; —NH— or —N($C_1$-$C_4$alkyl)-, $R_{13}$ and $R_{14}$ independently of one another other are hydrogen; $C_1$-$C_4$alkyl; hydroxy-$C_1$-$C_4$alkyl; cyano-$C_1$-$C_4$alkyl; sulfo-$C_1$-$C_4$alkyl; carboxy or halogen-$C_1$-$C_4$alkyl; unsubstituted phenyl or phenyl substituted by at least one substitutent chosen from the group consisting of halogen, $C_1$-$C_4$alkyl and $C_1$-$C_4$alkoxy; sulfo or carboxyl or $R_{13}$ and $R_{14}$ together with the nitrogen atom to which they are bonded form a form morpholino, piperazine or piperidine ring, $R_{15}$ and $R_{16}$ independently of one another are $C_1$-$C_4$alkyl or aryl-$C_1$-$C_4$alkyl radicals, $R_{17}$ is hydrogen; an unsubstituted $C_1$-$C_4$alkyl or $C_1$-$C_4$alkyl substituted by at least one substitutent chosen from the group consisting of halogen, hydroxyl, cyano, $SO_3H$, —$NH_2$, phenyl, carboxyl, carb-$C_1$-$C_4$alkoxy or $C_1$-$C_6$alkoxy, $R_{18}$ is $C_1$-$C_{10}$alkyl; branched $C_3$-$C_{10}$alkyl; $C_1$-$C_{10}$alkenyl or branched $C_3$-$C_{10}$alkenyl; $C_3$-$C_{22}$glycol; $C_1$-$C_{10}$alkoxy; branched $C_3$-$C_{10}$alkoxy; and mixtures thereof, M is hydrogen; $Na^+$; $K^+$ or an ammonium ion, $Z_2^-$ a is a alkanolate; a hydroxyl ion; $R_0COO^-$; $ClO_4^-$; $BF_4^-$;$PF_6^-$;$R_0SO_3^-$; $SO_4^{2-}$; $NO_3^-$; $F^-$; $Cl^-$; $Br^-$; $I^-$; citrate ion; tartrate ion or oxalate ion, wherein $R_0$ is hydrogen; or unsubstituted $C_1$-$C_{18}$alkyl; or $C_1$-$C_{18}$alkyl, which is substituted by at least one substituent chosen from the group consisting of hydroxyl, cyano, carboxyl, $SO_3H$, —$NH_2$, carb-$C_1$-$C_6$alkoxy, $C_1$-$C_6$alkoxy, phenyl, naphthyl and pyridyl; unsubstituted aryl or aryl, which is substituted by at least one substituent chosen from the group consisting of hydroxyl, cyano, carboxyl, $SO_3H$, —$NH_2$, carb-$C_1$-$C_6$alkoxy, $C_1$-$C_6$alkoxy and $C_1$-$C_4$-alkyl, a is 0 or 1, b is from 0 to 6, c is from 0 to 100, d is 0; or 1, e is from 0 to 22, v is an integer from 2 to 12, w is 0 or 1, and $A^-$ is an organic or inorganic anion, and s is equal to $r_2$, $r_3$, $r_4$ and $r_5$ in cases of monovalent anions $A^-$ and is $\leq r_2$, $r_3$, $r_4$ and $r_5$ in cases of polyvalent anions, it being necessary for $A_s^-$ to compensate the positive charge; where, when $r_2$, $r_3$, $r_4$ and $r_5 \neq 1$, the radicals $Q_1$ can be identical or different, each L is independently from each other a direct bond; —$SO_2$—; —O—; —$OR_{19}$—; —$OR_{19}O$—; —$OR_{19}N(R_{20})$—; —$N(R_{20})$—; —$(CH_2CH_2O—)_n$—; —C(O)—; —C(O)N($R_{20}$)—; —N($R_{20}$)C(O)—; —OC(O)—; —C(O)O—; —S—; unsubstituted, linear or branched $C_1$-$C_{18}$alkylene; linear or branched $C_1$-$C_{18}$alkylene, which is substituted by at least one substituent chosen from the group consisting of hydroxyl, cyano, $SO_3H$, —$NH_2$, carboxyl, carb-$C_1$-$C_4$alkoxy, $C_1$-$C_4$alkoxy, phenyl, naphthyl and pyridyl; unsubstituted $C_5$-$C_{18}$arylene; $C_5$-$C_{18}$arylene, which is substituted by at least one substituent chosen from the group consisting of hydroxyl, cyano, carboxyl, carb-$C_1$-$C_4$alkoxy, $C_1$-$C_4$alkoxy and $C_1$-$C_4$alkyl; unsubstituted, linear or branched $C_1$-$C_{18}$alkylene-$C_5$-$C_{18}$aryl; linear or branched $C_1$-$C_{18}$alkylene-$C_5$-$C_{18}$aryl, which is substituted by at least one substituent chosen from the group consisting of hydroxyl, cyano, $SO_3H$, —$NH_2$, carboxyl, carb-$C_1$-$C_4$alkoxy, $C_1$-$C_4$alkoxy, $C_1$-$C_4$alkyl, phenyl, naphthyl and pyridyl; unsubstituted, linear or branched $C_5$-$C_{18}$arylene-$C_1$-$C_{18}$alkyl or linear or branched $C_5$-$C_{18}$arylene-$C_1$-$C_{18}$alkyl, which is substituted by at least one substituent chosen from the group consisting of hydroxyl, cyano, $SO_3H$, —$NH_2$, carboxyl, carb-$C_1$-$C_4$alkoxy, $C_1$-$C_4$alkoxy, $C_1$-$C_4$alkyl, phenyl, naphthyl and pyridyl, wherein $R_{19}$ is unsubstituted, linear or branched $C_1$-$C_{18}$alkylene; linear or branched $C_1$-$C_{18}$alkylene, which is substituted by at least one substituent chosen from the group consisting of hydroxyl, cyano, $SO_3H$, —$NH_2$, carboxyl, carb-$C_1$-$C_4$alkoxy, $C_1$-$C_4$alkoxy, phenyl, naphthyl and pyridyl; unsubstituted $C_5$-$C_{18}$arylene; $C_5$-$C_{18}$arylene, which is substituted by at least one substituent chosen from the group consisting of hydroxyl, cyano, $SO_3H$, —$NH_2$, carboxyl, carb-$C_1$-$C_4$alkoxy, $C_1$-$C_4$alkoxy and $C_1$-$C_4$alkyl; unsubstituted, linear or branched $C_1$-$C_{18}$alkylene-$C_5$-$C_{18}$aryl; linear or branched $C_1$-$C_{18}$alkylene-$C_5$-$C_{18}$aryl, which is substituted by at least one substituent chosen from the group consisting of hydroxyl, cyano, $SO_3H$, —$NH_2$, carboxyl, carb-$C_1$-$C_4$alkoxy, $C_1$-$C_4$alkoxy, $C_1$-$C_4$alkyl, phenyl, naphthyl and pyridyl; unsubstituted, linear or branched $C_5$-$C_{18}$arylene-$C_1$-$C_{18}$alkyl or linear or branched $C_5$-$C_{18}$arylene-$C_1$-$C_{18}$alkyl, which is substituted by at least one substituent chosen from the group consisting of hydroxyl, cyano, carboxyl, carb-$C_1$-$C_4$alkoxy, $C_1$-$C_4$alkoxy, $C_1$-$C_4$alkyl, phenyl, naphthyl and pyridyl, $R_{20}$ is unsubstituted, linear or branched $C_1$-$C_{18}$alkyl; linear or branched $C_1$-$C_{18}$alkyl, which is substituted by at least one substituent chosen from the group consisting of hydroxyl, cyano, $SO_3H$, —$NH_2$, carboxyl, carb-$C_1$-$C_4$alkoxy, $C_1$-$C_4$alkoxy, phenyl, naphthyl and pyridyl;

unsubstituted $C_5$-$C_{18}$aryl; $C_5$-$C_{18}$aryl, which is substituted by at least one substituent chosen from the group consisting of hydroxyl, cyano, $SO_3H$, —$NH_2$, carboxyl, carb-$C_1$-$C_4$alkoxy, $C_1$-$C_4$alkoxy and $C_1$-$C_4$alkyl; unsubstituted, linear or branched $C_1$-$C_{18}$alkoxy or linear or branched $C_1$-$C_{18}$alkoxy, which is substituted by at least one substituent chosen from the group consisting of hydroxyl, cyano, $SO_3H$, —$NH_2$, carboxyl, carb-$C_1$-$C_4$alkoxy, $C_1$-$C_4$alkyl, phenyl, naphthyl and pyridyl, n is 1; 2; 3 or 4, each D is independently from each other a dyestuff radical of formula (I), (II), (III), (IV), (V), (VI), (VII), (VIII), (IX), (X), (XI), (XII), (XIII), (XIV), (XV), (XVI), (XVII), (XVIII), (XIX), (XX), (XXI), (XXII), (XXIII), (XXIV), (XXV), (XXVI), (XXVIIa), (XXVIIb), (XXVIIc), (XXVIId), (XXVIII), (XXIX), (XXX), (XXXI), (XXXII), (XXXIII), (XXXIV), (XXXV), (I'), (II'), (III'), (IV'), (V'), (VI'), (VIIa'), (VIIb'), (VIII'), (IX'), (X'), (XI'), (XII'), (XIII'), (XIV'), (XV'), (XVI'), (XVII'), (XVIII'), (XIX'), (XX'), (XXI'), (XXVIIa'), (XXVIIb'), (XXVIIc'), (XXVIId'), (XXVIII'), (XXIX'), (XXX'), (XXXI'), (XXXII'), $r_2$ is 0 or 1, $r_3$ is 0 or 1, and $r_4$ is 0 or 1.

Usually, the inventive shading process is part of a laundry washing process. It can be part of any step of the laundry washing process (Pre-soaking, main washing and after-treatment). The process can be carried out in a washing machine as well as by hand. The usual washing temperature is between 5° C. and 95° C.

The washing or cleaning agents are usually formulated that the washing liquor has pH value of about 6.5-11, preferably 7.5-11 during the whole washing procedure.

The liquor ration in the washing process is usually 1:4 to 1:40, preferably 1:4 to 1:15, more preferably 1:4 to 1:10, especially preferably 1:5 to 1:9.

The washing procedure is usually done in washing machine.

There are various types of washing machines, for example:

top-loader-washing machines with a verticle rotating axis; these machines, which have usually a capacity of about 45 to 83 liters, are used for washing processes at temperatures of 10-50° C. and washing cycles of about 10-60 minutes. Such types of washing machines are often used in the USA;

front-loader-washing machinee with a horizontal rotating axis; these machines, which have usually a capacity of about 8 to 15 liters, are used for washing processes at temperatures of 30-95° C. and washing cycles of about 10-60 minutes. Such types of washing machines are often used in Europe;

top-loader- washing machines with a verticle rotating axis; these machines, which have usually a capacity of about 26 to 52 liters, are used for washing processes at temperatures of 5-25° C. and washing cycles of about 8-15 minutes. Such types of washing machines are often used in Japan.

The washing, cleaning, disinfecting or bleaching agent according to the invention can also be used in a soaking process, where the stained textiles are left for 0.5-24 hours in a solution or suspension of the detergent and/or bleaching laundry additive without agitation. Soaking can take place for example in a bucket or in a washing machine. Usually the textiles are washed and/or rinsed after the soaking process.

A further embodiment of the present invention relates to a shading composition (A) comprising at least one compound of formula (1a) and/or (1b), as defined above.

A preferred embodiment of the present invention relates to a shading composition (A') comprising at least one compound of formula (2a), (3), (4), (4a), (5), (6) and/or (7), as defined above.

A more preferred embodiment of the present invention relates to a shading composition (A") comprising at least one compound of formula (8) and/or (9), as defined above.

The shading compositions (A), (A') and (A") may be in any physical form, preferably in a solid or liquid form.

Granulates are preferred as solid formulation.

The present invention also relates to granulates (G) comprising a) from 2 to 75% by weight (wt-%) of at least one shading composition (A), (A') and/or (A"), based on the total weight of the granulate, b) from 10 to 95 wt-% of at least one further additive, based on the total weight of the granulate, and c) from 0 to 15 wt-% water, based on the total weight of the granulate.

The sum of the wt-% of components a)-c) is always 100%.

The granulates according to the invention can be encapsulated or not.

Encapsulating materials include especially water-soluble and water-dispersible polymers and waxes. Of those materials, preference is given to polyethylene glycols, polyamides, polyacrylamides, polyvinyl alcohols, polyvinylpyrrolidones, gelatin, hydrolyzed polyvinyl acetates, copolymers of vinylpyrrolidone and vinyl acetate, and also polyacrylates, paraffins, fatty acids, copolymers of ethyl acrylate with methacrylate and methacrylic acid, and poly-methacrylates.

The granulates according to the invention contain from 2 to 75 wt-%, preferably from 2 to 60 wt-%, especially from 5 to 55 wt-%, of component a), based on the total weight of the granulate.

The granulates in the formulations according to the invention contain from 10 to 95 wt-%, preferably from 10 to 85 wt-%, especially from 10 to 80 w, of at least one further additive (component b)), based on the total weight of the granulate.

Such further additives may be anionic or non-ionic dispersing agents; water-soluble organic polymers; inorganic salts; low-molecular-weight organic acids or a salts thereof; wetting agents; disintegrants such as, for example, powdered or fibrous cellulose, microcrystalline cellulose; fillers such as, for example, dextrin; water-insoluble or water-soluble dyes or pigments; and also dissolution accelerators and optical brighteners. Aluminium silicates such as zeolites, and also compounds such as talc, kaolin, $TiO_2$, $SiO_2$ or magnesium trisilicate may also be used in small amounts.

The anionic dispersing agents used are, for example, the commercially available water-soluble anionic dispersing agents for dyes, pigments etc.

The following products, especially, come into consideration: condensation products of aromatic sulfonic acids and formaldehyde, condensation products of aromatic sulfonic acids with unsubstituted or chlorinated biphenyls or biphenyl oxides and optionally formaldehyde, (mono-/di-)alkylnaphthalenesulfonates, sodium salts of polymerized organic sulfonic acids, sodium salts of polymerized alkylnaphthalenesulfonic acids, sodium salts of polymerized alkylbenzenesulfonic acids, alkylarylsulfonates, sodium salts of alkyl polyglycol ether sulfates, polyalkylated polynuclear arylsulfonates, methylene-linked condensation products of arylsulfonic acids and hydroxyarylsulfonic acids, sodium salts of dialkylsulfosuccinic acids, sodium salts of alkyl diglycol ether sulfates, sodium salts of polynaphthalene-methanesulfonates, ligno- or oxyligno-sulfonates or heterocyclic polysulfonic acids. Especially suitable anionic dispersing agents are condensation products of naphthalene-sulfonic acids with formaldehyde, sodium salts of polymerized organic sulfonic acids, (mono-/di-)alkylnaphthalene-sulfonates, polyalkylated polynuclear arylsulfonates, sodium salts of polymerized alkylbenzenesulfonic acid, lignosulfonates, oxylignosulfonates and condensation products of naphthalenesulfonic acid with a polychloromethylbiphenyl.

Suitable non-ionic dispersants are especially compounds having a melting point of, preferably, at least 35° C. that are emulsifiable, dispersible or soluble, for example the following compounds:

1. fatty alcohols having from 8 to 22 carbon atoms, especially cetyl alcohol;
2. addition products of, preferably, from 2 to 80 mol of alkylene oxide, especially ethylene oxide, wherein some of the ethylene oxide units may have been replaced by substituted epoxides, such as styrene oxide and/or propylene oxide, with higher unsaturated or saturated monoalcohols, fatty acids, fatty amines or fatty amides having from 8 to 22 carbon atoms or with benzyl alcohols, phenyl phenols, benzyl phenols or alkyl phenols, the alkyl radicals of which have at least 4 carbon atoms;
3. alkylene oxide, especially propylene oxide, condensation products (block polymers);
4. ethylene oxide/propylene oxide adducts with diamines, especially ethylenediamine;
5. reaction products of a fatty acid having from 8 to 22 carbon atoms and a primary or secondary amine having at least one hydroxy-lower alkyl or lower alkoxy-lower alkyl group, or alkylene oxide addition products of such hydroxyalkyl-group-containing reaction products;
6. sorbitan esters, preferably with long-chain ester groups, or ethoxylated sorbitan esters, such as polyoxyethylene sorbitan monolaurate having from 4 to 10 ethylene oxide units or polyoxyethylene sorbitan trioleate having from 4 to 20 ethylene oxide units;
7. addition products of propylene oxide with a tri- to hexahydric aliphatic alcohol having from 3 to 6 carbon atoms, e.g. glycerol or pentaerythritol; and
8. fatty alcohol polyglycol mixed ethers, especially addition products of from 3 to 30 mol of ethylene oxide and from 3 to 30 mol of propylene oxide with aliphatic monoalcohols having from 8 to 22 carbon atoms.

Especially suitable non-ionic dispersants are surfactants of formula $$R_{22}\text{—O-(alkylene-O)}_n\text{—}R_{23} \quad (10),$$

wherein $R_{23}$ is $C_8$-$C_{22}$alkyl or $C_8$-$C_{18}$alkenyl, $R_{23}$ is hydrogen; $C_1$-$C_4$alkyl; a cycloaliphatic radical having at least 6 carbon atoms or benzyl, "alkylene" is an alkylene radical having from 2 to 4 carbon atoms and n is a number from 1 to 60.

The substituents $R_{22}$ and $R_{23}$ in formula (10) are advantageously each the hydrocarbon radical of an unsaturated or, preferably, saturated aliphatic monoalcohol having from 8 to 22 carbon atoms. The hydrocarbon radical may be straight-chain or branched. $R_{22}$ and $R_{23}$ are preferably each independently of the other an alkyl radical having from 9 to 14 carbon atoms.

Aliphatic saturated monoalcohols that come into consideration include natural alcohols, e.g. lauryl alcohol, myristyl alcohol, cetyl alcohol or stearyl alcohol, and also synthetic alcohols, e.g. 2-ethylhexanol, 1,1,3,3-tetramethylbutanol, octan-2-ol, isononyl alcohol, trimethyl-hexanol, trimethylnonyl alcohol, decanol, $C_9$-$C_{11}$oxo-alcohol, tridecyl alcohol, isotridecyl alcohol and linear primary alcohols (Alfols) having from 8 to 22 carbon atoms. Some examples of such Alfols are Alfol (8-10), Alfol (9-11), Alfol (10-14), Alfol (12-13) and Alfol (16-18). ("Alfol" is a registered trade mark).

Unsaturated aliphatic monoalcohols are, for example, dodecenyl alcohol, hexadecenyl alcohol and oleyl alcohol.

The alcohol radicals may be present singly or in the form of mixtures of two or more components, e.g. mixtures of alkyl and/or alkenyl groups that are derived from soybean fatty acids, palm kernel fatty acids or tallow oils.

(Alkylene-O) chains are preferably divalent radicals of the formulae $$\text{—(}CH_2\text{—}CH_2\text{—O)—},\quad \text{—(}CH(CH_3)\text{—}CH_2\text{—O)—}\quad \text{and}\quad \text{—(}CH_2\text{—}CH(CH_3)\text{—O)—}.$$

Examples of a cycloaliphatic radical are cycloheptyl, cyclooctyl and preferably cyclohexyl. As non-ionic dispersants there come into consideration preferably surfactants of formula $$R_{24}\text{—O—}(CH(Y_1)\text{—}CH(Y_2)\text{—O})_{n_2}\text{—}(CH(Y_3)\text{—}CH(Y_4)\text{—O})_{n_3}\text{—}R_{25} \quad (11)$$

wherein $R_{24}$ is $C_8$-$C_{22}$alkyl, $R_{25}$ is hydrogen or $C_1$-$C_4$alkyl, $Y_1$, $Y_2$, $Y_3$ and $Y_4$ are each independently of the others hydrogen; methyl or ethyl, $n_2$ is a number from 0 to 8, and $n_3$ is a number from 2 to 40.

Further important non-ionic dispersants correspond to formula $$R_{26}\text{—O—}(CH(Y_5)\text{—}CH(Y_6)\text{—O})_{n4}\text{—}(CH(Y_7)\text{—}CH(Y_8)\text{—O})_{n5}\text{—}R_{27}, \quad (12)$$

wherein $R_{26}$ is $C_9$-$C_{14}$alkyl, $R_{27}$ is $C_1$-$C_4$alkyl, $Y_5$, $Y_6$, $Y_7$ and $Y_8$ are each independently of the others hydrogen; methyl or ethyl, one of the radicals $Y_5$, $Y_6$ and one of the radicals $Y_7$, $Y_8$ always being hydrogen, and $n_4$ and $n_5$ are each independently of the other an integer from 4 to 8.

The non-ionic dispersants of formulae (10) to (12) can also be used in the form of mixtures. For example, as surfactant mixtures there come into consideration non-end-group-terminated fatty alcohol ethoxylates of formula (10), e.g. compounds of formula (10) wherein $R_{22}$ is $C_8$-$C_{22}$alkyl, $R_{23}$ is hydrogen and the alkylene-O chain is the radical —($CH_2$—$CH_2$—O)— and also end-group-terminated fatty alcohol ethoxylates of formula (12).

Examples of non-ionic dispersants of formulae (10), (11) and (12) include reaction products of a $C_{10}$-$C_{13}$fatty alcohol, e.g. a $C_{13}$oxo-alcohol, with from 3 to 10 mol of ethylene oxide, propylene oxide and/or butylene oxide or the reaction product of one mol of a $C_{13}$fatty alcohol with 6 mol of ethylene oxide and 1 mol of butylene oxide, it being possible for the addition products each to be end-group-terminated with $C_1$-$C_4$alkyl, preferably methyl or butyl. Such dispersants can be used singly or in the form of mixtures of two or more dispersants.

Instead of or in addition to the dispersing agent or agents, the granulates according to the invention may comprise a water-soluble organic polymer, which may also have dispersing properties. Such polymers may be used singly or as mixtures of two or more polymers. As water-soluble polymers (which may, but need not, have film-forming properties), there come into consideration, for example, gelatins, polyacrylates, polymethacrylates, copolymers of ethyl acrylate, methyl methacrylate and methacrylic acid (ammonium salt), polyvinylpyrrolidones, vinylpyrrolidones, vinyl acetates, copolymers of vinylpyrrolidone with long-chain olefins, poly (vinylpyrrolidone/dimethylaminoethyl methacrylates), copolymers of vinylpyrrolidone/dimethylaminopropyl methacrylamides, copolymers of vinylpyrrolidone/dimethylaminopropyl acrylamides, quaternised copolymers of vinylpyrrolidones and dimethylaminoethyl methacrylates, terpolymers of vinylcaprolactam/vinylpyrrolidone/dimethylaminoethyl methacrylates, copolymers of vinylpyrrolidone and methacrylamidopropyltrimethylammonium chloride, terpolymers of caprolactam/vinylpyrrolidone/dimethylaminoethyl methacrylates, copolymers of styrene and acrylic acid, polycarboxylic acids, polyacrylamides, carboxymethyl cellulose, hydroxymethyl cellulose, polyvinyl alcohols, hydrolyzed and non-hydrolyzed polyvinyl acetate, copolymers of maleic acid with unsaturated hydrocarbons and also mixed polymerization products of the mentioned polymers. Further suitable substances are polyethylene glycol (MW=2000-20 000), copolymers of ethylene oxide with propylene oxide (MW>3500), condensation products (block polymerization products) of alkylene oxide, especially propylene oxide, copolymers of vinylpyrrolidone with vinyl acetate, ethylene oxide-propylene oxide addition products with diamines, especially ethylenediamine, polystyrenesulfonic acid, polyethylenesulfonic acid, copolymers of acrylic acid with sulfonated styrenes, gum arabic, hydroxypropyl methylcellulose, sodium carboxymethyl cellulose, hydroxypropyl methylcellulose phthalate, maltodextrin, starch, sucrose, lactose, enzymatically modified and subsequently hydrated sugars, as are obtainable under the name “Isomalt”, cane sugar, polyaspartic acid and tragacanth.

Among those water-soluble organic polymers, special preference is given to carboxymethyl cellulose, polyacrylamides, polyvinyl alcohols, polyvinylpyrrolidones, gelatins, hydrolyzed polyvinyl acetates, copolymers of vinylpyrrolidone and vinyl acetate, maltodextrins, polyaspartic acid and also polyacrylates and polymethacrylates.

For use as inorganic salts there come into consideration carbonates, hydrogen carbonates, phosphates, polyphosphates, sulfates, silicates, sulfites, borates, halides and pyrophosphates, preferably in the form of alkali metal salts. Preference is given to water-soluble salts such as, for example, alkali metal chlorides, alkali phosphates, alkali carbonates, alkali polyphosphates and alkali sulfates and water-soluble salts used in washing agent and/or washing agent additive formulations.

There come into consideration as low-molecular-weight acids, for example, mono- or polycarboxylic acids. Of special interest are aliphatic carboxylic acids, especially those having a total number of from 1 to 12 carbon atoms. Preferred acids are aliphatic $C_1$-$C_{12}$-mono- or -poly-carboxylic acids, the monocarboxylic acids being especially those having at least 3 carbon atoms in total. As substituents of the carboxylic acids there come into consideration, for example, hydroxy and amino, especially hydroxy. Special preference is given to aliphatic $C_2$-$C_{12}$polycarboxylic acids, especially aliphatic $C_2$-$C_6$polycarboxylic acids. Very special preference is given to hydroxy-substituted aliphatic $C_2$-$C_6$polycarboxylic acids. These compounds may be used in the form of the free acid or a salt, especially an alkali salt.

There may also be used aminopolycarboxylates (e.g. sodium ethylenediaminetetraacetate), phytates, phosphonates, aminopolyphosphonates (e.g. sodium ethylenediaminetetraphosphonate), aminoalkylenepoly(alkylenephosphonates), polyphosphonates, polycarboxylates or water-soluble polysiloxanes.

As examples of low-molecular-weight organic acids and salts thereof there may be mentioned oxalic acid, tartaric acid, acetic acid, propionic acid, succinic acid, maleic acid, citric acid, formic acid, gluconic acid, p-toluenesulfonic acid, terephthalic acid, benzoic acid, phthalic acid, acrylic acid and polyacrylic acid.

The optical brighteners may be selected from a wide range of chemical types such as 4,4'-bis-(triazinylamino)-stilbene-2,2'-disulfonic acids, 4,4'-bis-(triazol-2-yl)stilbene-2,2'-disulfonic acids, 4,4'-(diphenyl)-stilbenes, 4,4'-distyryl-biphenyls, 4-phenyl-4'-benzoxazolyl-stilbenes, stilbenyl-naphthotriazoles, 4-styryl-stilbenes, bis-(benzoxazol-2-yl) derivatives, bis-(benzimidazol-2-yl) derivatives, coumarines, pyrazolines, naphthalimides, triazinyl-pyrenes, 2-styryl-benzoxazole- or -naphthoxazole derivatives, benzimidazole-benzofuran derivatives or oxanilide derivatives.

With particular reference to the use of a composition, which is an aqueous textile finishing composition, preferred 4,4'-bis-(triazinylamino)-stilbene-2,2'-disulfonic acids are those having the formula (13):

(13)

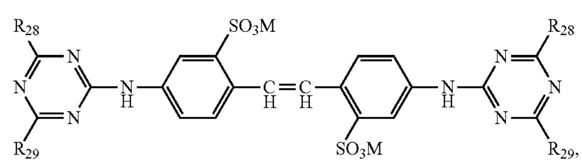

in which $R_{28}$ and $R_{29}$, independently of one another, are phenyl; mono- or disulfonated phenyl; phenylamino; mono- or disulfonated phenylamino; morpholino; —$N(CH_2CH_2OH)_2$; —$N(CH_3)(CH_2CH_2OH)$; —$NH_2$; —$N(C_1$-$C_4alkyl)_2$; —$OCH_3$; —Cl; —NH—$CH_2CH_2SO_3H$ or —NH—$CH_2CH_2OH$, and M is H; Na; K; Ca; Mg; ammonium; mono-, di-, tri- or tetra-$C_1$-$C_4$-alkylammonium; mono-, di- or tri-$C_1$-$C_4$hydroxyalkylammonium or ammonium that is di- or tri-substituted with by a mixture of $C_1$-$C_4$-alkyl and $C_1$-$C_4$-hydroxyalkyl groups.

Especially preferred compounds of formula (13) are those in which each $R_{28}$ is 2,5-disulfophenyl and each $R_{29}$ is morpholino; or each $R_{28}$ is 2,5-disulfophenyl and each $R_{29}$ is $N(C_2H_8)_2$; or each $R_{28}$ is 3-sulfophenyl and each $R_{29}$ is $NH(CH_2CH_2OH)$ or $N(CH_2CH_2OH)_2$; or each $R_{28}$ is 4-sulfophenyl and each $R_{29}$ is $N(CH_2CH_2OH)_2$; and, in each case, the sulfo group is $SO_3M$ in which M is sodium.

Preferred 4,4'-bis-(triazol-2-yl)stilbene-2,2'-disulfonic acids are those having the formula (14):

(14)

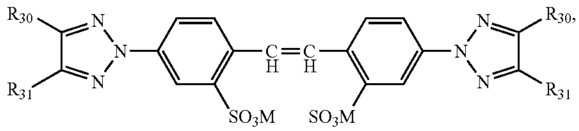

in which $R_{30}$ and $R_{31}$, independently of one another, are H; $C_1$-$C_4$-alkyl; phenyl or monosulfonated phenyl, and M is H; Na; K; Ca; Mg; ammonium; mono-, di-, tri- or tetra-$C_1$-$C_4$-alkylammonium; mono-, di- or tri-$C_1$-$C_4$-hydroxyalkylammonium or ammonium that is di- or tri-substituted with by a mixture of $C_1$-$C_4$-alkyl and $C_1$-$C_4$-hydroxyalkyl groups.

Especially preferred compounds of formula (14) are those in which $R_{30}$ is phenyl, $R_{31}$ is H and M is sodium.

One preferred 4,4'-(diphenyl)-stilbene is that having the formula (15):

(15)

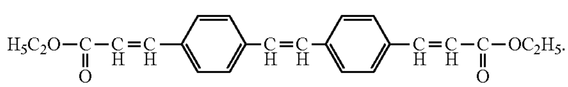

Preferably, 4,4'-distyryl-biphenyls used are those of formula (16):

(16)

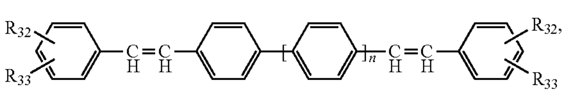

in which $R_{32}$ and $R_{33}$, independently of one another, are H; —$SO_3M$; —$SO_2N(C_1$-$C_4$-alkyl$)_2$; O—($C_1$-$C_4$-alkyl); CN; Cl; COO($C_1$-$C_4$-alkyl); CON($C_1$-$C_4$-alkyl$)_2$ or $O(CH_2)_3N^{(+)}(CH_3)_2An^{(-)}$ in which $An^{(-)}$ is an anion of an organic or inorganic acid, in particular a formate, acetate, propionate, glycolate, lactate, acrylate, methanephosphonate, phosphite, sulfonate, dimethyl or diethyl phosphite anion or a mixture thereof, n is 0 or 1 and M is H; Na; K; Ca; Mg; ammonium; mono-, di-, tri- or tetra-$C_1$-$C_4$-alkylammonium; mono-, di- or tri-$C_1$-$C_4$-hydroxyalkylammonium or ammonium that is di- or tri-substituted with by a mixture of $C_1$-$C_4$-alkyl and $C_1$-$C_4$-hydroxyalkyl groups.

Especially preferred compounds of formula (16) are those in which n is 1 and each $R_{32}$ is a 2-$SO_3M$ group in which M is sodium and each $R_{33}$ is —$O(CH_2)_3N^{(+)}(CH_3)_2An^{(-)}$ in which An is acetate.

Preferred 4-phenyl-4'-benzoxazolyl-stilbenes have the formula (17):

(17)

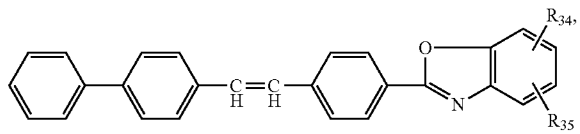

in which $R_{34}$ and $R_{35}$, independently of one another, are H; Cl; $C_1$-$C_4$-alkyl or —$SO_2$—$C_1$-$C_4$-alkyl.

An especially preferred compound of formula (17) is that in which $R_{34}$ is 4-$CH_3$ and $R_{35}$ is 2-$CH_3$.

Preferably, stilbenyl-naphthotriazoles used are those of formula (18):

(18)

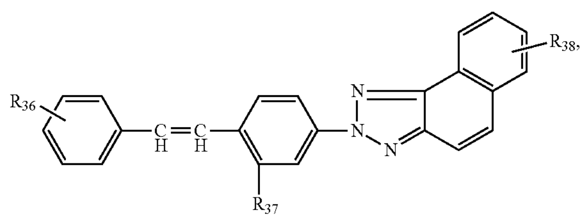

in which $R_{36}$ is H or Cl, $R_{37}$ is —$SO_3M$; —$SO_2N(C_1$-$C_4$-alkyl$)_2$; —$SO_2O$-phenyl or —CN, $R_{38}$ is H or —$SO_3M$, and M is H; Na; K; Ca; Mg; ammonium; mono-, di-, tri- or tetra-$C_1$-$C_4$-alkylammonium; mono-, di- or tri-$C_1$-$C_4$-hydroxyalkylammonium or ammonium that is di- or tri-substituted with by a mixture of $C_1$-$C_4$-alkyl and $C_1$-$C_4$-hydroxyalkyl groups.

Especially preferred compounds of formula (18) are those in which $R_{36}$ and $R_{37}$ are H and $R_{38}$ is 2-$SO_3M$ in which M is Na.

Preferably, 4-styryl-stilbenes used are those of formula:

(19)

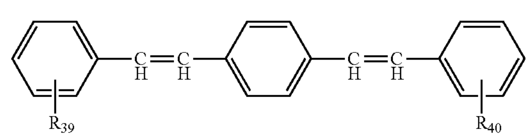

in which $R_{39}$ and $R_{40}$, independently of one another, are H; —$SO_3M$; —$SO_2N(C_1$-$C_4$-alkyl$)_2$; —O—($C_1$-$C_4$-alkyl); —CN; —Cl; —COO($C_1$-$C_4$-alkyl); —CON($C_1$-$C_4$-alkyl$)_2$ or —$O(CH_2)_3N^{(+)}(CH_3)_2An^{(-)}$ in which An is an anion of an organic or inorganic acid, in particular a formate, acetate, propionate, glycolate, lactate, acrylate, methanephosphonate, phosphite, sulfonate, dimethyl or diethyl phosphite anion or a mixture thereof.

Especially preferred compounds of formula (19) are those in which each of $R_{39}$ and $R_{40}$ is 2-cyano; 2-$SO_3M$ in which M is sodium or $O(CH_2)_3N^{(+)}(CH_3)_2An^{(-)}$ in which An is acetate.

Preferred bis-(benzoxazol-2-yl) derivatives are those of formula (20):

(20)

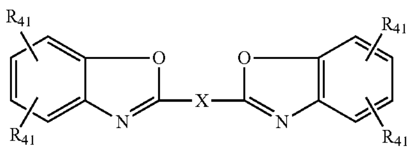

in which each $R_{41}$, independently of one another, is H; $C(CH_3)_3$; $C(CH_3)_2$-phenyl; $C_1$-$C_4$-alkyl or COO—$C_1$-$C_4$-alkyl, and X is —CH═CH— or a group of formula:

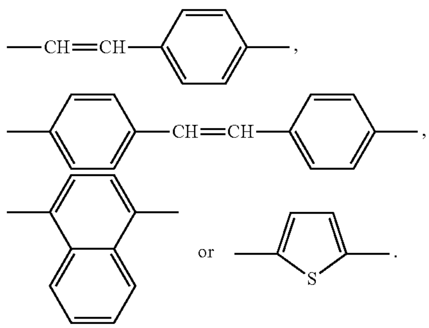

Especially preferred compounds of formula (20) are those in which each $R_{41}$ is H and X is

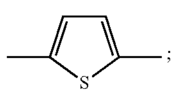

or one group $R_{41}$ in each ring is 2-methyl and the other $R_{41}$ is H and X is —CH═CH—; or one group $R_{41}$ in each ring is 2-$C(CH_3)_3$ and the other $R_{41}$ is H and X is

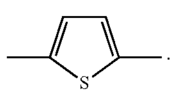

Preferred bis-(benzimidazol-2-yl) derivatives are those of formula (21):

(21)

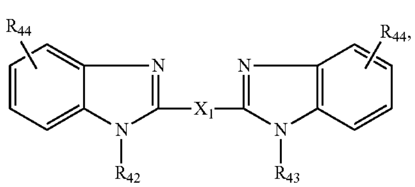

in which $R_{42}$ and $R_{43}$, independently of one another, are H; $C_1$-$C_4$-alkyl or $CH_2CH_2OH$;

$R_{44}$ is H or $SO_3M$;

$X_1$ is —CH═CH— or a group of formula:

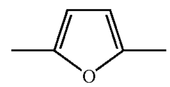

and

M is H; Na; K; Ca; Mg; ammonium; mono-, di-, tri- or tetra-$C_1C_4$alkylammonium; mono-, di- or tri-$C_1$-$C_4$-hydroxyalkylammonium or ammonium that is di- or tri-substituted with by a mixture of $C_1$-$C_4$-alkyl and $C_1$-$C_4$-hydroxyalkyl groups.

Especially preferred compounds of formula (21) are those in which $R_{42}$ and $R_{43}$ are each H, $R_{44}$ is $SO_3M$ in which M is sodium and $X_1$ is —CH═CH—.

Preferred coumarines are those of formula:

(22)

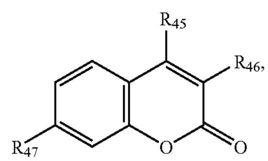

in which $R_{45}$ is H; —Cl or —$CH_2COOH$, $R_{46}$ is H; phenyl; —COO—$C_1$-$C_4$-alkyl or a group of formula:

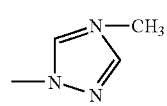

and $R_{47}$ is —O—$C_1$-$C_4$-alkyl; —N($C_1$-$C_4$-alkyl$)_2$; —NH—CO—$C_1$-$C_4$-alkyl or a group of formula:

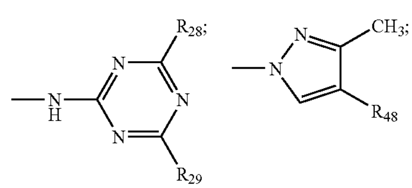

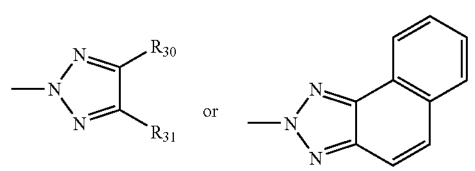

in which $R_{28}$, $R_{29}$, $R_{30}$ and $R_{31}$ have their previous significance and $R_{48}$ is H; $C_1$-$C_4$-alkyl or phenyl.

Especially preferred compounds of formula (22) are those having the formula (23) and (24):

(23)

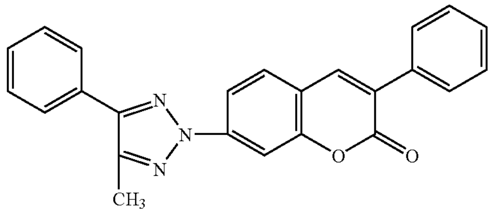

or (24)

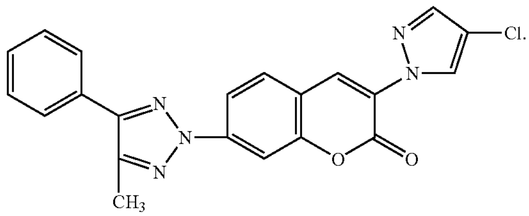

Preferably, pyrazolines used are those having the formula (25):

(25)

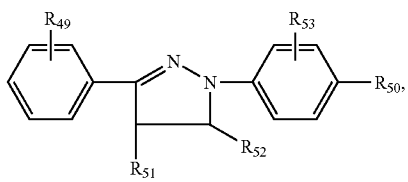

in which $R_{49}$ is H; —Cl or —N($C_1$-$C_4$-alkyl)$_2$, $R_{50}$ is H; —Cl; —$SO_3M$; —$SO_2NH_2$; —$SO_2NH$—($C_1$-$C_4$-alkyl); —COO—$C_1$-$C_4$-alkyl; —$SO_2$—$C_1$-$C_4$-alkyl; —$SO_2NHCH_2CH_2CH_2N^{(+)}(CH_3)_3$ or $SO_2CH_2CH_2N^{(+)}H$ ($C_1$-$C_4$-alkyl)$_2An^{(-)}$, $R_{51}$ and $R_{52}$ are the same or different and each is H; $C_1$-$C_4$-alkyl or phenyl, $R_{53}$ is H or —Cl, $An^{(-)}$ is an anion of an organic or inorganic acid, in particular a formate, acetate, propionate, glycolate, lactate, acrylate, methanephosphonate, phosphite, sulfonate, dimethyl or diethyl phosphite anion or a mixture thereof and M is H; Na; K; Ca; Mg; ammonium; mono-, di-, tri- or tetra-$C_1$-$C_4$-alkylammonium; mono-, di- or tri-$C_1$-$C_4$-hydroxyalkylammonium or ammonium that is di- or tri-substituted with by a mixture of $C_1$-$C_4$-alkyl and $C_1$-$C_4$-hydroxyalkyl groups.

Especially preferred compounds of formula (25) are those in which $R_{49}$ is —Cl; $R_{50}$ is —$SO_2CH_2CH_2N^{(+)}H$($C_1$-$C_4$-alkyl)$_2An^{(-)}$ in which An is phosphite and $R_{51}$, $R_{52}$ and $R_{53}$ are each H; or those having the formula (26) and (27):

(26)

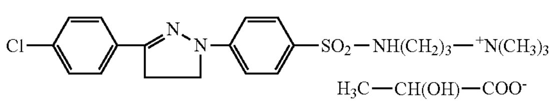

or

-continued (27)

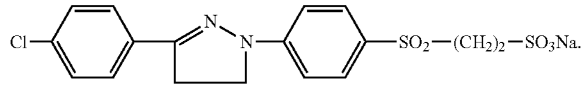

Preferred naphthalimides are those of formula (28):

(28)

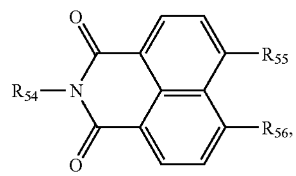

in which $R_{54}$ is $C_1$-$C_4$-alkyl or —$CH_2CH_2CH_2N^{(+)}(CH_3)_3$, $R_{55}$ and $R_{56}$, independently of one another, are —O—$C_1$-$C_4$-alkyl; —$SO_3M$ or —NH—CO—$C_1$-$C_4$-alkyl, and M is H; Na; K; Ca; Mg; ammonium; mono-, di-, tri- or tetra-$C_1$-$C_4$-alkylammonium; mono-, di- or tri-$C_1$-$C_4$-hydroxyalkylammonium or ammonium that is di- or tri-substituted with by a mixture of $C_1$-$C_4$-alkyl and $C_1$-$C_4$-hydroxyalkyl groups.

Especially preferred compounds of formula (28) are those having the formula (29) and (30):

(29)

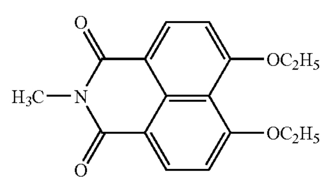

or (30)

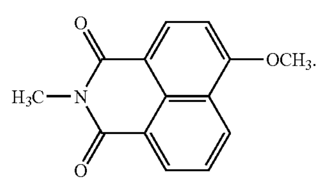

Preferred triazinyl-pyrenes used are those of formula (31):

(31)

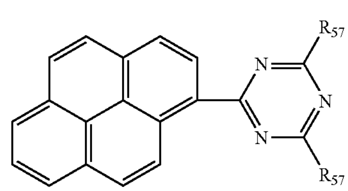

in which each $R_{57}$, independently of one another, is $C_1$-$C_4$-alkoxy.

Especially preferred compounds of formula (31) are those in which each $R_{57}$ is methoxy.-

Preferred 2-styryl-benzoxazole- or -naphthoxazole derivatives are those having the formula (32):

(32)

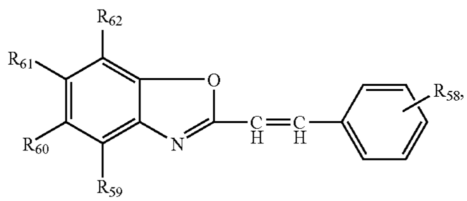

in which $R_{58}$ is —CN; —Cl; —COO—$C_1$-$C_4$-alkyl or phenyl, $R_{59}$ and $R_{60}$ are the atoms required to form a fused benzene ring or $R_{60}$ and $R_{62}$, independently of one another, are H or $C_1$-$C_4$-alkyl, and $R_{61}$ is H; $C_1$-$C_4$-alkyl or phenyl.

Especially preferred compounds of formula (32) are those in which $R_{58}$ is a 4-phenyl group and each of $R_{59}$ to $R_{61}$ is H.

Preferred benzimidazole-benzofuran derivatives are those having the formula (33):

(33)

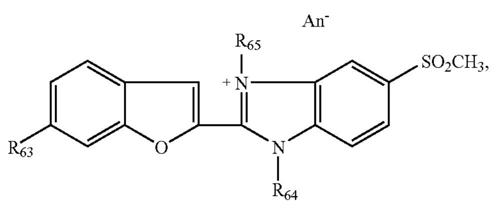

in which $R_{63}$ is $C_1$-$C_4$-alkoxy, $R_{64}$ and $R_{65}$, independently of one another, are $C_1$-$C_4$-alkyl, and $An^{(-)}$ is an anion of an organic or inorganic acid, in particular a formate, acetate, propionate, glycolate, lactate, acrylate, methanephosphonate, phosphite, sulfonate, dimethyl or diethyl phosphite anion or a mixture thereof.

A particularly preferred compound of formula (33) is that in which $R_{63}$ is methoxy, $R_{64}$ and $R_{65}$ are each methyl and $An^{(-)}$ is methane sulfonate.

Preferred oxanilide derivatives include those having the formula (34):

(34)

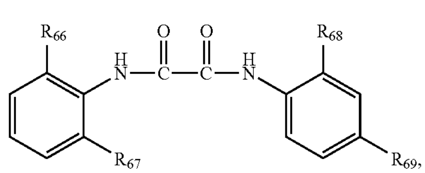

in which $R_{66}$ is $C_1$-$C_4$alkoxy, $R_{68}$ is $C_1$-$C_4$alkyl; $C_1$-$C_4$alkyl-$SO_3M$ or $C_1$-$C_4$alkoxy-$SO_3M$ in which M is H; Na; K; Ca; Mg; ammonium; mono-, di-, tri- or tetra-$C_1$-$C_4$-alkylammonium; mono-, di- or tri-$C_1$-$C_4$-hydroxyalkylammonium or ammonium that is di- or tri-substituted with by a mixture of $C_1$-$C_4$-alkyl and $C_1$-$C_4$-hydroxyalkyl groups and $R_{67}$ and $R_{69}$ are the same and each is hydrogen; tert.-butyl or $SO_3M$ in which M has its previous significance.

Preferred FWA are those having one of the formulae:

(35)

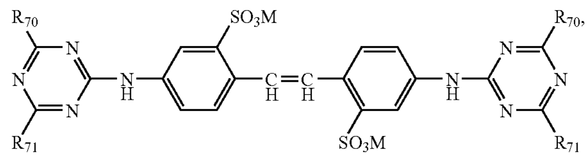

(36)

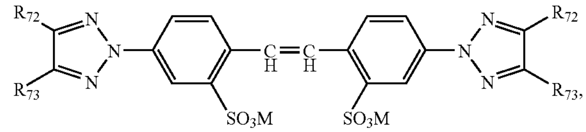

(37)

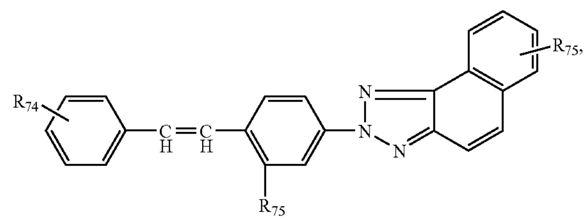

(38)

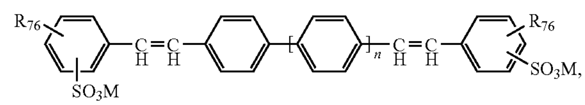

(39)

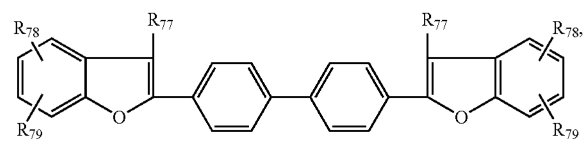

(40)

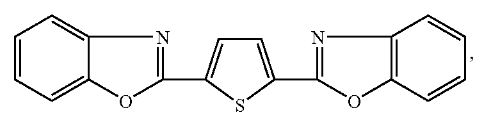

(41)

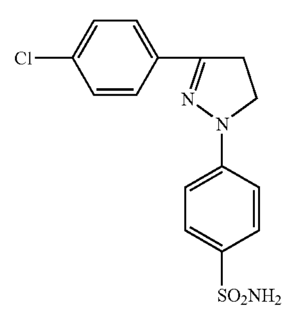

and (42)

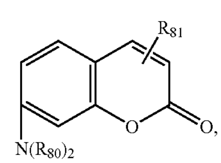

in which $R_{70}$ and $R_{71}$, independently of one another, are —OH; —$NH_2$; —O—$C_1$-$C_4$-alkyl; —O-aryl; —NH—$C_1$-$C_4$-alkyl; —N($C_1$-$C_4$-alkyl)$_2$; —N($C_1$-$C_4$-alkyl)($C_1$-$C_4$-hydroxyalkyl); —N($C_1$-$C_4$-hydroxyalkyl)$_2$; —NH-aryl; morpholino; —S—$C_1$-$C_4$-alkyl(aryl) or Cl, $R_{72}$ and $R_{73}$, independently of one another, are H; $C_1$-$C_4$-alkyl; phenyl or a group of formula:

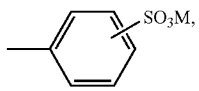

$R_{74}$ is H; —Cl or —$SO_3M$, $R_{75}$ is —CN; —$SO_3M$; —S($C_1$-$C_4$-alkyl)$_2$ or —S(aryl)$_2$, $R_{76}$ is H; —$SO_3M$; —O—$C_1$-$C_4$-alkyl; —CN; —Cl; —COO—$C_1$-$C_4$-alkyl; or —CON($C_1$-$C_4$-alkyl)$_2$, $R_{77}$ is H; $C_1$-$C_4$-alkyl; —Cl or —$SO_3M$, $R_{78}$ and $R_{79}$, independently of one another, are H; $C_1$-$C_4$-alkyl; —$SO_3M$; —or —O—$C_1$-$C_4$-alkyl;

$R_{80}$ is H or $C_1$-$C_4$-alkyl, $R_{81}$ is H; $C_1$-$C_4$-alkyl; —CN; —Cl; —COO—$C_1$-$C_4$-alkyl; —CON($C_1$-$C_4$-alkyl)$_2$; aryl or —O-aryl; and M is H; Na; K; Ca; Mg; ammonium; mono-, di-, tri- or tetra-$C_1$-$C_4$-alkylammonium; mono-, di- or tri-$C_1$-$C_4$-hydroxyalkylammonium or ammonium that is di- or tri-substituted with by a mixture of $C_1$-$C_4$-alkyl and $C_1$-$C_4$-hydroxyalkyl groups and n is 0 or 1.

In the compounds of formulae (35) to (42), $C_1$-$C_4$-alkyl groups are, e.g., methyl, ethyl, n-propyl, isopropyl and n-butyl, especially methyl. Aryl groups are naphthyl or, especially, phenyl.

Specific examples of preferred compounds of formula (35) are those having the formulae:

(43)

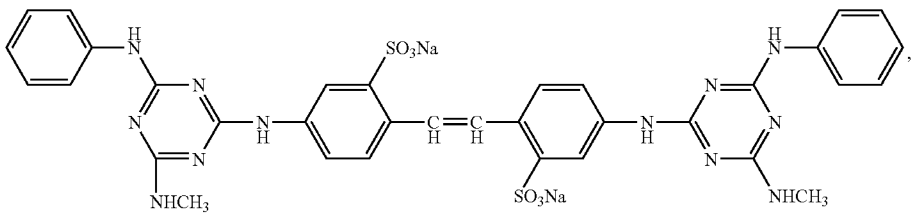

(44)

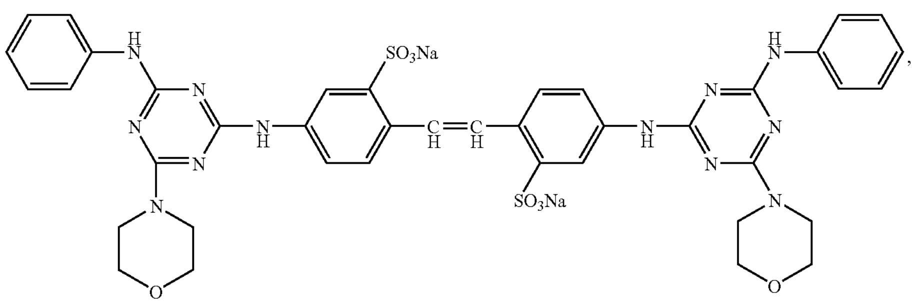

(45)

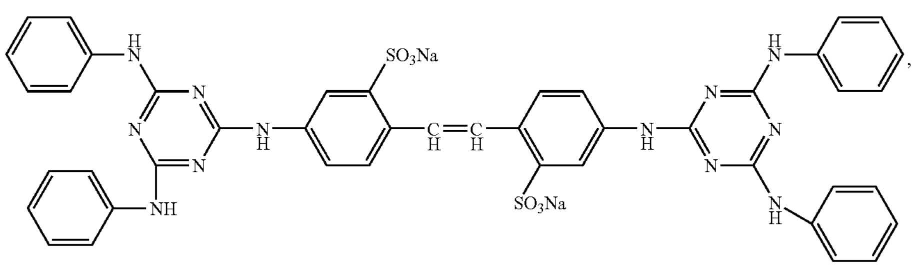

(46)

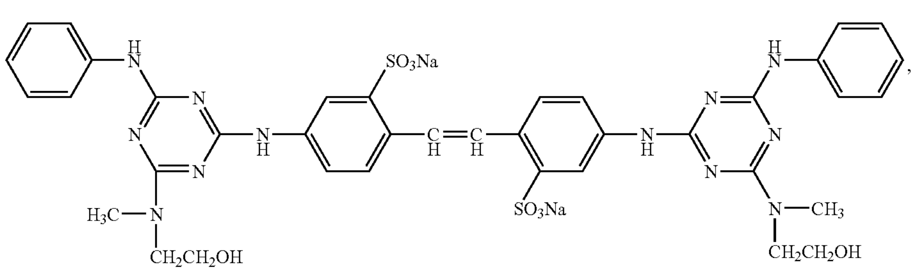

-continued
(47)
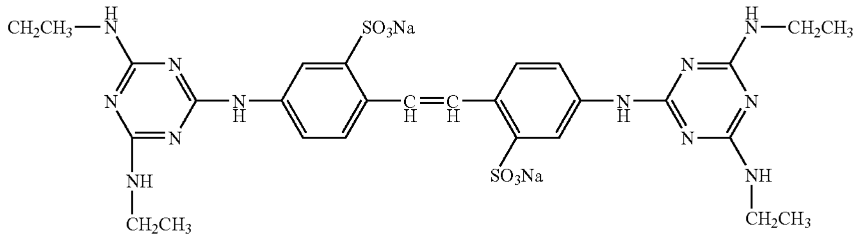
and
(48)
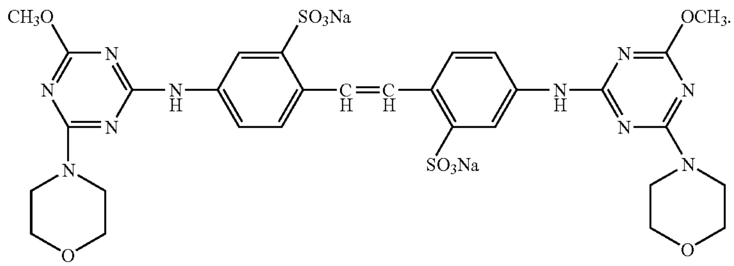
Specific preferred examples of compounds of formula (36) are those of formulae:
(49)
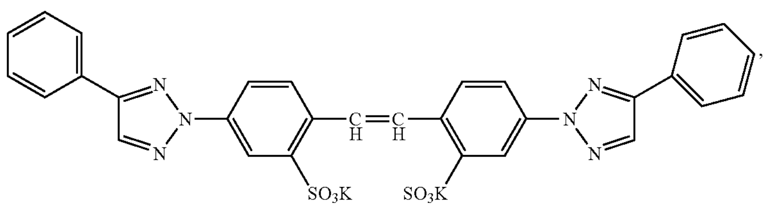
(50)
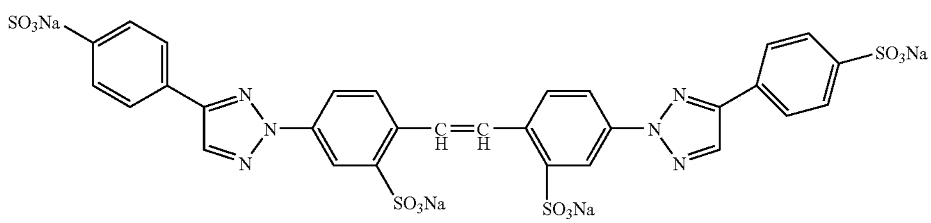
and
(51)
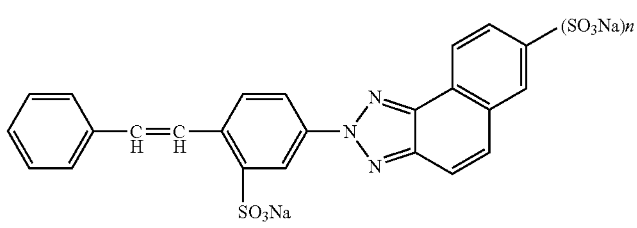
in which n has its previous significance.
Preferred examples of compounds of formula (38) are those having the formulae:
(52)
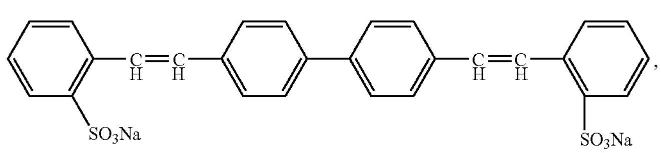

-continued (53)

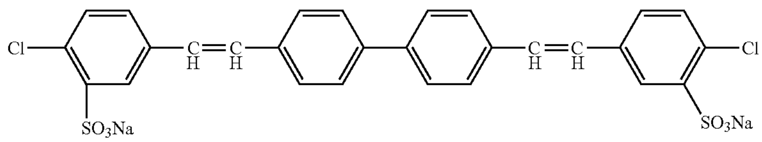

and (54)

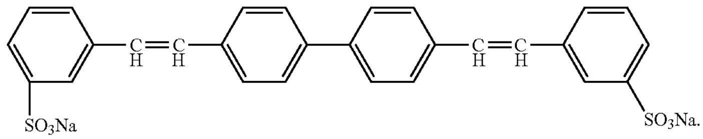

Preferred examples of compounds of formula (39) are those of formulae:

(55)

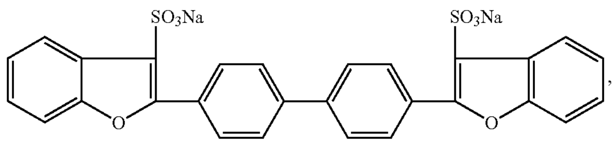

(56)

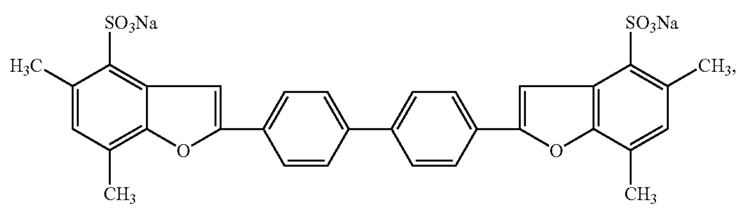

(57)

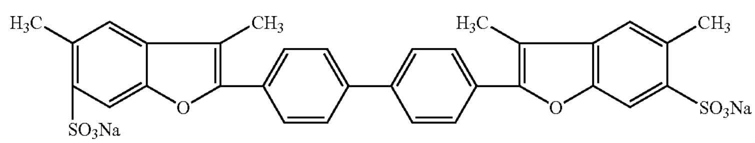

and (58)

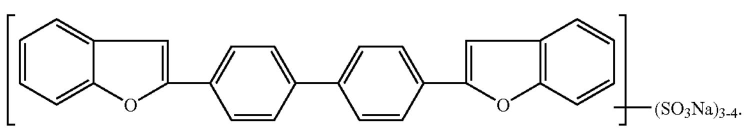

A preferred example of a compound of formula (42) is that having the formula (59):

(59)

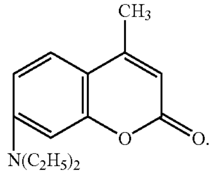

The compounds of formulae (25) to (59) are known and may be obtained by known methods.

Further preferred FWA's are those of the class of cationic bistyrylphenyl fluorescent whitening agent having the formula (60):

(60)

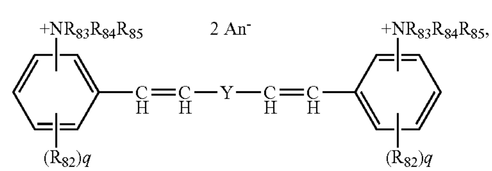

in which

Y is arylene, preferably 1,4-phenylene or 4,4'-diphenylene, each optionally substituted by chloro, methyl or methoxy, each q is independently from each other 1 or 2, each $R_{82}$ is independently from each other hydrogen; chloro; $C_1$-$C_4$-alkyl; $C_1$-$C_4$-alkoxy; cyano or $C_1$-$C_4$-alkoxycarbonyl, $R_{83}$ and $R_{84}$ are independently from each other $C_1$-$C_4$-alkyl; chloroethyl; methoxyethyl; β-ethoxyethyl; β-acetoxyethyl or β-cyanoethyl; benzyl or phenylethyl, each $R_{85}$ is independently from each other $C_1$-$C_4$-alkyl; $C_2$-$C_3$-hydroxyalkyl; β-hydroxy-γ-chloropropyl; β-cyanoethyl or $C_1$-$C_4$-alkoxy-carbonylethyl, and $An^{(-)}$ has its previous significance and is preferably the chloride; bromide; iodide; methosulfate; ethosulfate; benzenesulfonate or p-toluenesulfonate anion when $R_{85}$ is $C_1$-$C_4$-alkyl or $An^{(-)}$ is preferably the formate; acetate; propionate or benzoate anion when $R_{85}$ is β-hydroxy-γ-chloropropyl; β-cyanoethyl or $C_1$-$C_4$-alkoxy-carbonylethyl.

Preferred compounds of formula (60) are those in which Y is 1,4-phenylene or 4,4'-diphenylene; $R_{82}$ is hydrogen; methyl or cyano; $R_{83}$ and $R_{84}$ are each methyl or cyano; and $R_{83}$ and $An^{(-)}$ have their previously indicated preferred meanings.

One particularly preferred compound of formula (60) is that having the formula (61):

(61)

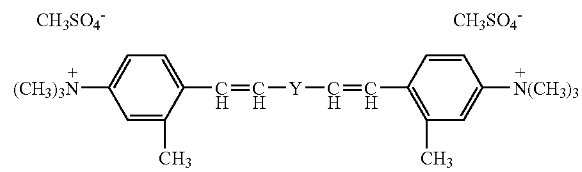

The compounds of formula (60) and their production are described in U.S. Pat. No. 4,009,193.

A further preferred class of cationic bistyrylphenyl fluorescent whitening agent is that having the formula (62):

(62)

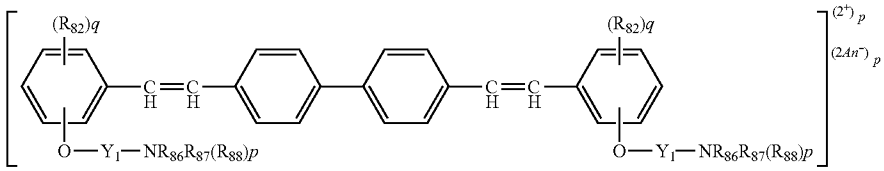

in which each q is independently from each other 1 or 2, each $R_{82}$ is independently from each other hydrogen; chloro; $C_1$-$C_4$-alkyl; $C_1$-$C_4$-alkoxy; cyano or $C_1$-$C_4$-alkoxycarbonyl, $Y_1$ is $C_2$-$C_4$-alkylene or hydroxypropylene, each $R_{86}$ is independently from each other $C_1$-$C_4$-alkyl or, together with $R_{87}$ and the nitrogen to which they are each attached, $R_{86}$ forms a pyrrolidine; piperidine; hexamethyleneimine or morpholine ring, each $R_{87}$ is independently from each other $C_1$-$C_4$-alkyl or, together with $R_{86}$ and the nitrogen to which they are each attached, $R_{87}$ forms a pyrrolidine, piperidine, hexamethyleneimine or morpholine ring, each $R_{88}$ is independently from each other hydrogen; $C_1$-$C_4$-alkyl; $C_3$-$C_4$-alkenyl; $C_1$-$C_4$-alkoxycarbonylmethyl; benzyl; $C_2$-$C_4$-hydroxyalkyl; $C_2$-$C_4$-cyanoalkyl or, together with $R_{86}$ and $R_{87}$ and the nitrogen atom to which they are each attached, $R_{88}$ forms a pyrrolidine, piperidine, hexamethyleneimine or morpholine ring, $An^{(-)}$ is an anion of an organic or inorganic acid, in particular a formate, acetate, propionate, glycolate, lactate, acrylate, methanephosphonate, phosphite, sulfonate, dimethyl or diethyl phosphite anion, or a mixture thereof, and each p is independently from each other 0 or 1.

Preferred compounds of formula (62) are those in which q is 1; $R_{82}$ is hydrogen, chlorine, $C_1$-$C_4$-alkyl or $C_1$-$C_4$-alkoxy; $Y_1$ is $(CH_2)_2$; $R_{86}$ and $R_{87}$ are the same and each is methyl or ethyl; $R_{88}$ is methyl or ethyl; p is 1; and $An^{(-)}$ is $CH_3OSO_3$ or $C_2H_5OSO_3$.

The compounds of formula (62) and their production are described in U.S. Pat. No. 4,339,393.

A further preferred class of cationic bistyrylphenyl fluorescent whitening agent is that having the formula (63):

(63)

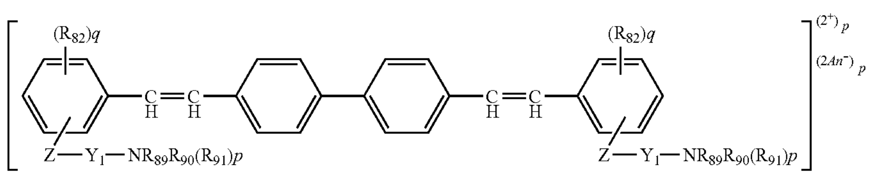

in which $R_{82}$, $Y_1$, $An^{(-)}$, p and q have their previous significance, $R_{89}$ and $R_{90}$, independently of one another, are $C_1$-$C_4$-alkyl or $C_2$-$C_3$-alkenyl or $R_{89}$ and $R_{90}$, together with the nitrogen atom to which they are attached, form a pyrrolidine; piperidine; hexamethyleneimine or morpholine ring, each $R_{91}$ is independently from each other hydrogen; $C_1$-$C_4$-alkyl or $C_2$-$C_3$-alkenyl or $R_{89}$, $R_{90}$ and $R_{91}$, together with the nitrogen atom to which they are attached, form a pyridine or picoline ring, and Z is sulfur; —$SO_2$—; —$SO_2$NH—; —O—$C_1$-$C_4$-alkylene-COO— or —OCO—.

Preferred compounds of formula (63) are those in which $R_{82}$ is hydrogen; chloro; $C_1$-$C_4$-alkyl or $C_1$-$C_4$-alkm; $R_{89}$ and $R_{90}$, independently of one another, are $C_1$-$C_4$-alkyl or, together with the nitrogen atom to which they are attached, form a pyrrolidine, piperidine or morpholine ring; $R_{91}$ is hydrogen; $C_1$-$C_4$-alkyl or $C_3$-$C_4$-alkenyl or $R_{89}$, $R_{90}$ and $R_{91}$, together with the nitrogen atom to which they are attached, form a pyridine ring; and Z is sulfur; —$SO_2$— or —$SO_2$NH—.

The compounds of formula (63) and their production are described in U.S. Pat. No. 4,486,352.

A further preferred class of cationic bistyrylphenyl fluorescent whitening agent is that having the formula (64):

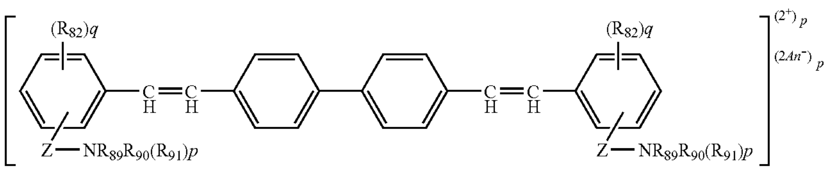

(64)

in which $R_{82}$, $R_{89}$, $R_{90}$, $R_{91}$, $Y_1$, An(−), p and q have their previous significance.

Preferred compounds of formula (64) are those in which q is 1; $R_{82}$ is hydrogen; chloro; $C_1$-$C_4$-alkyl or $C_1$-$C_4$-alkoxy; $R_{89}$ and $R_{90}$, independently of one another, are $C_1$-$C_4$-alkyl or $R_{89}$ and $R_{90}$ together with the nitrogen atom to which they are attached, form a pyrrolidine; piperidine or morpholine ring; $R_{91}$ is hydrogen; $C_1$-$C_4$-alkyl or $C_3$-$C_4$-alkenyl or $R_{89}$, $R_{90}$ and $R_{91}$, together with the nitrogen atom to which they are attached, form a pyridine ring.

The compounds of formula (64) and their production are described in U.S. Pat. No. 4,602,087.

One preferred class of amphoteric styrene fluorescent whitening agent is that having the formula (65):

(65)

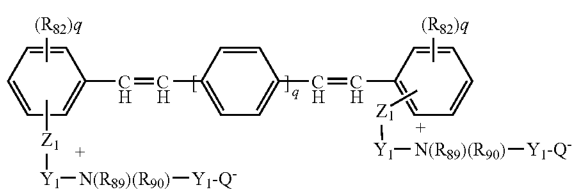

in which $R_{82}$, $R_{89}$, $R_{90}$, $Y_1$ and q have their previous significance and $Z_1$ is oxygen; sulfur; a direct bond; —COO—; —CON($R_{92}$)— or —$SO_2$N($R_{92}$)— in which $R_{92}$ is hydrogen; $C_1$-$C_4$-alkyl or cyanoethyl; and Q is —COO— or —$SO_3$.

Preferred compounds of formula (65) are those in which $Z_1$ is oxygen; a direct bond; —CONH—; —$SO_2$NH— or —COO—; especially oxygen; q is 1; $R_{82}$ is hydrogen; $C_1$-$C_4$-alkyl; methoxy or chlorine; and $R_{89}$, $R_{90}$, $Y_1$ and Q have their previous significance.

The compounds of formula (65) and their production are described in U.S. Pat. No. 4,478,598.

One preferred class of amine oxide fluorescent whitening agent is that having the formula:

(66)

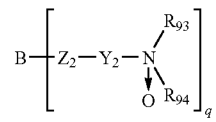

in which q has its previous significance,

B is a brightener radical selected from a 4,4'-distyrylbiphenyl; 4,4'-divinyl-stilbene, and a 1,4'-distyrylbenzene, each optionally substituted by one to four substituents selected from halogen, $C_1$-$C_4$-alkyl, $C_1$-$C_4$-hydroxyalkyl, $C_1$-$C_4$-halogenoalkyl, $C_1$-$C_4$-cyanoalkyl, $C_1$-$C_4$-alkoxy-$C_1$-$C_4$-alkyl, phenyl-$C_1$-$C_4$-alkyl, carboxy-$C_1$-$C_4$-alkyl, carb-$C_1$-$C_4$-alkoxy-$C_1$-$C_4$-alkyl, $C_1$-$C_4$-alkenyl, $C_5$-$C_8$-cycloalkyl, $C_1$-$C_4$-alkoxy, $C_1$-$C_4$-alkenoxy, $C_1$-$C_4$-alkoxycarbonyl, carbamoyl, cyano, $C_1$-$C_4$-alkyl-sulfonyl, phenylsulfonyl, $C_1$-$C_4$-alkoxysulfonyl, sulfamoyl, hydroxyl, carboxyl, sulfo and trifluoromethyl;

$Z_2$ is a direct bond between B and $Y_2$; an oxygen atom; a sulfur atom; —$SO_2$—; —$SO_2$—O—; —COO—; —CON($R_{95}$)— or —$SO_2$N($R_{95}$)— in which $R_{95}$ is hydrogen or $C_1$-$C_4$-alkyl optionally substituted by halogen, cyano, hydroxyl, $C_2$-$C_5$-carbalkoxy, $C_1$-$C_4$-alkoxy, phenyl, chlorophenyl, methylphenyl, methoxyphenyl, carbamoyl or sulfamoyl, $Y_2$ is $C_2$-$C_4$-alkylene or $C_2$-$C_4$-alkyleneoxy-$C_2$-$C_4$-alkylene, each optionally substituted by halogen, hydroxyl, $C_2$-$C_5$-carbalkoxy, $C_1$-$C_4$-alkoxy, phenyl, chlorophenyl, methylphenyl, methoxyphenyl, carbamoyl or sulfamoyl, and $R_{93}$ and $R_{94}$, independently of one another, are $C_5$-$C_8$-cycloalkyl; $C_1$-$C_4$-alkyl or phenyl, each optionally substituted by halogen, hydroxyl, $C_2$-$C_5$-carbalkoxy, $C_1$-$C_4$-alkoxy, phenyl, chlorophenyl, methylphenyl, methoxyphenyl, carbamoyl or sulfamoyl; in which, in all the carbamoyl or sulfamoyl groups, the nitrogen atom is optionally substituted by one or two $C_1$-$C_4$-alkyl, $C_1$-$C_4$-hydroxyalkyl, $C_2$-$C_5$-cyanoalkyl, $C_1$-$C_4$-halogenoalkyl, benzyl or phenyl groups.

Preferred brightener radicals B are those having the formula:

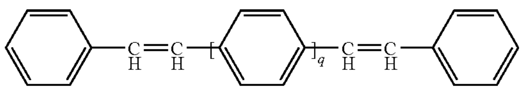

in which q has its previous significance and the rings are optionally substituted as indicated above.

Preferably $Z_2$ is oxygen; —$SO_2$— or —$SO_2N(R_{96})$— in which $R_{96}$ is hydrogen or $C_1$-$C_4$-alkyl optionally substituted by hydroxyl, halogen or cyano; and $R_{93}$ and $R_{94}$, independently of one another, are $C_1$-$C_4$-alkyl optionally substituted by halogen, cyano, hydroxyl, $C_1$-$C_4$-alkoxy, phenyl, chlorophenyl, methylphenyl, methoxyphenyl or $C_2$-$C_5$-alkoxycarbonyl. Other preferred compounds of formula (64) are those in which $Z_2$ is oxygen; sulfur; —$SO_2$—; —$CON(R_{96})$— or —$SO_2N(R_{96})$— in which $R_{96}$ is hydrogen or $C_1$-$C_4$-alkyl optionally substituted by hydroxyl, halogen or cyano; and $Y_2$ is $C_1$-$C_4$-alkylene.

The compounds of formula (66) and their production are described in U.S. Pat. No. 4,539,161.

One preferred class of cationic phosphinic acid salt fluorescent whitening agent is that having the formula (67):

(67)

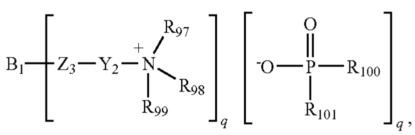

in which q and $Y_2$ have their previous significance, $B_1$ is brightener radical, $Z_3$ is a direct bond; —$SO_2$—$C_2$-$C_4$-alkyleneoxy; —$SO_2$—$C_2$-$C_4$-alkylene-COO—; —$SO_2$—; —COO—; —$SO_2$—$C_2$-$C_4$-alkylene-$CON(R_{102})$— or —$SO_2N(R_{102})$—, in which $R_{102}$ is hydrogen or $C_1$-$C_4$-alkyl optionally substituted by hydroxyl, halogen or cyano;

$R_{97}$ is $C_1$-$C_4$-alkyl or $C_2$-$C_4$-alkenyl, each optionally substituted by halogen, cyano, hydroxy, $C_1$-$C_4$-alkoxycarbonyl or $C_1$-$C_4$-alkylcarbonyloxy, or $R_{97}$ is benzyl, optionally substituted by halogen, $C_1$-$C_4$-alkyl or $C_1$-$C_4$-alkoxy, or $R_{97}$, together with $R_{98}$ or $Z_3$, forms a pyrrolidine piperidine or morpholine radical, $R_{95}$ is $C_1$-$C_4$-alkyl or $C_2$-$C_4$-alkenyl, each optionally substituted by halogen, cyano, hydroxy, $C_1$-$C_4$-alkoxycarbonyl or $C_1$-$C_4$-alkylcarbonyloxy, or $R_{98}$ is benzyl, optionally substituted by halogen, $C_1$-$C_4$-alkyl or $C_1$-$C_4$-alkoxy, or $R_N$, together with $R_{97}$, forms a pyrrolidine, piperidine or morpholine radical, $R_{99}$ is $C_1$-$C_4$-alkyl, $R_{100}$ is hydrogen or $C_1$-$C_4$-alkyl, optionally substituted by cyano, hydroxy, $C_1$-$C_4$-alkoxycarbonyl or $C_1$-$C_4$-alkylcarbonyloxy, and $R_{101}$ is $C_1$-$C_4$-alkyl.

Preferably, brightener radical $B_1$ has the formula:

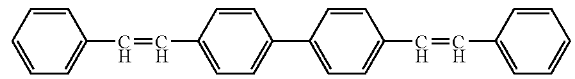 [SMILES: C(=Cc1ccc(-c2ccc(C=Cc3ccccc3)cc2)cc1)c1ccccc1]

or the formula:

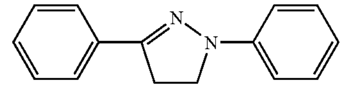

each optionally substituted by one to four substituents selected from halogen, $C_1$-$C_4$-alkyl, $C_1$-$C_4$-hydroxyalkyl, $C_1$-$C_4$-halogenoalkyl, $C_1$-$C_4$-cyanoalkyl, $C_1$-$C_4$-alkoxy-$C_1$-$C_4$-alkyl, phenyl-$C_1$-$C_4$-alkyl, carboxy-$C_1$-$C_4$-alkyl, carb-$C_1$-$C_4$-alkoxy-$C_1$-$C_4$-alkyl, $C_1$-$C_4$-alkenyl, $C_5$-$C_8$-cycloalkyl, $C_1$-$C_4$-alkoxy, $C_1$-$C_4$-alkenoxy, $C_1$-$C_4$-alkoxycarbonyl, carbamoyl, cyano, $C_1$-$C_4$-alkyl-sulfonyl, phenylsulfonyl, $C_1$-$C_4$-alkoxysulfonyl, sulfamoyl, hydroxyl, carboxyl, sulfo and trifluoromethyl.

The compounds of formula (67) and their production are described in GB-A-2 023 605.

Preferred bis(triazinyl)diaminostilbene anionic fluorescent whitening agents for use in the present invention are those having the formula (68):

(68)

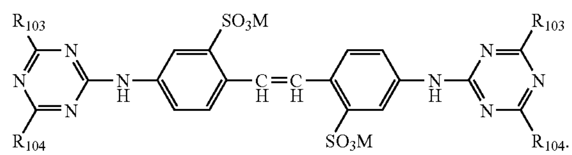

Preferred dibenzofuranylbiphenyl anionic fluorescent whitening agents for use in the present invention are those having the formula (69):

(69)

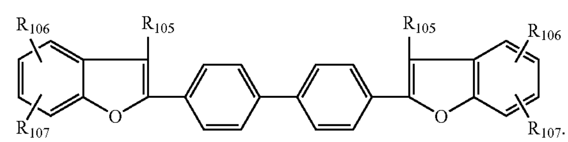

Preferred anionic bistyryiphenyl fluorescent whitening agents for use in the present invention are those having the formula (70):

(70)

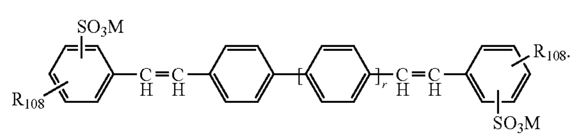

In the formulae (68) to (70), $R_{103}$ is phenyl, optionally substituted by one or two —$SO_3M$ groups, $R_{104}$ is —NH—$C_1$-$C_4$-alkyl; —N($C_1$-$C_4$-alkyl)$_2$; —NH—$C_1$-$C_4$-alkoxy; —N($C_1$-$C_4$-alkoxy)$_2$; —N($C_1$-$C_4$-alkyl)($C_1$-$C_4$-hydroxyalkyl) or —N($C_1$-$C_4$-hydroxyalkyl)$_2$, $R_{105}$ is H; —$C_1$-$C_4$-alkyl; —CN; —Cl or —$SO_3M$; $R_{106}$ and $R_{107}$, independently of one another, are H; $C_1$-$C_4$-alkyl; —$SO_3M$; —CN; —Cl or —O—$C_1$-$C_4$-alkyl, provided that at least two of $R_{105}$, $R_{106}$ and $R_{107}$ are —$SO_3M$ and the third group has solubilising character, $R_{108}$ is H; —$SO_3M$; —O—$C_1$-$C_4$-alkyl; —CN; —Cl; —COO—$C_1$-$C_4$-alkyl or —CON($C_1$-$C_4$-alkyl)$_2$, M is H; Na; K; Ca; Mg; ammonium; mono-, di-, tri-or tetra-$C_1$-$C_4$-alkylammonium; mono-, di- or tri-$C_1$-$C_4$-hydroxy-alkylammonium or ammonium that is di- or tri-substituted with by a mixture of $C_1$-$C_4$-alkyl and $C_1$-$C_4$-hydroxyalkyl groups and r is 0 or 1.

The compounds of formulae (68) to (70) are known and may be obtained by known methods.

Especially preferred are the non-ionic or the anionic FWA's.

The granulates in the formulations according to the invention may contain from 0 to 15 wt-% water (component c), based on the total weight of the granulate.

The granulates in the formulations according to the invention preferably have an average particle size of <500 μm. Greater preference is given to the particle size of the granulates being from 40 to 400 μm.

A preferred embodiment of the present invention relates to granulates (G') comprising a) from 2 to 75 wt-% of at least one shading composition (A), (A') and/or (A"), based on the total weight of the granulate,
b) from 10 to 95 wt-% of at least one further additive selected from the group consisting of anionic or non-ionic dispersing agents; water-soluble organic polymers; inorganic salt; low-molecular-weight organic acid or a salt thereof; wetting agents; disintegrants such as, for example, powdered or fibrous cellulose, microcrystalline cellulose; fillers such as, for example, dextrin; water-insoluble or water-soluble dyes or pigments; dissolution accelerators; optical brighteners; aluminium silicates; talc, kaolin, $TiO_2$, $SiO_2$ and magnesium trisilicate, and
c) from 0 to 15 wt-% water, based on the total weight of the granulate.

A more preferred embodiment of the present invention relates to granulates (G") comprising a) from 2 to 75 wt-% of at least one composition (A') and/or (A"), based on the total weight of the granulate,
b) from 10 to 95 wt-% of at least one further additive selected from the group consisting of anionic or non-ionic dispersing agents; water-soluble organic polymers; inorganic salt; low-molecular-weight organic acid or a salt thereof; wetting agents; disintegrants such as, for example, powdered or fibrous cellulose, microcrystalline cellulose; fillers such as, for example, dextrin; water-insoluble or water-soluble dyes or pigments; dissolution accelerators; optical brighteners; aluminium silicates; talc, kaolin, $TiO_2$, $SiO_2$ and magnesium trisilicate, and
c) from 0 to 15 wt-% water, based on the total weight of the granulate.

A further embodiment is a liquid formulation (LF) comprising at least one shading composition (A), (A') and/or (A").

A preferred liquid formulation (LF') comprises (a) 0.01-95 wt-%, preferably 1-80 wt-%, more preferably 5-70 wt-% of a shading composition (A), (A') and/or (A"), based on the total weight of the liquid formulation,
(b) 5-99.99 wt-%, preferably 20-99 wt-%, more preferably 30-95 wt-%, based on the total weight of the liquid formulation, of at least one organic solvent and
(c) 0-10 wt-%, preferably 0-5 wt-%, more preferably 0-2 wt-%, based on the total weight of the liquid formulation, of at least one further additive.

As organic solvents, polar solvents are preferred. Especially preferred are $C_1$-$C_4$-alcohols or water.

If appropriate, the liquid formulation according to the invention can further comprise optional additives; examples are preservatives or mixtures of preservatives, such as chloroacetamide, triazine derivates, benzoisothiazolines, 2-methyl-2H-isothiazol-3on, 2-octyl-2H-isothiazol-3on, 2-brom-2-nitropropan-1,3-diol or aqueous formaldehyde solution; Mg/Al silicates or mixtures of Mg/Al silicates, such as bentonite, montmorillonite, zeolites or highly disperse silicic acids; odour improvers and perfuming agent or mixtures thereof; antifoam agents or mixtures thereof; builders or mixtures thereof; protective colloids or mixtures thereof; stabilizers or mixtures thereof; sequestering agents and antifreeze agents or mixtures thereof, such as propylene glycol.

A more preferred embodiment of the present invention relates to a liquid formulation (LF") comprising (a) 0.01-95 wt-%, preferably 1-80 wt-%, more preferably 5-70 wt-% of a shading composition (A), (A') and/or (A"), based on the total weight of the liquid formulation,
(b) 5-99.99 wt-%, preferably 20-99 wt-%, more preferably 30-95 wt-%, based on the total weight of the liquid formulation, of $C_1$-$C_4$-alcohols or water, and
(c) 0-10 wt-%, preferably 0-5 wt-%, more preferably 0-2 wt-%, based on the total weight of the liquid formulation, of at least one additive selected from the group consisting of preservatives; Mg/Al silicates; odour improvers; perfuming agent; antifoam agents; builders; protective colloids; stabilizers; sequestering agents and antifreeze agents.

The composition according to the invention is used especially in a washing or softener formulation. Such a washing or softener formulation may be in solid, liquid, gel-like or paste-like form, for example in the form of a liquid, non-aqueous washing agent composition containing not more than 5 wt-%, preferably from 0 to 1 wt-%, water and based on a suspension of a builder substance in a non-ionic surfactant, for example as described in GB-A-2 158 454.

The washing formulations may also be in the form of powders or (super-)compact powders, in the form of single- or multi-layer tablets (tabs), in the form of washing agent bars, washing agent blocks, washing agent sheets, washing agent pastes or washing agent gels, or in the form of powders, pastes, gels or liquids used in capsules or in pouches (sachets).

However, the washing agent compositions are preferably in the form of non-aqueous formulations, powders, tabs or granules.

The present invention accordingly relates also to washing agent formulations (WAF) comprising I) from 5 to 70 wt-% A) of at least one anionic surfactant and/or B) at least one non-ionic surfactant, based on the total weight of the washing agent formulation,
II) from 5 to 60 wt-% C) of at least one builder substance, based on the total weight of the washing agent formulation,
III) from 0 to 30 wt-% D) of at least one peroxide and, optionally, at least one activator and/or at least one catalyst, based on the total weight of the washing agent formulation, and IV) from 0.001 to 1 wt-% E) of granulate (G), (G') and (G") as defined above, based on the total weight of the washing agent formulation, V) from 0 to 60 wt-% F) of at least one further additive, based on the total weight of the washing agent formulation, and VI) from 0 to 5 wt-% G) water, based on the total weight of the washing agent formulation.

The sum of the wt-% of components I)-VI) in a formulation is always 100%.

The anionic surfactant A) can be, for example, a sulfate, sulfonate or carboxylate surfactant or a mixture thereof. Preferred sulfates are those having from 12 to 22 carbon atoms in the alkyl radical, optionally in combination with alkyl ethoxysulfates in which the alkyl radical has from 10 to 20 carbon atoms.

Preferred sulfonates are e.g. alkylbenzenesulfonates having from 9 to 15 carbon atoms in the alkyl radical. The cation in the case of anionic surfactants is preferably an alkali metal cation, especially sodium.

The anionic surfactant component may be, e.g., an alkylbenzenesulfonate, an alkylsulfate, an alkylethersulfate, an olefinsulfonate, an alkanesulfonate, a fatty acid salt, an alkyl or alkenyl ether carboxylate or an a-sulfofatty acid salt or an ester thereof. Preferred are alkylbenzenesulfonates having 10 to 20 carbon atoms in the alkyl group, alkylsulfates having 8 to 18 carbon atoms, alkylethersulfates having 8 to 22 carbon atoms, and fatty acid salts being derived from palm oil or tallow and having 8 to 22 carbon atoms. The average molar number of ethylene oxide added in the alkylethersulfate is preferably 1 to 22, preferably 1 to 10. The salts are preferably derived from an alkaline metal like sodium and potassium, especially sodium. Highly preferred carboxylates are alkali metal sarcosinates of formula $R_{109}$—$CO(R_{110})CH_2COOM_1$ in which $R_{109}$ is alkyl or alkenyl having 8-20 carbon atoms in the alkyl or alkenyl radical, $R_{110}$ is $C_1$-$C_4$ alkyl and $M_1$ is an alkali metal, especially sodium.

The nonionic surfactant component may be, e.g., primary and secondary alcohol ethoxylates, especially the $C_8$-$C_{20}$ aliphatic alcohols ethoxylated with an average of from 1 to 20 moles of ethylene oxide per mole of alcohol, and more especially the $C_{10}$-$C_{15}$ primary and secondary aliphatic alcohols ethoxylated with an average of from 1 to 10 moles of ethylene oxide per mole of alcohol. Non-ethoxylated nonionic surfactants include alkylpolyglycosides, glycerol monoethers, and polyhydroxyamides (glucamide).

The total amount of anionic surfactant and nonionic surfactant is preferably 5-50 wt-%, preferably 5-40 wt-% and more preferably 5-30 wt-%. As to these surfactants it is preferred that the lower limit is 10 wt-%.

The non-ionic surfactant B) can be, for example, a condensation product of from 3 to 8 mol of ethylene oxide with 1 mol of a primary alcohol having from 9 to 15 carbon atoms.

As builder substance C) there come into consideration, for example, alkali metal phosphates, especially tripolyphosphates, carbonates or hydrogen carbonates, especially their sodium salts, silicates, aluminosilicates, polycarboxylates, polycarboxylic acids, organic phosphonates, aminoalkylenepoly(alkylenephosphonates) or mixtures of those compounds.

Especially suitable silicates are sodium salts of crystalline layered silicates of the formula $NaHSi_tO_{2t+1}.pH_2O$ or $Na_2Si_tO_{2t+1}.pH_2O$ wherein t is a number from 1.9 to 4 and p is a number from 0 to 20.

Among the aluminosilicates, preference is given to those commercially available under the names zeolithe A, B, X and HS, and also to mixtures comprising two or more of those components. Zeolithe A is preferred.

Among the polycarboxylates, preference is given to polyhydroxycarboxylates, especially citrates, and acrylates and also copolymers thereof with maleic anhydride. Preferred polycarboxylic acids are nitrilotriacetic acid, ethylenediaminetetraacetic acid and ethylenediamine disuccinate either in racemic form or in the enantiomerically pure (S,S) form.

Phosphonates or aminoalkylenepoly(alkylenephosphonates) that are especially suitable are alkali metal salts of 1-hydroxyethane-1,1-diphosphonic acid, nitrilotris(methylenephosphonic acid), ethylenediaminetetramethylenephosphonic acid, hexamethylenediamin N,N,N',N' tetrakis methanphosphonic acid and diethylenetriaminepentamethylenephosphonic acid, as well as the salts therefrom. Also preferred polyphosphonates have the following formula

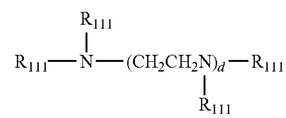

wherein $R_{111}$ is $CH_2PO_3H_2$ or a water soluble salt thereof and d is an integer of the value 0, 1, 2 or 3 are preferred.

Especially preferred are the polyphosphonates wherein b is an integer of the value of 1.

Suitable peroxide components include, for example, the organic and inorganic peroxides (like sodium peroxides) known in the literature and available commercially that bleach textile materials at conventional washing temperatures, for example at from 5 to 95° C.

The amount of the peroxide or the peroxide-forming substance is preferably 0.5-30% by weight, more preferably 1-20% by weight and especially preferably 1-15% by weight.

As the peroxide component D) there come into consideration every compound which is capable of yielding hydrogen peroxide in aqueous solutions, for example, the organic and inorganic peroxides known in the literature and available commercially that bleach textile materials at conventional washing temperatures, for example at from 10 to 95° C.

The organic peroxides are, for example, mono- or polyperoxides, urea peroxides, a combination of a $C_1$-$C_4$alkanol oxidase and $C_1$-$C_4$alkanol (Such as methanol oxidase and ethanol as described in WO95/07972), alkylhydroxy peroxides, such as cumene hydroperoxide and t-butyl hydroperoxide, organic mono peracids of formula

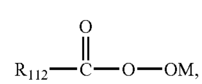

wherein

M signifies hydrogen or a cation, $R_{112}$ signifies unsubstituted $C_1$-$C_{18}$alkyl; substituted $C_1$-$C_{18}$alkyl; unsubstituted aryl; substituted aryl; —($C_1$-$C_6$alkylene)-aryl, wherein the alkylene and/or the alkyl group may be substituted; and phthalimido$C_1$-$C_8$alkylene, wherein the phthalimido and/or the alkylene group may be substituted. Preferred mono organic perm acids and their salts are those of formula

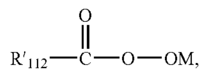

wherein

M signifies hydrogen or an alkali metal, and $R'_{112}$ signifies unsubstituted $C_1$-$C_4$alkyl; phenyl;—$C_1$-$C_2$alkylene-phenyl or phthalimido$C_1$-$C_8$alkylene.

Especially preferred is $CH_3COOOH$ and its alkali salts.

Especially preferred is also ε-phthalimido peroxy hexanoic acid and its alkali salts.

Instead of the peroxy acid it is also possible to use organic peroxy acid precursors and $H_2O_2$. Such precursors are the corresponding carboxyacid or the corresponding carboxyanhydrid or the corresponding carbonylchlorid, or amides, or esters, which can form the peroxy acids on perhydrolysis. Such reactions are commonly known.

Peroxy acids may also be generated from precursers such as bleach activators, that is to say compounds that, under perhydrolysis conditions, yield unsubstituted or substituted perbenzo- and/or peroxo-carboxylic acids having from 1 to 10 carbon atoms, especially from 2 to 4 carbon atoms. Suitable bleach activators include the customary bleach activators, mentioned at the beginning, that carry O— and/or N-acyl groups having the indicated number of carbon atoms and/or unsubstituted or substituted benzoyl groups. Preference is given to polyacylated alkylenediamines, especially tetraacetylethylenediamine (TAED), acylated glycolurils, especially tetraacetylglycoluril (TAGU), N,N-diacetyl-N,N-dimethylurea (DDU), acylated triazine derivatives, especially 1,5-diacetyl-2,4-dioxohexahydro-1,3,5-triazine (DADHT), compounds of formula:

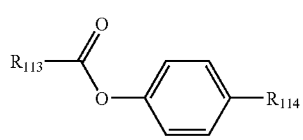

wherein $R_{113}$ is a sulfonate group, a carboxylic acid group or a carboxylate group, and wherein $R_{114}$ is linear or branched ($C_7$-$C_{15}$)alkyl, especially activators known under the names SNOBS, SLOBS and DOBA, acylated polyhydric alcohols, especially triacetin, ethylene glycol diacetate and 2,5-diacetoxy-2,5-dihydrofuran, and also acetylated sorbitol and mannitol and acylated sugar derivatives, especially pentaacetylglucose (PAG), sucrose polyacetate (SUPA), pentaacetylfructose, tetraacetylxylose and octaacetyllactose as well as acetylated, optionally N-alkylated glucamine and gluconolactone. It is also possible to use the combinations of conventional bleach activators known from German Patent Application DE-A-44 43 177. Nitrile compounds that form perimine acids with peroxides also come into consideration as bleach activators.

Also suitable are diperoxyacids, for example, 1,12-diperoxydodecanedioic acid (DPDA), 1,9-diperoxyazelaic acid, diperoxybrassilic acid; diperoxysebasic acid, diperoxyisophthalic acid, 2-decyldiperoxybutane-1,4-diotic acid and 4,4'-sulphonylbisperoxybenzoic acid.

Preferably, however, inorganic peroxides are used, for example persulfates, perborates, percarbonates and/or persilicates.

Example of suitable inorganic peroxides are sodium tetrahydrate or sodium perborated monohydrate, inorganic peroxyacid compounds, such as for example potassium monopersulphate (MPS). If organic or inorganic peroxyacids are used as the peroxygen compound, the amount thereof will normally be within the range of about 2-10 wt-%, preferably from 4-8 wt-%.

All these peroxy compounds may be utilized alone or in conjunction with a peroxyacid bleach precursor and/or an organic bleach catalyst not containing a transition metal. Generally, the bleaching composition of the invention can be suitably formulated to contain from 2 to 35 wt-% , preferably from 5 to 25 wt-%, of the peroxy bleaching agent.

Peroxyacid bleach precursors are known and amply described in literature, such as in the British Patents 836988; 864,798; 907,356; 1,003,310 and 1,519,351; German Patent 3,337,921; EP-A-0185522; EP-A-0174132; EP-A-0120591; and U.S. Pat. Nos. 1,246,339; 3,332,882; 4,128,494; 4,412, 934 and 4,675,393. Preferred one are those disclosed in WO 01/05925), especially preferred the 1:1 Mn(III) complexes.

Another useful class of peroxyacid bleach precursors is that of the cationic i.e. quaternary ammonium substituted peroxyacid precursors as disclosed in U.S. Pat. Nos. 4,751, 015 and 4,397,757, in EP-A0284292 and EP-A-331,229. Examples of peroxyacid bleach precursors of this class are: 2-(N,N,N-trimethyl ammonium)ethyl sodium-4-sulphonphenyl carbonate chloride—(SPCC), N-octyl,N,N-dimehyl-N10-carbophenoxy decyl ammonium chloride—(ODC), 3-(N,N,N-trimethyl ammonium)propyl sodium-4-sulphophenyl carboxylate and N,N,N-trimethyl ammonium toluyloxy benzene sulphonate.

A further special class of bleach precursors is formed by the cationic nitriles as disclosed in EP-A-303,520, WO 96/40661 and in European Patent Specification No.'s 458, 396, 790244 and 464,880. These cationic nitriles also known as nitril quats have the formula (α)

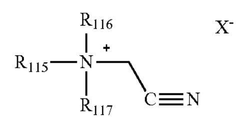

(β)

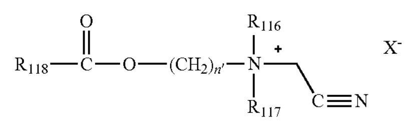

(γ)

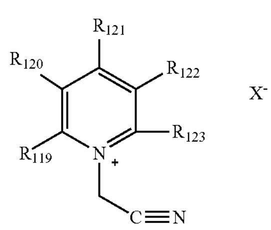

(δ)

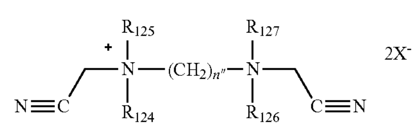

wherein $R_{115}$ is a $C_1$-$C_{24}$alkyl, a $C_1$-$C_{24}$alkenyl; an alkaryl having a $C_1$-$C_{24}$alkyl; a substituted $C_1$-$C_{C24}$alkyl; a substituted $C_1$-$C_{24}$alkenyl; a substituted aryl, $R_{116}$ and $R_{117}$ are each independently a $C_1$-$C_3$alkyl; hydroxyalkyl having 1 to 3 carbon atoms, —$(C_2H_4O)_n$H, n being 1 to 6; —$CH_2$—CN $R_{118}$ is is a $C_1$-$C_{20}$alkyl; a $C_1$-$C_{20}$alkenyl; a substituted $C_1$-$C_{20}$alkyl; a substituted $C_1$-$C_{20}$alkenyl; an alkaryl having a $C_1$-$C_{24}$alkyl and at least one other substituent, $R_{119}$, $R_{120}$, $R_{121}$, $R_{122}$ and $R_{123}$ are each independently hydrogen, a $C_1$-$C_{10}$alkyl, a $C_1$-$C_{10}$alkenyl, a substituted $C_1$-$C_{10}$alkyl, a substituted $C_1C_{10}$alkenyl, carboxyl, sulfonyl or cyano $R_{124}$, $R_{125}$, $R_{126}$ and $R_{127}$ are each independently a $C_1$ to $C_6$ alkyl, n' is an integer from 1 to 3, n" is an integer from 1 to 16, and X is an anion.

Other nitril quats have the following formula (ε)

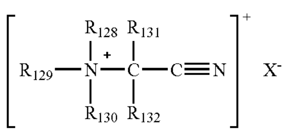

wherein $R_{128}$ and $R_{129}$ form, together with the nitrogen atom to whih they are bonded, a ring comprising 4 to 6 carbon atoms, this ring may also be substituted by $C_1$-$C_5$-alkyl, $C_1$-$C_5$-alkoxy, $C_1$-$C_5$-alkanoyl, phenyl, amino, ammonium, cyano, cyanamino or chloro and 1 or 2 carbon atom(s) of this ring may also be substituted by a nitrogen atom, by a oxygen atom, by a N—$R_{133}$-grouo abd/or by a $R_{130}$—N—$R_{133}$-group, wherein $R_{133}$ is hydrogen, $C_1$-$C_5$-alkyl, $C_2$-$C_5$-alkenyl, $C_2$-$C_5$-alkinyl, phenyl, $C_7$-$C_9$-aralkyl, $C_5$-$C_7$-cycloalkyl, $C_1$-$C_5$-alkanoyl, cyanomethyl or cyano, $R_{130}$ is $C_1$-$C_{24}$-, preferably $C_1$-$C_4$-alkyl, $C_2$-$C_{24}$-alkenyl, preferably $C_2$-$C_4$-alkenyl, cyanomethyl or $C_1$-$C_4$-alkoxy-$C_1$-$C_4$-alkyl, $R_{131}$ and $R_{132}$ are independently from each other hydrogen, $C_1$-$C_4$-alkyl, $C_1$-$C_4$-alkenyl, $C_1$-$C_4$-alkoxy-$C_1$-$C_r$alkyl, phenyl oder $C_1$-$C_3$-alkylphenyl, preferably hydrogen, methyl or phenyl, whereby preferably the moiety $R_{131}$ signifies hydrogen, if $R_{132}$ is not hydrogen, and X" is an anion.

Suitable examples of nitril quats of formula (8) are

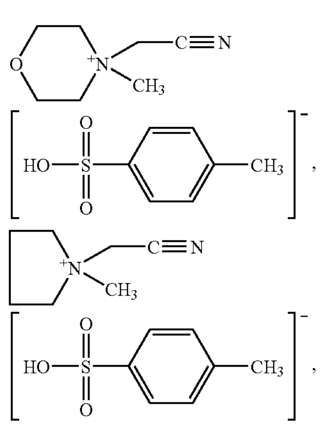

-continued

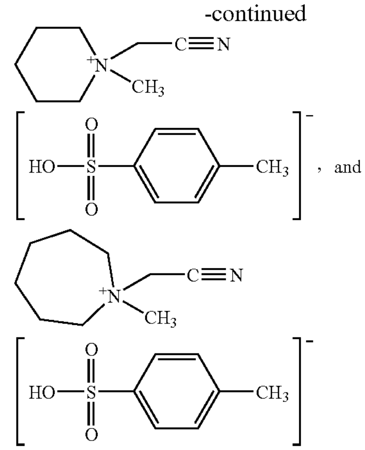

Other nitrile quats have the formula (φ)

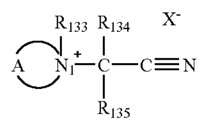

(η)

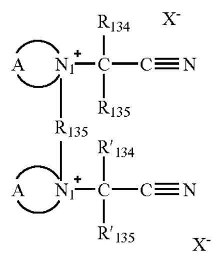

wherein

A is a saturated ring formed by a plurality of atoms in addition to the $N_1$ atom, the saturated ring atoms to include at least one carbon atom and at least one heteroatom in addition to the $N_1$ atom, the said one heteroatom selected from the group consisting of O, S and N atoms, the substituent $R_{133}$ bound to the $N_1$ atom of the Formula (φ) structure is (a) a C1-8 alkyl or alkoxylated alkyl where the alkoxy is $C_{2-4}$, (b) a $C_{4-24}$cycloalkyl, (c) a $C_{7-24}$alkaryl, (d) a repeating or nonrepeating alkoxy or alkoxylated alcohol, where the alkoxy unit is $C_{2-4}$, or (e) —$CR_{136}R_{137}$—C≡N where $R_{136}$ and $R_{137}$ are each H, a $C_{1-24}$alkyl, cycloalkyl, or alkaryl, or a repeating or nonrepeating alkoxyl or alkoxylated alcohol where the alkoxy unit is $C_{2-4}$, in Formula (φ) at least one of the $R_{134}$ and $R_{135}$ substituents is H and the other of $R_{134}$ and $R_{135}$ is H, a $C_{1-24}$ alkyl, cycloalkyl, or alkaryl, or a repeating or nonrepeating alkoxyl or alkoxylated alcohol where the alkoxy unit is $C_{2-4}$, and Y is at least one counterion.

Any one of these peroxyacid bleach precursors can be used in the present invention, though some may be more preferred than others.

Of the above classes of bleach precursors, the preferred classes are the esters, including acyl phenol sulphonates and acyl alkyl phenol sulphonates; the acyl-amides; and the quaternary ammonium substituted peroxyacid precursors including the cationic nitriles.

Examples of said preferred peroxyacid bleach precursors or activators are sodium-4-benzoyloxy benzene sulphonate (SBOBS); N,N,N'N'-tetraacetyl ethylene diamine (TAED); sodium-1-methyl-2-benzoylm benzene-4-sulphonate; sodium-4-methyl-3-benzoloxy benzoate; SPCC; trimethyl ammonium toluyloxy-benzene sulphonate; sodium nonanoyloxybenzene sulphonate (SNOBS); sodium 3,5,5-trimethyl hexanoyl-oxybenzene sulphonate (STHOBS); and the substituted cationic nitriles.

The precursors may be used in an amount of up to 12%, preferably from 2-10% by weight, of the composition.

It will be understood that mixtures of inorganic and/or organic peroxides can also be used. The peroxides may be in a variety of crystalline forms and have different water contents, and they may also be used together with other inorganic or organic compounds in order to improve their storage stability.

The peroxides are added to the agent preferably by mixing the components, for example using a screw metering system and/or a fluidised bed mixer.

The agents may comprise, in addition to the combination according to the invention, one or more optical brighteners, for example from the class bis-triazinylamino-stilbenedisulfonic acid, bis-triazolyl-stilbenedisulfonic acid, bis-styrylbiphenyl or bis-benzofuranylbiphenyl, a bis-benzoxalyl derivative, bis-benzimidazolyl derivative or coumarin derivative or a pyrazoline derivative.

The detergents used will usually contain one or more auxiliaries such as soil suspending agents, for example sodium carboxymethylcellulose; salts for adjusting the pH, for example alkali or alkaline earth metal silicates; foam regulators, for example soap; salts for adjusting the spray drying and granulating properties, for example sodium sulphate; perfumes; and also, if appropriate, antistatic and softening agents; such as smectite clays; photobleaching agents; pigments; and/or shading agents. These constituents should, of course, be stable to any bleaching system employed. Such auxiliaries can be present in an amount of, for example, 0.1 to 20 wt-%, preferably 0.5 to 10 wt-%, especially 0.5 to 5 wt-%, based on the total weight of the detergent.

Furthermore, the detergent can optionally contain enzymes. Enzymes can be added to detergents for stain removal. The enzymes usually improve the performance on stains that are either protein- or starch-based, such as those caused by blood, milk, grass or fruit juices. Preferred enzymes are cellulases, proteases, amylases and lipases. Preferred enzymes are cellulases and proteases, especially proteases. Cellulases are enzymes which act on cellulose and its derivatives and hydrolyze them into glucose, cellobiose, cellooligosaccharide. Cellulases remove dirt and have the effect of mitigating the roughness to the touch. Examples of enzymes to be used include, but are by no means limited to, the following:

proteases as given in U.S. Pat. No. 6,242,405, column 14, lines 21 to 32;

lipases as given in U.S. Pat. No. 6,242,405, column 14, lines 33 to 46 and as given in WO 0060063;

amylases as given in U.S. Pat. No. 6,242,405, column 14, lines 47 to 56; and cellulases as given in U.S. Pat. No. 6,242,405, column 14, lines 57 to 64.

Commercially available detergent proteases, such as Alcalase®, Esperase®, Everlase®, Savinase®, Kannase® and Durazym®, are sold e.g. by NOVOZYMES A/S.

Commercially available detergent amylases, such as Termamyl®, Duramyl®, Stainzyme®, Natalase®, Ban® and Fungamyl®, are sold e.g. by NOVOZYMES A/S.

Commercially available detergent ellulases, such as Celluzyme®, Carezyme® and Endolase®, are sold e.g. by NOVOZYMES A/S.

Commercially available detergent lipases, such as Lipolase®, Lipolase Ultra® and Lipoprime®, are sold e.g. by NOVOZYMES A/S.

Suitable mannanases, such as Mannanaway®, are sold by NOVOZYMES A/S.

The enzymes can optionally be present in the detergent. When used, the enzymes are usually present in an amount of 0.01-5 wt-%, preferably 0.05-5 wt-% and more preferably 0.1-4 wt-%, based on the total weight of the detergent.

Further preferred additives to the agents according to the invention are dye fixing agents and/or polymers which, during the washing of textiles, prevent staining caused by dyes in the washing liquor that have been released from the textiles under the washing conditions. Such polymers are preferably polyvinylpyrrolidones, polyvinylimidazole or polyvinylpyridine-N-oxides which may have been modified by the incorporation of anionic or cationic substituents, especially those having a molecular weight in the range of from 5000 to 60000, more especially from 5000 to 50000. Such polymers are usually used in an amount of from 0.01 to 5 wt-%, preferably 0.05 to 5 wt-%, especially 0.1 to 2 wt-%, based on the total weight of the detergent. Preferred polymers are those given in WO-A-02/02865 (see especially page 1, last paragraph and page 2, first paragraph).

A preferred washing agent formulation (WAF') according to the invention consists of I) from 5 to 70 wt-% A) of at least one anionic surfactant from the group consisting of alkylbenzenesulfonates having from 9 to 15 carbon atoms in the alkyl radical; alkylnaphthalenesulfonates having from 6 to 16 carbon atoms in the alkyl radical in question; and alkali metal sarcosinates of the formula $R_{109}$—CO—N($R_{110}$)—$CH_2COOM_1$, wherein $R_{109}$ is alkyl or alkenyl having from 8 to 20 carbon atoms in the alkyl or alkenyl radical, $R_{110}$ is $C_1$-$C_4$alkyl and $M_1$ is an alkali metal and/or B) at least one non-ionic surfactant from the group consisting of condensation products of from 3 to 8 mols of ethylene oxide with 1 mol of primary alcohol containing from 9 to 20 carbon atoms, based on the total weight of the washing agent formulation II) from 5 to 60 wt-% C) of a builder substance from the group consisting of alkali metal phosphates; carbonates; hydrogen carbonates; silicates; aluminium silicates; polycarboxylates; polycarboxylic acids; organic phosphonates and aminoalkylenepoly(alkylenephosphonates), based on the total weight of the washing agent formulation III) from 0 to 30 wt-% D) of a peroxide from the group consisting of organic mono- or poly-peroxides; organic peracids and salts thereof; persulfates; perborates; percarbonates and persilicates and optionally a bleach activator and/or bleach catalyst, based on the total weight of the washing agent formulation IV) from 0.001 to 1 wt-% E) of at least one granulate (G), (G') and/or (G"), based on the total weight of the washing agent formulation, V) from 0 to 60% F) of further additives from the group consisting of optical brighteners; suspending agents for dirt; pH regulators; foam regulators; salts for regulating the spray-drying and granulating properties; fragrances; antistatic agents; fabric conditioners; enzymes; bleaching agents; pigments; toning agents; polymers which, during the washing of textiles, prevent staining caused by dyes in the washing liquor which have been released from the textiles under the washing conditions; and perborate activators, based on the total weight of the washing agent formulation, and VI) from 0 to 5% G) water, based on the total weight of the washing agent formulation.

The granulates (G), (G') and (G") are prepared according to known methods. Any known method is suitable to produce granules comprising the inventive mixture. Continuous or discontinuous methods are suitable, Continuous methods, such as spray drying or fluidised bed granulation processes are preferred.

Especially suitable are spray-drying processes in which the active ingredient solution is sprayed into a chamber with circulating hot air. The atomisation of the solution is carried out using single or binary nozzles or is brought about by the spinning effect of a rapidly rotating disc. In order to increase the particle size, the spray-drying process may be combined with additional agglomeration of the liquid particles with solid nuclei in a fluidised bed that forms an integral part of the chamber (so-called fluidised spray). The fine particles (<100 μm) obtained by a conventional spray-drying process may, if necessary after being separated from the exhaust gas flow, be fed as nuclei, without being further treated, directly into the spray cone of the atomiser of the spray-dryer, for the purpose of agglomeration with the liquid droplets of the active ingredient. During the granulation step, the water can be rapidly removed from the solutions comprising phthalocyanine compound, and, where appropriate, further additives, and it is expressly intended that agglomeration of the droplets forming in the spray cone, i.e. the agglomeration of droplets with solid particles, will take place. Preference is given to the use of agglomeration processes to produce the granulates according to the invention because such processes usually yield a higher bulk weight so that the granulates have better compatibility with washing agent formulations.

A further embodiment of the present invention comprises using, for preparation of the granulates, phthalocyanine solutions that have been purified by membrane separation procedures. Such membrane separation processes, such as membrane filtration are well known in the prior art and are described for example in "Handbuch der industriellen Fest/Flüssig-Filtration", Weinheim: Wiley-VCH 2000 or "Encyclopedia of Analytical Science", S. 3035-3050, New York: Academic Press 1995 or "Ullmann" (5.) A16, 187-258.

If necessary, the granules formed in the spray-dryer are removed in a continuous process, for example by a sieving operation. The fines and the oversize particles are either recycled directly to the process (without being redissolved) or are dissolved in the liquid active ingredient formulation and subsequently granulated again.

The granulates (G), (G') and (G") are resistant to abrasion, low in dust, free-flowing and can be readily metered. They are distinguished especially by very rapid solubility in water.

The granulates (G), (G') and (G") preferably have a density in the range from 500 to 900 g/l, dissolve rapidly in water and do not float on the surface of the washing agent solution. They may be added in the desired concentration of the phthalocyanine compound directly to the washing agent formulation.

The content of granulates (G), (G') and (G") in accordance with the invention in the formulations according to the invention is from to 0.001 to 1 wt-%, preferably from 0.001 to 0.05 wt-% and very especially from 0.005 to 0.03 wt-%.

The washing agent formulation according to the invention can be prepared in a generally known manner.

A formulation in powder form can be prepared, for example, by first preparing an initial powder by spray-drying an aqueous slurry comprising all of the afore-mentioned components except for components D) and E) and then adding the dry components D) and E) and mixing all of them together. It is also possible to start from an aqueous slurry which, although comprising components A) and C), does not comprise component B) or comprises only a portion of component B). The slurry is spray-dried; component E) is then mixed with component B) and added; and then component D) is mixed in dry. The components are preferably mixed with one another in such amounts that a solid compact washing agent composition in granule form is obtained, having a specific weight of at least 500 g/l.

In another preferred embodiment, the production of the washing agent composition is carried out in three steps. In the first step a mixture of anionic surfactant (and, where appropriate, a small amount of non-ionic surfactant) and builder substance is prepared. In the second step that mixture is sprayed with the major portion of the non-ionic surfactant and then, in the third step, peroxide and, where appropriate, catalyst, and the granulate according to the invention are added. That method is usually carried out in a fluidised bed. In a further preferred embodiment, the individual steps are not carried out completely separately, so that there is a certain amount of overlap between them. Such a method is usually carried out in an extruder, in order to obtain granulates in the form of "megapearls".

As an alternative thereto, the granulates according to the invention can, for the purpose of admixture with a washing agent in a post-dosing step, be mixed with other washing agent components such as phosphates, zeolites, brighteners or enzymes.

A mixture of that kind for post-dosing of the granulates is distinguished by a homogeneous distribution of the granulates according to the invention in the mixture and can consist of, for example, from 5 to 50% granulates and from 95 to 50% sodium tripolyphosphate. Where the dark appearance of the granulate in the washing agent composition is to be suppressed, this can be achieved, for example, by embedding the granules in droplets of a whitish meltable substance ("water-soluble wax") or, preferably, by encapsulating the granules in a melt consisting of, for example, a water-soluble wax, as described in EP-B-0 323 407 B1, a white solid (e.g. titanium dioxide) being added to the melt in order to reinforce the masking effect of the capsule.

The detergent may also be formulated as an aqueous liquid comprising 5-50, preferably 10-35 wt-% of water or as a non-aqueous liquid detergent, containing not more than 5, preferably 0-1 wt-% of water. Non-aqueous liquid detergent compositions can contain other solvents as carriers. Low molecular weight primary or secondary alcohols exemplified by methanol, ethanol, propanol, and isopropanol are suitable. Monohydric alcohols are preferred for solubilizing surfactant, but polyols such as those containing from 2 to about 6 carbon atoms and from 2 to about 6 hydroxy groups (e.g., 1,3-propanediol, ethylene glycol, glycerine, and 1,2-propanediol) can also be used. The compositions may contain from 5 wt-% to 90 wt-%, typically 10 wt-% to 50 wt-% of such carriers. The detergents can also be present as the so-called "unit liquid dose" form.

A further embodiment of the present invention is a fabric softener formulation (FSF) comprising (a) at least one shading composition (A), (A') and/or (A"), (b) at least one fabric softener.

Fabric softeners, especially hydrocarbon fabric softeners, suitable for use herein are selected from the following classes of compounds:

(i) Cationic quaternary ammonium salts. The counter ion of such cationic quaternary ammonium salts may be a halide, such as chloride or bromide, methyl sulphate, or other ions well known in the literature. Preferably the counter ion is methyl sulfate or any alkyl sulfate or any halide, methyl sulfate being most preferred for the dryer-added articles of the invention.

Examples of cationic quaternary ammonium salts include but are not limited to:

(1) Acyclic quaternary ammonium salts having at least two $C_8$ to $C_{30}$, preferably $C_{12}$ to $C_{22}$ alkyl or alkenyl chains, such as: ditallowdimethyl ammonium methylsulfate, di(hydrogenated tallow)dimethyl ammonium methylsulfate, di(hydrogenated tallow)dimethyl ammonium methylchloride, distearyldimethyl ammonium methyl-sulfate, dicocodimethyl ammonium methylsulfate and the like. It is especially preferred if the fabric softening compound is a water insoluble quaternary ammonium material which comprises a compound having two $C_{12}$ to $C_{18}$ alkyl or alkenyl groups connected to the molecule via at least one ester link. It is more preferred if the quaternary ammonium material has two ester links present. An especially preferred ester-linked quaternary ammonium material for use in the invention can be represented by the formula:

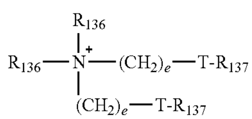

wherein each $R_{136}$ group is independently selected from $C_1$ to $C_4$ alkyl, hydroxyalkyl or $C_2$ to $C_4$ alkenyl groups; T is either —O—C(O)— or —C(O)—O—, and wherein each $R_{137}$ group is independently selected from $C_8$ to $C_{28}$ alkyl or alkenyl groups; and e is an integer from 0 to 5.

A second preferred type of quaternary ammonium material can be represented by the formula:

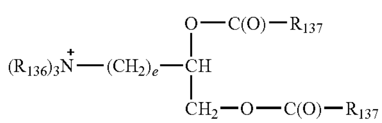

wherein $R_{136}$, e and $R_{137}$ are as defined above.

(2) Cyclic quaternary ammonium salts of the imidazolinium type such as di(hydrogenated tallow)dimethyl imidazolinium methylsulfate, 1-ethylene-bis(2-tallow-1-methyl) imidazolinium methylsulfate and the like;

(3) Diamido quaternary ammonium salts such as: methyl-bis (hydrogenated tallow amidoethyl)-2-hydroxethyl ammonium methyl sulfate, methyl bi(tallowamidoethyl)-2-hydroxypropyl ammonium methylsulfate and the like;

(4) Biodegradable quaternary ammonium salts such as N,N-di(tallowoyl-oxy-ethyl)-N,N-dimethyl ammonium methyl sulfate and N,N-di(tallowoyl-oxy-propyl)-N,N-dimethyl ammonium methyl sulfate. Biodegradable quaternary ammonium salts are described, for example, in U.S. Pat. Nos. 4,137,180, 4,767,547 and 4,789,491 incorporated by reference herein.

Preferred biodegradable quaternary ammonium salts include the biodegradable cationic diester compounds as described in U.S. Pat. No. 4,137,180, herein incorporated by reference.

(ii) Tertiary fatty amines having at least one and preferably two $C_5$ to $C_{30}$, preferably $C_{12}$ to $C_{22}$ alkyl chains. Examples include hardened tallow-di-methylamine and cyclic amines such as 1-(hydrogenated tallow)amidoethyl-2-(hydrogenated tallow)imidazoline. Cyclic amines, which may be employed for the compositions herein, are described in U.S. Pat. No. 4,806,255 incorporated by reference herein.

(iii) Carboxylic acids having 8 to 30 carbons atoms and one carboxylic group per molecule. The alkyl portion has 8 to 30, preferably 12 to 22 carbon atoms. The alkyl portion may be linear or branched, saturated or unsaturated, with linear saturated alkyl preferred. Stearic acid is a preferred fatty acid for use in the composition herein. Examples of these carboxylic acids are commercial grades of stearic acid and palmitic acid, and mixtures thereof, which may contain small amounts of other acids.

(iv) Esters of polyhydric alcohols such as sorbitan esters or glycerol stearate. Sorbitan esters are the condensation products of sorbitol or iso-sorbitol with fatty acids such as stearic acid.

Preferred sorbitan esters are monoalkyl. A common example of sorbitan ester is SPAN® 60 (ICI) which is a mixture of sorbitan and isosorbide stearates.

(v) Fatty alcohols, ethoxylated fatty alcohols, alkylphenols, ethoxylated alkylphenols, ethoxylated fatty amines, ethoxylated monoglycerides and ethoxylated diglycerides.

(vi) Mineral oils, and polyols such as polyethylene glycol.

These softeners are more definitively described in U.S. Pat. No. 4,134,838 the disclosure of which is incorporated by reference herein. Preferred fabric softeners for use herein are acyclic quaternary ammonium salts. Mixtures of the above mentioned fabric softeners may also be used.

The fabric softener formulation according to this invention comprises about 0.001-5 wt-%, preferably 0.001-3 wt-%, of a shading composition (A), (A') and/or (A"), based on the total weight of the fabric softener formulation.

The fabric softener formulation employed in the present invention preferably contains about 0.1 to about 95 wt-%, based on the total weight of the fabric softening composition, of the fabric softener formulation. Preferred is an amount of 0.5 to 50 wt-%, especially an amount of 2 to 50 wt-% and most preferably an amount of 2 to 30 wt-%.

The fabric softening composition may also comprise additives which are customary for standard commercial fabric softening compositions, for example alcohols, such as ethanol, n-propanol, i-propanol, polyhydric alcohols, for example glycerol and propylene glycol;

amphoteric and nonionic surfactants, for example carboxyl derivatives of imidazole, oxyethylated fatty alcohols, hydrogenated and ethoxylated castor oil, alkyl polyglycosides, for example decyl polyglucose and dodecylpolyglucose, fatty alcohols, fatty acid esters, fatty acids, ethoxylated fatty acid glycerides or fatty acid partial glycerides; also inorganic or organic salts, for example water-soluble potassium, sodium or magnesium salts, non-aqueous solvents, pH buffers, perfumes, dyes, hydrotropic agents, antifoams, anti redeposition agents, enzymes, optical brighteners, antishrink agents, stain removers, germicides, fungicides, dye fixing agents or dye transfer inhibitors (as described in WO-A-02/02865), antioxidants, corrosion inhibitors, wrinkle recovery or wet soiling reduction agent, such as polyorganosiloxanes. The latter two additives are described in WO0125385.

Such additives are preferably used in an amount of 0 to 30 wt-%, based on the total weight of the fabric softening composition. Preferred is an amount of 0 to 20 wt-%, especially an amount of 0 to 10 wt-% and most preferably an amount of 0 to 5 wt-%, based on the total weight of the fabric softening composition.

The fabric softener compositions are preferably in liquid aqueous form. The fabric softener compositions preferably contain a water content of 25 to 90 wt-%, based on the total weight of the composition. More preferably the water content is 50 to 90 wt-%, especially 60 to 90 wt-%.

A preferred embodiment of the present invention is a fabric softener formulation (FSF') comprising (a) 0.001-5wt-% of a shading composition (A), (A') and/or (A''), based on the total weight of the fabric softener formulation, (b) 0.1-95 wt-% of at least one fabric softener selected from the above defined classes (i)-(vi), based on the total weight of the fabric softener formulation, (c) 0-30 wt-% of at least one additive selected from the group consisting of alcohols; amphoteric and nonionic surfactants; inorganic or organic salts; non-aqueous solvents; pH buffers; perfumes, dyes; hydrotropic agents; antifoams; anti redeposition agents; enzymes; optical brighteners; antishrink agents; stain removers; germicides; fungicides; dye fixing agents or dye transfer inhibitors; antioxidants; corrosion inhibitors; wrinkle recovery or wet soiling reduction agent, based on the total weight of the fabric softener formulation, and (d) 25-90 wt-% of water, based on the total weight of the fabric softener formulation.

The fabric softener compositions preferably have a pH value from 2.0 to 9.0, especially 2.0 to 5.0.

The fabric softener compositions can, for example, be prepared as follows:

Firstly, an aqueous formulation of the cationic polymer is prepared as described above. The fabric softener composition according to the invention is usually, but not exclusively, prepared by firstly stirring the active substance, i.e. the hydrocarbon based fabric softening component, in the molten state into water, then, where required, adding further desired additives and, finally, adding the formulation of the cationic polymer. The fabric softener composition can, for example, also be prepared by mixing a preformulated fabric softener with the cationic polymer.

These fabric softener compositions are traditionally prepared as dispersions containing for example up to 30 wt-% of active material in water. They usually have a turbid appearance. However, alternative formulations usually containing actives at levels of 5 to 40 wt-% along with solvents can be prepared as microemulsions, which have a clear appearance (as to the solvents and the formulations see for example U.S. Pat. No. 5,543,067 and WO-A-98/17757).

A further embodiment of the present invention relates to new Zn—, Ca—, Mg—, Na—, K—, Al, Si—, Ti—, Ge—, Ga—, Z—, In— or Sn-phthalocyanine compounds to which at least one dyestuff is attached through a covalent bonding.

The present invention also relates to the compounds of formula (1a) and (1b), as defined above.

The present invention also relates to the compounds of formula (2a), (3), (4), (4a), (5), (6) and (7), as defined above.

An especially preferred embodiment of the present invention relates to compounds of formula (8) and (9)

(8)

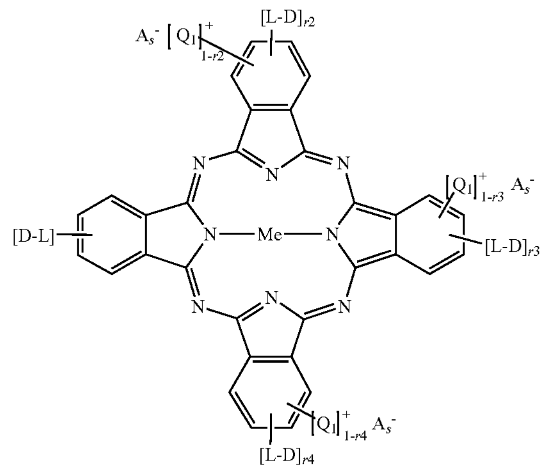

(9)

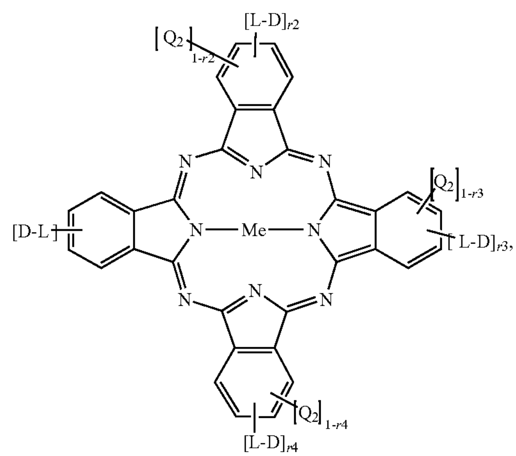

wherein

Me is Zn, $AlZ_1$, Si(IV)-$(Z_i)_2$ or Ti(IV)-$(Z_1)_2$, wherein $Z_1$ is chloride, fluorine, bromine or hydroxyl, each $Q_1$ is independently of each other a sulfo or carboxyl group; or a radical of the formula —$SO_2X_2$—$R_1$—$X_3^+$; —O—$R_1$—$X_3^+$ or —$(CH_2)_t$—$Y_1^+$, in which $R_1$ is a branched or unbranched $C_1$-$C_4$alkylene; 1,3-phenylene or 1,4-phenylene, $X_2$ is —NH— or —N($C_1$-$C_4$alkyl)-, $X_3^+$ is a group of the formula

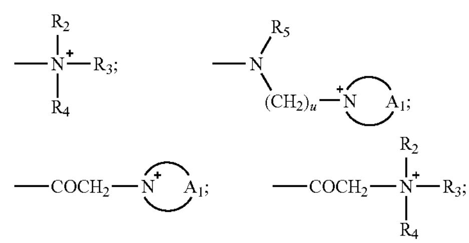

or, in the case where $R_1$═$C_1$-$C_4$alkylene, also a group of the formula

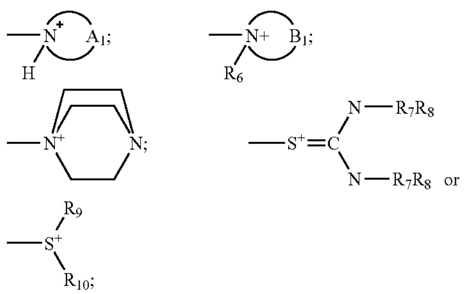

$Y_1^+$ is a group of the formula

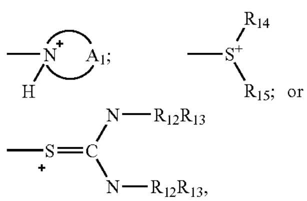

t is 0 or 1, wherein the above formulae $R_2$ and $R_3$ independently of one another are $C_1$-$C_6$alkyl, $R_4$ is $C_1$-$C_4$alkyl; pentyl; hexyl or $NR_7R_8$, $R_5$ and $R_6$ independently of one another are $C_1$-$C_4$alkyl, $R_7$ and $R_8$ independently of one another are hydrogen or $C_1$-$C_4$alkyl, $R_9$ and $R_{10}$ independently of one another are unsubstituted $C_1$-$C_4$alkyl or $C_1$-$C_4$alkyl substituted by at least one substituent chosen from the group consisting of hydroxyl, cyano, carboxyl, $SO_3H$, —$NH_2$, carb-$C_1$-$C_4$alkoxy, $C_1$-$C_4$alkoxy, phenyl, naphthyl and pyridyl, u is from 1 to 6, $A_1$ is a unit which completes an pyrrole-; imidazol-; pyridine-; pyrazine-; pyrimidine-; pyridazine-ring, and $B_1$ is a unit which completes a morpholino-; pyrrolidine-; piperazine- or piperidine-ring, each $Q_2$ is independently from each other hydroxyl; $C_1$-$C_{10}$alkyl; branched $C_3$-$C_{10}$alkyl; $C_2$-$C_{10}$alkenyl; branched $C_3$-$C_{10}$alkenyl and mixtures thereof; $C_1$-$C_{10}$alkoxy; a sulfo or carboxyl radical; a radical of the formula

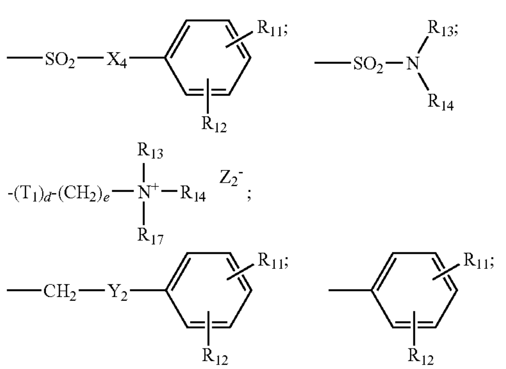

-continued

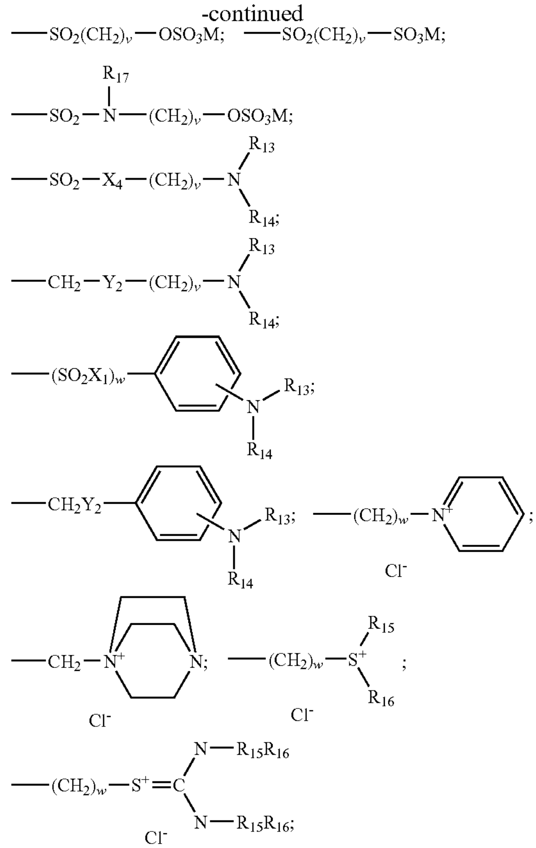

a branched alkoxy radical of the formula

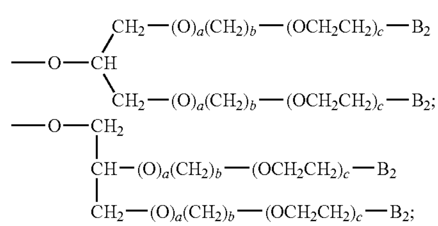

an alkylethyleneoxy unit of the formula -$(T_1)_d$-$(CH_2)_b$$(OCH_2CH_2)_a$—$B_3$ or an ester of the formula $COOR_{18}$, in which $B_2$ is hydrogen; hydroxyl; $C_1$-$C_{18}$alkyl; $C_1$-$C_{18}$alkoxy; —$CO_2H$; —$CH_2COOH$; —$SO_3^-M_1$; —$OSO_3^-M_1$; —$PO_3^{2-}M_1$; —$OPO_3^{2-}M_1$; and mixtures thereof, $B_3$ is hydrogen; hydroxyl; —COON; —$SO_3^-M_1$; —$OSO_3^-M_1$ or $C_1$-$C_4$alkoxy, $M_1$ is hydrogen; alkalimetal-ion or an ammonium ion, $T_1$ is —O— or —NH—, $X_1$ and $X_4$ independently of one another are —O—; —NH— or —N($C_1$-$C_4$alkyl)-, $R_{11}$ and $R_{12}$ independently of one another are hydrogen; a sulfo group and salts thereof; a carboxyl group and salts thereof or a hydroxyl group; at least one of the radicals $R_{11}$ and $R_{12}$ being a sulfo or carboxyl group or salts thereof, $Y_2$ is —O—; —S—; —NH— or —N($C_1$-$C_4$alkyl)-, $R_{13}$ and $R_{14}$ independently of one another other are hydrogen; $C_1$-$C_4$alkyl; hydroxy-$C_1$-$C_4$alkyl; cyano-$C_1$-$C_4$alkyl; sulfo- $C_1$-$C_4$alkyl; carboxy or halogen-$C_1$-$C_4$alkyl; unsubstituted phenyl or phenyl substituted by at least one substitutent chosen from the group consisting of halogen, $C_1$-$C_4$alkyl and $C_1$-$C_4$alkoxy; sulfo or carboxyl or $R_{13}$ and $R_{14}$ together with the nitrogen atom to which they are bonded form a form morpholino, piperazine or piperidine ring, $R_{15}$ and $R_{16}$ independently of one another are $C_1$-$C_4$alkyl or aryl-$C_1$-$C_4$alkyl radicals, $R_{17}$ is hydrogen; an unsubstituted $C_1$-$C_4$alkyl or $C_1$-$C_4$alkyl substituted by at least one substitutent chosen from the group consisting of halogen, hydroxyl, cyano, $SO_3H$, —$NH_2$, phenyl, carboxyl, carb-$C_1$-$C_4$alkoxy or $C_1$-$C_6$alkoxy, $R_{18}$ is $C_1$-$C_{10}$alkyl; branched $C_3$-$C_{10}$alkyl; $C_1$-$C_{10}$alkenyl or branched $C_3$-$C_{10}$alkenyl; $C_3$-$C_{22}$glycol; $C_1$-$C_{10}$alkoxy; branched $C_3$-$C_{10}$alkoxy; and mixtures thereof, M is hydrogen; $Na^+$; $K^+$ or an ammonium ion, $Z_2^-$ a is a alkanolate; a hydroxyl ion; $R_0COO^-$; $ClO_4^-$; $BF_4^-$;$PF_6^-$;$R_0SO_3^-$; $SO_4^{2-}$; $NO_3^-$; $F^-$; $Cl^-$; $Br^-$; $I^-$; citrate ion; tartrate ion or oxalate ion, wherein $R_0$ is hydrogen; or unsubstituted $C_1$-$C_{18}$alkyl; or $C_1$-$C_{18}$alkyl, which is substituted by at least one substituent chosen from the group consisting of hydroxyl, cyano, carboxyl, $SO_3H$, —$NH_2$, carb-$C_1$-$C_6$alkoxy, $C_1$-$C_6$alkoxy, phenyl, naphthyl and pyridyl; unsubstituted aryl or aryl, which is substituted by at least one substituent chosen from the group consisting of hydroxyl, cyano, carboxyl, $SO_3H$, —$NH_2$, carb-$C_1$-$C_6$alkoxy, $C_1$-$C_6$alkoxy and $C_1$-$C_4$-alkyl, a is 0 or 1, b is from 0 to 6, c is from 0 to 100, d is 0; or 1, e is from 0 to 22, v is an integer from 2 to 12, w is 0 or 1, and $A^-$ is an organic or inorganic anion, and s is equal to $r_2$, $r_3$, $r_4$ and $r_5$ in cases of monovalent anions $A^-$ and is $\leq r_2$, $r_3$, $r_4$ and $r_5$ in cases of polyvalent anions, it being necessary for $A_s^-$ to compensate the positive charge; where, when $r_2$, $r_3$, $r_4$ and $r_5 \neq 1$, the radicals $Q_1$ can be identical or different, each L is independently from each other a direct bond; —$SO_2$—; —O—; —$OR_{19}$—; —$OR_{19}$O—; —$OR_{19}$($R_{20}$)—; —N($R_{20}$)—; —($CH_2CH_2O$—)$_n$—; —C(O)—; —C(O)N($R_{20}$)—; —N($R_{20}$)C(O)—; —OC(O)—; —C(O)O—; —S—; unsubstituted, linear or branched $C_1$-$C_{18}$alkylene; linear or branched $C_1$-$C_{18}$alkylene, which is substituted by at least one substituent chosen from the group consisting of hydroxyl, cyano, $SO_3H$, —$NH_2$, carboxyl, carb-$C_1$-$C_4$alkoxy, $C_1$-$C_4$alkoxy, phenyl, naphthyl and pyridyl; unsubstituted $C_5$-$C_{18}$arylene; $C_5$-$C_{18}$arylene, which is substituted by at least one substituent chosen from the group consisting of hydroxyl, cyano, carboxyl, carb-$C_1$-$C_4$alkoxy, $C_1$-$C_4$alkoxy and $C_1$-$C_4$alkyl; unsubstituted, linear or branched $C_1$-$C_{18}$alkylene-$C_5$-$C_{18}$aryl; linear or branched $C_1$-$C_{18}$alkylene-$C_5$-$C_{18}$aryl, which is substituted by at least one substituent chosen from the group consisting of hydroxyl, cyano, $SO_3H$, —$NH_2$, carboxyl, carb-$C_1$-$C_4$alkoxy, $C_1$-$C_4$alkoxy, $C_1$-$C_4$alkyl, phenyl, naphthyl, and pyridyl; unsubstituted, linear or branched $C_5$-$C_{18}$arylene-$C_1$-$C_{18}$alkyl or linear or branched $C_5$-$C_{18}$arylene-$C_1$-$C_{18}$alkyl, which is substituted by at least one substituent chosen from the group consisting of hydroxyl, cyano, $SO_3H$, —$NH_2$, carboxyl, carb-$C_1$-$C_4$alkoxy, $C_1$-$C_4$alkoxy, $C_1$-$C_4$alkyl, phenyl, naphthyl and pyridyl, wherein $R_{19}$ is unsubstituted, linear or branched $C_1$-$C_{18}$alkylene; linear or branched $C_1$-$C_{18}$alkylene, which is substituted by at least one substituent chosen from the group consisting of hydroxyl, cyano, $SO_3H$, —$NH_2$, carboxyl, carb-$C_1$-$C_4$alkoxy, $C_1$-$C_4$alkoxy, phenyl, naphthyl and pyridyl; unsubstituted $C_5$-$C_{18}$arylene; $C_5$-$C_{18}$arylene, which is substituted by at least one substituent chosen from the group consisting of hydroxyl, cyano, $SO_3H$, —$NH_2$, carboxyl, carb-$C_1$-$C_4$alkoxy, $C_1$-$C_4$alkoxy and $C_1$-$C_4$alkyl; unsubstituted, linear or branched $C_1$-$C_{18}$alkylene-$C_5$-$C_{18}$aryl; linear or branched $C_1$-$C_{18}$alkylene-$C_5$-$C_{18}$aryl, which is substituted by at least one substituent chosen from the group consisting of hydroxyl, cyano, $SO_3H$, —$NH_2$, carboxyl, carb-$C_1$-$C_4$alkoxy, $C_1$-$C_4$alkoxy, $C_1$-$C_4$alkyl, phenyl, naphthyl and pyridyl; unsubstituted, linear or branched $C_5$-$C_{18}$arylene-$C_1$-$C_{18}$alkyl or linear or branched $C_5$-$C_{18}$arylene-$C_1$-$C_{18}$alkyl, which is substituted by at least one substituent chosen from the group consisting of hydroxyl, cyano, carboxyl, carb-$C_1$-$C_4$alkoxy, $C_1$-$C_4$alkoxy, $C_1$-$C_4$alkyl, phenyl, naphthyl and pyridyl, $R_{20}$ is unsubstituted, linear or branched $C_1$-$C_{18}$alkyl; linear or branched $C_1$-$C_{18}$alkyl, which is substituted by at least one substituent chosen from the group consisting of hydroxyl, cyano, $SO_3H$, —$NH_2$, carboxyl, carb-$C_1$-$C_4$alkoxy, $C_1$-$C_4$alkoxy, phenyl, naphthyl and pyridyl; unsubstituted $C_5$-$C_{18}$aryl; $C_5$-$C_{18}$aryl, which is substituted by at least one substituent chosen from the group consisting of hydroxyl, cyano, $SO_3H$, —$NH_2$, carboxyl, carb-$C_1$-$C_4$alkoxy, $C_1$-$C_4$alkoxy and $C_1$-$C_4$alkyl; unsubstituted, linear or branched $C_1$-$C_{18}$alkoxy or linear or branched $C_1$-$C_{18}$alkoxy, which is substituted by at least one substituent chosen from the group consisting of hydroxyl, cyano, $SO_3H$, —$NH_2$, carboxyl, carb-$C_1$-$C_4$alkoxy, $C_1$-$C_4$alkyl, phenyl, naphthyl and pyridyl, N is 1; 2; 3 or 4, each D is independently from each other a dyestuff radical of formula (I), (II), (III), (IV), (V), (VI), (VII), (VIII), (IX), (X), (XI), (XII), (XIII), (XIV), (XV), (XVI), (XVII), (XVIII), (XIX), (XX), (XXI), (XXII), (XXIII), (XXIV), (XXV), (XXVI), (XXVIIa), (XXVIIb), (XXVIIc), (XXVIId), (XXVIII), (XXIX), (XXX), (XXXI), (XXXII), (XXXIII), (XXXIV), (XXXV), (I'), (II'), (IV'), (V'), (VI'), (VIIa'), (VIIb'), (VIII'), (IX'), (X'), (XI'), (XIII'), (XIV'), (XV'), (XVI'), (XVII'), (XIX'), (XX'), (XXI'), (XXVIIa'), (XXVIIb'), (XXVIIc'), (XXVIId'), (XXVIII'), (XXIX'), (XXX'), (XXXI'), (XXXII'), $r_2$ is 0 or 1, $r_3$ is 0 or 1, and $r_4$ is 0 or 1.

A further embodiment of the present invention relates to process of production of the compounds of formula (1a) and (1b):

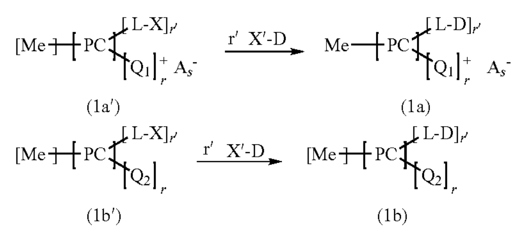

wherein X and X' are a leaving group and all other substituents have the meaning as defined above.

For the synthesis of metal phthalocyanines, two different pathways may be followed: either the initial synthesis of a metal-free phthalocyanine derivative and subsequent complexation with a metal salt or the synthesis of a phthalocyanine ring system from a simple benzenoid precursor by concomitant incorporation of the metal ion.

Substituents can be introduced before or after the formation of the phthalocyanine ring system. In the former case, this leads to derivatives with substituents in all four rings, whereas in the latter case the degree of substitution will be variable.

By an introduction of suitable substituents, water-soluble phthalocyanines can be obtained after known procedures (DE1569783, DE1569729, DE2021257, DE1794298). The synthesis and use of such metal phthalocyanines for the use as photoactivators are also known (DE0081462 and references cited therein).

A suitable method to obtain water-soluble phthalocyanine is the introduction of sulfonate groups. Generally, the sulfonated phthalocyanines are not pure substances, but complex mixtures of different positional isomers. Also the degree of sulfonation is varying and normally not whole-numbered. For example, a tetra sodium salt of the Zinc phthalocyanine can be prepared after known procedure [J. Griffiths et al., Dyes and Pigments, Vol 33, 65-78 (1997) and literature cited therein].

In the present application, a water-soluble phthalocyanine molecule is being linked through covalent bonds with a dye molecule. A convenient way to realize this linkage is the synthesis of a metal phthalocyanine sulfonyl chloride by a sulfochlorination reaction after known procedures [DE2812261, DE0153278]. By varying the amount of the sulfochlorination agent, the desired degree of sulfochloride content can be adjusted. The sulfochlorination reaction of phthalocyanines generally leads to a main product, but as by-products small amounts of lower or higher degree of sulfonyl chloride groups are detected.

The resulting reactive phthalocyanine-sulfonylchloride can then be reacted further with a suitable dye having an amino group.

To illustrate the synthesis, the following synthetic examples leading to Zinc and Aluminium Phtalocyanines linked with amino-functionalized azo-dyes are given. The syntheses are performed as shown in the following scheme. From the possible positional isomers, only one is shown. The formation of the side products (degree of $SO_3R$ and $SO_2Cl$) is not shown.

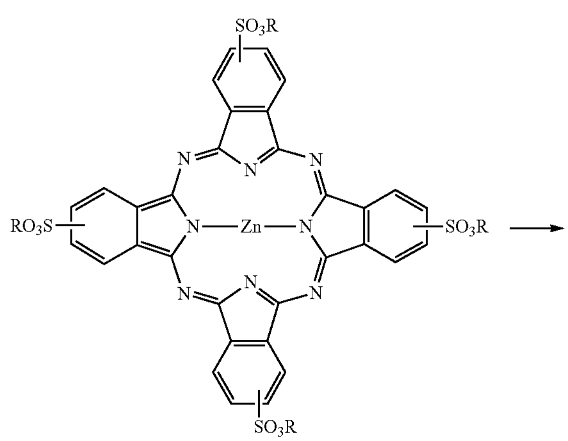

DS 3-4

-continued

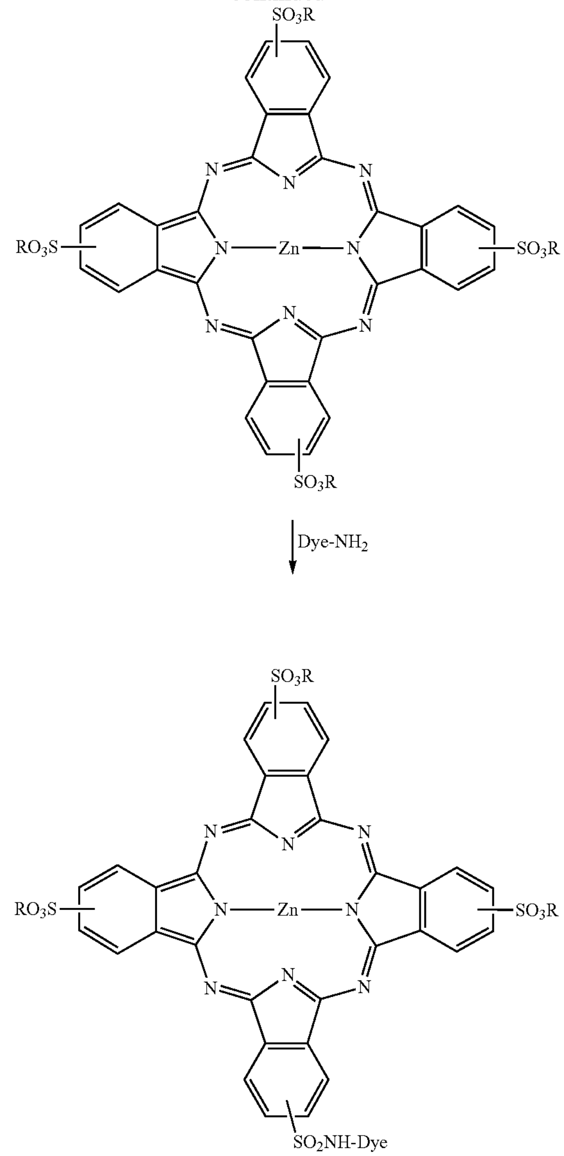

R = H or Na

The following Examples serve to illustrate the invention but do not limit the invention thereto. Parts and percentages relate to weight, unless otherwise indicated. Temperatures are in degrees Celsius, unless otherwise indicated.

SYNTHESIS EXAMPLES

General Procedures

1) Synthesis of a Sulfonated Zinc Phthalocyanine Sulfonyl Chloride

Normally the sulfonated Zinc phthalocyanine tetrasulfonic acid sodium salt is a mixture of different isomers with an average degree of sulfonation about 3.6-3.8. The main components are various isomers of tetrasulfonated and trisulfonated Zinc phthalocyanines. Before the reaction, the mate rial must be dried by freeze drying or spray drying. The dried Zinc phthalocyanine tetrasulfonic acid sodium salt (1 mol) is slowly added under stirring to chlorosulfuric acid (3.5 mol) at room temperature. The reaction mixture is heated at 90-95° C. for 30 minutes. At this temperature a certain amount of thionyl chloride (1.5 mol) is added dropwise. If the sulfonated Zinc phthalocyanine tetrasulfonic acid sodium salt contains considerable amounts of water (determination according the Karl-Fischer method), more thionyl chloride (up to 8 mol) must be added. Stirring is continued for another 90 minutes at 90° C. The reaction mixture is cooled down to room temperature and added to an excess of ice. The formed green precipitate is filtered off, washed with aqueous sodium chloride (3%) and dried. The crude green intermediate is directly used for the next reaction step.

2) Synthesis of a Zinc Phthalocyanine Dye Conjugate

To an aqueous stirred solution of the corresponding dye (0.35 mol) is added the Zinc phthalocyanine sulfonyl chloride prepared in example 1. During the addition, pH is adjusted to 7 with aqueous solution of sodium hydroxide. The reaction mixture is reacted at pH 7 for 8 hours at room temperature. The reaction control is done by TLC (solvent pyridine 25 ml/N,N-diethyl amine 33 ml/3-methylbutanol/aqueous ammonia (25%) 25 ml). When no starting dye can be detected, the reaction solution is worked-up.

Work-up and Purification:

The reaction mixture is desalted by dialysis (cellulose tubes) or by nanofiltration through a suitable membrane. The desalted reaction solution containes the isomeric mixture of covalently linked sulfonated Zinc phthalocyanine dye conjugates and starting material (Zinc phthalocyanine tetrasulfonic acid). The obtained blue reaction solution can be directly used for the synthesis of liquid or solid formulations.

A solid Zinc phthalocyanine dye conjugate can be obtained by freeze-drying the desalted solution.

Because there are a lot of possible isomers with regard to the position of the sulfonic acid group and the sulfonamide linkage, the idealized structures are given.

The sulfonic acid functions can exist in the free acid form or as in the sodium salt form or as a mixture thereof.

Example 1

1. a) Synthesis of Zinc Phthalocyanine Monosulfonyl Chloride

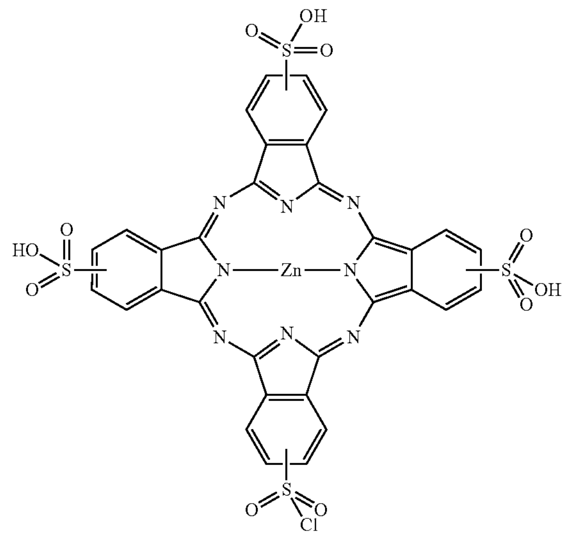

138.6 g Zinc phthalocyanine tetrasulfonic acid sodium salt, 337 ml chlorosulfuric acid and 16 ml of thionylchloride are reacted as given in the general procedure. The reaction mixture is given onto 300 g of ice. The precipitate is isolated as described above.

Yield: 696.5 g, green humid solid.

b) Synthesis of a Zinc Phthalocyanine Bisazo Dye Conjugate

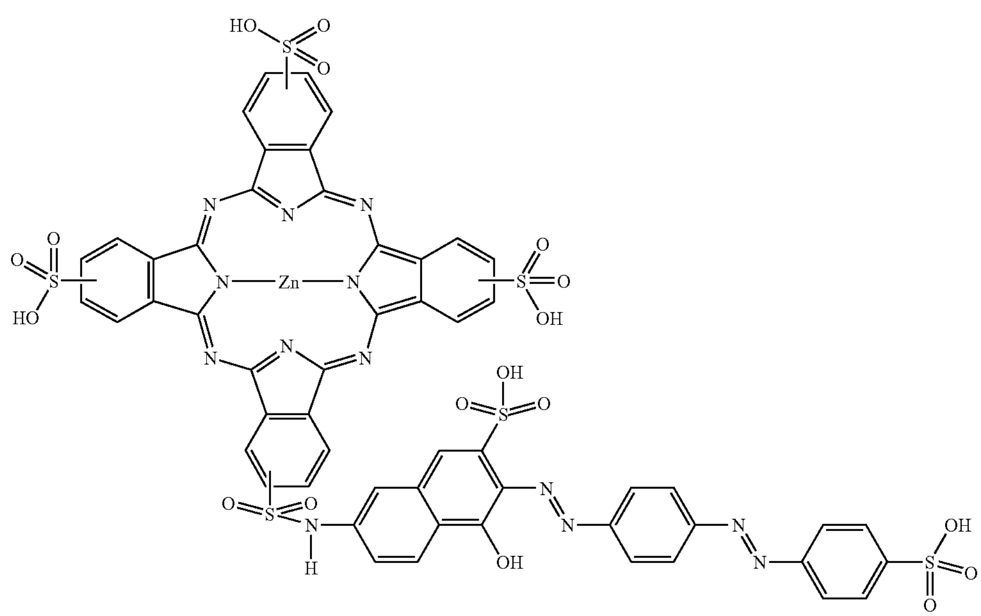

To a solution of 1.7 g dye (prepared according to known procedures by diazotation of commercially available 4-amino-azobenzol-4'-sulfonic acid and subsequent coupling to J-acid) in 25 ml destilled water is added under stirring 6.4 g of crude Zinc phthalocyanine monosulfonyl chloride from example 1a. The reaction mixture is diluted with 15 ml destilled water. A pH value of 6.1 of the reaction mixture is adjusted by addition of 1 N sodium hydroxide solution. The reaction is stirred for 10 hours at room temperature. After the reaction is complete (TLC control with solvent mixture pyridine 12.5 ml/N,N-diethylamine 16.6 ml/3-methylbutanol 8.3 ml, aqueous ammonia 25% 12.5 ml), the product is precipitated with a mixture of 400 ml of an aqueous (1.5%) sodium chloride solution and 30 ml isopropanol. The crude dark blue reaction product is filtered off and dried at room temperature.

The purification step (precipitation with sodium chloride solution/isopropanol) is repeated twice to obtain a pure product.

Yield: 1.2 g (48%), violet solid.

Alternatively, the purification can be done by chromatography. The reaction mixture is concentrated in vacuum and the crude product cleaned by thin layer chromatography (silicagel, solvent mixture as given above).

The substance is characterized by liquid chromatography in combination with UV absorption studies (LC-UV) and mass spectroscopy.

UV spectra: $\lambda_{max}$ 520 and 670 nm.

$M^+$ (MALDI-TOF): 1409 ($M++H^+$). Assignment of fragments are listed in the following table.

| mass | fragment |
| --- | --- |
| 1135 | 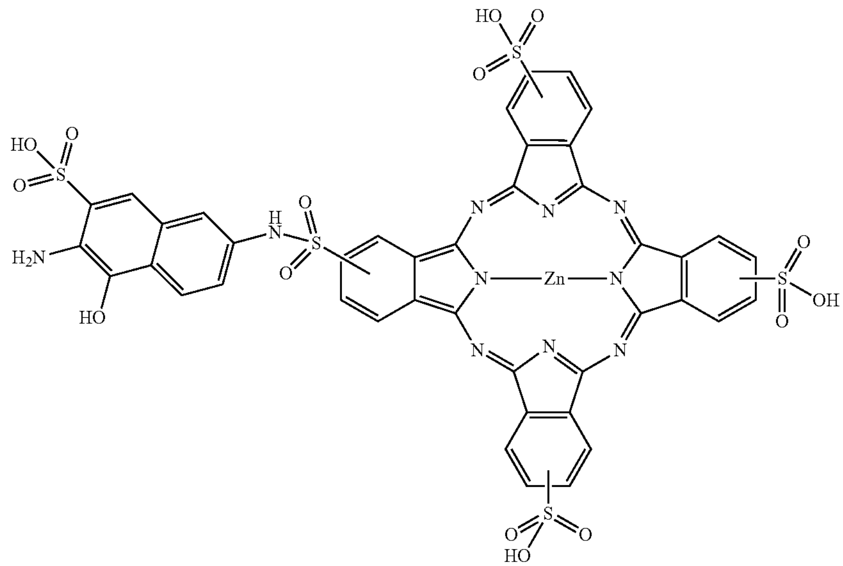 |
| 1054 | 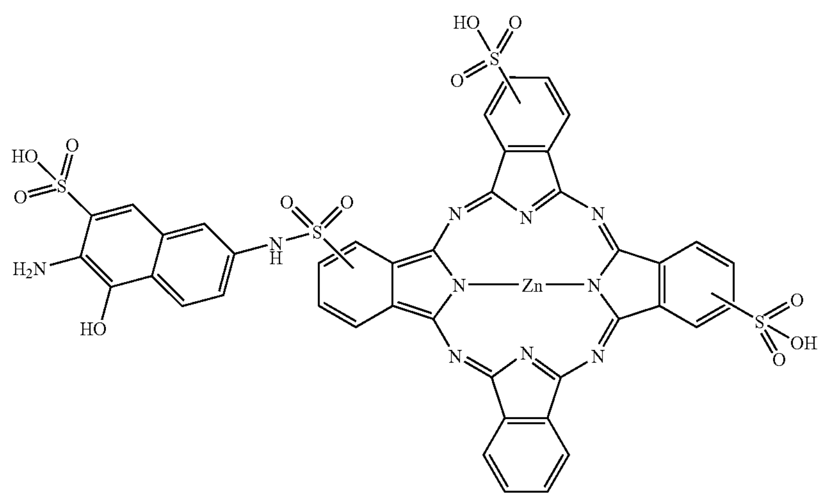 |

Example 2

Synthesis of a Zinc Phthalocyanine Bisazo Dye Conjugate

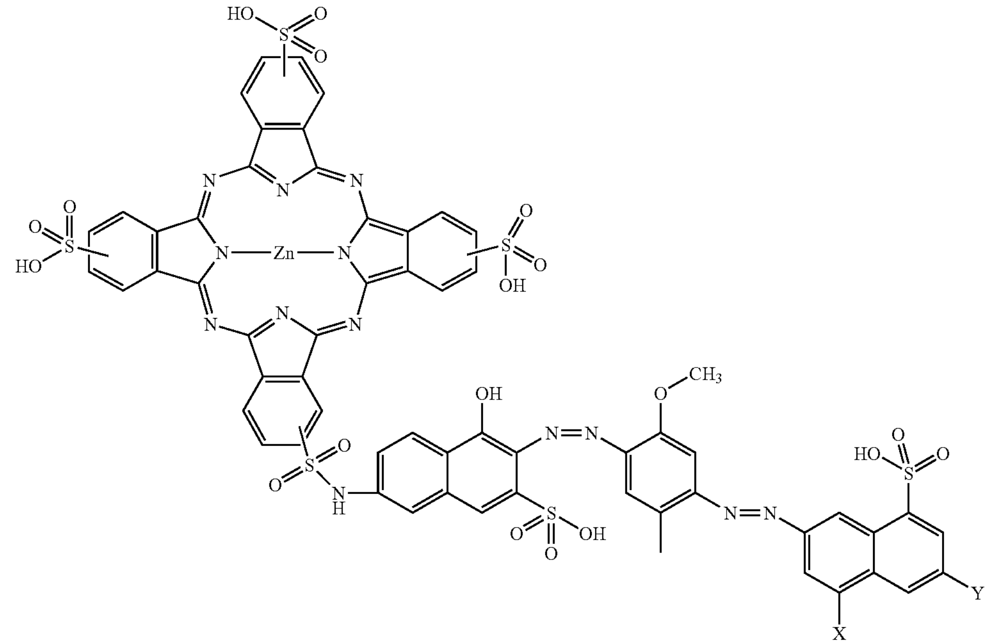

x = H, y = $SO_3H$
x = $SO_3H$, y = H 184.8 g of a commercial available aqueous solution of Direct Violet 99 (trade name: Pontamine Brilliant Violet, dye concentration around 10%) is diluted with 1.5 l water. In this dye solution, 696.5 g sulfonated Zinc phthalocyanine mono-sulfonylchloride from example 1a is added and reacted as described in the general procedure. After 12 h stirring at room temperature the reaction is complete. The aqueous solution is desalted by dialysis (cellulose tube, Fisherbrand, MWCO 12.000-14.000). After 12 h of dialysis, the amount of chloride and sulfat salts is checked. Normally dialysis is complete, otherwise dialysis must be continued for 20 hours. The obtained solution is freeze-dried to get a blue solid.

UV-spectra $\lambda_{max}$ 340, 540, 670 nm $^1$H NMR (DMSO-$d_6$) δ=15.99 (Ar—OH), 11.50 (SO2-NH-dye), 9.3-10.0 (aromatic hydrogens), 8.0-9.0 (aromatic hydrogens), 7.45 (aromatic hydrogens), 4.02 ($OCH_3$), 2.69 ($ArCH_3$) ppm.

Molecular formula (idealized structure given above, free acid form) $C_{60}H_{37}N_{13}O_{22}S_7Zn$ (1581.9).

MS (ESI) m/z 448 $[M-2H]^{2-}$, tetrasulfonated Zn pc (Zinc phthalocanine), 897 $[M-H]^{1-}$, tetrasulfonated Zn pc, 817, 407, 1225 (trisulfonated Zn pc), 789 $[M-2H]^{2-}$, tetrasulfonated Zn pc dye conjugate, 749 ($[M-2H]^{2-}$ trisulfonated Zn pc dye conjugate).

The Zinc phthalocyanine dye conjugates containes considerable amounts of starting material, therefore the resulting mixture can be described with the following general formula:

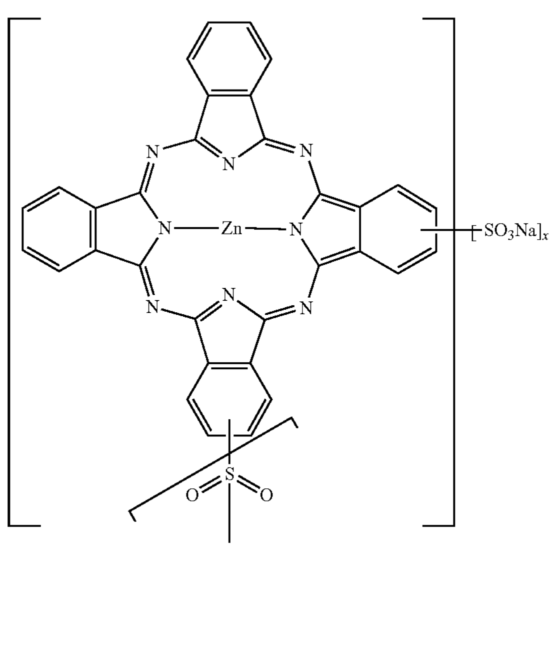

-continued

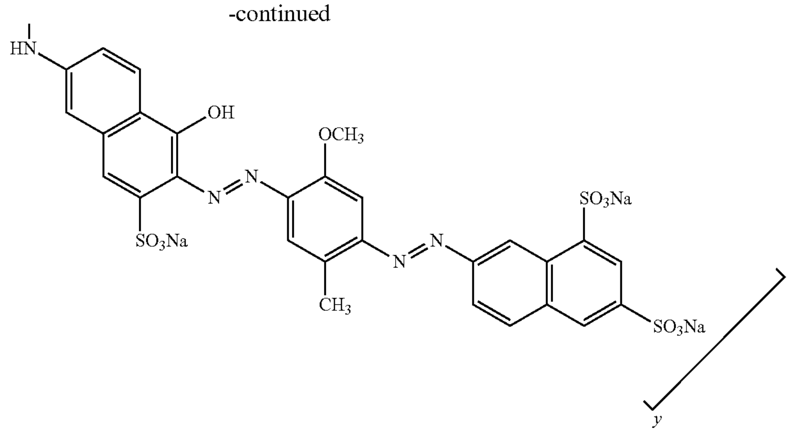

x + y = 3.6 - 3.8
y = 0.5

Formula of the resulting mixture: $C_{46}H_{21.8}N_{10.5}ZnNa_{4.7}O_{16.1}S_{5.2}$ (1318.3)

The dye conjugate contained 14.8% water.

Elemental analysis: $C_{calc.}$35.6%, $C_{found}$ 36.20%.

Example 3

Synthesis of a Zinc Phthalocyanine Bisazo Dye Conjugate 687 mg Zinc phthalocyanine tetrasulfonic acid sodium salt, 1.67 ml chlorosulfuric acid and 78.5 µl of thionylchloride are reacted and worked-up as given in the general procedure. The dye component is synthesized by a known procedure. As first step 2-naphthylamino-4,8-disulfonic acid (C-acid) is diazotized and coupled with 2-(2-amino-4-methylphenoxy)ethanol. This intermediate is again diazotized and coupled with 2-amino-5-naphthol-7-sulfonic acid (J-acid).

128 mg of the violet dye is dissolved in 15 ml of water and reacted with the crude Zinc-phthalocyanine sulfonylchloride according to the general procedure. The obtained solution is freeze-dried to get a blue solid.

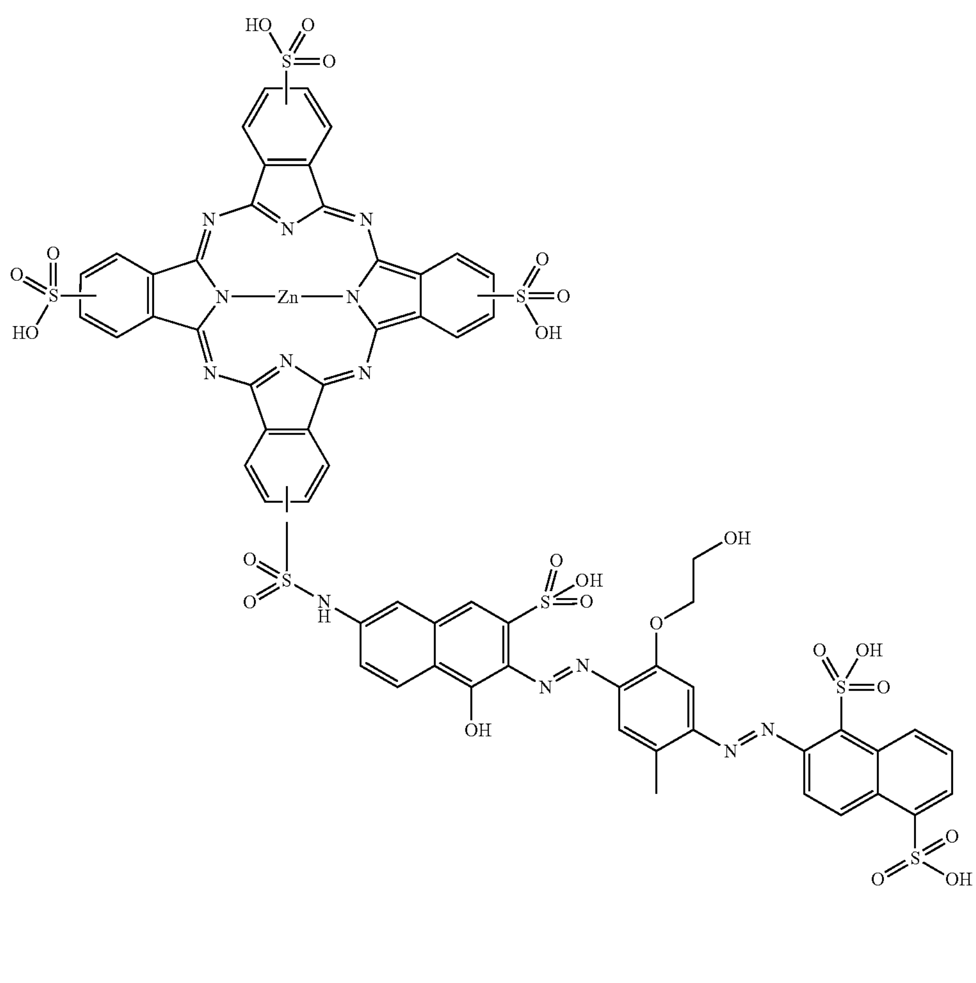

Example 4

Synthesis of a Zinc Phthalocyanine Bisazo Dye Conjugate

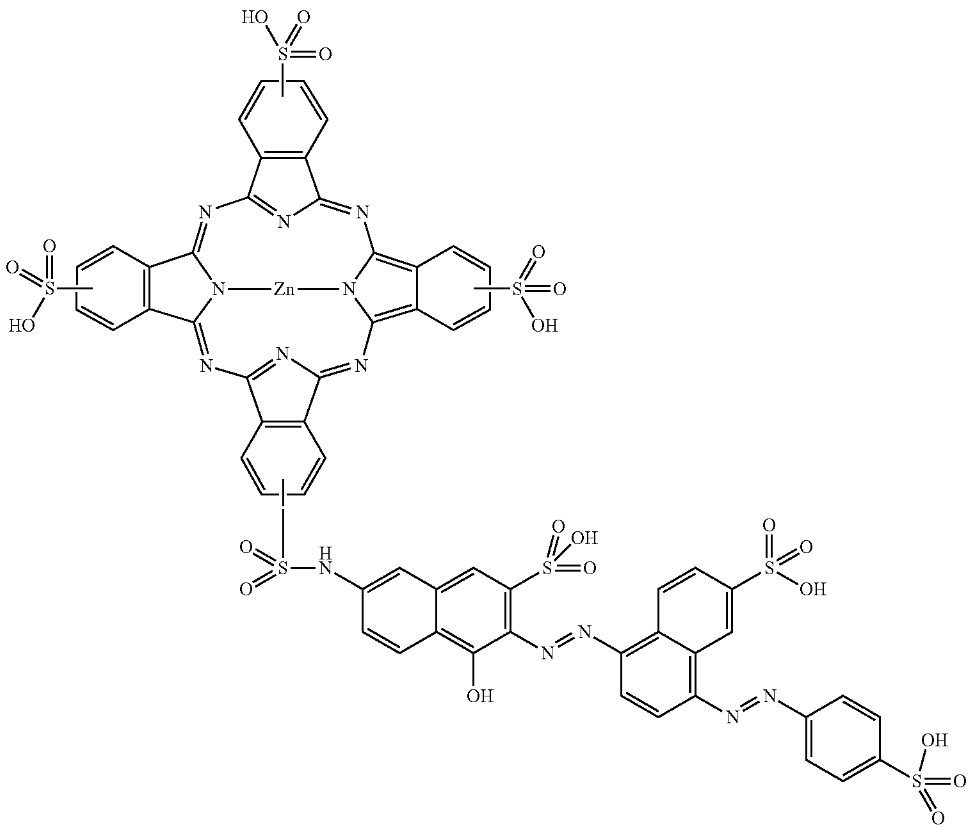

687 mg Zinc phthalocyanine tetrasulfonic acid sodium salt is activated to the Zinc phthalocyanine sulfonylchloride as described in the general procedure.

The used dye is prepared by a diazotizaton/coupling procedure starting from sulfanilic acid and 1-naphthylamine-6-sulfonic acid (1,6-Cleve acid). This intermediate is diazotized and coupled with J-acid.

115 mg of violet dye is dissolved in 15 ml of water and reacted with the crude Zinc-phthalocyanine sulfonylchloride according to the general procedure. The obtained solution is freeze-dried to get a blue solid.

Example 5

Synthesis of a Zinc Phthalocyanine Bisazo Dye Conjugate

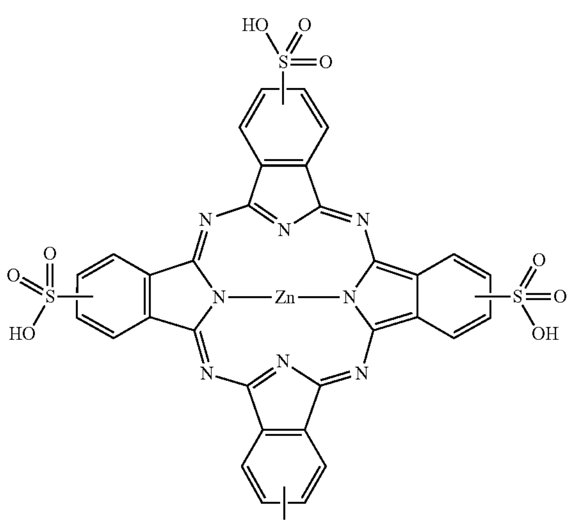

-continued

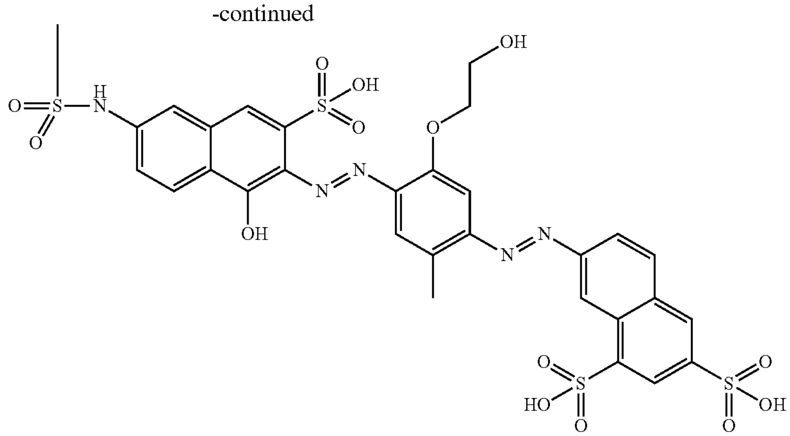

7.6 g Zinc phthalocyanine tetrasulfonic acid sodium salt is activated to the Zinc phthalocyanine sulfonylchloride as described in the general procedure.

The violet dye is prepared after known procedures by diazotization and coupling of 2-naphthylamino-6,8-disulfonic acid (amino-G-acid) to 2-(2-amino-4-methylphenoxy)ethanol. The intermediate is subsequently coupled with J-acid.

To an aqueous solution of 1.5 g dye in 45 ml of water is added the crude Zinc phthalocyanine sulfonyl chloride and reacted as described in the general procedure.

Work-up: The crude Zinc phthalocyanine dye conjugate is isolated by a mixture of aqueous of sodium chloride (1.5%) and isopropanol.

Yield: 8 g crude dye, blue solid.

Example 6

Synthesis of a Zinc Phthalocyanine Bisazo Dye Conjugate

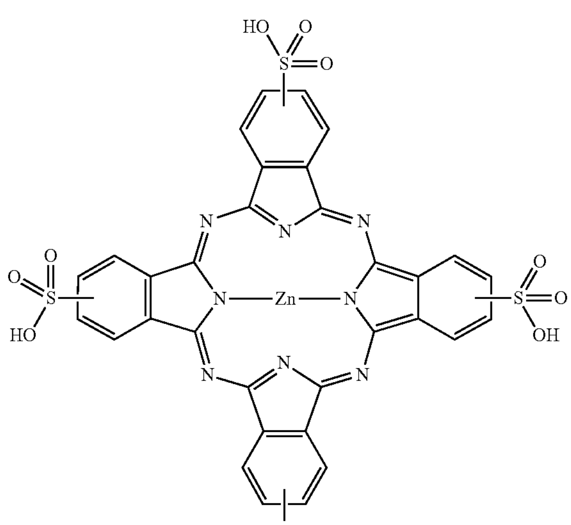

-continued

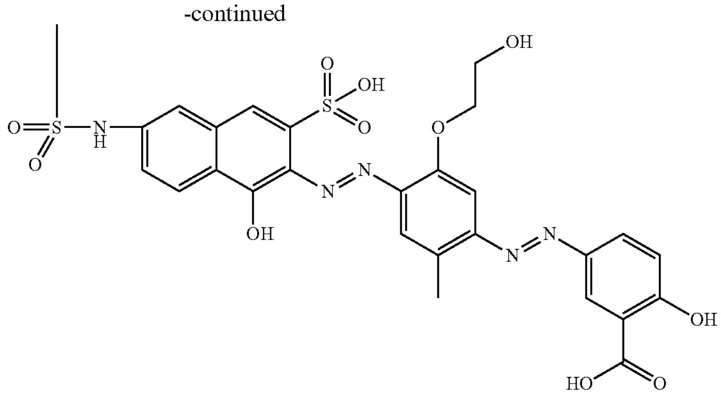

2.5 g Zinc phthalocyanine tetrasulfonic acid sodium salt is activated to the sulfonylchloride as described in example 3.

The violet dye is prepared according to known procedures by diazotization and coupling of 5-amino-salicylic acid to 2-(2-amino-4-methylphenoxy)ethanol. The intermediate is subsequently coupled to J-acid.

To a solution of 400 mg dye in 25 ml water is added the crude Zinc phthalocyanine sulfonylchloride and reacted as described in the general procedure. Work-up is done according to example 5.

Yield: 2 g Zinc phthalocyanine dye conjugate, blue solid.

Example 7

Synthesis of a Zinc Phthalocyanine Mono Azo Dye Conjugate

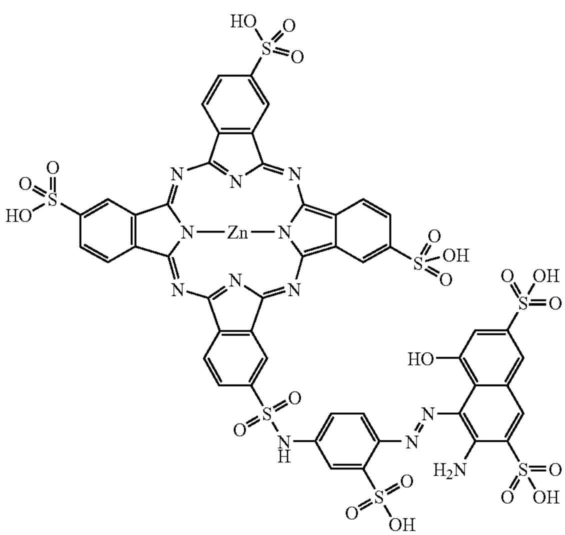

3.84 g Zinc phthalocyanine tetrasulfonic acid sodium salt is activated to the sulfonylchloride and isolated as described in the general procedure.

To a solution of 555 mg of the dye component (prepared according to known procedures by the reaction of 4-nitroaniline-2-sulfonic acid and sulfo-γ-acid and subsequent reduction) in 15 ml of water the crude Zinc-phthalocyanine sulfonylchloride is added and reacted according to the general procedure. The obtained solution is freeze-dried to get a blue solid.

Example 8

Synthesis of a Zinc Phthalocyanine Mono Azo Dye Conjugate

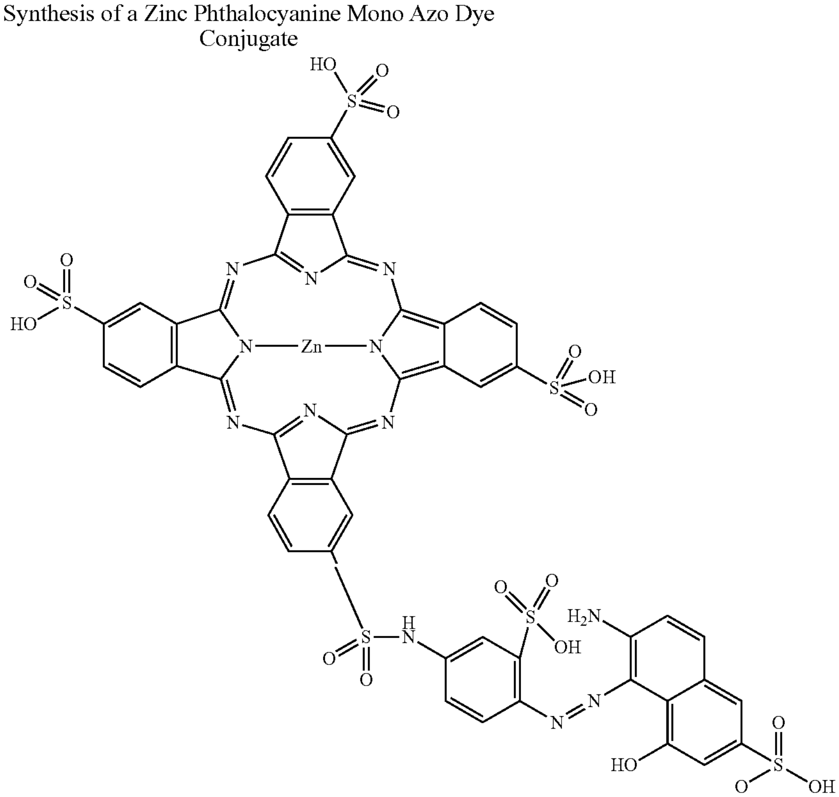

3.84 g Zinc phthalocyanine tetrasulfonic acid sodium salt is activated to the Zinc phthalocyanine sulfonylchloride and isolated as described in the general procedure. The crude Zinc phthalocyanine sulfonylchloride is added to a solution of 469 mg of the dye (prepared according to known procedures by the reaction of 4-nitroaniline-2-sulfonic acid and γ-acid followed by subsequent reduction) in 15 ml of water and reacted as described in the general procedure. The obtained solution is freeze-dried to get a blue solid.

Example 9

Synthesis of a Zinc Phthalocyanine Bis Azo Dye Conjugate

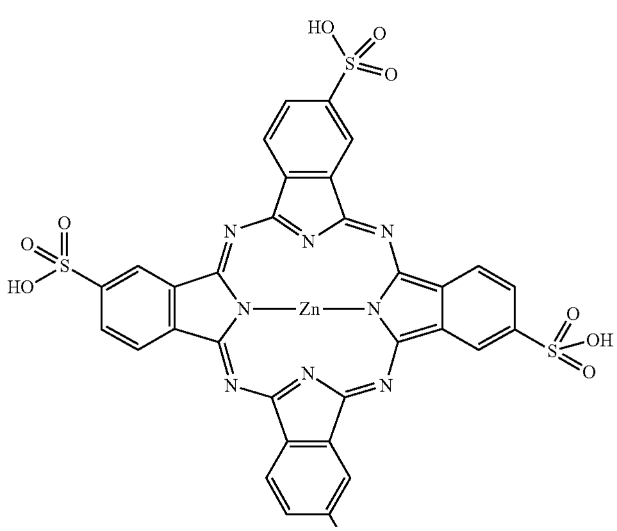

-continued

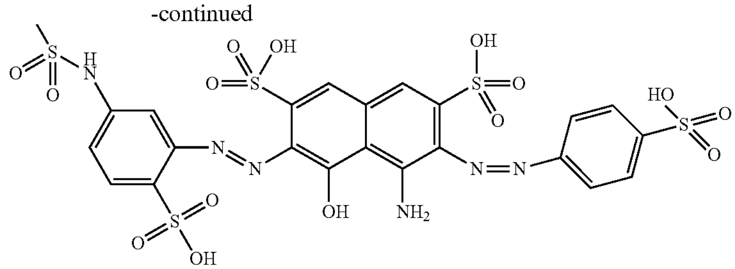

1.44 g Zinc phthalocyanine tetrasulfonic acid sodium salt is activated to the Zinc phthalocyanine sulfonylchloride and isolated as described in the general procedure. The crude Zinc-phthalocyanine sulfonylchloride is added to a solution of 751 mg dye (prepared according to known procedures by the diazotation and coupling reaction of sulfanilic acid and 3-amino-acetanilide-4-sulfonic acid to H-acid followed by a final saponificaton step) in 15 ml of water. The reaction is done according to the general procedure. The obtained solution is freeze-dried to get a blue solid.

Example 10

Synthesis of a Zinc Phthalocyanine Mono Azo Dye Conjugate

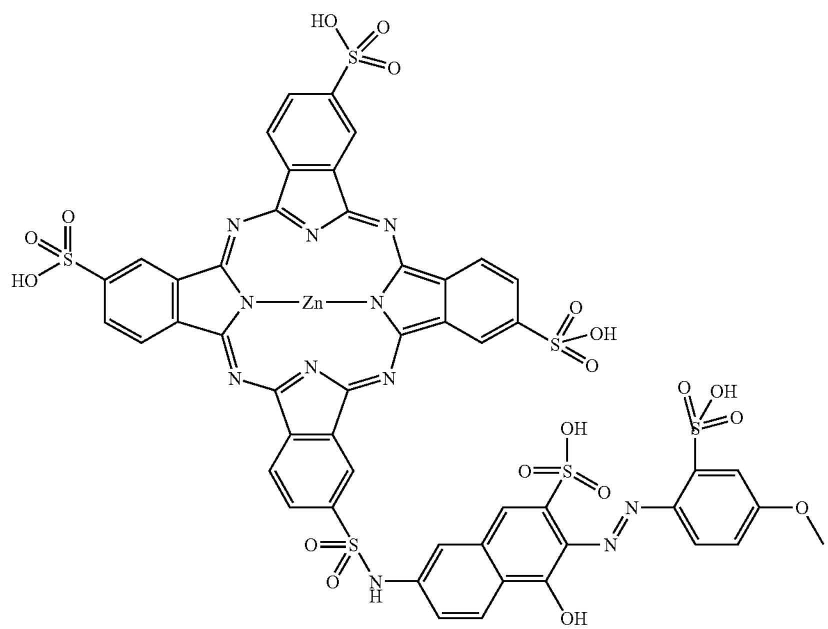

3.84 g Zinc phthalocyanine tetrasulfonic acid sodium salt is activated to the Zinc phthalocyanine sulfonylchloride and isolated as described in the general procedure. The crude Zinc phthalocyanine sulfonylchloride is added to a solution of 485 mg of dye (prepared according to a known procedure by a diazotation and coupling reaction of 4-methoxy-aniline-2-sulfonic acid to J-acid) in 15 ml of water. The solution is reacted and worked-up as described in the general procedure. The obtained solution is freeze-dried to get a blue solid.

Example 11

Synthesis of a Zinc Phthalocyanine Mono Azo Dye Conjugate

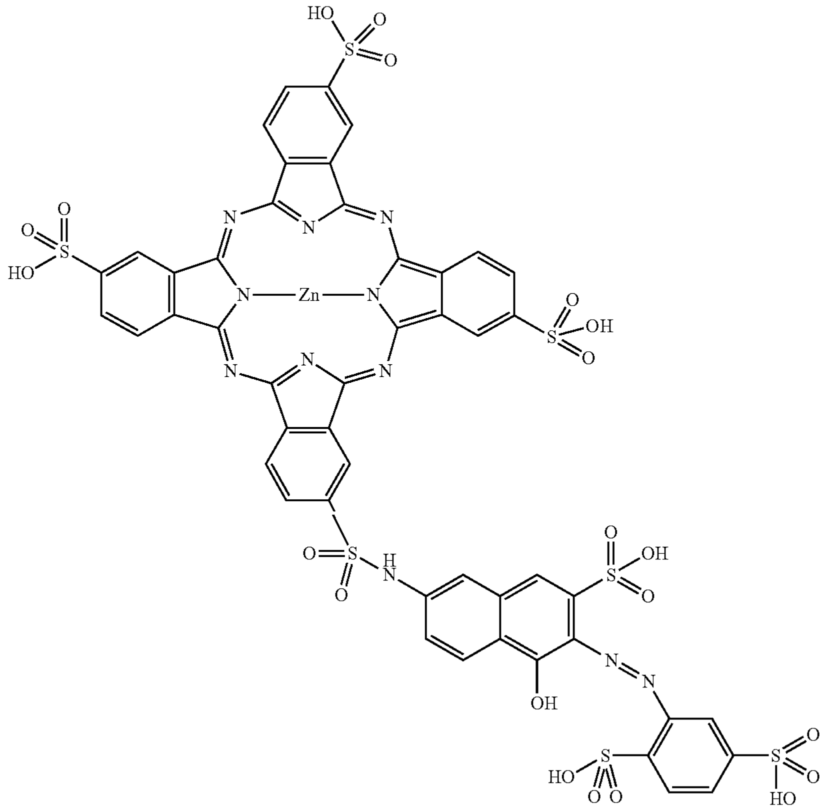

3.84 g Zinc phthalocyanine tetrasulfonic acid sodium salt is activated to the sulfonylchloride and isolated as described in the general procedure.

The crude Zinc phthalocyanine sulfonylchloride is added to a solution of 539 mg of the dye (prepared according to known procedures by a diazotation and coupling reaction of aniline-2,5-disulfonic acid to J-acid), reacted and worked-up as described in the general procedure. The obtained solution is freeze-dried to get a blue solid.

Example 12 a) Synthesis of Aluminium Phthalocyanine Monosulfonyl Chloride

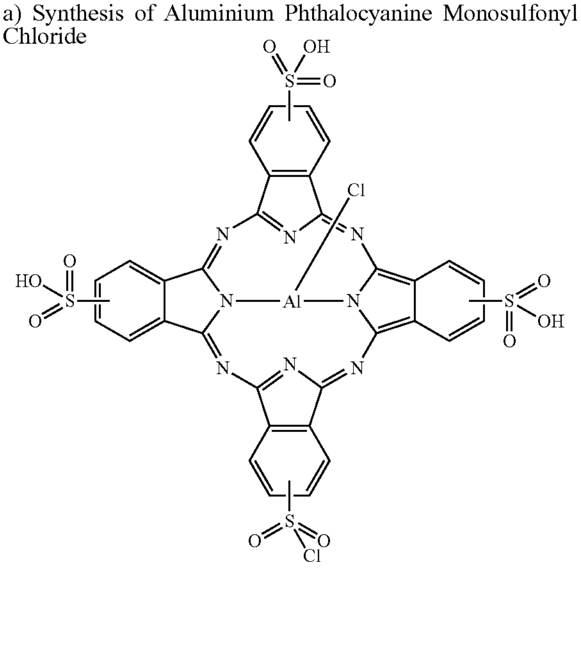

2.63 g of sodium salt of Aluminium phthalocyanine tetrasulfonic acid is added with stirring to 6.5 ml (95.6 mmol) chloro sulfuric acid at room temperature. The reaction mixture is heated at 90° C. for 20 minutes. Within 3 minutes, 313.8 μl of thionyl chloride are carefully added dropwise. Stirring is continued for another 90 minutes at 90° C. The reaction mixture is cooled down to room temperature and, with vigorous stirring, added to 20 g of ice. The formed precipitate is filtered off, washed with 1.5% aqueous NaCl solution (2×5 ml) and dried for 10 minutes with a vacuum pump. The crude product (8.9 g, wet cake) is directly used for the next reaction step.

b) Synthesis of a Aluminium Phthalocyanine Bisazo Dye Conjugate

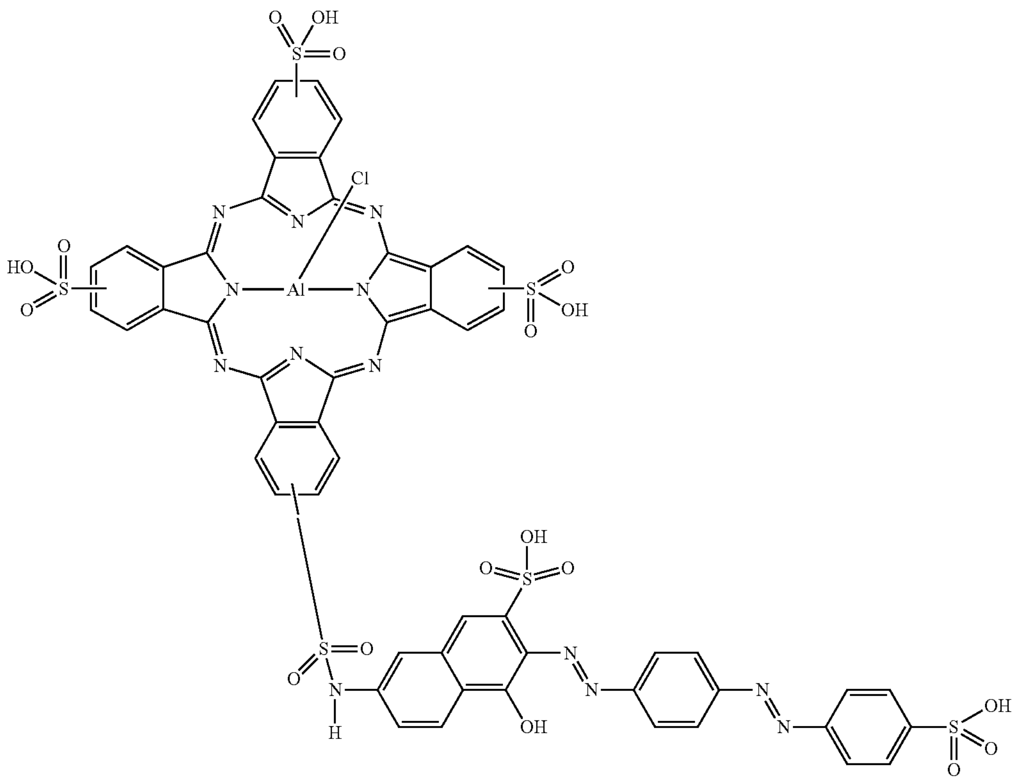

To a solution of 1.7 g Direct Red 254 dye in 25 ml destilled water is added under stirring 6.36 g of crude Aluminium phthalocyanine monosulfonyl chloride from example 12a. The reaction mixture is diluted with 15 ml destilled water. A pH value of 1.7 of the reaction mixture is adjusted by addition of 1 N sodium hydroxide solution (14 ml) to 9.6. The reaction is stirred for 0.5 hours at room temperature. pH is 9.4. Stirring is continued for 17 h at room temperature. TLC is recorded with a solvent mixture of pyridine 12.5 ml/N,N-diethylamine 16.6 ml/isopropylalcohol 10.8 ml, aqueous ammonia 25% 10.1 ml). The product is precipitated with a mixture of 15 ml of an aqueous (3%) sodium chloride solution and 200 ml isopropanol. The crude dark colored reaction product is centrifuged for 10 min. at 1800 rpm. The sticky solid obtained is treated with ethyl acetate to get granular solid, which is dried under vacuum at room temperature.

Yield: 2.1 g, dark colored solid.

UV spectra: $\lambda_{max}$ 295, 355, 509, 610 and 677 nm.

Example 13

Synthesis of a Aluminium Phthalocyanine Bisazo Dye Conjugate

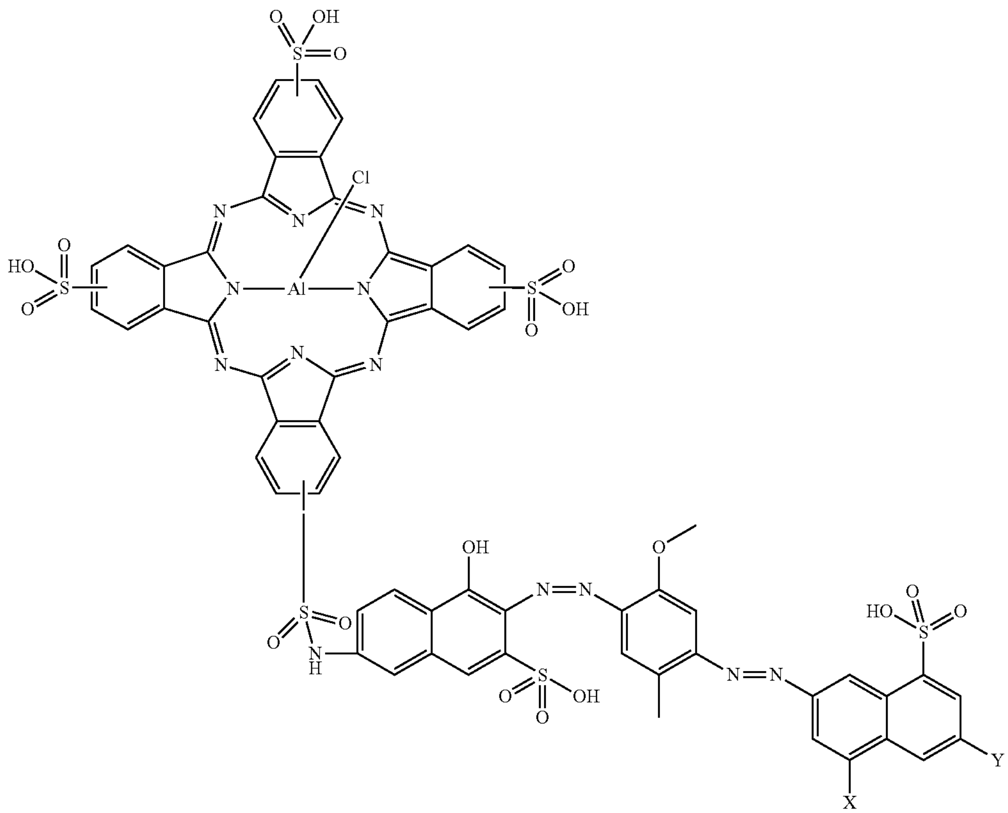

x = H, y = $SO_3H$
x = $SO_3H$, y = H

To a solution of 0.8 g of Pontamine Brilliant BRW in 10 ml of destilled water 2.57 g of Aluminium phthalocyanine monosulfonyl chloride from example 12a is slowly added under stirring. A pH value of 1.9 of the reaction mixture is adjusted by addition of 1 N sodium hydroxide solution (6.5 ml) to 7.6. The reaction is stirred for 0,5 hours at room temperature. Stirring is continued for 17 h at room temperature. TLC is recorded with a solvent mixture of pyridine 12.5 ml/N,N-diethylamine 16.6 ml/isopropylalcohol 8.3 ml, aqueous ammonia 25% 12.5 ml). Work-up and purification (precipitation with sodium chloride/isopropanol) are accomplished as described for example 3b.

Yield: 0.62 g, dark blue solid.

UV spectra: $\lambda_{max}$ 296, 353, 609, and 676 nm. (Peak at 609 is embedded in a hump which starts from 460 nm E pontamine absorption maximum).

APPLICATION EXAMPLES

Degradation Experiments

An aqueous solution of the photocatalyst was exposed in the given concenctration in a closed 50 ml glass bottle to an optical illumination unit (Leitz) equipped with a photooptic lamp Xenophot (Osram HLX 64625). The intensity measured with a Roline RO-1322 Digital Lux meter in front of the bottle was within the range of 111000-120000 Lux.

The degradation of the photocatalyst was determined from spectrophotometric data gained with a HP 8452 Diode array spectrophotometer. The absorption was measured at representative wavelengths of the chromophoric components of the photocatalyst.

(670 nm, 540 nm). While there is only a small overlap at the absorption maximum originating from the Phthalocyanine part (670 nm) of the photocatalyst by the absorption of the attached dye-chromophore, there may be an appreciable overlap at the absorption maximum of the attached dyestuff chromophore itself, depending on its structure, by the Phthalocyanine part. The absorption was determined at the start and then after illumination every 5 respectively 10 min up to 2 hours. The normalized photochemical destruction of the photocatalyst, given as loss in percentage regarding the initial absorption at the selected wavelength is summarized in table 1, covering an illumination period up to 2 hours Example 14

An aqueous solution containing 60mg/l of the blue photocatalyst obtained from Example 2 was illuminated following the procedure outlined above. Upon illumination the photocatalyst was degraded to a high extent regarding both chromophoric parts.

TABLE 1

| Loss of absorption in % upon illumination at relevant wavelength of the chromophors | | |
|---|---|---|
| Time in min | 670 nm | 540 nm |
| 0 | 0.00% | 0.00% |
| 5 | 3.80% | 2.01% |
| 10 | 9.78% | 17.44% |
| 15 | 14.40% | 21.93% |
| 20 | 18.68% | 23.59% |
| 25 | 23.28% | 25.41% |
| 30 | 28.29% | 29.89% |
| 35 | 32.53% | 31.31% |
| 40 | 37.09% | 32.14% |
| 45 | 41.99% | 36.40% |
| 50 | 46.63% | 40.80% |
| 55 | 54.55% | 43.34% |
| 65 | 59.57% | 45.07% |
| 75 | 66.45% | 46.68% |
| 85 | 71.46% | 49.56% |
| 95 | 75.03% | 49.33% |
| 105 | 77.66% | 49.50% |
| 115 | 79.18% | 49.85% |

Example 15

An aqueous solution of the bluish photocatalyst obtained from Example 1 containing 100 mg/l was illuminated following the procedure outlined above at neutral pH. Upon illumination the photocatalyst was degraded to a high extent.

TABLE 2

| Loss of absorption in % upon illumination at relevant wavelength of the chromophors | | |
|---|---|---|
| Time in min | 670 nm | 514 nm |
| 0 | 0.00% | 0.00% |
| 5 | 3.09% | 2.00% |
| 10 | 5.92% | 3.10% |
| 15 | 9.24% | 4.56% |
| 20 | 12.52% | 5.96% |
| 25 | 15.80% | 6.91% |
| 30 | 18.95% | 8.07% |
| 35 | 22.37% | 9.21% |
| 40 | 25.93% | 10.91% |
| 45 | 28.91% | 12.14% |
| 50 | 32.66% | 13.76% |
| 60 | 37.77% | 15.21% |
| 70 | 43.07% | 16.93% |
| 80 | 47.59% | 18.58% |
| 90 | 51.28% | 19.88% |
| 100 | 54.39% | 20.85% |
| 110 | 57.38% | 21.79% |
| 120 | 59.52% | 22.63% |

Example 16

An aqueous solution, adjusted to pH 11 containing 31 mg/l of the blue photocatalyst obtained from Example 2 was illuminated following the procedure outlined above. Upon illumination the photocatalyst was degraded to a very high degree regarding both chromophoric parts.

TABLE 3

| Loss of absorption in % upon illumination at relevant wavelength of the chromophors | | |
|---|---|---|
| Time in min | 670 nm | 540 nm |
| 0 | 0.00% | 0.00% |
| 5 | 8.58% | 11.54% |
| 10 | 16.31% | 20.17% |
| 15 | 24.52% | 27.93% |
| 20 | 32.25% | 36.26% |
| 25 | 39.28% | 42.80% |
| 30 | 45.97% | 47.86% |
| 35 | 51.90% | 51.17% |
| 40 | 57.49% | 56.02% |
| 45 | 62.27% | 58.61% |
| 50 | 66.48% | 61.30% |
| 55 | 70.13% | 63.45% |
| 65 | 76.10% | 67.58% |
| 75 | 80.19% | 68.80% |
| 85 | 83.15% | 70.21% |
| 95 | 85.28% | 71.07% |

Example 17

An aqueous solution containing 60 mg/l of the blue photocatalyst obtained from Example 2 was illuminated at neutral pH following the procedure outlined above. At neutral pH the compound is partially aggregated. Nevertheless upon illumination the photocatalyst was degraded to a high extent regarding both chromophoric parts.

TABLE 4

| Loss of absorption in % upon illumination at relevant wavelength of the chromophors | | |
|---|---|---|
| Time in min | 670 nm | 540 nm |
| 5 | 0.35% | 12.12% |
| 10 | 6.54% | 25.96% |
| 15 | 11.33% | 29.98% |
| 20 | 15.77% | 31.48% |
| 25 | 20.53% | 33.10% |
| 30 | 25.72% | 37.12% |
| 35 | 30.11% | 38.40% |
| 40 | 34.83% | 39.14% |
| 45 | 39.91% | 42.97% |
| 50 | 44.72% | 46.91% |
| 60 | 52.92% | 49.18% |
| 70 | 58.12% | perturbed |
| 80 | 65.25% | 52.18% |
| 90 | 70.44% | 54.76% |
| 100 | 74.14% | 54.56% |
| 110 | 76.86% | 54.71% |
| 120 | 78.44% | perturbed |

TABLE 5

| Loss of absorption in % upon illumination at relevant wavelength of the chromophors pH neutral | | |
|---|---|---|
| Time | Results with Zn-pc dye conjugate of example 3 | |
| in min | 670 nm | 540 nm |
| 0 | 0.00% | 0.00% |
| 5 | 4.71% | 2.23% |
| 10 | 10.24% | 3.96% |
| 15 | 15.51% | 5.68% |
| 20 | 21.50% | 7.53% |

TABLE 5-continued

| Loss of absorption in % upon illumination at relevant wavelength of the chromophors pH neutral | | |
|---|---|---|
| Time | Results with Zn-pc dye conjugate of example 3 | |
| in min | 670 nm | 540 nm |
| 25 | 27.33% | 9.11% |
| 30 | 33.08% | 10.99% |
| 35 | 38.16% | 12.39% |
| 40 | 42.87% | 14.02% |
| 45 | 47.58% | 14.45% |
| 50 | 51.13% | 16.32% |
| 60 | 56.08% | 18.07% |
| 70 | 59.56% | 20.18% |
| 80 | 61.72% | 20.46% |
| 90 | 64.05% | 21.43% |
| 100 | 64.91% | 22.37% |
| 110 | 65.68% | 22.74% |
| 120 | 65.85% | 24.46% |

TABLE 6

| Loss of absorption in % upon illumination at relevant wavelength of the chromophors pH neutral | | |
|---|---|---|
| Time | Results with Zn-pc dye conjugate of example 4 | |
| in min | 670 nm | 540 nm |
| 0 | 0.00% | 0.00% |
| 5 | 8.57% | 6.53% |
| 10 | 17.65% | 8.97% |
| 15 | 24.81% | 9.42% |
| 20 | 31.45% | 9.12% |
| 25 | 38.26% | 12.90% |
| 30 | 44.11% | 13.46% |
| 35 | 49.20% | 15.15% |
| 40 | 53.70% | 16.11% |
| 45 | 57.74% | 16.34% |
| 50 | 61.09% | 17.95% |
| 60 | 66.57% | 19.75% |
| 70 | 70.20% | 19.83% |
| 80 | 73.22% | 24.30% |
| 90 | 74.05% | 24.56% |
| 100 | 75.92% | 24.02% |
| 110 | 76.61% | 23.45% |
| 120 | 77.42% | 25.87% |

TABLE 7

| Loss of absorption in % upon illumination at relevant wavelength of the chromophors pH neutral | | |
|---|---|---|
| Time | Results with Zn-pc dye conjugate of example 5 | |
| in min | 670 nm | 540 nm |
| 0 | 0.00% | 0.00% |
| 5 | 6.81% | 3.13% |
| 10 | 15.08% | 6.09% |
| 15 | 22.99% | 9.09% |
| 20 | 31.61% | 10.70% |
| 25 | 39.06% | 14.66% |
| 30 | 47.01% | 19.28% |
| 35 | 53.57% | 21.25% |
| 40 | 59.19% | 22.96% |
| 45 | 63.20% | 23.84% |
| 50 | 67.61% | 24.60% |
| 60 | 73.87% | 26.93% |
| 70 | 78.10% | 29.69% |
| 80 | 80.64% | 30.69% |

TABLE 7-continued

| Loss of absorption in % upon illumination at relevant wavelength of the chromophors pH neutral | | |
|---|---|---|
| Time | Results with Zn-pc dye conjugate of example 5 | |
| in min | 670 nm | 540 nm |
| 90 | 82.29% | 31.48% |
| 100 | 83.38% | 32.45% |
| 110 | 84.10% | 33.37% |
| 120 | 84.47% | 33.53% |

TABLE 8

| Loss of absorption in % upon illumination at relevant wavelength of the chromophors pH neutral | | |
|---|---|---|
| Time | Results with Zn-pc dye conjugate of example 6 | |
| in min | 670 nm | 540 nm |
| 0 | 0.00% | 0.00% |
| 5 | 6.54% | 3.48% |
| 10 | 12.48% | 6.01% |
| 15 | 19.67% | 9.33% |
| 20 | 26.49% | 12.19% |
| 25 | 33.56% | 14.92% |
| 30 | 40.34% | 17.68% |
| 35 | 45.46% | 20.01% |
| 40 | 50.65% | 63.20% |
| 45 | 55.41% | 23.95% |
| 50 | 59.80% | 25.33% |
| 60 | 65.85% | 27.66% |
| 70 | 70.30% | 29.70% |
| 80 | 73.63% | 31.06% |
| 90 | 75.92% | 32.55% |
| 100 | 77.52% | 34.09% |
| 110 | 78.50% | 34.31% |
| 120 | 79.23% | 35.12% |

TABLE 9

| Loss of absorption in % upon illumination at relevant wavelength of the chromophors pH neutral | | |
|---|---|---|
| Time | Results with Zn-pc dye conjugate of example 7 | |
| in min | 670 nm | 540 nm |
| 0 | 0.00% | 0.00% |
| 5 | 5.22% | 6.19% |
| 10 | 10.82% | 13.36% |
| 15 | 17.47% | 20.85% |
| 20 | 21.95% | 25.66% |
| 25 | 26.96% | 31.32% |
| 30 | 32.18% | 34.99% |
| 35 | 37.09% | 37.80% |
| 40 | 42.01% | 41.58% |
| 45 | 46.31% | 45.26% |
| 50 | 50.59% | 47.98% |
| 60 | 57.78% | 53.76% |
| 70 | 63.76% | 59.29% |
| 80 | 68.57% | 61.81% |
| 90 | 72.40% | 64.46% |
| 100 | 75.58% | 67.10% |
| 110 | 78.20% | 69.16% |
| 120 | 80.25% | 70.23% |

TABLE 10

| Loss of absorption in % upon illumination at relevant wavelength of the chromophors pH neutral | | |
|---|---|---|
| Time | Results with Zn-pc dye conjugate of example 8 | |
| in min | 670 nm | 540 nm |
| 0 | 0.00% | 0.00% |
| 5 | 4.02% | 17.09% |
| 10 | 11.25% | 33.03% |
| 15 | 17.99% | 45.66% |
| 20 | 24.68% | 54.07% |
| 25 | 29.25% | 60.04% |
| 30 | 35.17% | 65.61% |
| 35 | 39.64% | 69.32% |
| 40 | 44.23% | 72.83% |
| 45 | 48.51% | 75.54% |
| 50 | 51.91% | 77.74% |
| 60 | 58.06% | 80.81% |
| 70 | 63.11% | 83.25% |
| 80 | 67.29% | 84.85% |
| 90 | 70.31% | 85.62% |
| 100 | 72.86% | 87.27% |
| 110 | 74.90% | 87.69% |
| 120 | 76.67% | 88.34% |

TABLE 11

| Loss of absorption in % upon illumination at relevant wavelength of the chromophors pH neutral | | |
|---|---|---|
| Time | Results with Zn-pc dye conjugate of example 9 | |
| in min | 670 nm | 540 nm |
| 0 | 0.00% | 0.00% |
| 5 | 3.97% | 0.76% |
| 10 | 9.36% | 1.93% |
| 15 | 14.32% | 2.63% |
| 20 | 18.89% | 4.10% |
| 25 | 22.68% | 4.93% |
| 30 | 26.59% | 5.84% |
| 35 | 30.69% | 6.74% |
| 40 | 33.89% | 7.44% |
| 45 | 37.21% | 8.17% |
| 50 | 39.80% | 8.27% |
| 60 | 44.23% | 8.56% |
| 70 | 47.61% | 8.48% |
| 80 | 50.84% | 9.46% |
| 90 | 53.43% | 10.36% |
| 100 | 55.25% | 11.13% |
| 110 | 57.31% | 11.82% |
| 120 | 58.69% | 12.34% |

Example 18

As comparison an aqueous solution, containing only the azo dye part of the blue photocatalyst was illuminated at neutral pH following the procedure outlined above. No degradation of the chromophore was observed within two hours exposure.

Experiments with Fabrics

Example 19

A bleached cotton fabric was treated with an aqueous solution which resulted in a bluish color. This fabric was exposed in a wet state for up to 90 min to a tungsten lamp. The light intensity measured with a Roline RO-1322 Digital Lux meter at the position of the fabric was within the range of 17000 Lux. The intensity of the blue color of the fabric was continuously reduced on exposure.

Washing Experiments

Bleached cotton was washed with a detergent containing the photocatalyst obtained from Example 2 in different concentrations for 15 min at 30° C.

Detergent 40 gr/kg of fabric

Liquor ratio 1:10

After washing one part of the fabrics were exposed to tungsten light for two hours (Light intensity measured with a Roline RO-1322 Digital Lux meter at the position of the fabric was within the range of 17000 Lux.) one part was dried in the dark.

This washing cycle was repeated five times and after each washing cycle the Whiteness (Ganz) and the tint value determined Example 20

As reference one set of fabrics was washed with the detergent containing a commercial photocatalyst Tinolux BMC.

Concentration of photocatalyst in the detergent was 0.04%.

Example 21

The detergent used for the washing experiment contained an equivalent of 0.01% of the blue photocatalyst obtained from Example 2.

Example 22

The detergent used for the washing experiment contained an equivalent of 0.015% of the blue photocatalyst obtained from Example 2.

Example 23

The detergent used for the washing experiment contained an equivalent of 0.009% of the blue photocatalyst obtained from Example 2.

The fabric was washed five time times without intermediate exposure to light. After the five washes the fabric was exposed either in dry or wet state for two hours to tungsten light.

Example 24

The detergent used for the washing experiment contained an equivalent of 0.009% of the blue photocatalyst obtained from Example 2 and additionally 0.01% Tinopal CBS (FWA of Ciba Specialty Chemicals).

The fabric was washed five time times without intermediate exposure to light. After the five washes the fabric was exposed either in dry or wet state for two hours to tungsten light.

The results of the shade and whiteness evaluation with and without exposure of the fabrics to light are summarized in table 12.

From the reflection spectra it could be derived that the buildup of the photocatalyst BCF obtained from Example 2 was higher than for the turquoise reference photocatalyst Tinolux BMC.

The values in table 12 show the increased whiteness gained by the blue obtained from Example 2 in comparison to the reference photocatalyst and the control to prevent overhueing by exposure to light while maintaining an appreciable gain in whiteness delivery.

TABLE 12

| Whiteness (Ganz) and Tint Value (TV) of cotton fabrics washed with detergent as exemplified above | | | | | | | | | | |
|---|---|---|---|---|---|---|---|---|---|---|
| | After 1 cycle | | After 2 cycles | | After 3 cycles | | After 4 cycles | | After 5 cycles | |
| | W | TV | W | TV | W | TV | W | TV | W | TV |
| Without exposure to light | | | | | | | | | | |
| Example 20 | 79 | 1.3 | 81 | 2.1 | 82 | 2.6 | 83 | 3.2 | 83 | 3.6 |
| Example 21 | 84 | 1.6 | 90 | 2.4 | 94 | 3.0 | 100 | 3.6 | 105 | 4.2 |
| Example 22 | 88 | 2.3 | 98 | 4.0 | 106 | 5.1 | 113 | 5.8 | 117 | 6.4 |
| Example 23 | | | | | | | | | 99 | 3.58 |
| Example 24 | | | | | | | | | 226 | 1.76 |
| With exposure to light | | | | | | | | | | |
| Example 20 | 79 | 0.3 | 79 | 0.4 | 80 | 0.5 | 81 | 0.7 | 79 | 0.8 |
| Example 21 | 80 | 0.3 | 83 | 0.4 | 86 | 0.7 | 89 | 0.9 | 91 | 1.3 |
| Example 22 | 81 | 0.3 | 87 | 0.7 | 91 | 1.1 | 100 | 2.0 | 99 | 2.1 |
| Example 23 dry | | | | | | | | | 93 | 2.47 |
| Example 23 wet | | | | | | | | | 97 | 1.76 |
| Example 24 dry | | | | | | | | | 215 | 0.85 |
| Example 24 wet | | | | | | | | | 217 | 0.44 |

Photo-Bleaching Experiments on Soiled Fabrics

Washing Procedure, Light Exposure

A mixture of cotton soiled with red wine (testfabric No 114 of EMPA) and bleached cotton as ballast was washed under the condition as outlined under washing experiments. After five washing cycles the fabric was exposed in wet state under the illumination conditions as outlined in example 19. The lightness of the fabrics was evaluated as function of exposure time.

The difference of the lightness between the fabrics after washing and after exposure to light is a measure for the photobleaching performance of the detergent containing the photocatalyst. The results are summarized in table 13.

Example 25

As reference one set of fabrics was washed with the detergent containing 0.04% of the commercial photocatalyst Tinolux BMC Example 26

The set of fabrics was washed with a detergent containing 0.007% of the photocatalyst of example 2

Example 27

The set of fabrics was washed with a detergent containing 0.0079% of the photocatalyst of example 6.

Example 28

The set of fabrics was washed with a detergent containing 0.011% of the photocatalyst of example 5.

TABLE 13

| Delta Lightness Y (Lightness of soiled fabrics exposed after x hours illumination - Lightness of fabric after five washes) | | | |
|---|---|---|---|
| Hours of exposure | 1 h | 2 h | 6 h |
| Example 25 | 4.1 | 4.2 | 5.1 |
| Example 26 | 3.9 | 4.9 | 6.6 |
| Example 27 | 4.1 | 5.9 | 8.4 |
| Example 28 | 4.4 | 5.7 | 7.5 |

The invention claimed is:

1. A shading process for textile fiber comprising treating the textile fiber material with a composition comprising at least one Zn—, Ca—, Mg—, Na—, K—, Al, Si—, Ti—, Ge—, Ga—, Zr—, In— or Sn—phthalocyanine to which at least one dyestuff is attached through covalent bonding, wherein the textile is treated with a composition (A) comprising at least one compound of formula (1a) and/or formula (1b)

(1a)

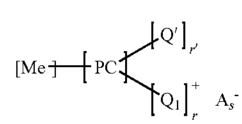

(1b)

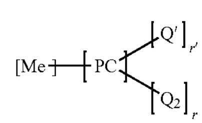

in which

PC is the phthalocyanine ring system,

Me is Zn; Ca; Mg; Na; K; Al—$Z_1$; Si(IV)-$(Z_1)_2$; Ti(IV)-$(Z_1)_2$; Ge(IV)-$(Z_1)_2$; Ga(III)-$Z_1$; Zr(IV)-$(Z_1)_2$; In(III)-$Z_1$ or Sn(IV)-$(Z_1)_2$, $Z_1$ is an alkanolate ion; a hydroxyl ion; $R_0COO^-$; $ClO_4^-$; $BF_4^-$;$PF_6^-$;$R_0SO_3^-$; $SO_4^{2-}$; $NO_3^-$; $F^-$; $Cl^-$; $Br^-$; $I^-$; citrate ion; tartrate ion or oxalate ion, wherein $R_0$ is hydrogen; or unsubstituted $C_1$-$C_{18}$alkyl; or $C_1$-$C_{18}$alkyl, which is substituted by at least one substituent selected from the group consisting of hydroxyl, cyano, carboxyl, $SO_3H$, —$NH_2$, carb-$C_1$-$C_6$alkoxy, $C_1$-$C_6$alkoxy, phenyl, naphthyl and pyridyl; unsubstituted aryl or aryl, which is substituted by at least one substituent selected from the group consisting of hydroxyl, cyano, carboxyl, $SO_3H$, —$NH_2$, carb-$C_1$-$C_6$alkoxy, $C_1$-$C_6$alkoxy and $C_1$-$C_4$-alkyl, r is 0; 1; 2; 3 or 4, r' is 1; 2; 3 or 4, each $Q_1$ is independently of each other a sulfo or carboxyl group or a radical of the formula —$SO_2X_2$—$R_1$—$X_3^+$; —O—$R_1$—$X_3^+$ or —$(CH_2)_t$—$Y_1^+$, in which $R_1$ is a branched or unbranched $C_1$-$C_8$alkylene; 1,3-phenylene or 1,4-phenylene, $X_2$ is —NH— or —N($C_1$-$C_5$alkyl)-, $X_3^+$ is a group of the formula

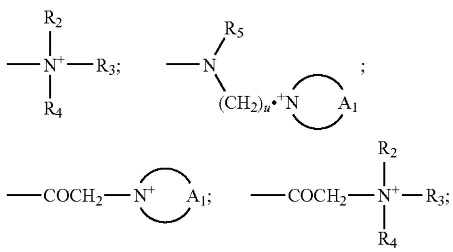

or, in the case where $R_1$ =$C_1$-$C_8$alkylene, also a group of the formula

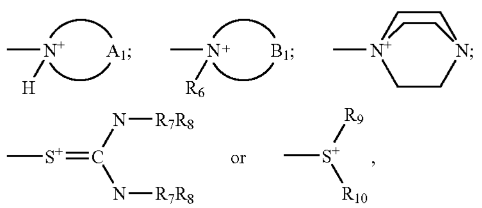

$Y_1^+$ is a group of the formula

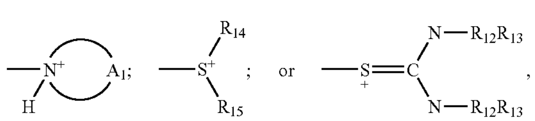

t is 0 or 1, wherein the above formulae $R_2$ and $R_3$ independently of one another are $C_1$-$C_6$alkyl, $R_4$ is $C_1$-$C_6$alkyl; $C_5$-$C_7$cycloalkyl or $NR_7R_8$, $R_5$ and $R_6$ independently of one another are $C_1$-$C_5$alkyl, $R_7$ and $R_8$ independently of one another are hydrogen or $C_1$-$C_5$alkyl, $R_9$ and $R_{10}$ independently of one another are unsubstituted $C_1$-$C_6$alkyl or $C_1$-$C_6$alkyl substituted by at least one substituent selected from the group consisting of hydroxyl, cyano, carboxyl, $SO_3H$, —$NH_2$, carb-$C_1$-$C_6$alkoxy, $C_1$-$C_6$alkoxy, phenyl, naphthyl and pyridyl, u is from 1 to 6, $A_1$ is a unit which completes an aromatic 5- to 7-membered nitrogen heterocycle, which may where appropriate also contain one or two further nitrogen atoms as ring members, and $B_1$ is a unit which completes a saturated 5- to 7-membered nitrogen heterocycle, which may where appropriate also contain 1 to 2 nitrogen, oxygen and/or sulfur atoms as ring members, each Q' is independently from each other a moiety of formula -L-D, wherein L is a direct bond or a bridging group and D is the radical of a dyestuff, each $Q_2$ is independently from each other hydroxyl; $C_1$-$C_{22}$alkyl; branched $C_3$-$C_{22}$alkyl; $C_2$-$C_{22}$alkenyl; branched $C_3$-$C_{22}$alkenyl and mixtures thereof; $C_1$-$C_{22}$alkoxy; a sulfo or carboxyl radical; a radical of the formula

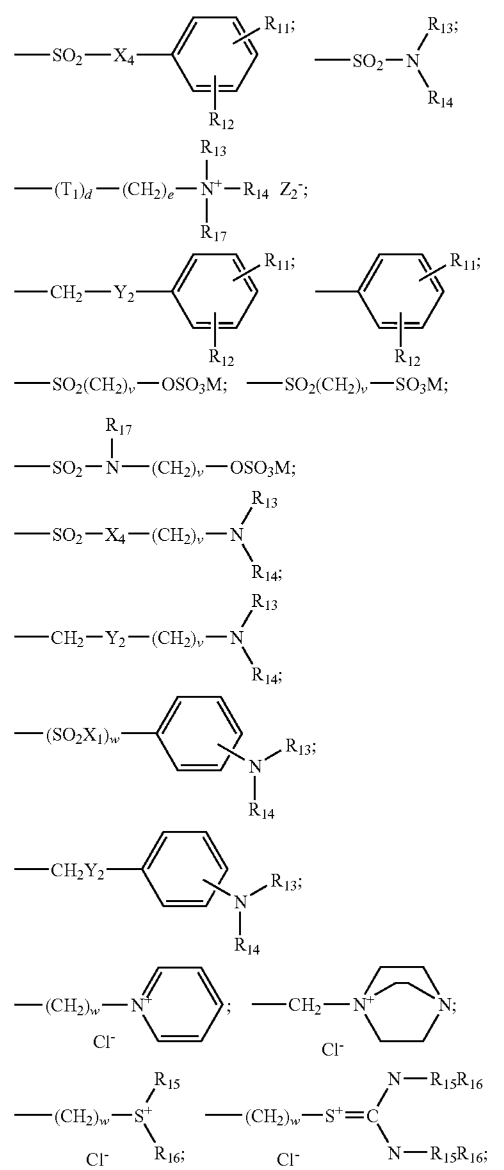

a branched alkoxy radical of the formula

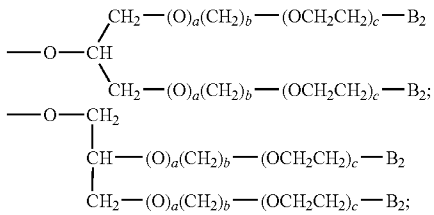

an alkylethyleneoxy unit of the formula $-(T1)_d-(CH_2)_b(OCH_2CH_2)_a$—$B_3$ or an ester of the formula $COOR_{18}$, in which $B_2$ is hydrogen; hydroxyl; $C_1$-$C_{30}$alkyl; $C_1$-$C_{30}$alkoxy; —$CO_2H$; —$CH_2COOH$; —$SO_3^-M_1$; —$OSO_3^-M_1$; —$PO_3^{2-}M_1$; —$OPO_3^{2-}M_1$; and mixtures thereof, $B_3$ is hydrogen; hydroxyl; —COOH; —$SO_3^-M_1$; —$OSO_3^-M_1$ or $C_1$-$C_6$alkoxy, $M_1$ is a water-soluble cation, $T_1$ is —O— or —NH—, $X_1$ and $X_4$ independently of one another are —O—; —NH— or —N($C_1$-$C_5$alkyl)-, $R_{11}$ and $R_{12}$ independently of one another are hydrogen; a sulfo group and salts thereof; a carboxyl group and salts thereof or a hydroxyl group; at least one of the radicals $R_{11}$ and $R_{12}$ being a sulfo or carboxyl group or salts thereof, $Y_2$ is —O—; —S—; —NH— or —N($C_1$-$C_5$alkyl)-, $R_{13}$ and $R_{14}$ independently of one another other are hydrogen; $C_1$-$C_6$alkyl; hydroxy-$C_1$-$C_6$alkyl; cyano-$C_1$-$C_6$alkyl; sulfo-$C_1$-$C_6$alkyl; carboxy or halo-$C_1$-$C_6$alkyl; unsubstituted phenyl or phenyl substituted by at least one substituent selected from the group consisting of halogen, $C_1$-$C_4$alkyl, $C_1$-$C_4$alkoxy, sulfo or by carboxy; or $R_{18}$ and $R_{19}$, together with the nitrogen atom to which they are bonded, form a saturated 5- or 6-membered heterocyclic ring that may in addition contain a further nitrogen atom or an oxygen atom as ring member, $R_{15}$ and $R_{16}$ independently of one another are $C_1$-$C_6$alkyl or aryl-$C_1$-$C_6$alkyl radicals, $R_{17}$ is hydrogen; an unsubstituted $C_1$-$C_6$alkyl or $C_1$-$C_6$alkyl substituted by at least one substituent selected from the group consisting of halogen, hydroxyl, cyano, $SO_3H$, —$NH_2$, phenyl, carboxyl, carb-$C_1$-$C_6$alkoxy and $C_1$-$C_6$alkoxy, $R_{18}$ is $C_1$-$C_{22}$alkyl; branched $C_3$-$C_{22}$alkyl; $C_1$-$C_{22}$alkenyl or branched $C_3$-$C_{22}$alkenyl; $C_3$-$C_{22}$glycol; $C_1$-$C_{22}$alkoxy; branched $C_3$-$C_{22}$alkoxy; and mixtures thereof, M is hydrogen; or an alkali metal ion or ammonium ion, $Z_2$ is a is an alkanolate ion; a hydroxyl ion; $R_0COO^-$; $ClO_4^{-BF}4^-$;$PF_6^-$;$R_0SO_3^-$; $SO_4^{\ 2-}$; $NO_3^-$; $F^-$; $Cl^-$; $BR^-$;$I^-$; citrate ion; tartrate ion or oxalate ion, wherein $R_0$ is hydrogen; or unsubstituted $C_1$-$C_{18}$alkyl; or $C_1C_{18}$alkyl, which is substituted by at least one substituent selected from the group consisting of hydroxyl, cyano, carboxyl, $SO_3H$, —$NH_2$, carb-$C_1$-$C_6$alkoxy, phenyl, naphthyl and pyridyl; unsubstituted aryl or aryl, which is substituted by at least one substituent selected from the group consisting of hydroxyl, cyano, carboxyl, $SO_3H$, —$NH_2$, carb-$C_1$-$C_6$alkoxy, $C_1$-$C_6$alkoxy and $C_1$-$C_4$-alkyl, a is 0 or 1, b is from 0 to 6, c is from 0 to 100, d is 0 or 1, e is from 0 to 22, v is an integer from 2 to 12, w is 0 or 1, and $A^-$ is an organic or inorganic anion, and s is equal to r in cases of monovalent anions $A^-$ and is ≤r in cases of polyvalent anions, it being necessary for $A_s^-$ to compensate the positive charge; where, when r≠1, the radicals $Q_1$ can be identical or different, and where the phthalocyanine ring system may also comprise further solubilising groups and D is a radical of formulae (I)-(XXXII):

(I)

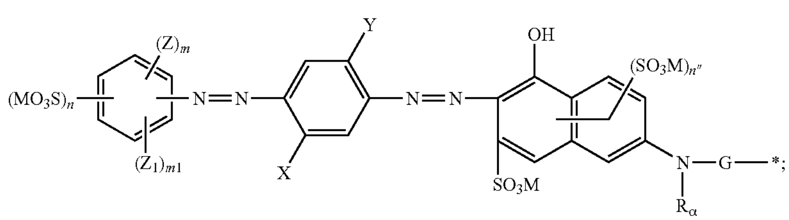

(II)

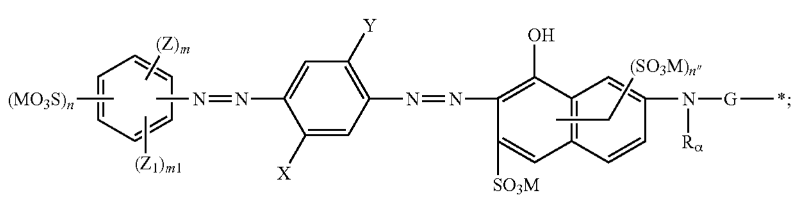

-continued
(III)
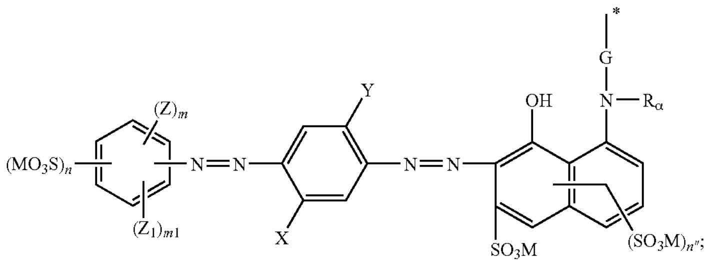
(IV)
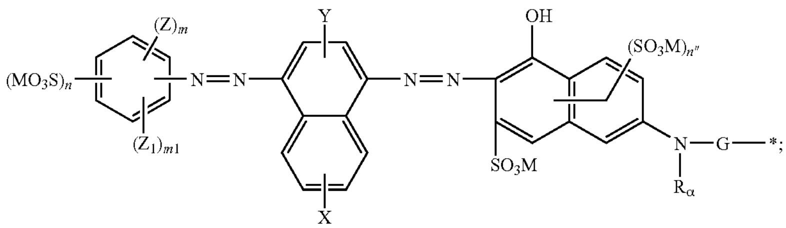
(V)
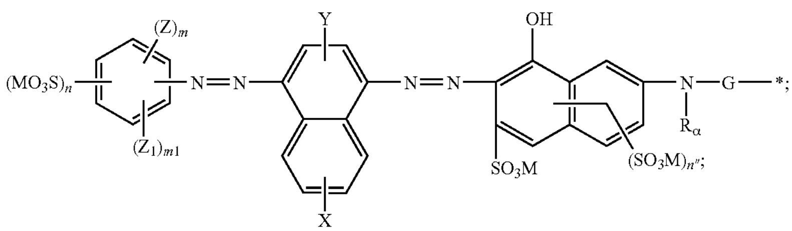
(VI)
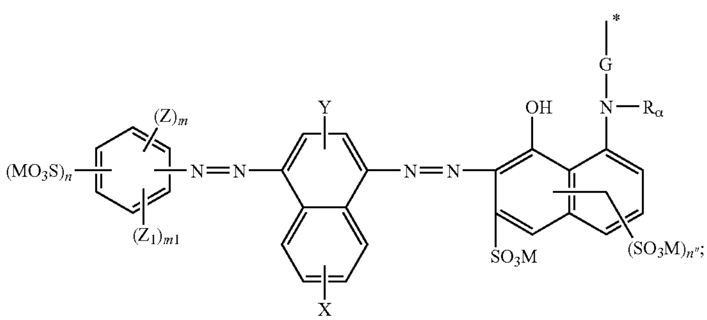
(VII)
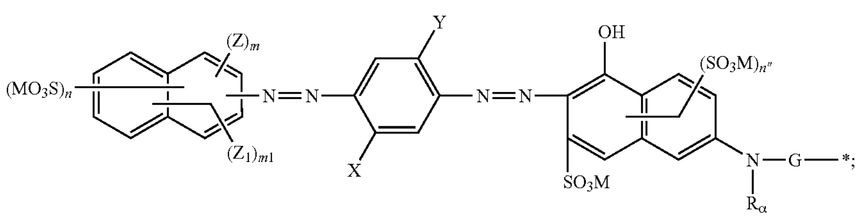
(VIII)
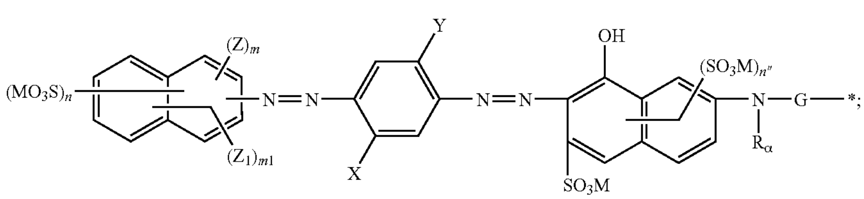

-continued
(IX)
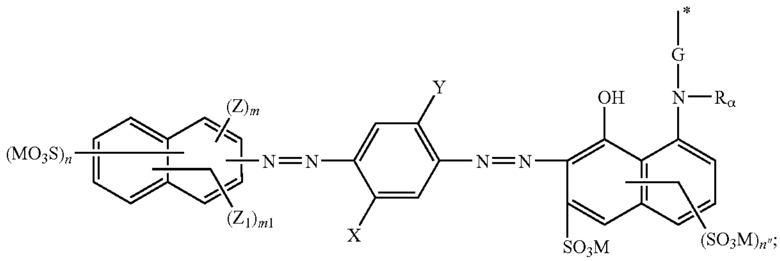
(X)
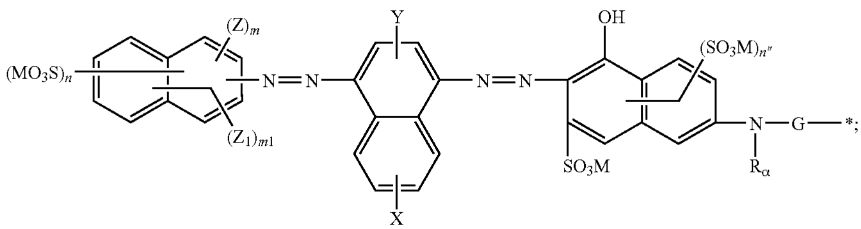
(XI)
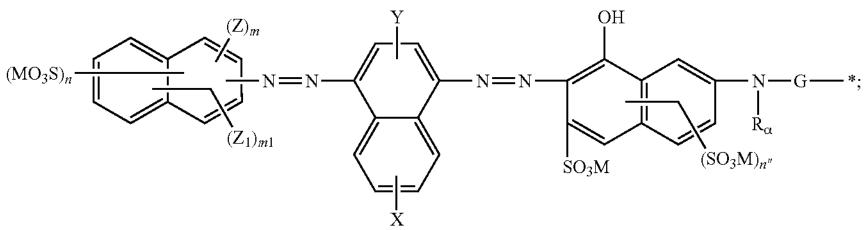
(XII)
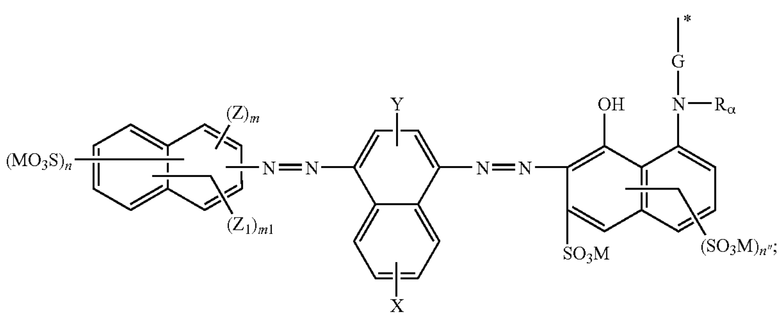
(XIII)
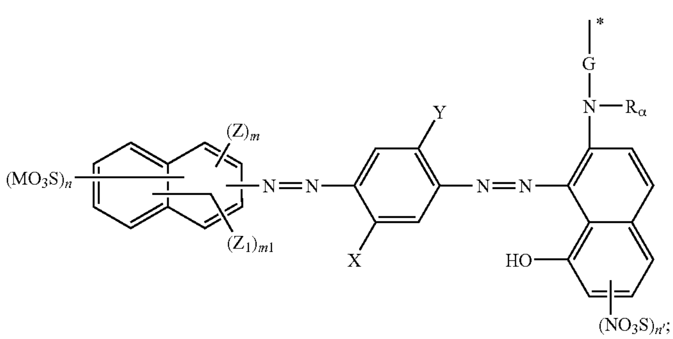
(XIV)
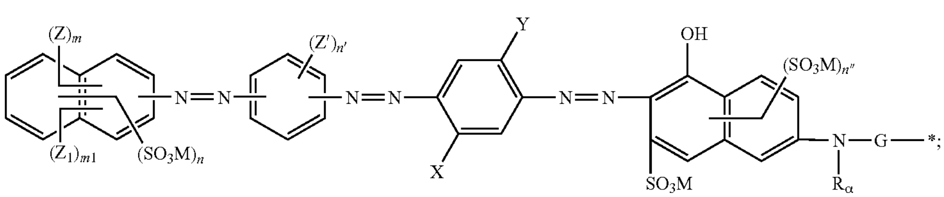

-continued
(XV)
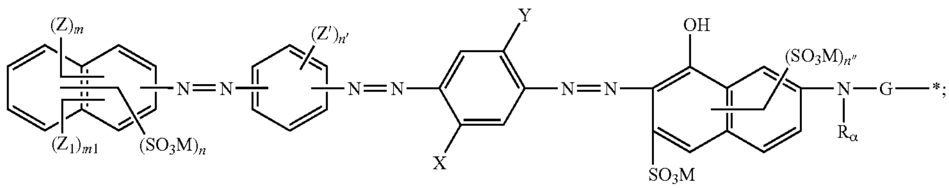
(XVI)
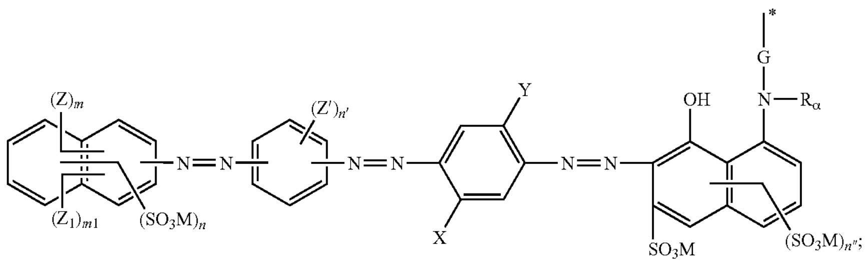
(XVII)
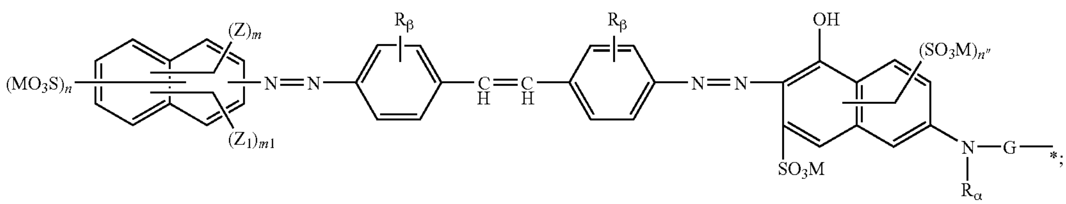
(XVIII)
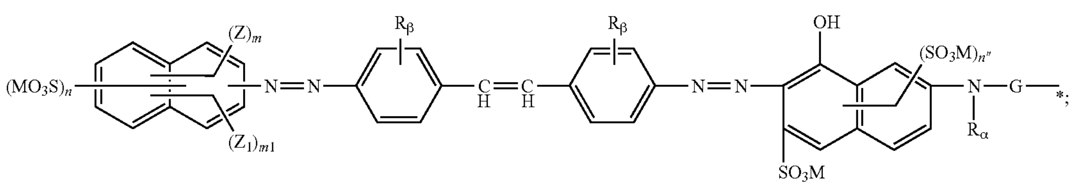
(XIX)
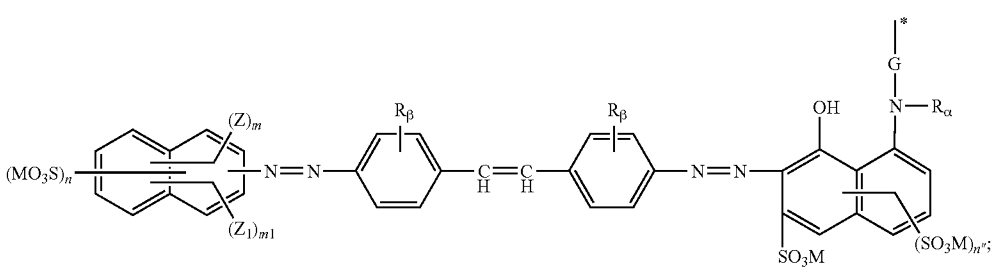
(XX)
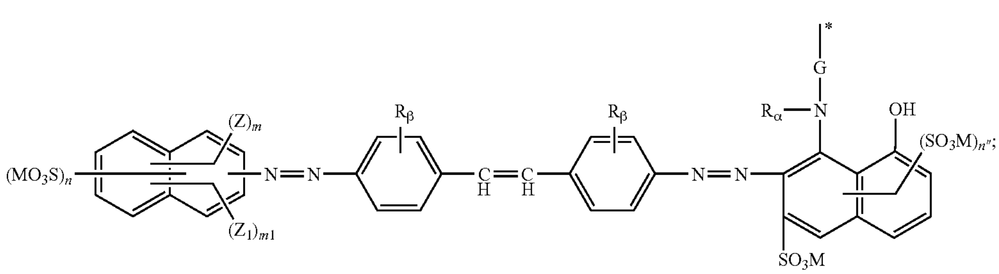

-continued
(XXI)
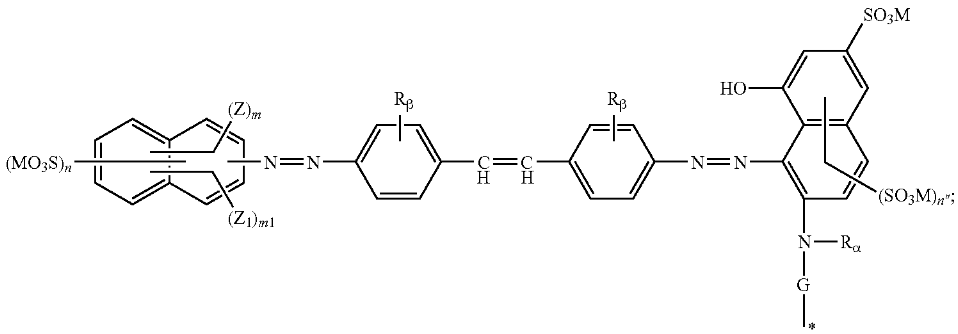
(XXII)
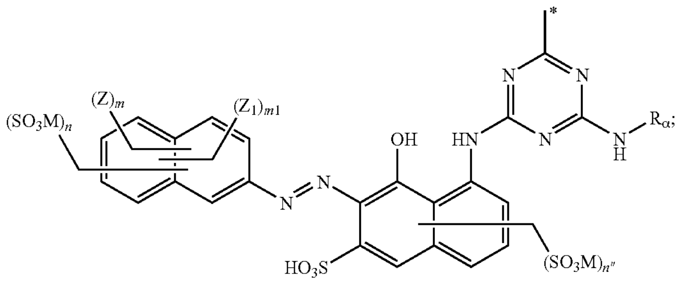
(XXIII)
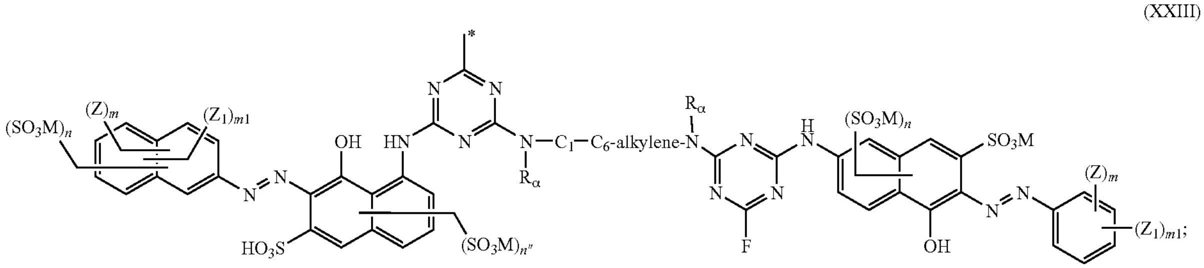
(XXIV)
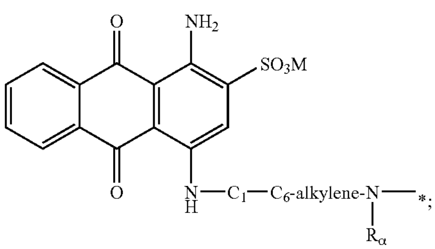
(XXV)
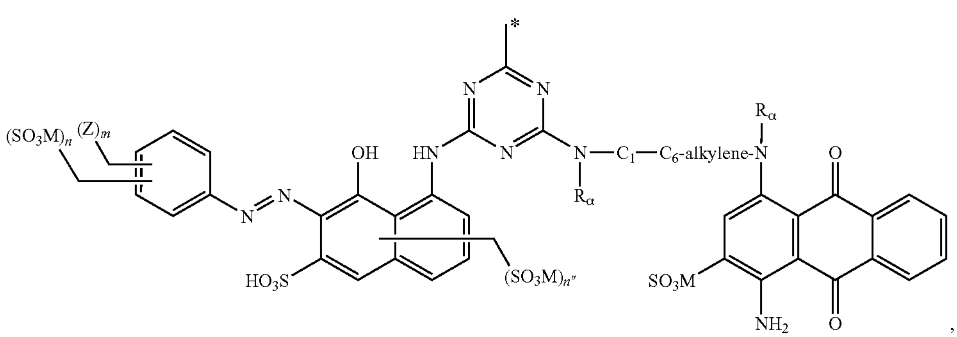

-continued (XXVI)

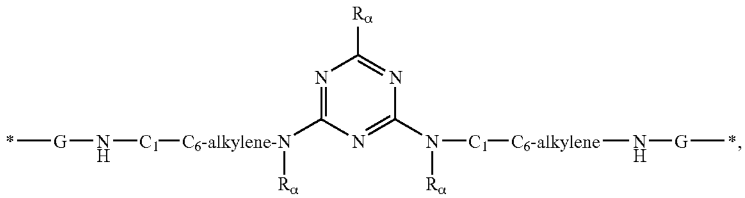

(XXVIIa)

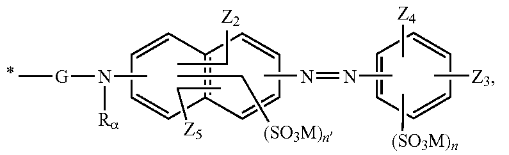

(XXVIIb)

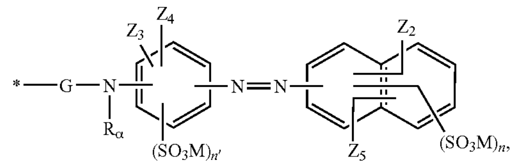

(XXVIIc)

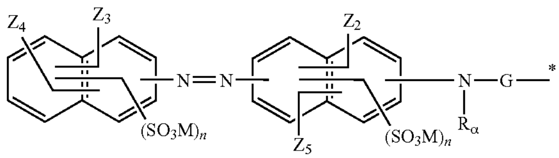

(XXVIId)

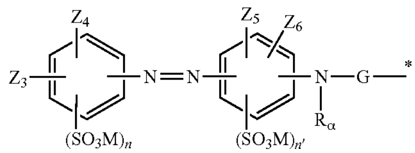

(XXVIII)

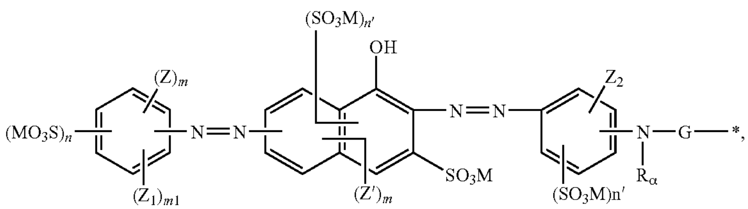

(XXIX)

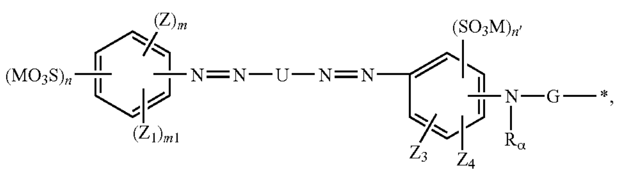

(XXX)

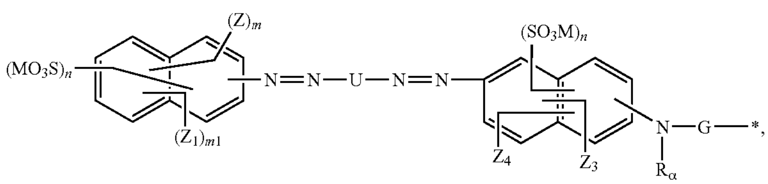

(XXXI)

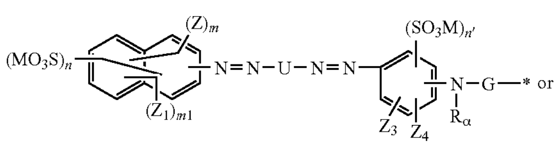

(XXXII)

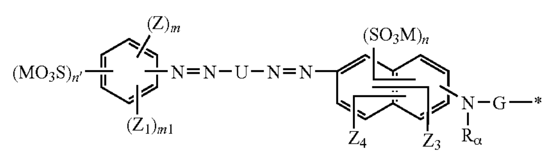

wherein

* marks the bond to the bridging group L,

X and Y independently of one another, are hydrogen; $SO_3M$; linear or branched, unsubstituted $C_1$-$C_4$-alkyl; linear or branched $C_1$-$C_4$-alkyl, which is substituted by at least one substituent selected from the group consisting of hydroxyl, cyano, $SO_3H$, —$NH_2$, carboxyl, carb-$C_1$-$C_4$alkoxy, $C_1$-$C_4$ alkoxy, phenyl, naphthyl and pyridyl; linear or branched, unsubstituted $C_1$-$C_4$-alkoxy; linear or branched, $C_1$-$C_4$-alkoxy, which is substituted by at least one substituent selected from the group consisting of hydroxyl, cyano, $SO_3H$, —$NH_2$, carboxyl, carb-$C_1$-$C_4$alkoxy, $C_1$-$C_4$alkyl, phenyl, naphthyl and pyridyl; NHCOOH; NHCOO$C_1$-$C_4$alkyl; COOH or COO$C_1$-$C_4$alkyl;

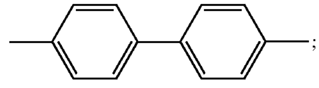;

-continued

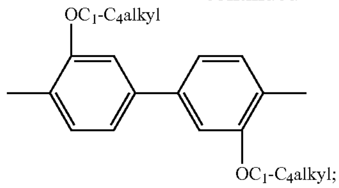

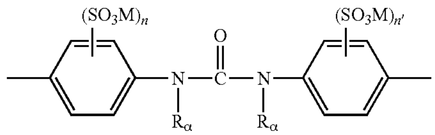

U is a moiety of formula $R_\alpha$ is hydrogen; linear or branched, unsubstituted $C_1$-$C_4$-alkyl; linear or branched $C_1$-$C_4$-alkyl, which is substituted by at least one substituent selected from the group consisting of hydroxyl, cyano, $SO_3H$, —$NH_2$, carboxyl, carb-$C_1$-$C_4$alkoxy, $C_1$-$C_4$alkoxy, phenyl, naphthyl and pyridyl; unsubstituted aryl or aryl, which is substituted by at least one substituent selected from the group consisting of hydroxyl, cyano, $SO_3H$, —$NH_2$, carboxyl, carb-$C_1$-$C_4$alkoxy, $C_1$-$C_4$alkoxy and $C_1a_4$alkyl, each $R_\beta$ independently of one another is hydrogen; $SO_3M$; linear or branched, unsubstituted $C_1$-$C_4$-alkyl; linear or branched $C_1$-$C_4$-alkyl, which is substituted by at least one substituent selected from the group consisting of hydroxyl, cyano, $SO_3H$, —$NH_2$, carboxyl, carb-$C_1$-$C_4$alkoxy, $C_1$-$C_4$alkoxy, phenyl, naphthyl and pyridyl; linear or branched, unsubstituted $C_1$-$C_4$-alkoxy or linear or branched, $C_1$-$C_4$-alkoxy, which is substituted by at least one substituent selected from the group consisting of hydroxyl, cyano, $SO_3H$, —$NH_2$, carboxyl, carb-$C_1$-$C_4$alkoxy, $C_1$-$C_4$alkoxy phenyl, naphthyl and pyridyl;

Z is linear or branched, unsubstituted $C_1$-$C_4$-alkyl; linear or branched $C_1$-$C_4$-alkyl, which is substituted by at least one substituent selected from the group consisting of hydroxyl, cyano, $SO_3H$, —$NH_2$, carboxyl, carb-$C_1C_4$alkoxy, $C_1$-$C_4$alkoxy, phenyl, naphthyl and pyridyl; linear or branched, unsubstituted $C_1$-$C_4$-alkoxy or linear or branched, $C_1$-$C_4$-alkoxy, which is substituted by at least one substituent selected from the group consisting of hydroxyl, cyano, $SO_3H$, —$NH_2$, carboxyl, carb-$C_1$-$C_4$alkoxy, $C_1$-$C_4$alkyl, phenyl, naphthyl and pyridyl; halogen; OH; $NO_2$; COOH; $COOC_1$-$C_4$alkyl; $NH_2$; $NHC_1$-$C_4$alkyl, wherein the alkyl group may be substituted by at least one substituent selected from the group consisting of OH, $NH_2$, $C_1$-$C_4$alkyl, CN and COOH; $N(C_1$-$C_4alkyl)C_1$-$C_4$alkyl, wherein the alkyl groups may independently of each other be substituted by at least one substituent selected from the group consisting of OH, $NH_2$, $C_1$-$C_4$alkyl, CN and COOH; NH-aryl; NH-aryl, wherein the aryl is substituted by at least one substituent selected from the group consisting of hydroxyl, cyano, $SO_3H$, —$NH_2$, carboxyl, carb-$C_1C_4$alkoxy, $C_1$-$C_4$alkyl and $C_1$-$C_4$alkoxy; $NHCOC_1$-$C_4$alkyl and $NHCOOC_1$-$C_4$alkyl, Z' is $SO_3M$; linear or branched, unsubstituted $C_1$-$C_4$-alkyl; linear or branched $C_1$-$C_4$-alkyl, which is substituted by at least one substituent selected from the group consisting of hydroxyl, cyano, $SO_3H$, —$NH_2$, carboxyl, carb-$C_1C_4$alkoxy, $C_1$-$C_4$alkoxy, phenyl, naphthyl and pyridyl; linear or branched, unsubstituted $C_1$-$C_4$-alkoxy or linear or branched, $C_1$-$C_4$-alkoxy, which is substituted by at least one substituent selected from the group consisting of hydroxyl, cyano, $SO_3H$, —$NH_2$, carboxyl, carb-$C_1$-$C_4$alkoxy, $C_1$-$C_4$alkyl, phenyl, naphthyl and pyridyl; halogen; OH; $NO_2$; COOH; $COOC_1$-$C_4$alkyl; $NH_2$; $NHC_1$-$C_4$alkyl, wherein the alkyl group may be substituted by at least one substituent selected from the group consisting of OH, $NH_2$, $C_1$-$C_4$alkyl, CN or COOH; $N(C_1$-$C_4alkyl)C_1$-$C_4$alkyl, wherein the alkyl groups may independently of each other be substituted by at least one substituent selected from the group consisting of OH, $NH_2$, $C_1$-$C_4$alkyl, CN and COOH; NH-aryl; NH-aryl, wherein the aryl is substituted by at least one substituent selected from the group consisting of hydroxyl, cyano, $SO_3H$, —$NH_2$, carboxyl, carb-$C_1C_4$alkoxy, $C_1$-$C_4$alkyl and $C_1$-$C_4$alkoxy; $NHCOC_1$-$C_4$alkyl or $NHCOOC_1$-$C_4$alkyl, $Z_1$ is linear or branched, unsubstituted $C_1$-$C_4$-alkyl; linear or branched $C_1$-$C_4$-alkyl, which is substituted by at least one substituent selected from the group consisting of hydroxyl, cyano, $SO_3H$, —$NH_2$, carboxyl, carb-$C_1C_4$alkoxy, $C_1$-$C_4$alkoxy, phenyl, naphthyl and pyridyl; linear or branched, unsubstituted $C_1$-$C_4$-alkoxy or linear or branched, $C_1$-$C_4$-alkoxy, which is substituted by at least one substituent selected from the group consisting of hydroxyl, cyano, $SO_3H$, —$NH_2$, carboxyl, carb-$C_1C_4$alkoxy, $C_1$-$C_4$alkyl, phenyl, naphthyl and pyridyl; halogen; OH; $NO_2$; COOH; $COOC_1$-$C_4$alkyl; $NH_2$; $NHC_1$-$C_4$alkyl, wherein the alkyl group may be substituted by at least one substituent selected from the group consisting of OH, $NH_2$, $C_1$-$C_4$alkyl, CN or COOH; $N(C_1$-$C_4alkyl)C_1$-$C_4$alkyl, wherein the alkyl groups may independently of each other be substituted by at least one substituent selected from the group consisting of OH, $NH_2$, $C_1$-$C_4$alkyl, CN and COOH; NH-aryl; NH-aryl, wherein the aryl is substituted by at least one substituent selected from the group consisting of hydroxyl, cyano, $SO_3H$, —$NH_2$, carboxyl, carb-$C_1C_4$alkoxy, $C_1$-$C_4$alkyl and $C_1$-$C_4$alkoxy; $NHCOC_1$-$C_4$alkyl or $NHCOOC_1$-$C_4$alkyl, $Z_2$, $Z_3$, $Z_4$, $Z_5$ and $Z_6$ are independently from each other hydrogen; linear or branched, unsubstituted $C_1$-$C_4$-alkyl; linear or branched $C_1$-$C_4$-alkyl, which is substituted by at least one substituent selected from the group consisting of hydroxyl, cyano, $SO_3H$, —$NH_2$, carboxyl, carb-$C_1$-$C_4$alkoxy, $C_1$-$C_4$alkoxy, phenyl, naphthyl and pyridyl; linear or branched, unsubstituted $C_1$-$C_4$-alkoxy or linear or branched, $C_1$-$C_4$-alkoxy, which is substituted by at least one substituent selected from the group consisting of hydroxyl, cyano, $SO_3H$, —$NH_2$, carboxyl, carb-$C_1$-$C_4$alkoxy, $C_1$-$C_4$alkyl, phenyl, naphthyl and pyridyl; halogen; OH; $SO_2CH_2CH_2SO_3H$; $NO_2$; COOH; $COOC_1$-$C_4$alkyl; $NH_2$; $NHC_1$-$C_4$alkyl, wherein the alkyl group may be substituted by at least one substituent selected from the group consisting of OH, $NH_2$, $C_1$-$C_4$alkyl, CN or COOH; $N(C_1$-$C_4alkyl)C_1$-$C_4$alkyl, wherein the alkyl groups may independently of each other be substituted by at least one substituent selected from the group consisting of OH, $NH_2$, $C_1$-$C_4$alkyl, CN and COOH; NH-aryl; NH-aryl, wherein the aryl is substituted by at least one substituent selected from the group consisting of hydroxyl, cyano, $SO_3H$, —$NH_2$, carboxyl, carb-$C_1C_4$alkoxy, $C_1$-$C_4$alkyl and $C_1$-$C_4$alkoxy; $NHCOC_1$-$C_4$alkyl or $NHCOOC_1$-$C_4$alkyl, G is a direct bond; $COOC_1$-$C_4$alkylene; unsubstituted arylene; arylene which is substituted by at least one substituent selected from the group consisting of hydroxyl, cyano, $NO_2$, $SO_3H$, —$NH_2$, carboxyl, carb-$C_1C_4$alkoxy, $C_1$-$C_4$alkoxy and $C_1$-$C_4$alkyl; unsubstituted $C_1$-$C_4$alkylene or $C_1$-$C_4$-alkylene which is substituted by at least one substituent selected from the group consisting of hydroxyl, cyano, $NO_2$, $SO_3H$, —$NH_2$, carboxyl, carb-$C_1C_4$alkoxy, $C_1$-$C_4$alkoxy and $C_1$-$C_4$alkyl; or —CO-arylene, n is 0; 1; 2 or 3, n' is 0; 1 or 2, n" is 0 or 1, m is 0; 1 or 2, $m_1$ is 0; 1 or 2, each M is independently from each other hydrogen; an alkali metal ion or an ammonium ion.

2. The process according to claim 1, wherein the composition comprising at least one compound of formula (1a) and/or (1b) produces a relative hue angle of 220-320° and the compounds of formula (1a) and (1b) are not light stable.

3. The process according to claim 1, wherein the decrease rate of the compounds of formula (1a) and/or (1b) is at least 1% per 2 hours when the composition is exposed to (sun) light.

4. The process according to claim 1 wherein D is a radical of formulae (I')-(XXXII'):

(I')

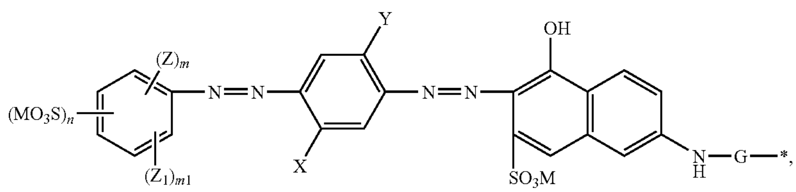

wherein

X and Y independently of one another are linear or branched, unsubstituted $C_1$-$C_4$-alkyl; linear or branched $C_1$-$C_4$-alkyl, which is substituted by at least one substituent selected from the group consisting of hydroxyl, cyano, $SO_3H$, —$NH_2$, carboxyl, carb-$C_1$-$C_2$alkoxy, $C_1$-$C_2$alkoxy, phenyl, naphthyl and pyridyl; linear or branched, unsubstituted $C_1$-$C_4$-alkoxy, Z is unsubstituted $C_1$-$C_2$-alkyl; $C_1$-$C_2$-alkyl, which is substituted by at least one substituent selected from the group consisting of hydroxyl, cyano, $SO_3H$, —$NH_2$, carboxyl, carb-$C_1$-$C_2$alkoxy, $C_1$-$C_2$alkoxy, phenyl, naphthyl and pyridyl; linear or branched, unsubstituted $C_1$-$C_4$-alkoxy; OH; $NO_2$; COOH; $COOC_1$-$C_2$alkyl, $Z_1$ is halogen; OH; $NO_2$; COOH or $COOC_1$-$C_4$alkyl, G is a direct bond; unsubstituted arylene; arylene which is substituted by at least one substituent selected from the group consisting of hydroxyl, cyano, $NO_2$, $SO_3H$, —$NH_2$, carboxyl, carb-$C_1$-$C_2$alkoxy, $C_1$-$C_2$alkoxy and $C_1$-$C_2$alkyl; unsubstituted $C_1$-$C_4$alkylene or $C_1$-$C_4$-alkylene which is substituted by at least one substituent selected from the group consisting of hydroxyl, cyano, $NO_2$, $SO_3H$, —$NH_2$, carboxyl, carb-$C_1$-$C_2$alkoxy, $C_1$-$C_2$alkoxy and $C_1$-$C_2$alkyl, n is 0; 1 or 2, m is 0 or 1, $m_1$ is 0 or 1, each M is independently from each other hydrogen; $Na^+$ or $K^+$;

(II')

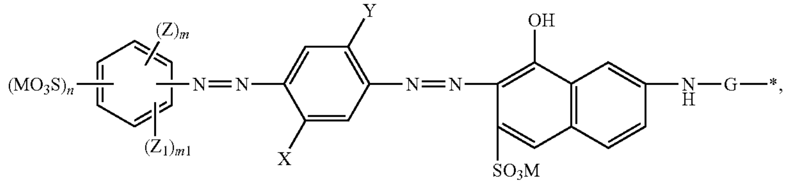

wherein

X and Y independently of one another are linear or branched, unsubstituted $C_1$-$C_4$-alkyl; linear or branched $C_1$-$C_4$-alkyl, which is substituted by at least one substituent selected from the group consisting of hydroxyl, cyano, $SO_3H$, —$NH_2$, carboxyl, carb-$C_1$-$C_2$alkoxy, $C_1$-$C_2$alkoxy, phenyl, naphthyl and pyridyl; linear or branched, unsubstituted $C_1$-$C_4$-alkoxy, Z is unsubstituted $C_1$-$C_2$-alkyl; $C_1$-$C_2$-alkyl, which is substituted by at least one substituent selected from the group consisting of hydroxyl, cyano, $SO_3H$, —$NH_2$, carboxyl, carb-$C_1$-$C_2$alkoxy, $C_1$-$C_2$alkoxy, phenyl, naphthyl and pyridyl; linear or branched, unsubstituted $C_1$-$C_4$-alkoxy; OH; $NO_2$; COOH; $COOC_1$-$C_2$alkyl, $Z_1$ is OH; $NO_2$; COOH or $COOC_1$-$C_2$alkyl, G is a direct bond; unsubstituted arylene; arylene which is substituted by at least one substituent selected from the group consisting of hydroxyl, cyano, $NO_2$, $SO_3H$, —$NH_2$, carboxyl, carb-$C_1$-$C_2$alkoxy, $C_1$-$C_2$alkoxy and $C_1$-$C_2$alkyl; unsubstituted $C_1$-$C_4$alkylene or $C_1$-$C_4$alkylene which is substituted by at least one substituent selected from the group consisting of hydroxyl, cyano, $NO_2$, $SO_3H$, —$NH_2$, carboxyl, carb-$C_1$-$C_2$alkoxy, $C_1$-$C_2$alkoxy and $C_1$-$C_2$alkyl, n is 0; 1 or 2, m is 0 or 1, $m_1$ is 0 or 1, each M is independently from each other hydrogen; $Na^+$ or $K^+$;

(III')

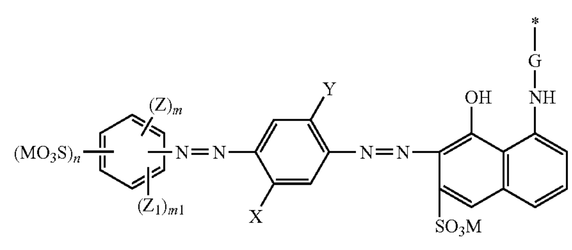

wherein

X and Y independently of one another are linear or branched, unsubstituted $C_1$-$C_4$-alkyl; linear or branched $C_1$-$C_4$-alkyl, which is substituted by at least one substituent selected from the group consisting of hydroxyl, cyano, $SO_3H$, —$NH_2$, carboxyl, carb-$C_1$-$C_2$alkoxy, $C_1$-$C_2$alkoxy, phenyl, naphthyl and pyridyl; linear or branched, unsubstituted $C_1$-$C_4$-alkoxy, Z is unsubstituted $C_1$-$C_2$-alkyl; $C_1$-$C_2$-alkyl, which is substituted by at least one substituent selected from the group consisting of hydroxyl, cyano, $SO_3H$, —$NH_2$, carboxyl, carb-$C_1$-$C_2$alkoxy, $C_1$-$C_2$alkoxy, phenyl, naphthyl and pyridyl; linear or branched, unsubstituted $C_1$-$C_4$-alkoxy; OH; $NO_2$; COOH; $COOC_1$-$C_2$alkyl, $Z_1$ is OH; $NO_2$; COOH or $COOC_1$-$C_4$alkyl, G is a direct bond; unsubstituted arylene; arylene which is substituted by at least one substituent selected from the group consisting of hydroxyl, cyano, $NO_2$, $SO_3H$, —$NH_2$, carboxyl, carb-$C_1$-$C_2$alkoxy, $C_1$-$C_2$alkoxy and $C_1$-$C_2$alkyl; unsubstituted $C_1$-$C_4$alkylene or $C_1$-$C_4$-alkylene which is substituted by at least one substituent selected from the group consisting of hydroxyl, cyano, $NO_2$, $SO_3H$, —$NH_2$, carboxyl, carb-$C_1$-$C_2$alkoxy, $C_1$-$C_2$alkoxy and $C_1$-$C_2$alkyl, n is 0; 1 or 2, m is 0 or 1, $m_1$ is 0 or 1, each M is independently from each other hydrogen; $Na^+$ or $K^+$;

(IV')

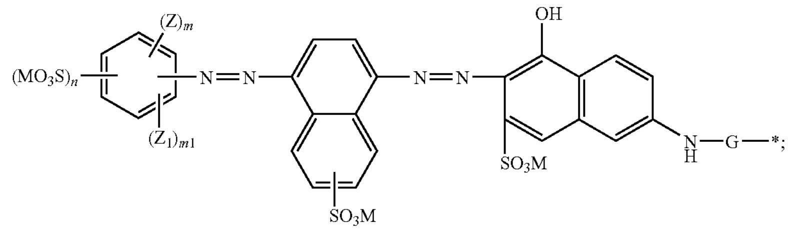

wherein

Z is unsubstituted $C_1$-$C_2$-alkyl; $C_1$-$C_2$-alkyl, which is substituted by at least one substituent selected from the group consisting of hydroxyl, cyano, $SO_3H$, —$NH_2$, carboxyl, carb-$C_1$-$C_2$alkoxy, $C_1$-$C_2$alkoxy, phenyl, naphthyl and pyridyl; linear or branched, unsubstituted $C_1$-$C_4$-alkoxy; OH; $NO_2$; COOH; $COOC_1$-$C_2$alkyl, $Z_1$ is OH; $NO_2$; COOH or $COOC_1$-$C_2$alkyl, G is a direct bond or $COOC_1$-$C_2$alkylene, n is 0; 1 or 2, m is 0 or 1, $m_1$ is 0 or 1, each M is independently from each other hydrogen; $Na^+$ or $K^+$;

(V')

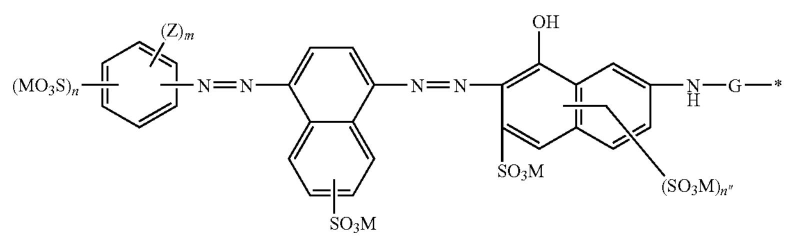

wherein

Z is unsubstituted $C_1$-$C_2$-alkyl; $C_1$-$C_2$-alkyl, which is substituted by at least one substituent selected from the group consisting of hydroxyl, cyano, $SO_3H$, —$NH_2$, carboxyl, carb-$C_1$-$C_2$alkoxy, $C_1$-$C_2$alkoxy, phenyl, naphthyl and pyridyl; linear or branched, unsubstituted $C_1C_4$-alkoxy; OH; $NO_2$; COOH; $COOC_1$-$C_2$alkyl, G is a direct bond or $COOC_1$-$C_2$alkylene, n is 0; 1 or 2, n'' is 0 or 1, m is 0 or 1, each M is independently from each other hydrogen; $Na^+$ or $K^+$;

(VI')

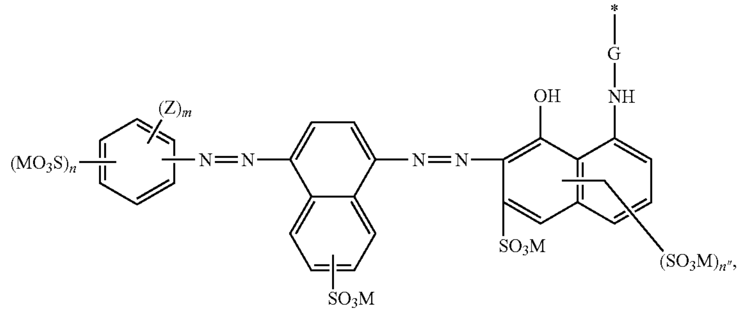

wherein

Z is unsubstituted $C_1$-$C_2$-alkyl; $C_1$-$C_2$-alkyl, which is substituted by at least one substituent selected from the group consisting of hydroxyl, cyano, $SO_3H$, —$NH_2$, carboxyl, carb-$C_1$-$C_2$alkoxy, $C_1$-$C_2$alkoxy, phenyl, naphthyl and pyridyl; linear or branched, unsubstituted $C_1$-$C_4$-alkoxy; OH; $NO_2$; COOH; $COOC_1$-$C_2$alkyl, G is a direct bond or $COOC_1$-$C_2$alkylene, n is 0; 1 or 2, n" is 0 or 1, m is 0 or 1, each M is independently from each other hydrogen; $Na^+$ or $K^+$;

(VIIa')

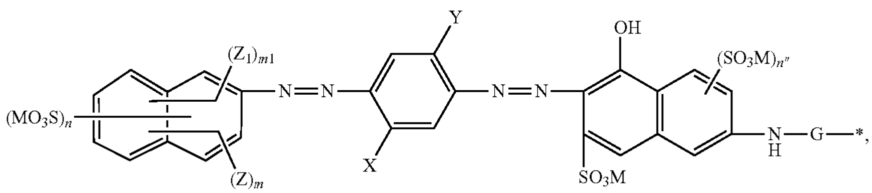

wherein

* marks the bond to the bridging group L,

X is hydrogen; $SO_3M$; linear or branched, unsubstituted $C_1$-$C_2$-alkyl; linear or branched $C_1$-$C_2$-alkyl, which is substituted by at least one substituent selected from the group consisting of hydroxyl, cyano, $SO_3H$ and —$NH_2$; linear or branched, unsubstituted $C_1$-$C_2$-alkoxy or linear or branched, $C_1$-$C_2$-alkoxy, which substituted by at least one substituent selected from the group consisting of hydroxyl, cyano, $SO_3H$ and —$NH_2$, Y is $SO_3M$; linear or branched, unsubstituted $C_1$-$C_2$-alkyl; linear or branched $C_1$-$C_2$-alkyl, which is substituted by at least one substituent selected from the group consisting of hydroxyl, cyano, $SO_3H$ and —$NH_2$; linear or branched, unsubstituted $C_1$-$C_2$-alkoxy or linear or branched, $C_1$-$C_2$-alkoxy, which substituted by at least one substituent selected from the group consisting of hydroxyl, cyano, $SO_3H$ and —$NH_2$, Z is $NH_2$ or $NHCOOC_1$-$C_4$alkyl, $Z_1$ is OH or $NHCOC_1$-$C_4$alkyl, G is a direct bond; $COOC_1$-$C_2$alkylene; unsubstituted arylene; arylene which is substituted by at least one substituent selected from the group consisting of hydroxyl, cyano, $NO_2$, $SO_3H$, —$NH_2$, carboxyl, carb-$C_1C_4$alkoxy, $C_1$-$C_4$alkoxy and $C_1$-$C_4$alkyl; unsubstituted $C_1C_2$alkylene or $C_1$-$C_2$-alkylene which is substituted by at least one substituent selected from the group consisting of hydroxyl, cyano, $NO_2$, $SO_3H$, —$NH_2$, carboxyl, carb-$C_1C_4$alkoxy, $C_1$-$C_4$alkoxy and $C_1$-$C_4$alkyl, n is 0; 1 or 2, n" is 0 or 1, m is 0 or 1, $m_1$ is 0 or 1, each M is independently from each other hydrogen; $Na^+$ or $K^+$;

(VIIb')

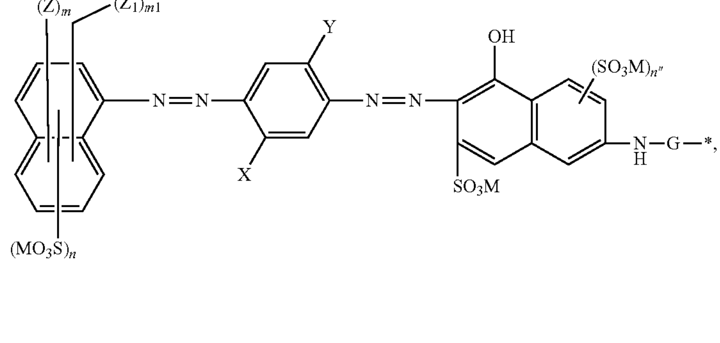

wherein

* marks the bond to the bridging group L,

X is hydrogen; $SO_3M$; linear or branched, unsubstituted $C_1$-$C_2$-alkyl; linear or branched $C_1$-$C_2$-alkyl, which is substituted by at least one substituent selected from the group consisting of hydroxyl, cyano, $SO_3H$ and —$NH_2$; linear or branched, unsubstituted $C_1$-$C_2$-alkoxy or linear or branched, $C_1$-$C_2$-alkoxy, which is substituted by at least one substituent selected from the group consisting of hydroxyl, cyano, $SO_3H$ and —$NH_2$, Y is $SO_3M$; linear or branched, unsubstituted $C_1$-$C_2$-alkyl; linear or branched $C_1$-$C_2$-alkyl, which is substituted by at least one substituent selected from the group consisting of hydroxyl, cyano, $SO_3H$ and —$NH_2$; linear or branched, unsubstituted $C_1$-$C_2$-alkoxy or linear or branched, $C_1$-$C_2$-alkoxy, which is substituted by at least one substituent selected from the group consisting of hydroxyl, cyano, $SO_3H$ and —$NH_2$, Z is $NH_2$ or $NHCOOC_1$-$C_4$alkyl, $Z_1$ is OH or $NHCOC_1$-$C_4$alkyl, G is a direct bond; $COOC_1$-$C_2$alkylene; unsubstituted arylene; arylene which is substituted by at least one substituent selected from the group consisting of hydroxyl, cyano, $NO_2$, $SO_3H$, —$NH_2$, carboxyl, carb-$C_1$-$C_4$alkoxy, $C_1$-$C_4$alkoxy and $C_1$-$C_4$alkyl; unsubstituted $C_1$-$C_2$alkylene or $C_1$-$C_2$-alkylene which is substituted by at least one substituent selected from the group consisting of hydroxyl, cyano, $NO_2$, $SO_3H$, —$NH_2$, carboxyl, carb-$C_1C_4$alkoxy, $C_1$-$C_4$alkoxy and $C_1$-$C_4$alkyl, n is 1; 2 or 3, n" is 0 or 1, m is 0 or 1, $m_1$ is 0 or 1, each M is independently from each other hydrogen; $Na^+$ or $K^+$;

group consisting of hydroxyl, cyano, $SO_3H$ and —$NH_2$; linear or branched, unsubstituted $C_1$-$C_2$-alkoxy or linear or branched, $C_1$-$C_2$-alkoxy, which is substituted by at least one substituent selected from the group consisting of hydroxyl, cyano, $SO_3H$ and —$NH_2$, Y is $SO_3M$; linear or branched, unsubstituted $C_1$-$C_2$-alkyl; linear or branched $C_1$-$C_2$-alkyl, which is substituted by at least one substituent selected from the group consisting of hydroxyl, cyano, $SO_3H$ and —$NH_2$; linear or branched, unsubstituted $C_1$-$C_2$-alkoxy or linear or branched, $C_1$-$C_2$-alkoxy, which is substituted by at least one substituent selected from the group consisting of hydroxyl, cyano, $SO_3H$ and —$NH_2$, Z is $NH_2$; NH-aryl or NH-aryl, wherein the aryl is substituted by at least one substituent selected from the group consisting of $SO_3H$, carboxyl, carb-$C_1$-$C_2$alkoxy, $C_1$-$C_2$alkyl and $C_1$-$C_2$alkoxy, $Z_1$ is OH; $NHCOC_1$-$C_2$alkyl or $NHCOOC_1$-$C_2$alkyl, G is a direct bond; $COOC_1$-$C_2$alkylene; unsubstituted arylene; arylene which is substituted by at least one substituent selected from the group consisting of hydroxyl, cyano, $NO_2$, $SO_3H$, —$NH_2$, carboxyl, carb-$C_1$-$C_2$alkoxy, $C_1$-$C_2$alkoxy and $C_1$-$C_2$alkyl; unsubstituted $C_1$-$C_2$alkylene or $C_1$-$C_2$-alkylene which is substituted by at least one substituent selected from the group consisting of hydroxyl, cyano, $NO_2$, $SO_3H$, —$NH_2$, carboxyl, carb-$C_1$-$C_2$alkoxy, $C_1$-$C_2$alkoxy and $C_1$-$C_2$alkyl, n is 1; 2 or 3, (VIII')

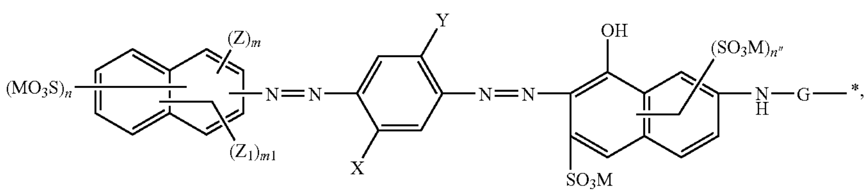

wherein

* marks the bond to the bridging group L,

X is hydrogen; $SO_3M$; linear or branched, unsubstituted $C_1$-$C_2$-alkyl; linear or branched $C_1$-$C_2$-alkyl, which is substituted by at least one substituent selected from the n" is 0 or 1, m is 0 or 1, $m_1$ is 0 or 1, each M is independently from each other hydrogen; $Na^+$ or $K^+$;

(IX')

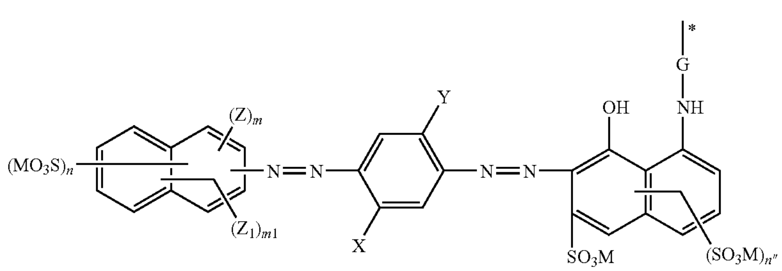

wherein

* marks the bond to the bridging group L,

X is hydrogen; $SO_3M$; linear or branched, unsubstituted $C_1$-$C_2$-alkyl; linear or branched $C_1$-$C_2$-alkyl, which is substituted by at least one substituent selected from the group consisting of hydroxyl, cyano, $SO_3H$ and —$NH_2$; linear or branched, unsubstituted $C_1$-$C_2$-alkoxy or linear or branched, $C_1$-$C_2$-alkoxy, which is substituted by at least one substituent selected from the group consisting of hydroxyl, cyano, $SO_3H$ and —$NH_2$, Y is $SO_3M$; linear or branched, unsubstituted $C_1$-$C_2$-alkyl; linear or branched $C_1$-$C_2$-alkyl, which is substituted by at least one substituent selected from the group consisting of hydroxyl, cyano, $SO_3H$ and —$NH_2$; linear or branched, unsubstituted $C_1$-$C_2$-alkoxy or linear or branched, $C_1$-$C_2$-alkoxy, which is substituted by at least one substituent selected from the group consisting of hydroxyl, cyano, $SO_3H$ and —$NH_2$, Z is $NH_2$; NH-aryl or NH-aryl, wherein the aryl is substituted by at least one substituent selected from the group wherein

* marks the bond to the bridging group L,

Z is $NH_2$; $NHCOC_1$-$C_4$alkyl or $NHCOOC_1$-$C_4$alkyl, $Z_1$ is OH; NH-aryl or NH-aryl, wherein the aryl is substituted by at least one substituent selected from the group consisting of hydroxyl, cyano, $SO_3H$, —$NH_2$, carboxyl, carb-$C_1C_4$alkoxy, $C_1$-$C_4$alkyl and $C_1$-$C_4$alkoxy, G is a direct bond; $COOC_1$-$C_4$alkylene; unsubstituted arylene; arylene which is substituted by at least one substituent selected from the group consisting of hydroxyl, cyano, $NO_2$, $SO_3H$, —$NH_2$, carboxyl, carb-$C_1$-$C_4$alkoxy, $C_1$-$C_4$alkoxy and $C_1$-$C_4$alkyl; unsubstituted $C_1$-$C_4$alkylene or $C_1$-$C_4$-alkylene which is substituted by at least one substituent selected from the group consisting of hydroxyl, cyano, $NO_2$, $SO_3H$, —$NH_2$, carboxyl, carb-$C_1$-$C_4$alkoxy, $C_1$-$C_4$alkoxy and $C_1$-$C_4$alkyl, n is 1; 2 or 3, m is 0 or 1, $m_1$ is 0 or 1, each M is independently from each other hydrogen; $Na^+$ or $K^+$;

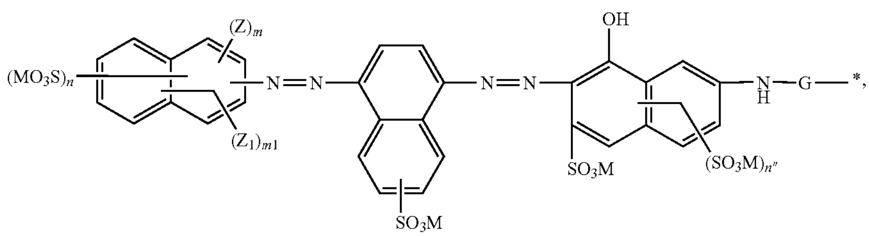

(XI′)

consisting of $SO_3H$, carboxyl, carb-$C_1$-$C_2$alkoxy, $C_1$-$C_2$alkyl and $C_1$-$C_2$alkoxy, $Z_1$ is OH; $NHCOC_1$-$C_2$alkyl or $NHCOOC_1$-$C_2$alkyl, G is a direct bond; $COOC_1$-$C_2$alkylene; unsubstituted arylene; arylene which is substituted by at least one substituent selected from the group consisting of hydroxyl, cyano, $NO_2$, $SO_3H$, —$NH_2$, carboxyl, carb-$C_1$-$C_2$alkoxy, $C_1$-$C_2$alkoxy and $C_1$-$C_2$alkyl; unsubstituted $C_1$-$C_2$alkylene or $C_1$-$C_2$-alkylene which is substituted by at least one substituent selected from the group consisting of hydroxyl, cyano, $NO_2$, $SO_3H$, —$NH_2$, carboxyl, carb-$C_1$-$C_2$alkoxy, $C_1$-$C_2$alkoxy and $C_1$-$C_2$alkyl, n is 1; 2 or 3, n" is 0 or 1, m is 0 or 1, $m_1$ is 0 or 1, each M is independently from each other hydrogen; $Na^+$ or $K^+$;

wherein

* marks the bond to the bridging group L,

Z is $NH_2$; $NHCOC_1$-$C_4$alkyl or $NHCOOC_1$-$C_4$alkyl, $Z_1$ is OH; NH-aryl or NH-aryl, wherein the aryl is substituted by at least one substituent selected from the group consisting of hydroxyl, cyano, $SO_3H$, —$NH_2$, carboxyl, carb-$C_1$-$C_4$alkoxy, $C_1$-$C_4$alkyl and $C_1$-$C_4$alkoxy, G is a direct bond; $COOC_1$-$C_4$alkylene; unsubstituted arylene; arylene which is substituted by at least one substituent selected from the group consisting of hydroxyl, cyano, $NO_2$, $SO_3H$, —$NH_2$, carboxyl, carb-$C_1$-$C_4$alkoxy, $C_1$-$C_4$alkoxy and $C_1$-$C_4$alkyl; unsubstituted $C_1$-$C_4$alkylene or $C_1$-$C_4$-alkylene which is substituted by at least one substituent selected from the group consisting of hydroxyl, cyano, $NO_2$, $SO_3H$, —$NH_2$, carboxyl, carb-$C_1$-$C_4$alkoxy, $C_1$-$C_4$alkoxy and $C_1$-$C_4$alkyl, n is 1; 2 or 3, n" is 0 or 1,

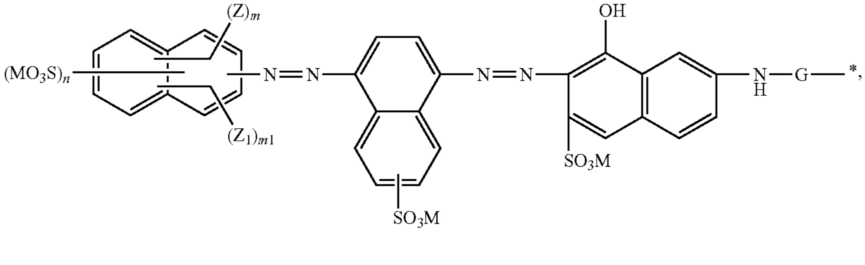

(X′)

m is 0 or 1, $m_1$ is 0 or 1, each M is independently from each other hydrogen; $Na^+$ or $K^+$;

(XII')

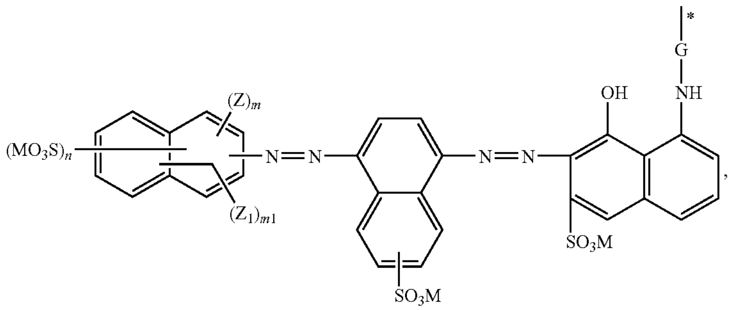

wherein

* marks the bond to the bridging group L,

Z is $NH_2$; $NHCOC_1$-$C_4$alkyl or $NHCOOC_1$-$C_4$alkyl, $Z_1$ is OH; NH-aryl or NH-aryl, wherein the aryl is substituted by at least one substituent selected from the group consisting of hydroxyl, cyano, $SO_3H$, —$NH_2$, carboxyl, carb-$C_1$-$C_4$alkoxy, $C_1$-$C_4$alkyl and $C_1$-$C_4$alkoxy, G is a direct bond; $COOC_1$-$C_4$alkylene; unsubstituted arylene; arylene which is substituted by at least one substituent selected from the group consisting of hydroxyl, cyano, $NO_2$, $SO_3H$, —$NH_2$, carboxyl, carb-$C_1$-$C_4$alkoxy, $C_1$-$C_4$alkoxy and $C_1$-$C_4$alkyl; unsubstituted $C_1$-$C_4$alkylene or $C_1$-$C_4$-alkylene which is substituted by at least one substituent selected from the group consisting of hydroxyl, cyano, $NO_2$, $SO_3H$, —$NH_2$, carboxyl, carb-$C_1$-$C_4$alkoxy, $C_1$-$C_4$alkoxy and $C_1$-$C_4$alkyl, n is 1; 2 or 3, m is 0 or 1, $m_1$ is 0 or 1, each M is independently from each other hydrogen; $Na^+$ or $K^+$;

(XIII')

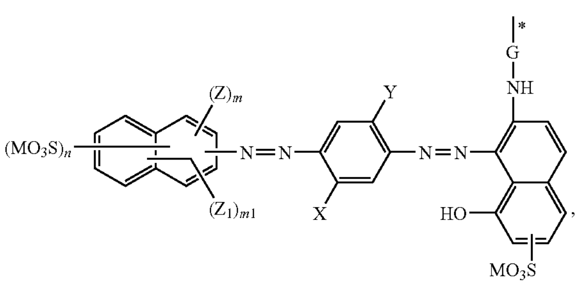

wherein

* marks the bond to the bridging group L,

X is hydrogen; $SO_3M$; linear or branched, unsubstituted $C_1$-$C_2$-alkyl; linear or branched $C_1$-$C_2$-alkyl, which is substituted by at least one substituent selected from the group consisting of hydroxyl, cyano, $SO_3H$ and —$NH_2$; linear or branched, unsubstituted $C_1$-$C_2$-alkoxy or linear or branched, $C_1$-$C_2$-alkoxy, which is substituted by at least one substituent selected from the group consisting of hydroxyl, cyano, $SO_3H$ and —$NH_2$, Y is $SO_3M$; linear or branched, unsubstituted $C_1$-$C_2$-alkyl; linear or branched $C_1$-$C_2$-alkyl, which is substituted by at least one substituent selected from the group consisting of hydroxyl, cyano, $SO_3H$, and —$NH_2$; linear or branched, unsubstituted $C_1$-$C_2$-alkoxy or linear or branched, $C_1$-$C_2$-alkoxy, which is substituted by at least one substituent selected from the group consisting of hydroxyl, cyano, $SO_3H$ and —$NH_2$, Z is $NH_2$; $NHCOC_1$-$C_4$alkyl or $NHCOOC_1$-$C_4$alkyl, $Z_1$ is OH; NH-aryl or NH-aryl, wherein the aryl is substituted by at least one substituent selected from the group consisting of hydroxyl, cyano, $SO_3H$, —$NH_2$, carboxyl, carb-$C_1$-$C_4$alkoxy, $C_1$-$C_4$alkyl and $C_1$-$C_4$alkoxy, G is a direct bond; $COOC_1$-$C_4$alkylene; unsubstituted arylene; arylene which is substituted by at least one substituent selected from the group consisting of hydroxyl, cyano, $NO_2$, $SO_3H$, —$NH_2$, carboxyl, carb-$C_1$-$C_4$alkoxy, $C_1$-$C_4$alkoxy and $C_1$-$C_4$alkyl; unsubstituted $C_1$-$C_4$alkylene or $C_1$-$C_4$-alkylene which is substituted by at least one substituent selected from the group consisting of hydroxyl, cyano, $NO_2$, $SO_3H$, —$NH_2$, carboxyl, carb-$C_1$-$C_4$alkoxy, $C_1$-$C_4$alkoxy and $C_1$-$C_4$alkyl, n is 1; 2 or 3, m is or 1, $m_1$ is 0 or 1, each M is independently from each other hydrogen; $Na^+$ or $K^+$;

(XIV')

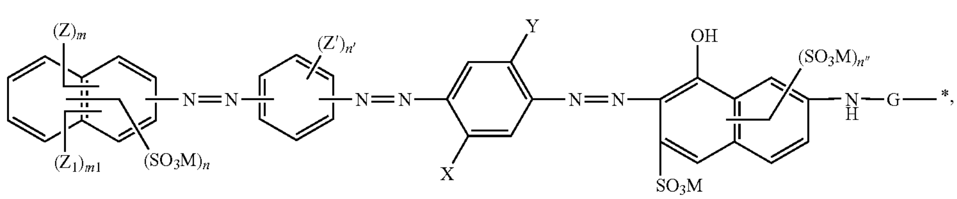

wherein

* marks the bond to the bridging group L,

X is hydrogen; $SO_3M$; linear or branched, unsubstituted $C_1$-$C_2$-alkyl; linear or branched $C_1$-$C_4$-alkyl, which is substituted by at least one substituent selected from the group consisting of hydroxyl, cyano, $SO_3H$, —$NH_2$, carboxyl, carb-$C_1$-$C_4$alkoxy, $C_1$-$C_4$alkoxy, phenyl, naphthyl and pyridyl; linear or branched, unsubstituted $C_1$-$C_4$-alkoxy; linear or branched, $C_1$-$C_4$-alkoxy, which is substituted by at least one substituent selected from the group consisting of hydroxyl, cyano, $SO_3H$, —$NH_2$, carboxyl, carb-$C_1$-$C_4$alkoxy, $C_1$-$C_4$alkyl, phenyl, naphthyl and pyridyl; COOH or $COOC_1$-$C_2$alkyl, Y is linear or branched, unsubstituted $C_1$-$C_2$-alkyl; linear or branched $C_1$-$C_4$-alkyl, which is substituted by at least one substituent selected from the group consisting of hydroxyl, cyano, $SO_3H$, —$NH_2$, carboxyl, carb-$C_1$-$C_4$alkoxy, $C_1$-$C_4$alkoxy, phenyl, naphthyl and pyridyl; linear or branched, unsubstituted $C_1$-$C_4$-alkoxy; linear or branched, $C_1$-$C_4$-alkoxy, which is substituted by at least one substituent selected from the group consisting of hydroxyl, cyano, $SO_3H$, —$NH_2$, carboxyl, carb-$C_1C_4$alkoxy, $C_1$-$C_4$alkyl, phenyl, naphthyl and pyridyl; COOH or $COOC_1$-$C_2$alkyl, Z is $NH_2$; NH-aryl or NH-aryl, wherein the aryl is substituted by at least one substituent selected from the group consisting of hydroxyl, cyano, $SO_3H$, —$NH_2$, carboxyl, carb-$C_1$-$C_2$alkoxy, $C_1$-$C_2$alkyl and $C_1$-$C_2$alkoxy, Z' is $SO_3M$; COOH or $COOC_1$-$C_2$alkyl, $Z_1$ is OH; $NHCOC_1$-$C_2$alkyl or $NHCOOC_1$-$C_2$alkyl, G is a direct bond; $COOC_1$-$C_2$alkylene; unsubstituted arylene; arylene which is substituted by at least one substituent selected from the group consisting of hydroxyl, cyano, $NO_2$, $SO_3H$, —$NH_2$, carboxyl, carb-$C_1$-$C_2$alkoxy, $C_1$-$C_2$alkoxy and $C_1$-$C_2$alkyl; unsubstituted $C_1$-$C_2$alkylene or $C_1$-$C_2$-alkylene which is substituted by at least one substituent selected from the group consisting of hydroxyl, cyano, $NO_2$, $SO_3H$, —$NH_2$, carboxyl, carb-$C_1$-$C_2$alkoxy, $C_1$-$C_2$alkoxy and $C_1$-$C_2$alkyl, n is 1; 2 or 3, n' is 0 or 1, n" is 0 or 1, m is 0 or 1, $m_1$ is 0 or 1, each M is independently from each other hydrogen; $Na^+$ or $K^+$;

wherein

* marks the bond to the bridging group L,

X is hydrogen; $SO_3M$; linear or branched, unsubstituted $C_1$-$C_2$-alkyl; linear or branched $C_1$-$C_4$-alkyl, which is substituted by at least one substituent selected from the group consisting of hydroxyl, cyano, $SO_3H$, —$NH_2$, carboxyl, carb-$C_1$-$C_4$alkoxy, $C_1$-$C_4$alkoxy, phenyl, naphthyl and pyridyl; linear or branched, unsubstituted $C_1$-$C_4$-alkoxy; linear or branched, $C_1$-$C_4$-alkoxy, which is substituted by at least one substituent selected from the group consisting of hydroxyl, cyano, $SO_3H$, —$NH_2$, carboxyl, carb-$C_1C_4$alkoxy, $C_1$-$C_4$alkyl, phenyl, naphthyl and pyridyl; COOH or $COOC_1$-$C_2$alkyl, Y is linear or branched, unsubstituted $C_1$-$C_2$-alkyl; linear or branched $C_1$-$C_4$-alkyl, which is substituted by at least one substituent selected from the group consisting of hydroxyl, cyano, $SO_3H$, —$NH_2$, carboxyl, carb-$C_1C_4$alkoxy, $C_1$-$C_4$alkoxy, phenyl, naphthyl and pyridyl; linear or branched, unsubstituted $C_1$-$C_4$-alkoxy; linear or branched, $C_1$-$C_4$-alkoxy, which is substituted by at least one substituent selected from the group consisting of hydroxyl, cyano, $SO_3H$, —$NH_2$, carboxyl, carb-$C_1C_4$alkoxy, $C_1$-$C_4$alkyl, phenyl, naphthyl and pyridyl; COOH or $COOC_1$-$C_2$alkyl, Z is $NH_2$; NH-aryl or NH-aryl, wherein the aryl is substituted by at least one substituent selected from the group consisting of hydroxyl, cyano, $SO_3H$, —$NH_2$, carboxyl, carb-$C_1$-$C_2$alkoxy, $C_1$-$C_2$alkyl and $C_1$-$C_2$alkoxy, Z' is $SO_3M$; COOH or $COOC_1$-$C_2$alkyl, $Z_1$ is OH; $NHCOC_1$-$C_2$alkyl or $NHCOOC_1$-$C_2$alkyl, G is a direct bond; $COOC_1$-$C_2$alkylene; unsubstituted arylene; arylene which is substituted by at least one substituent selected from the group consisting of hydroxyl, cyano, $NO_2$, $SO_3H$, —$NH_2$, carboxyl, carb-$C_1$-$C_2$alkoxy, $C_1$-$C_2$alkoxy and $C_1$-$C_2$alkyl; unsubstituted $C_1$-$C_2$alkylene or $C_1$-$C_2$-alkylene which is substituted by at least one substituent selected from the group consisting of hydroxyl, cyano, $NO_2$, $SO_3H$, —$NH_2$, carboxyl, carb-$C_1$-$C_2$alkoxy, $C_1$-$C_2$alkoxy and $C_1$-$C_2$alkyl, n is 1; 2 or 3, n' is 0 or 1, n" is 0 or 1, m is 0 or 1, $m_1$ is 0 or 1, each M is independently from each other hydrogen; $Na^+$ or $K^+$;

(XV')

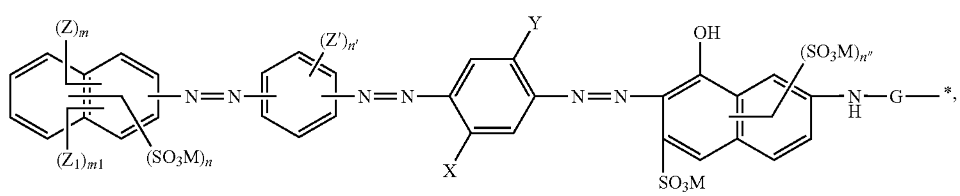

(XVI')

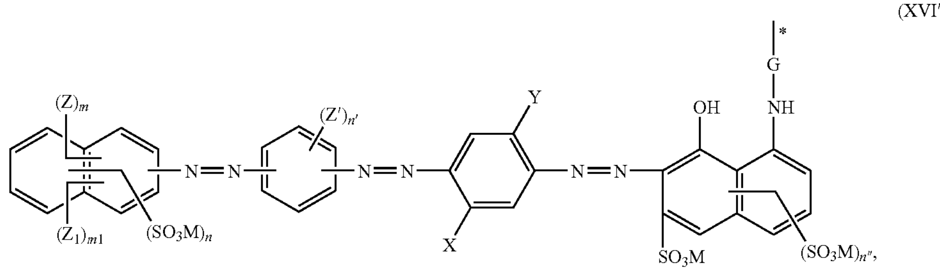

wherein

* marks the bond to the bridging group L,

X is hydrogen; $SO_3M$; linear or branched, unsubstituted $C_1$-$C_2$-alkyl; linear or branched $C_1$-$C_4$-alkyl, which is substituted by at least one substituent selected from the group consisting of hydroxyl, cyano, $SO_3H$, —$NH_2$, carboxyl, carb-$C_1C_4$alkoxy, $C_1$-$C_4$alkoxy, phenyl, naphthyl and pyridyl; linear or branched, unsubstituted $C_1$-$C_4$-alkoxy; linear or branched, $C_1$-$C_4$-alkoxy, which is substituted by at least one substituent selected from the group consisting of hydroxyl, cyano, $SO_3H$, —$NH_2$, carboxyl, carb-$C_1C_4$alkoxy, $C_1$-$C_4$alkyl, phenyl, naphthyl and pyridyl; COOH or $COOC_1$-$C_2$alkyl, tuted $C_1$-$C_2$alkylene or $C_1$-$C_2$-alkylene which is substituted by at least one substituent selected from the group consisting of hydroxyl, cyano, $NO_2$, $SO_3H$, —$NH_2$, carboxyl, carb-$C_1$-$C_2$alkoxy, $C_1$-$C_2$alkoxy and $C_1$-$C_2$alkyl, n is 1; 2 or 3, n' is 0 or 1, n'' is 0 or 1, m is 0 or 1, $m_1$ is 0 or 1, each M is independently from each other hydrogen; $Na^+$ or $K^+$;

(XVII')

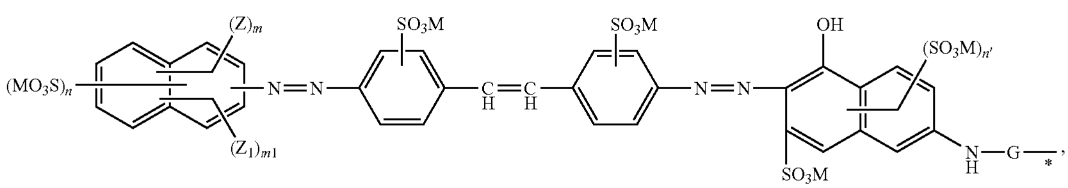

Y is linear or branched, unsubstituted $C_1$-$C_2$-alkyl; linear or branched $C_1$-$C_4$-alkyl, which is substituted by at least one substituent selected from the group consisting of hydroxyl, cyano, $SO_3H$, —$NH_2$, carboxyl, carb-$C_1C_4$alkoxy, $C_1$-$C_4$alkoxy, phenyl, naphthyl and pyridyl; linear or branched, unsubstituted $C_1$-$C_4$-alkoxy; linear or branched, $C_1$-$C_4$-alkoxy, which is substituted by at least one substituent selected from the group consisting of hydroxyl, cyano, $SO_3H$, —$NH_2$, carboxyl, carb-$C_1C_4$alkoxy, $C_1$-$C_4$alkyl, phenyl, naphthyl and pyridyl; COOH or $COOC_1$-$C_2$alkyl, Z is $NH_2$; NH-aryl or NH-aryl, wherein the aryl is substituted by at least one substituent selected from the group consisting of hydroxyl, cyano, $SO_3H$, —$NH_2$, carboxyl, carb-$C_1$-$C_2$alkoxy, $C_1$-$C_2$alkyl and $C_1$-$C_2$alkoxy, Z' is $SO_3M$; COOH or $COOC_1$-$C_2$alkyl, $Z_1$ is OH; $NHCOC_1$-$C_2$alkyl or $NHCOOC_1$-$C_2$alkyl, G is a direct bond; $COOC_1$-$C_2$alkylene; unsubstituted arylene; arylene which is substituted by at least one substituent selected from the group consisting of hydroxyl, cyano, $NO_2$, $SO_3H$, —$NH_2$, carboxyl, carb-$C_1$-$C_2$alkoxy, $C_1$-$C_2$alkoxy and $C_1$-$C_2$alkyl; unsubstiwherein

* marks the bond to the bridging group L,

Z is $NH_2$; NH-aryl or NH-aryl, wherein the aryl is substituted by at least one substituent selected from the group consisting of hydroxyl, cyano, $SO_3H$, —$NH_2$, carboxyl, carb-$C_1$-$C_2$alkoxy, $C_1$-$C_2$alkyl and $C_1$-$C_2$alkoxy, $Z_1$ is OH; $NHCOC_1$-$C_2$alkyl or $NHCOOC_1$-$C_2$alkyl, G is a direct bond; $COOC_1$-$C_2$alkylene; unsubstituted arylene; arylene which is substituted by at least one substituent selected from the group consisting of hydroxyl, cyano, $NO_2$, $SO_3H$, —$NH_2$, carboxyl, carb-$C_1$-$C_2$alkoxy, $C_1$-$C_2$alkoxy and $C_1$-$C_2$alkyl; unsubstituted $C_1$-$C_2$alkylene or $C_1$-$C_2$-alkylene which is substituted by at least one substituent selected from the group consisting of hydroxyl, cyano, $NO_2$, $SO_3H$, —$NH_2$, carboxyl, carb-$C_1$-$C_2$alkoxy, $C_1$-$C_2$alkoxy and $C_1$-$C_2$alkyl, n is 1; 2 or 3, n' is 0 or 1, m is 0 or 1, $m_1$ is 0 or 1, each M is independently from each other hydrogen; $Na^+$ or $K^+$;

(XVIII')

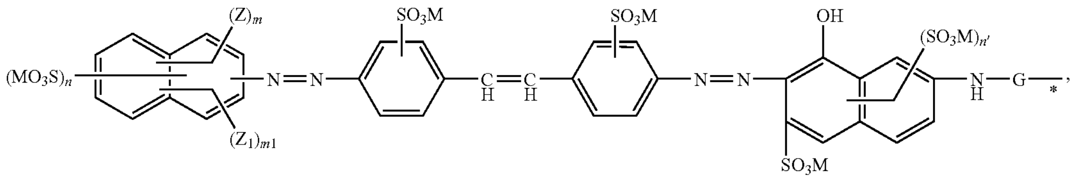

wherein

* marks the bond to the bridging group L,

Z is $NH_2$; NH-aryl or NH-aryl, wherein the aryl is substituted by at least one substituent selected from the group consisting of hydroxyl, cyano, $SO_3H$, —$NH_2$, carboxyl, carb-$C_1$-$C_2$alkoxy, $C_1$-$C_2$alkyl and $C_1$-$C_2$alkoxy, $Z_1$ is OH; NHCO$C_1$-$C_2$alkyl or NHCOO$C_1$-$C_2$alkyl, G is a direct bond; COO$C_1$-$C_2$alkylene; unsubstituted arylene; arylene which is substituted by at least one substituent selected from the group consisting of hydroxyl, cyano, $NO_2$, $SO_3H$, —$NH_2$, carboxyl, carb-$C_1$-$C_2$alkoxy, $C_1$-$C_2$alkoxy and $C_1$-$C_2$alkyl; unsubstituted $C_1$-$C_2$alkylene or $C_1$-$C_2$-alkylene which is substituted by at least one substituent selected from the group consisting of hydroxyl, cyano, $NO_2$, $SO_3H$, —$NH_2$, carboxyl, carb-$C_1$-$C_2$alkoxy, $C_1$-$C_2$alkoxy and $C_1$-$C_2$alkyl, n is 1; 2 or 3, n' is 0 or 1, m is 0 or 1, $m_1$ is 0 or 1, each M is independently from each other hydrogen; $Na^+$ or $K^+$;

(XIX')

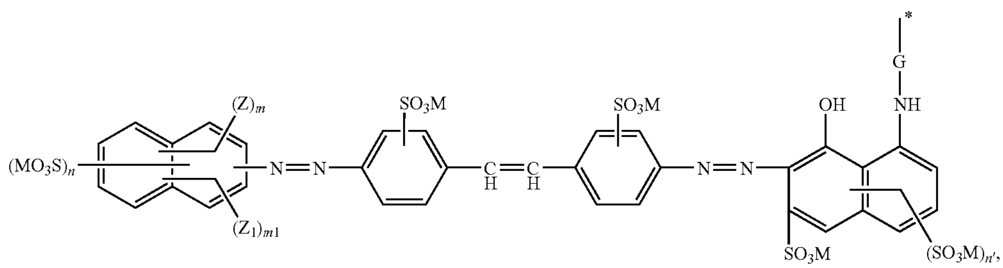

wherein

* marks the bond to the bridging group L,

Z is $NH_2$; NH-aryl or NH-aryl, wherein the aryl is substituted by at least one substituent selected from the group consisting of hydroxyl, cyano, $SO_3H$, —$NH_2$, carboxyl, carb-$C_1$-$C_2$alkoxy, $C_1$-$C_2$alkyl and $C_1$-$C_2$alkoxy, $Z_1$ is OH; NHCO$C_1$-$C_2$alkyl or NHCOO$C_1$-$C_2$alkyl, G is a direct bond; COO$C_1$-$C_2$alkylene; unsubstituted arylene; arylene which is substituted by at least one substituent selected from the group consisting of hydroxyl, cyano, $NO_2$, $SO_3H$, —$NH_2$, carboxyl, carb-$C_1$-$C_2$alkoxy, $C_1$-$C_2$alkoxy and $C_1$-$C_2$alkyl; unsubstituted $C_1$-$C_2$alkylene or $C_1$-$C_2$-alkylene which is substituted by at least one substituent selected from the group consisting of hydroxyl, cyano, $NO_2$, $SO_3H$, —$NH_2$, carboxyl, carb-$C_1$-$C_2$alkoxy, $C_1$-$C_2$alkoxy and $C_1$-$C_2$alkyl, n is 1; 2 or 3, n' is 0 or 1, m is 0 or 1, $m_1$ is 0 or 1, each M is independently from each other hydrogen; $Na^+$ or $K^+$;

(XX')

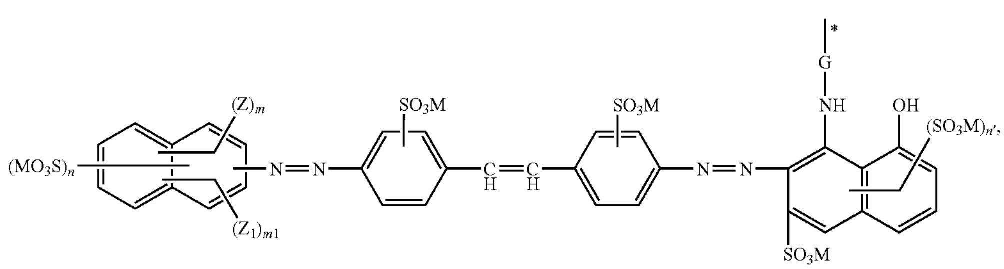

wherein

* marks the bond to the bridging group L,

Z is $NH_2$; NH-aryl or NH-aryl, wherein the aryl is substituted by at least one substituent selected from the group consisting of hydroxyl, cyano, $SO_3H$, —$NH_2$, carboxyl, carb-$C_1$-$C_2$alkoxy, $C_1$-$C_2$alkyl and $C_1$-$C_2$alkoxy, $Z_1$ is OH; NHCO$C_1$-$C_2$alkyl or NHCOO$C_1$-$C_2$alkyl, G is a direct bond; COO$C_1$-$C_2$alkylene; unsubstituted arylene; arylene which is substituted by at least one substituent selected from the group consisting of hydroxyl, cyano, $NO_2$, $SO_3H$, —$NH_2$, carboxyl, carb-$C_1$-$C_2$alkoxy, $C_1$-$C_2$alkoxy and $C_1$-$C_2$alkyl; unsubstituted $C_1$-$C_2$alkylene or $C_1$-$C_2$-alkylene which is substituted by at least one substituent selected from the group consisting of hydroxyl, cyano, $NO_2$, $SO_3H$, —$NH_2$, carboxyl, carb-$C_1$-$C_2$alkoxy, $C_1$-$C_2$alkoxy and $C_1$-$C_2$alkyl, n is 1; 2 or 3, n' is 0 or 1, m is 0 or 1, $m_1$ is 0 or 1, each M is independently from each other hydrogen; $Na^+$ or $K^+$; or (XXVIIa')

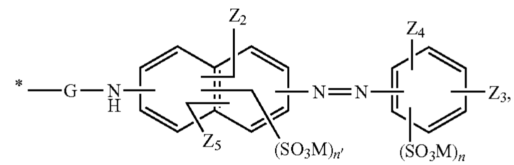

wherein

* marks the bond to the bridging group L, $Z_2$ is linear or branched, unsubstituted $C_1$-$C_2$-alkyl; linear or branched $C_1$-$C_2$-alkyl, which is substituted by at least one substituent selected from the group consisting of hydroxyl, cyano, $SO_3H$, —$NH_2$, carboxyl, carb-$C_1$-$C_2$alkoxy, $C_1$-$C_2$alkoxy, phenyl, naphthyl and pyridyl; linear or branched, unsubstituted $C_1$-$C_2$-alkoxy or linear or branched, $C_1$-$C_2$-alkoxy, which is substituted by at least one substituent selected from the group consisting (XXI')

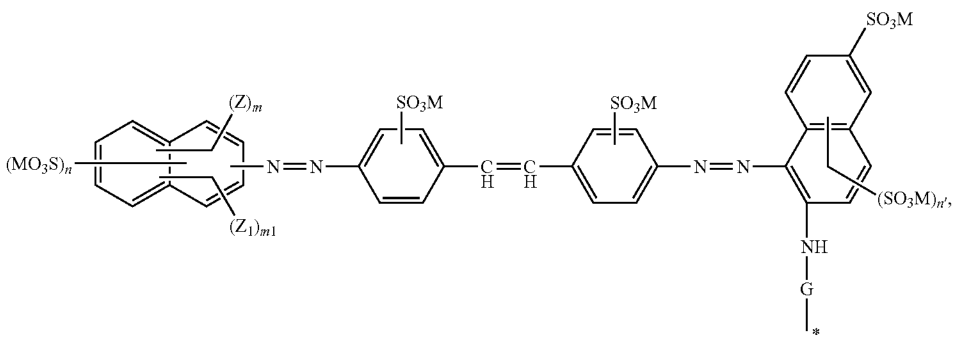

wherein

* marks the bond to the bridging group L,

Z is $NH_2$; NH-aryl or NH-aryl, wherein the aryl is substituted by at least one substituent selected from the group consisting of hydroxyl, cyano, $SO_3H$, —$NH_2$, carboxyl, carb-$C_1$-$C_2$alkoxy, $C_1$-$C_2$alkyl and $C_1$-$C_2$alkoxy, $Z_1$ is OH; NHCO$C_1$-$C_2$alkyl or NHCOO$C_1$-$C_2$alkyl, G is a direct bond; COO$C_1$-$C_2$alkylene; unsubstituted arylene; arylene which is substituted by at least one substituent selected from the group consisting of hydroxyl, cyano, $NO_2$, $SO_3H$, —$NH_2$, carboxyl, carb-$C_1$-$C_2$alkoxy, $C_1$-$C_2$alkoxy and $C_1$-$C_2$alkyl; unsubstituted $C_1$-$C_2$alkylene or $C_1$-$C_2$-alkylene which is substituted by at least one substituent selected from the group consisting of hydroxyl, cyano, $NO_2$, $SO_3H$, —$NH_2$, carboxyl, carb-$C_1$-$C_2$alkoxy, $C_1$-$C_2$alkoxy and $C_1$-$C_2$alkyl, n is 1; 2 or 3, n' is 0 or 1, m is 0 or 1, $m_1$ is 0 or 1, each M is independently from each other hydrogen; $Na^+$ or $K^+$, of hydroxyl, cyano, $SO_3H$, —$NH_2$, carboxyl, carb-$C_1$-$C_2$alkoxy, $C_1$-$C_2$alkyl, phenyl, naphthyl and pyridyl or OH, $Z_3$ is hydrogen; linear or branched, unsubstituted $C_1$-$C_2$-alkyl; linear or branched $C_1$-$C_2$-alkyl, which is substituted by at least one substituent selected from the group consisting of hydroxyl, cyano, $SO_3H$, —$NH_2$, carboxyl, carb-$C_1$-$C_2$alkoxy, $C_1$-$C_2$alkoxy, phenyl, naphthyl and pyridyl; linear or branched, unsubstituted $C_1$-$C_2$-alkoxy or linear or branched, $C_1$-$C_2$-alkoxy, which is substituted by at least one substituent selected from the group consisting of hydroxyl, cyano, $SO_3H$, —$NH_2$, carboxyl, carb-$C_1$-$C_2$alkoxy, $C_1$-$C_2$alkyl, phenyl, naphthyl and pyridyl; OH; $NO_2$; $NH_2$; NH$C_1$-$C_2$alkyl, wherein the alkyl group may be substituted by at least one substituent selected from the group consisting of OH, $NH_2$, $C_1$-$C_2$alkyl, CN or COOH; NHCO$C_1$-$C_2$alkyl or NHCOO$C_1$-$C_2$alkyl, $Z_4$ is hydrogen; linear or branched, unsubstituted $C_1$-$C_2$-alkyl; linear or branched $C_1$-$C_2$-alkyl, which is substituted by at least one substituent selected from the group consisting of hydroxyl, cyano, $SO_3H$, —$NH_2$, carboxyl, carb-$C_1$-$C_2$alkoxy, $C_1$-$C_2$alkoxy, phenyl, naphthyl and pyridyl; linear or branched, unsubstituted $C_1$-$C_2$-alkoxy or linear or branched, $C_1$-$C_2$-alkoxy, which is substituted by at least one substituent selected from the group consisting of hydroxyl, cyano, $SO_3H$, —$NH_2$, carboxyl, carb-$C_1C_4$alkoxy, $C_1$-$C_4$alkyl, phenyl, naphthyl and pyridyl; OH; $NO_2$; $NH_2$; NHC$_1$-$C_2$alkyl, wherein the alkyl group may be substituted by at least one substituent selected from the group consisting of OH, $NH_2$, $C_1$-$C_2$alkyl, CN or COOH; NHCOC$_1$-$C_2$alkyl or NHCOOC$_1$-$C_2$alkyl, $Z_5$ is hydrogen; linear or branched, unsubstituted $C_1$-$C_2$-alkyl or linear or branched $C_1$-$C_2$-alkyl, which is substituted by at least one substituent selected from the group consisting of hydroxyl, cyano, $SO_3H$, —$NH_2$, carboxyl, carb-$C_1$-$C_2$alkoxy, $C_1$-$C_2$alkoxy, phenyl, naphthyl and pyridyl;, G is a direct bond; COOC$_1$-$C_2$alkylene; unsubstituted arylene; arylene which is substituted by at least one substituent selected from the group consisting of hydroxyl, cyano, $NO_2$, $SO_3H$, —$NH_2$, carboxyl, carb-$C_1$-$C_2$alkoxy, $C_1$-$C_2$alkoxy and $C_1$-$C_2$alkyl; unsubstituted $C_1$-$C_2$alkylene or $C_1$-$C_2$-alkylene which is substituted by at least one substituent selected from the group consisting of hydroxyl, cyano, $NO_2$, $SO_3H$, —$NH_2$, carboxyl, carb-$C_1$-$C_2$alkoxy, $C_1$-$C_2$alkoxy and $C_1$-$C_2$alkyl, n is 0; 1 or 2, n' is 0 or 1, each M is independently from each other hydrogen; $Na^+$ or $K^+$;

(XXVIIb')

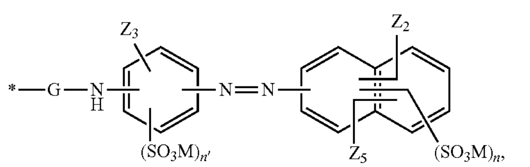

wherein

* marks the bond to the bridging group L, $Z_2$ is linear or branched, unsubstituted $C_1$-$C_2$-alkyl; linear or branched $C_1$-$C_2$-alkyl, which is substituted by at least one substituent selected from the group consisting of hydroxyl, cyano, $SO_3H$, —$NH_2$, carboxyl, carb-$C_1$-$C_2$alkoxy, $C_1$-$C_2$alkoxy, phenyl, naphthyl and pyridyl; linear or branched, unsubstituted $C_1$-$C_2$-alkoxy or linear or branched, $C_1$-$C_2$-alkoxy, which is substituted by at least one substituent selected from the group consisting of hydroxyl, cyano, $SO_3H$, —$NH_2$, carboxyl, carb-$C_1$-$C_2$alkoxy, $C_1$-$C_2$alkyl, phenyl, naphthyl and pyridyl or OH, $Z_3$ is hydrogen; linear or branched, unsubstituted $C_1$-$C_2$-alkyl; linear or branched $C_1$-$C_2$-alkyl, which is substituted by at least one substituent selected from the group consisting of hydroxyl, cyano, $SO_3H$, —$NH_2$, carboxyl, carb-$C_1$-$C_2$alkoxy, $C_1$-$C_2$alkoxy, phenyl, naphthyl and pyridyl; linear or branched, unsubstituted $C_1$-$C_2$-alkoxy or linear or branched, $C_1$-$C_2$-alkoxy, which is substituted by at least one substituent selected from the group consisting of hydroxyl, cyano, $SO_3H$, —$NH_2$, carboxyl, carb-$C_1$-$C_2$alkoxy, $C_1$-$C_2$alkyl, phenyl, naphthyl and pyridyl; OH; $NO_2$; $NH_2$; NHC$_1$-$C_2$alkyl, wherein the alkyl group may be substituted by at least one substituent selected from the group consisting of OH, $NH_2$, $C_1$-$C_2$alkyl, CN or COOH; NHCOC$_1$-$C_2$alkyl or NHCOOC$_1$-$C_2$alkyl, $Z_5$ is hydrogen; linear or branched, unsubstituted $C_1$-$C_2$-alkyl or linear or branched $C_1$-$C_2$-alkyl, which is substituted by at least one substituent selected from the group consisting of hydroxyl, cyano, $SO_3H$, —$NH_2$, carboxyl, carb-$C_1$-$C_2$alkoxy, $C_1$-$C_2$alkoxy, phenyl, naphthyl and pyridyl;

G is a direct bond; COOC$_1$-$C_2$alkylene; unsubstituted arylene; arylene which is substituted by at least one substituent selected from the group consisting of hydroxyl, cyano, $NO_2$, $SO_3H$, —$NH_2$, carboxyl, carb-$C_1$-$C_2$alkoxy, $C_1$-$C_2$alkoxy and $C_1$-$C_2$alkyl; unsubstituted $C_1$-$C_2$alkylene or $C_1$-$C_2$-alkylene which is substituted by at least one substituent selected from the group consisting of hydroxyl, cyano, $NO_2$, $SO_3H$, —$NH_2$, carboxyl, carb-$C_1$-$C_2$alkoxy, $C_1$-$C_2$alkoxy and $C_1$-$C_2$alkyl, n is 1; 2 or 3, n' is 0 or 1, each M is independently from each other hydrogen; $Na^+$ or $K^+$;

(XXVIIc')

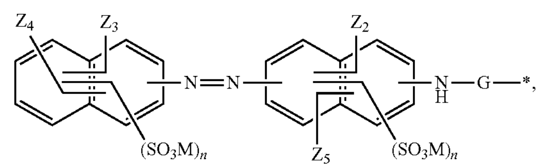

wherein

* marks the bond to the bridging group L, $Z_2$ is hydrogen; linear or branched, unsubstituted $C_1$-$C_2$-alkyl; linear or branched $C_1$-$C_2$-alkyl, which is substituted by at least one substituent selected from the group consisting of hydroxyl, cyano, $SO_3H$, —$NH_2$, carboxyl, carb-$C_1$-$C_2$alkoxy, $C_1$-$C_2$alkoxy, phenyl, naphthyl and pyridyl; linear or branched, unsubstituted $C_1$-$C_2$-alkoxy or linear or branched, $C_1$-$C_2$-alkoxy, which is substituted by at least one substituent selected from the group consisting of hydroxyl, cyano, $SO_3H$, —$NH_2$, carboxyl, carb-$C_1C_4$alkoxy, $C_1$-$C_4$alkyl, phenyl, naphthyl and pyridyl; OH; $NO_2$, $Z_3$ is hydrogen; linear or branched, unsubstituted $C_1$-$C_2$-alkyl; linear or branched $C_1$-$C_2$-alkyl, which is substituted by at least one substituent selected from the group consisting of hydroxyl, cyano, $SO_3H$, —$NH_2$, carboxyl, carb-$C_1$-$C_2$alkoxy, $C_1$-$C_2$alkoxy, phenyl, naphthyl and pyridyl; linear or branched, unsubstituted $C_1$-$C_2$-alkoxy or linear or branched, $C_1$-$C_2$-alkoxy, which is substituted by at least one substituent selected from the group consisting of hydroxyl, cyano, $SO_3H$, —$NH_2$, carboxyl, carb-$C_1$-$C_2$alkoxy, $C_1$-$C_2$alkyl, phenyl, naphthyl and pyridyl; OH; $NO_2$; $NH_2$; NHC$_1$-$C_2$alkyl, wherein the alkyl group may be substituted by at least one substituent selected from the group consisting of OH, $NH_2$, $C_1$-$C_2$alkyl, CN or COOH; NHCOC$_1$-$C_2$alkyl or NHCOOC$_1$-$C_2$alkyl, $Z_4$ is hydrogen; linear or branched, unsubstituted $C_1$-$C_2$-alkyl; linear or branched $C_1$-$C_2$-alkyl, which is substituted by at least one substituent selected from the group consisting of hydroxyl, cyano, $SO_3H$, —$NH_2$, carboxyl, carb-$C_1$-$C_2$alkoxy, $C_1$-$C_2$alkoxy, phenyl, naphthyl and pyridyl; linear or branched, unsubstituted $C_1$-$C_2$-alkoxy or linear or branched, $C_1$-$C_2$-alkoxy, which is substituted by at least one substituent selected from the group consisting of hydroxyl, cyano, $SO_3H$, —$NH_2$, carboxyl, carb-$C_1C_4$alkoxy, $C_1$-$C_4$alkyl, phenyl, naphthyl and pyridyl; OH; $NO_2$; $NH_2$; NHC$_1$-$C_2$alkyl, wherein the alkyl group may be substituted by at least one substituent selected from the group consisting of OH, $NH_2$, $C_1$-$C_2$alkyl, CN or COOH; $NHCOC_1$-$C_2$alkyl or $NHCOOC_1$-$C_2$alkyl, $Z_5$ is hydrogen; linear or branched, unsubstituted $C_1$-$C_2$-alkyl; linear or branched $C_1$-$C_2$-alkyl, which is substituted by at least one substituent selected from the group consisting of hydroxyl, cyano, $SO_3H$, —$NH_2$, carboxyl, carb-$C_1$-$C_2$alkoxy, $C_1$-$C_2$alkoxy, phenyl, naphthyl and pyridyl; linear or branched, unsubstituted $C_1$-$C_2$-alkoxy or linear or branched, $C_1$-$C_2$-alkoxy, which is substituted by at least one substituent selected from the group consisting of hydroxyl, cyano, $SO_3H$, —$NH_2$, carboxyl, carb-$C_1C_4$alkoxy, $C_1$-$C_4$alkyl, phenyl, naphthyl and pyridyl; $NO_2$, G is a direct bond; $COOC_1$-$C_2$alkylene; unsubstituted arylene; arylene which is substituted by at least one substituent selected from the group consisting of hydroxyl, cyano, $NO_2$, $SO_3H$, —$NH_2$, carboxyl, carb-$C_1$-$C_2$alkoxy, $C_1$-$C_2$alkoxy and $C_1$-$C_2$alkyl; unsubstituted $C_1$-$C_2$alkylene or $C_1$-$C_2$-alkylene which is substituted by at least one substituent selected from the group consisting of hydroxyl, cyano, $NO_2$, $SO_3H$, —$NH_2$, carboxyl, carb-$C_1$-$C_2$alkoxy, $C_1$-$C_2$alkoxy and $C_1$-$C_2$alkyl, each n is independently from each other 1; 2 or 3, each M is independently from each other hydrogen; $Na^+$ or $K^+$;

(XXVIId')

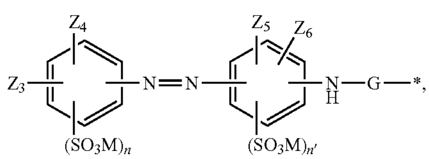

wherein

* marks the bond to the bridging group L, $Z_3$ is hydrogen; linear or branched, unsubstituted $C_1$-$C_2$-alkyl; linear or branched $C_1$-$C_2$-alkyl, which is substituted by at least one substituent selected from the group consisting of hydroxyl, cyano, $SO_3H$, —$NH_2$, carboxyl, carb-$C_1$-$C_2$alkoxy, $C_1$-$C_2$alkoxy, phenyl, naphthyl and pyridyl; linear or branched, unsubstituted $C_1$-$C_2$-alkoxy or linear or branched, $C_1$-$C_2$-alkoxy, which is substituted by at least one substituent selected from the group consisting of hydroxyl, cyano, $SO_3H$, —$NH_2$, carboxyl, carb-$C_1C_4$alkoxy, $C_1$-$C_4$alkyl, phenyl, naphthyl and pyridyl; $SO_2CH_2CH_2SO_3H$; or $NO_2$, $Z_4$ is linear or branched, unsubstituted $C_1$-$C_2$-alkyl; linear or branched $C_1$-$C_2$-alkyl, which is substituted by at least one substituent selected from the group consisting of hydroxyl, cyano, $SO_3H$, —$NH_2$, carboxyl, carb-$C_1$-$C_2$alkoxy, $C_1$-$C_2$alkoxy, phenyl, naphthyl and pyridyl; linear or branched, unsubstituted $C_1$-$C_2$-alkoxy or linear or branched, $C_1$-$C_2$-alkoxy, which is substituted by at least one substituent selected from the group consisting of hydroxyl, cyano, $SO_3H$, —$NH_2$, carboxyl, carb-$C_1C_4$alkoxy, $C_1$-$C_4$alkyl, phenyl, naphthyl and pyridyl; OH; $SO_2CH_2CH_2SO_3H$; or $NO_2$, $Z_5$ is hydrogen; linear or branched, unsubstituted $C_1$-$C_2$-alkyl; linear or branched $C_1$-$C_2$-alkyl, which is substituted by at least one substituent selected from the group consisting of hydroxyl, cyano, $SO_3H$, —$NH_2$, carboxyl, carb-$C_1$-$C_2$alkoxy, $C_1$-$C_2$alkoxy, phenyl, naphthyl and pyridyl; linear or branched, unsubstituted $C_1$-$C_2$-alkoxy or linear or branched, $C_1$-$C_2$-alkoxy, which is substituted by at least one substituent selected from the group consisting of hydroxyl, cyano, $SO_3H$, —$NH_2$, carboxyl, carb-$C_1C_4$alkoxy, $C_1$-$C_4$alkyl, phenyl, naphthyl and pyridyl; OH; $NO_2$; $NH_2$; $NHC_1$-$C_2$alkyl, wherein the alkyl group may be substituted by at least one substituent selected from the group consisting of OH, $NH_2$, $C_1$-$C_2$alkyl, CN or COOH; $NHCOC_1$-$C_2$alkyl or $NHCOOC_1$-$C_2$alkyl, $Z_6$ is linear or branched, unsubstituted $C_1$-$C_2$-alkyl; linear or branched $C_1$-$C_2$-alkyl, which is substituted by at least one substituent selected from the group consisting of hydroxyl, cyano, $SO_3H$, —$NH_2$, carboxyl, carb-$C_1$-$C_2$alkoxy, $C_1$-$C_2$alkoxy, phenyl, naphthyl and pyridyl; linear or branched, unsubstituted $C_1$-$C_2$-alkoxy or linear or branched, $C_1$-$C_2$-alkoxy, which is substituted by at least one substituent selected from the group consisting of hydroxyl, cyano, $SO_3H$, —$NH_2$, carboxyl, carb-$C_1C_4$alkoxy, $C_1$-$C_4$alkyl, phenyl, naphthyl and pyridyl; or $NO_2$, G is a direct bond; $COOC_1$-$C_2$alkylene; unsubstituted arylene; arylene which is substituted by at least one substituent selected from the group consisting of hydroxyl, cyano, $NO_2$, $SO_3H$, —$NH_2$, carboxyl, carb-$C_1$-$C_2$alkoxy, $C_1$-$C_2$alkoxy and $C_1$-$C_2$alkyl; unsubstituted $C_1$-$C_2$alkylene or $C_1$-$C_2$-alkylene which is substituted by at least one substituent selected from the group consisting of hydroxyl, cyano, $NO_2$, $SO_3H$, —$NH_2$, carboxyl, carb-$C_1$-$C_2$alkoxy, $C_1$-$C_2$alkoxy and $C_1$-$C_2$alkyl, n is 1 or 2, n' is 0 or 1, each M is independently from each other hydrogen; $Na^+$ or $K^+$, (XXVIII')

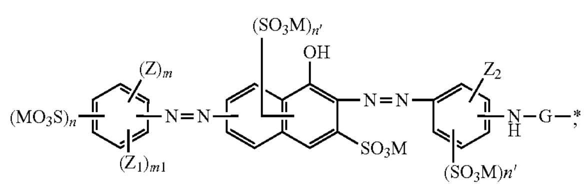

wherein

* marks the bond to the bridging group L,

Z is linear or branched, unsubstituted $C_1$-$C_2$-alkyl; linear or branched $C_1$-$C_2$-alkyl, which is substituted by at least one substituent selected from the group consisting of hydroxyl, cyano, $SO_3H$, —$NH_2$, carboxyl, carb-$C_1$-$C_2$alkoxy, $C_1$-$C_2$alkoxy, phenyl, naphthyl and pyridyl; linear or branched, unsubstituted $C_1$-$C_2$-alkoxy or linear or branched, $C_1$-$C_2$-alkoxy, which is substituted by at least one substituent selected from the group consisting of hydroxyl, cyano, $SO_3H$, —$NH_2$, carboxyl, carb-$C_1C_4$alkoxy, $C_1$-$C_4$alkyl, phenyl, naphthyl and pyridyl; $SO_2CH_2CH_2SO_3H$; or $NO_2$, $Z_1$ is linear or branched, unsubstituted $C_1$-$C_2$-alkyl; linear or branched $C_1$-$C_2$-alkyl, which is substituted by at least one substituent selected from the group consisting of hydroxyl, cyano, $SO_3H$, —$NH_2$, carboxyl, carb-$C_1$-$C_2$alkoxy, $C_1$-$C_2$alkoxy, phenyl, naphthyl and pyridyl; linear or branched, unsubstituted $C_1$-$C_2$-alkoxy or linear or branched, $C_1$-$C_2$-alkoxy, which is substituted by at least one substituent selected from the group consisting of hydroxyl, cyano, $SO_3H$, —$NH_2$, carboxyl, carb-$C_1C_4$alkoxy, $C_1$-$C_4$alkyl, phenyl, naphthyl and pyridyl; OH; or $NO_2$, $Z_2$ is hydrogen; linear or branched, unsubstituted $C_1$-$C_2$-alkyl; linear or branched $C_1$-$C_2$-alkyl, which is substituted by at least one substituent selected from the group consisting of hydroxyl, cyano, $SO_3H$, —$NH_2$, carboxyl, carb-$C_1$-$C_2$alkoxy, $C_1$-$C_2$alkoxy, phenyl, naphthyl and pyridyl; linear or branched, unsubstituted $C_1$-$C_2$-alkoxy or linear or branched, $C_1$-$C_2$-alkoxy, which is substituted by at least one substituent selected from the group consisting of hydroxyl, cyano, $SO_3H$, —$NH_2$, carboxyl, carb-$C_1C_4$alkoxy, $C_1$-$C_4$alkyl, phenyl, naphthyl and pyridyl; OH; or $NO_2$, G is a direct bond; $COOC_1$-$C_2$alkylene; unsubstituted arylene; arylene which is substituted by at least one substituent selected from the group consisting of hydroxyl, cyano, $NO_2$, $SO_3H$, —$NH_2$, carboxyl, carb-$C_1$-$C_2$alkoxy, $C_1$-$C_2$alkoxy and $C_1$-$C_2$alkyl; unsubstituted $C_1$-$C_2$alkylene or $C_1$-$C_2$-alkylene which is substituted by at least one substituent selected from the group consisting of hydroxyl, cyano, $NO_2$, $SO_3H$, —$NH_2$, carboxyl, carb-$C_1$-$C_2$alkoxy, $C_1$-$C_2$alkoxy and $C_1$-$C_2$alkyl, m is 0 or 1, m1 is 0 or 1, n is 0 or 1, each n' is independently from each other 0; 1 or 2, each M is independently from each other hydrogen; $Na^+$ or $K^+$, (XXIX')

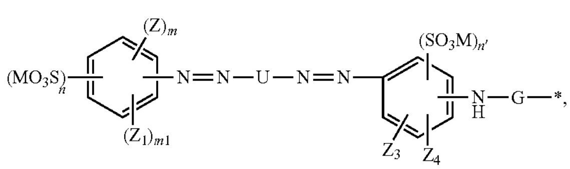

wherein

* marks the bond to the bridging group L,

Z is linear or branched, unsubstituted $C_1$-$C_2$-alkyl; linear or branched $C_1$-$C_2$-alkyl, which is substituted by at least one substituent selected from the group consisting of hydroxyl, cyano, $SO_3H$, —$NH_2$, carboxyl, carb-$C_1$-$C_2$alkoxy, $C_1$-$C_2$alkoxy, phenyl, naphthyl and pyridyl; linear or branched, unsubstituted $C_1$-$C_2$-alkoxy or linear or branched, $C_1$-$C_2$-alkoxy, which is substituted by at least one substituent selected from the group consisting of hydroxyl, cyano, $SO_3H$, —$NH_2$, carboxyl, carb-$C_1C_4$alkoxy, $C_1$-$C_4$alkyl, phenyl, naphthyl and pyridyl; $SO_2CH_2CH_2SO_3H$; or $NO_2$, $Z_1$ is linear or branched, unsubstituted $C_1$-$C_2$-alkyl; linear or branched $C_1$-$C_2$-alkyl, which is substituted by at least one substituent selected from the group consisting of hydroxyl, cyano, $SO_3H$, —$NH_2$, carboxyl, carb-$C_1$-$C_2$alkoxy, $C_1$-$C_2$alkoxy, phenyl, naphthyl and pyridyl; linear or branched, unsubstituted $C_1$-$C_2$-alkoxy or linear or branched, $C_1$-$C_2$-alkoxy, which is substituted by at least one substituent selected from the group consisting of hydroxyl, cyano, $SO_3H$, —$NH_2$, carboxyl, carb-$C_1C_4$alkoxy, $C_1$-$C_4$alkyl, phenyl, naphthyl and pyridyl; OH; or $NO_2$, $Z_3$ is hydrogen; linear or branched, unsubstituted $C_1$-$C_2$-alkyl; linear or branched $C_1$-$C_2$-alkyl, which is substituted by at least one substituent selected from the group consisting of hydroxyl, cyano, $SO_3H$, —$NH_2$, carboxyl, carb-$C_1$-$C_2$alkoxy, $C_1$-$C_2$alkoxy, phenyl, naphthyl and pyridyl; linear or branched, unsubstituted $C_1$-$C_2$-alkoxy or linear or branched, $C_1$-$C_2$-alkoxy, which is substituted by at least one substituent selected from the group consisting of hydroxyl, cyano, $SO_3H$, —$NH_2$, carboxyl, carb-$C_1C_4$alkoxy, $C_1$-$C_4$alkyl, phenyl, naphthyl and pyridyl; OH; or $NO_2$, $Z_4$ is hydrogen; linear or branched, unsubstituted $C_1$-$C_2$-alkyl; linear or branched $C_1$-$C_2$-alkyl, which is substituted by at least one substituent selected from the group consisting of hydroxyl, cyano, $SO_3H$, —$NH_2$, carboxyl, carb-$C_1$-$C_2$alkoxy, $C_1$-$C_2$alkoxy, phenyl, naphthyl and pyridyl; linear or branched, unsubstituted $C_1$-$C_2$-alkoxy or linear or branched, $C_1$-$C_2$-alkoxy, which is substituted by at least one substituent selected from the group consisting of hydroxyl, cyano, $SO_3H$, —$NH_2$, carboxyl, carb-$C_1C_4$alkoxy, $C_1$-$C_4$alkyl, phenyl, naphthyl and pyridyl; OH; or $NO_2$, G is a direct bond; $COOC_1$-$C_2$alkylene; unsubstituted arylene; arylene which is substituted by at least one substituent selected from the group consisting of hydroxyl, cyano, $NO_2$, $SO_3H$, —$NH_2$, carboxyl, carb-$C_1$-$C_2$alkoxy, $C_1$-$C_2$alkoxy and $C_1$-$C_2$alkyl; unsubstituted $C_1$-$C_2$alkylene or $C_1$-$C_2$-alkylene which is substituted by at least one substituent selected from the group consisting of hydroxyl, cyano, $NO_2$, $SO_3H$, —$NH_2$, carboxyl, carb-$C_1$-$C_2$alkoxy, $C_1$-$C_2$alkoxy and $C_1$-$C_2$alkyl, U is a moiety of formula

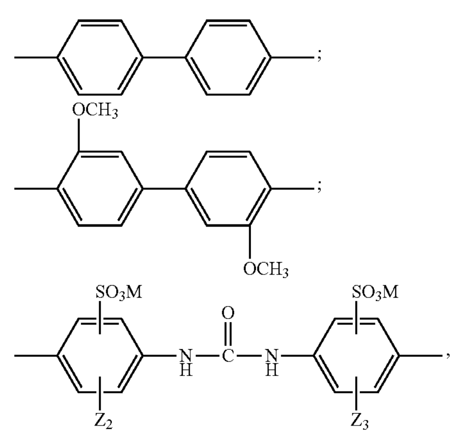

wherein $Z_2$ and $Z_3$ have the meanings as defined above, m is 0 or 1, m1 is 0 or 1, n is 0 or 1, n' is 0; 1 or 2, each M is independently from each other hydrogen; $Na^+$ or $K^+$, (XXX')

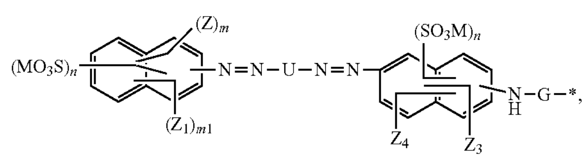

wherein

* marks the bond to the bridging group L,

Z is linear or branched, unsubstituted $C_1$-$C_2$-alkyl; linear or branched $C_1$-$C_2$-alkyl, which is substituted by at least one substituent selected from the group consisting of hydroxyl, cyano, $SO_3H$, —$NH_2$, carboxyl, carb-$C_1$-$C_2$alkoxy, $C_1$-$C_2$alkoxy, phenyl, naphthyl and pyridyl; linear or branched, unsubstituted $C_1$-$C_2$-alkoxy or linear or branched, $C_1$-$C_2$-alkoxy, which is substituted by at least one substituent selected from the group consisting of hydroxyl, cyano, $SO_3H$, —$NH_2$, carboxyl, carb-$C_1C_4$alkoxy, $C_1$-$C_4$alkyl, phenyl, naphthyl and pyridyl; $SO_2CH_2CH_2SO_3H$; or $NO_2$, $Z_1$ is linear or branched, unsubstituted $C_1$-$C_2$-alkyl; linear or branched $C_1$-$C_2$-alkyl, which is substituted by at least one substituent selected from the group consisting of hydroxyl, cyano, $SO_3H$, —$NH_2$, carboxyl, carb-$C_1$-$C_2$alkoxy, $C_1$-$C_2$alkoxy, phenyl, naphthyl and pyridyl; linear or branched, unsubstituted $C_1$-$C_2$-alkoxy or linear or branched, $C_1$-$C_2$-alkoxy, which is substituted by at least one substituent selected from the group consisting of hydroxyl, cyano, $SO_3H$, —$NH_2$, carboxyl, carb-$C_1C_4$alkoxy, $C_1$-$C_4$alkyl, phenyl, naphthyl and pyridyl; OH; or $NO_2$, $Z_3$ is hydrogen; linear or branched, unsubstituted $C_1$-$C_2$-alkyl; linear or branched $C_1$-$C_2$-alkyl, which is substituted by at least one substituent selected from the group consisting of hydroxyl, cyano, $SO_3H$, —$NH_2$, carboxyl, carb-$C_1$-$C_2$alkoxy, $C_1$-$C_2$alkoxy, phenyl, naphthyl and pyridyl; linear or branched, unsubstituted $C_1$-$C_2$-alkoxy or linear or branched, $C_1$-$C_2$-alkoxy, which is substituted by at least one substituent selected from the group consisting of hydroxyl, cyano, $SO_3H$, —$NH_2$, carboxyl, carb-$C_1C_4$alkoxy, $C_1$-$C_4$alkyl, phenyl, naphthyl and pyridyl; $NH_2$; or $NO_2$, $Z_4$ is hydrogen; linear or branched, unsubstituted $C_1$-$C_2$-alkyl; linear or branched $C_1$-$C_2$-alkyl, which is substituted by at least one substituent selected from the group consisting of hydroxyl, cyano, $SO_3H$, —$NH_2$, carboxyl, carb-$C_1$-$C_2$alkoxy, $C_1$-$C_2$alkoxy, phenyl, naphthyl and pyridyl; linear or branched, unsubstituted $C_1$-$C_2$-alkoxy or linear or branched, $C_1$-$C_2$-alkoxy, which is substituted by at least one substituent selected from the group consisting of hydroxyl, cyano, $SO_3H$, —$NH_2$, carboxyl, carb-$C_1C_4$alkoxy, $C_1$-$C_4$alkyl, phenyl, naphthyl and pyridyl; OH; or $NO_2$, G is a direct bond; $COOC_1$-$C_2$alkylene; unsubstituted arylene; arylene which is substituted by at least one substituent selected from the group consisting of hydroxyl, cyano, $NO_2$, $SO_3H$, —$NH_2$, carboxyl, carb-$C_1$-$C_2$alkoxy, $C_1$-$C_2$alkoxy and $C_1$-$C_2$alkyl; unsubstituted $C_1$-$C_2$alkylene or $C_1$-$C_2$-alkylene which is substituted by at least one substituent selected from the group consisting of hydroxyl, cyano, $NO_2$, $SO_3H$, —$NH_2$, carboxyl, carb-$C_1$-$C_2$alkoxy, $C_1$-$C_2$alkoxy and $C_1$-$C_2$alkyl, U is a moiety of formula

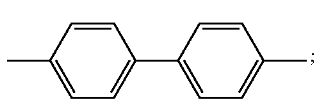

-continued

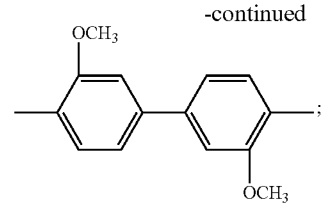

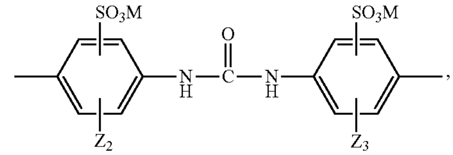

wherein $Z_2$ and $Z_3$ have the meanings as defined above, m is 0 or 1, m1 is 0 or 1, each n is independently from each other 0; 1 or 2, each M is independently from each other hydrogen; $Na^+$ or $K^+$, (XXXI')

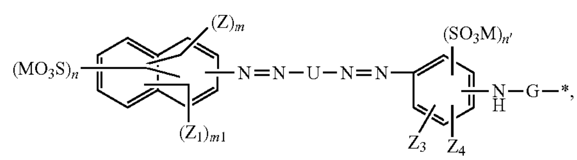

wherein

* marks the bond to the bridging group L,

Z is linear or branched, unsubstituted $C_1$-$C_2$-alkyl; linear or branched $C_1$-$C_2$-alkyl, which is substituted by at least one substituent selected from the group consisting of hydroxyl, cyano, $SO_3H$, —$NH_2$, carboxyl, carb-$C_1$-$C_2$alkoxy, $C_1$-$C_2$alkoxy, phenyl, naphthyl and pyridyl; linear or branched, unsubstituted $C_1$-$C_2$-alkoxy or linear or branched, $C_1$-$C_2$-alkoxy, which is substituted by at least one substituent selected from the group consisting of hydroxyl, cyano, $SO_3H$, —$NH_2$, carboxyl, carb-$C_1C_4$alkoxy, $C_1$-$C_4$alkyl, phenyl, naphthyl and pyridyl; $SO_2CH_2CH_2SO_3H$; $NH_2$ or $NO_2$, $Z_1$ is linear or branched, unsubstituted $C_1$-$C_2$-alkyl; linear or branched $C_1$-$C_2$-alkyl, which is substituted by at least one substituent selected from the group consisting of hydroxyl, cyano, $SO_3H$, —$NH_2$, carboxyl, carb-$C_1$-$C_2$alkoxy, $C_1$-$C_2$alkoxy, phenyl, naphthyl and pyridyl; linear or branched, unsubstituted $C_1$-$C_2$-alkoxy or linear or branched, $C_1$-$C_2$-alkoxy, which is substituted by at least one substituent selected from the group consisting of hydroxyl, cyano, $SO_3H$, —$NH_2$, carboxyl, carb-$C_1C_4$alkoxy, $C_1$-$C_4$alkyl, phenyl, naphthyl and pyridyl; OH; or $NO_2$, $Z_3$ is hydrogen; linear or branched, unsubstituted $C_1$-$C_2$-alkyl; linear or branched $C_1$-$C_2$-alkyl, which is substituted by at least one substituent selected from the group consisting of hydroxyl, cyano, $SO_3H$, —$NH_2$, carboxyl, carb-$C_1$-$C_2$alkoxy, $C_1$-$C_2$alkoxy, phenyl, naphthyl and pyridyl; linear or branched, unsubstituted $C_1$-$C_2$-alkoxy or linear or branched, $C_1$-$C_2$-alkoxy, which is substituted by at least one substituent selected from the group consisting of hydroxyl, cyano, $SO_3H$, —$NH_2$, carboxyl, carb-$C_1C_4$alkoxy, $C_1$-$C_4$alkyl, phenyl, naphthyl and pyridyl; $NH_2$; or $NO_2$, $Z_4$ is hydrogen; linear or branched, unsubstituted $C_1$-$C_2$-alkyl; linear or branched $C_1$-$C_2$-alkyl, which is substituted by at least one substituent selected from the group consisting of hydroxyl, cyano, $SO_3H$, —$NH_2$, carboxyl, carb-$C_1$-$C_2$alkoxy, $C_1$-$C_2$alkoxy, phenyl, naphthyl and pyridyl; linear or branched, unsubstituted $C_1$-$C_2$-alkoxy or linear or branched, $C_1$-$C_2$-alkoxy, which is substituted by at least one substituent selected from the group consisting of hydroxyl, cyano, $SO_3H$, —$NH_2$, carboxyl, carb-$C_1C_4$alkoxy, $C_1$-$C_4$alkyl, phenyl, naphthyl and pyridyl; OH; or $NO_2$, G is a direct bond; $COOC_1$-$C_2$alkylene; unsubstituted arylene; arylene which is substituted by at least one substituent selected from the group consisting of hydroxyl, cyano, $NO_2$, $SO_3H$, —$NH_2$, carboxyl, carb-$C_1$-$C_2$alkoxy, $C_1$-$C_2$alkoxy and $C_1$-$C_2$alkyl; unsubstituted $C_1$-$C_2$alkylene or $C_1$-$C_2$-alkylene which is substituted by at least one substituent selected from the group consisting of hydroxyl, cyano, $NO_2$, $SO_3H$, —$NH_2$, carboxyl, carb-$C_1$-$C_2$alkoxy, $C_1$-$C_2$alkoxy and $C_1$-$C_2$alkyl, U is a moiety of formula

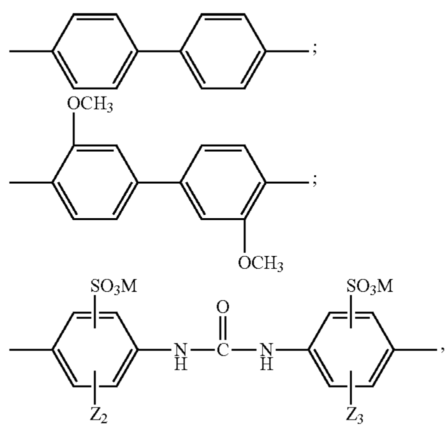

10 wherein $Z_2$ and $Z_3$ have the meanings as defined above, m is 0 or 1, m1 is 0 or 1, n is 1; 2 or 3, n' is 0; 1 or 2, each M is independently from each other hydrogen; $Na^+$ or $K^+$, (XXXII')

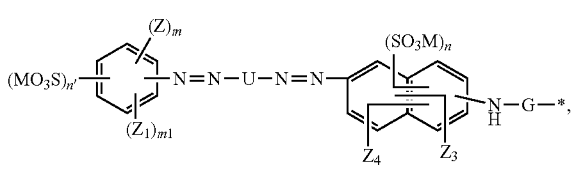

wherein

* marks the bond to the bridging group L,

Z is linear or branched, unsubstituted $C_1$-$C_2$-alkyl; linear or branched $C_1$-$C_2$-alkyl, which is substituted by at least one substituent selected from the group consisting of hydroxyl, cyano, $SO_3H$, —$NH_2$, carboxyl, carb-$C_1$-$C_2$alkoxy, $C_1$-$C_2$alkoxy, phenyl, naphthyl and pyridyl; linear or branched, unsubstituted $C_1$-$C_2$-alkoxy or linear or branched, $C_1$-$C_2$-alkoxy, which is substituted by at least one substituent selected from the group consisting of hydroxyl, cyano, $SO_3H$, —$NH_2$, carboxyl, carb-$C_1C_4$alkoxy, $C_1$-$C_4$alkyl, phenyl, naphthyl and pyridyl; $SO_2CH_2CH_2SO_3H$; $NH_2$ or $NO_2$, $Z_1$ is linear or branched, unsubstituted $C_1$-$C_2$-alkyl; linear or branched $C_1$-$C_2$-alkyl, which is substituted by at least one substituent selected from the group consisting of hydroxyl, cyano, $SO_3H$, —$NH_2$, carboxyl, carb-$C_1$-$C_2$alkoxy, $C_1$-$C_2$alkoxy, phenyl, naphthyl and pyridyl; linear or branched, unsubstituted $C_1$-$C_2$-alkoxy or linear or branched, $C_1$-$C_2$-alkoxy, which is substituted by at least one substituent selected from the group consisting of hydroxyl, cyano, $SO_3H$, —$NH_2$, carboxyl, carb-$C_1C_4$alkoxy, $C_1$-$C_4$alkyl, phenyl, naphthyl and pyridyl; OH; or $NO_2$, $Z_3$ is hydrogen; linear or branched, unsubstituted $C_1$-$C_2$-alkyl; linear or branched $C_1$-$C_2$-alkyl, which is substituted by at least one substituent selected from the group consisting of hydroxyl, cyano, $SO_3H$, —$NH_2$, carboxyl, carb-$C_1$-$C_2$alkoxy, $C_1$-$C_2$alkoxy, phenyl, naphthyl and pyridyl; linear or branched, unsubstituted $C_1$-$C_2$-alkoxy or linear or branched, $C_1$-$C_2$-alkoxy, which is substituted by at least one substituent selected from the group consisting of hydroxyl, cyano, $SO_3H$, —$NH_2$, carboxyl, carb-$C_1C_4$alkoxy, $C_1$-$C_4$alkyl, phenyl, naphthyl and pyridyl; $NH_2$; or $NO_2$, $Z_4$ is hydrogen; linear or branched, unsubstituted $C_1$-$C_2$-alkyl; linear or branched $C_1$-$C_2$-alkyl, which is substituted by at least one substituent selected from the group consisting of hydroxyl, cyano, $SO_3H$, —$NH_2$, carboxyl, carb-$C_1$-$C_2$alkoxy, $C_1$-$C_2$alkoxy, phenyl, naphthyl and pyridyl; linear or branched, unsubstituted $C_1$-$C_2$-alkoxy or linear or branched, $C_1$-$C_2$-alkoxy, which is substituted by at least one substituent selected from the group consisting of hydroxyl, cyano, $SO_3H$, —$NH_2$, carboxyl, carb-$C_1C_4$alkoxy, $C_1$-$C_4$alkyl, phenyl, naphthyl and pyridyl; OH; or $NO_2$, G is a direct bond; $COOC_1$-$C_2$alkylene; unsubstituted arylene; arylene which is substituted by at least one substituent selected from the group consisting of hydroxyl, cyano, $NO_2$, $SO_3H$, —$NH_2$, carboxyl, carb-$C_1$-$C_2$alkoxy, $C_1$-$C_2$alkoxy and $C_1$-$C_2$alkyl; unsubstituted $C_1$-$C_2$alkylene or $C_1$-$C_2$-alkylene which is substituted by at least one substituent selected from the group consisting of hydroxyl, cyano, $NO_2$, $SO_3H$, —$NH_2$, carboxyl, carb-$C_1$-$C_2$alkoxy, $C_1$-$C_2$alkoxy and $C_1$-$C_2$alkyl, U is a moiety of formula

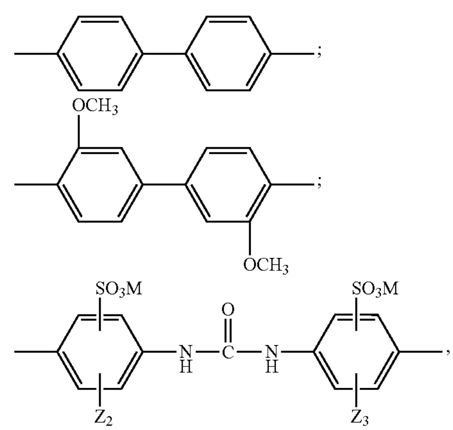

wherein $Z_2$ and $Z_3$ have the meanings as defined above, m is 0 or 1, m1 is 0 or 1, n is 1; 2 or 3, n' is 0; 1 or 2, each M is independently from each other hydrogen; $Na^+$ or $K^+$.

5. he process according to claim 1 wherein D is a radical of formulae (XXXIII)-(XXXV):

(XXXIII)

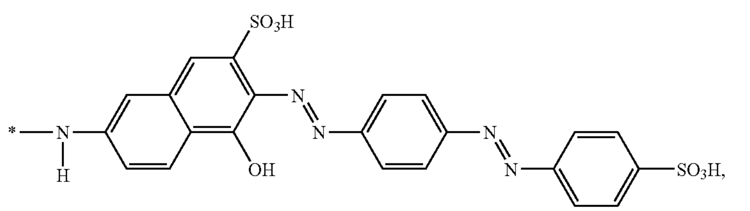

(XXXIV)

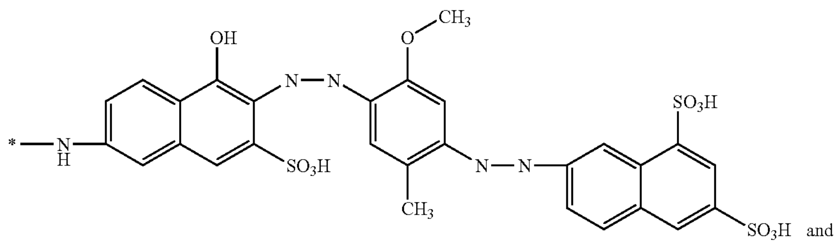

(XXXV)

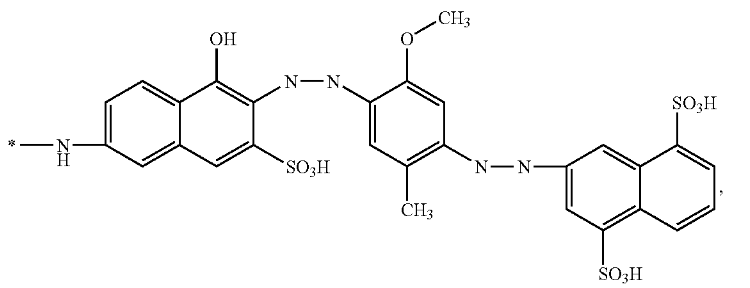

wherein

* marks the bond to the bridging group.

6. The process according to claim 1 comprising at least one compound of formula (8) and/or (9)

(8)

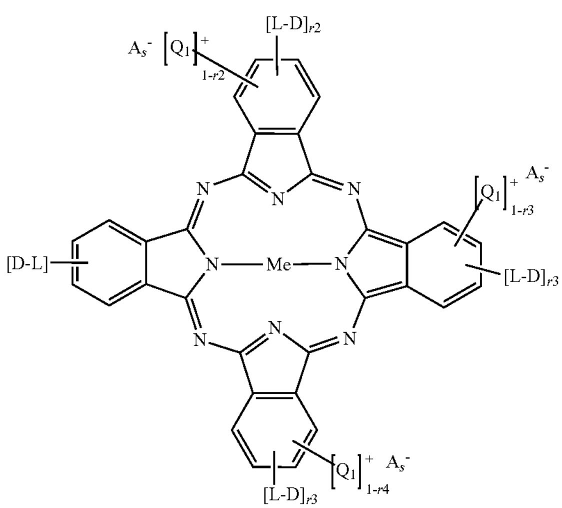

-continued (9)

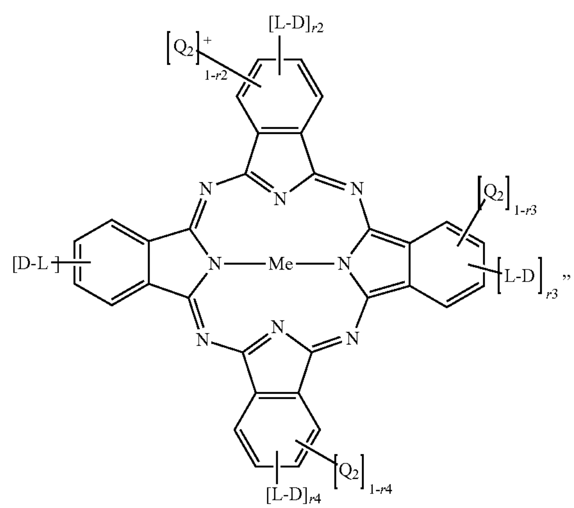

wherein

Me is Zn, $AlZ_1$, Si(IV)-$(Z_1)_2$ or Ti(IV)-$(Z_1)_2$, wherein $Z_1$ is chloride, fluorine, bromine or hydroxyl, each $Q_1$ is independently of each other a sulfo or carboxyl group; or a radical of the formula $—SO_2X_2—R_1—X_3^+$; $—O—R_1—X_3^+$ or $—(CH_2)_t—Y_1^+$, in which $R_1$ is a branched or unbranched $C_1$-$C_4$alkylene; 1,3-phenylene or 1,4-phenylene, $X_2$ is —NH— or —N($C_1$-$C_4$alkyl)-, $X_3^+$ is a group of the formula

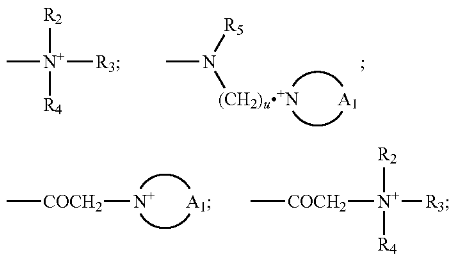

or, in the case where $R_1$=$C_1$-$C_4$alkylene, also a group of the formula

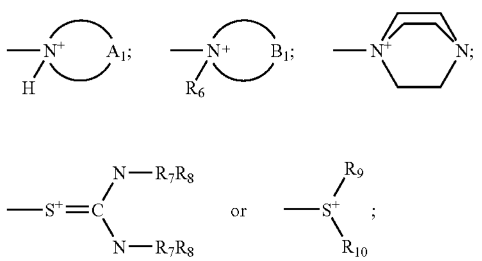

$Y_1^+$ is a group of the formula

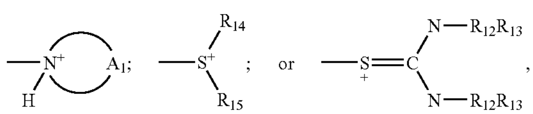

t is 0 or 1, wherein the above formulae $R_2$ and $R_3$ independently of one another are $C_1$-$C_6$alkyl, $R_4$ is $C_1$-$C_4$alkyl; pentyl; hexyl or $NR_7R_8$, $R_5$ and $R_6$ independently of one another are $C_1$-$C_4$alkyl, $R_7$ and $R_8$ independently of one another are hydrogen or $C_1$-$C_4$alkyl, $R_9$ and $R_{10}$ independently of one another are unsubstituted $C_1$-$C_4$alkyl or $C_1$-$C_4$alkyl substituted by at least one substituent selected from the group consisting of hydroxyl, cyano, carboxyl, $SO_3H$, —$NH_2$, carb-$C_1$-$C_4$alkoxy, $C_1$-$C_4$alkoxy, phenyl, naphthyl and pyridyl, u is from 1 to 6, $A_1$ is a unit which completes an pyrrole-; imidazol-; pyridine-; pyrazine-; pyrimidine-; pyridazine-ring, and $B_1$ is a unit which completes a morpholino-; pyrrolidine-; piperazine- or piperidine-ring, each $Q_2$ is independently from each other hydroxyl; $C_1$-$C_{10}$alkyl; branched $C_3$-$C_{10}$alkyl; $C_2$-$C_{10}$alkenyl; branched $C_3$-$C_{10}$alkenyl and mixtures thereof; $C_1$-$C_{10}$alkoxy; a sulfo or carboxyl radical; a radical of the formula

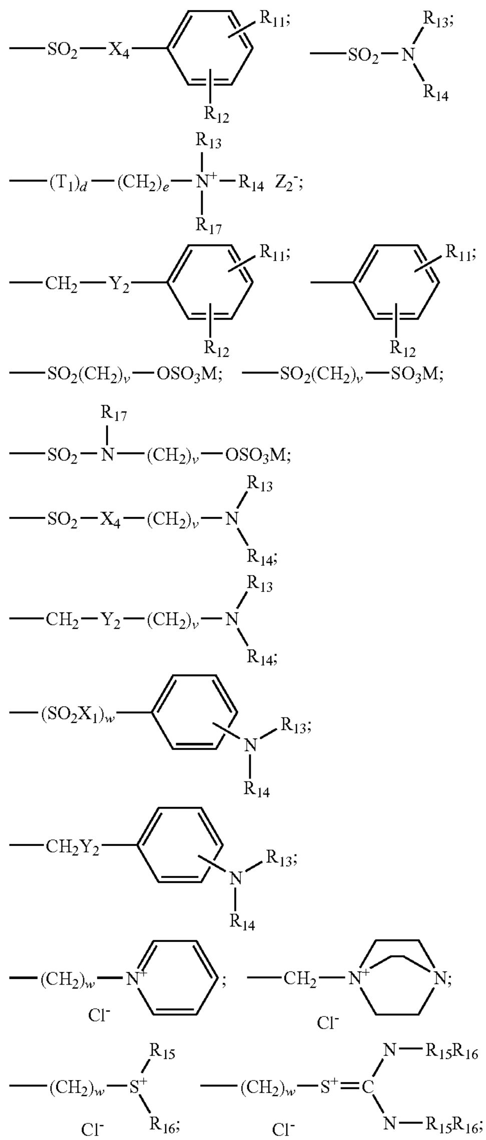

a branched alkoxy radical of the formula

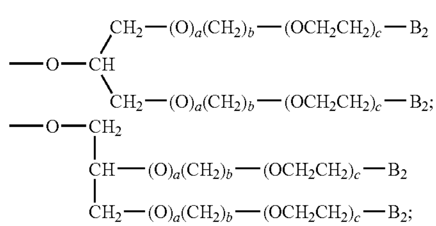

an alkylethyleneoxy unit of the formula -$(T_1)_d$-$(CH_2)_b(OCH_2CH_2)_a$—$B_3$ or an ester of the formula $COOR_{18}$, in which $B_2$ is hydrogen; hydroxyl; $C_1$-$C_{18}$alkyl; $C_1$-$C_{18}$alkoxy; —$CO_2H$; —$CH_2COOH$; —$SO_3^-M_1$; —$OSO_3^-M_1$; —$PO_3^{2-}M_1$; —$OPO_3^{2-}M_1$; and mixtures thereof, $B_3$ is hydrogen; hydroxyl; —COOH; —$SO_3^-M_1$; —$OSO_3^-M_1$ or $C_1$-$C_4$alkoxy, $M_1$ is hydrogen; alkalimetal-ion or an ammonium ion, $T_1$ is —O— or —NH—, $X_1$ and $X_4$ independently of one another are —O—; —NH— or —N($C_1$-$C_4$alkyl)-, $R_{11}$ and $R_{12}$ independently of one another are hydrogen; a sulfo group and salts thereof; a carboxyl group and salts thereof or a hydroxyl group; at least one of the radicals $R_{11}$ and $R_{12}$ being a sulfo or carboxyl group or salts thereof, $Y_2$ is —O—; —S—; —NH— or —N($C_1$-$C_4$alkyl)-, $R_{13}$ and $R_{14}$ independently of one another other are hydrogen; $C_1$-$C_4$alkyl; hydroxy-$C_1$-$C_4$alkyl; cyano-$C_1$-$C_4$alkyl; sulfo-$C_1$-$C_4$alkyl; carboxy or halogen-$C_1$-$C_4$alkyl; unsubstituted phenyl or phenyl substituted by at least one substituent selected from the group consisting of halogen, $C_1$-$C_4$alkyl and $C_1$-$C_4$alkoxy; sulfo or carboxyl or $R_{13}$ and $R_{14}$ together with the nitrogen atom to which they are bonded form a form morpholino, piperazine or piperidine ring, $R_{15}$ and $R_{16}$ independently of one another are $C_1$-$C_4$alkyl or aryl-$C_1$-$C_4$alkyl radicals, $R_{17}$ is hydrogen; an unsubstituted $C_1$-$C_4$alkyl or $C_1$-$C_4$alkyl substituted by at least one substituent selected from the group consisting of halogen, hydroxyl, cyano, $SO_3H$, —$NH_2$, phenyl, carboxyl, carb-$C_1$-$C_4$alkoxy or $C_1$-$C_6$alkoxy, $R_{18}$ is $C_1$-$C_{10}$alkyl; branched $C_3$-$C_{10}$alkyl; $C_1$-$C_{10}$alkenyl or branched $C_3$-$C_{10}$alkenyl; $C_3$-$C_{22}$glycol; $C_1$-$C_{10}$alkoxy; branched $C_3$-$C_{1o}$alkoxy; and mixtures thereof, M is hydrogen; $Na^+$; $K^+$ or an ammonium ion, $Z_2^-$ a is a alkanolate; a hydroxyl ion; $R_0COO^-$; $ClO_4^-$; $BF_4^-$;$PF_6^-$;$R_0SO_3^-$; $SO_4^{2-}$; $NO_3^-$; $F^-$; $Cl^-$; $Br^-$; $I^-$; citrate ion; tartrate ion or oxalate ion, wherein $R_0$ is hydrogen; or unsubstituted $C_1$-$C_{18}$alkyl; or $C_1$-$C_{18}$alkyl, which is substituted by at least one substituent selected from the group consisting of hydroxyl, cyano, carboxyl, $SO_3H$, —$NH_2$, carb-$C_1$-$C_6$alkoxy, $C_1$-$C_6$alkoxy, phenyl, naphthyl and pyridyl; unsubstituted aryl or aryl, which is substituted by at least one substituent selected from the group consisting of hydroxyl, cyano, carboxyl, $SO_3H$, —$NH_2$, carb-$C_1$-$C_6$alkoxy, $C_1$-$C_6$alkoxy and $C_1$-$C_4$-alkyl, a is 0 or 1, b is from 0 to 6, c is from 0 to 100, d is 0; or 1, e is from 0 to 22, v is an integer from 2 to 12, w is 0 or 1, and $A^-$ is an organic or inorganic anion, and s is equal to $r_2$, $r_3$, $r_4$ and $r_5$ in cases of monovalent anions $A^-$ and is $\leq r_2$, $r_3$, $r_4$ and $r_5$ in cases of polyvalent anions, it being necessary for $A_s^-$ to compensate the positive charge; where, when $r_2$, $r_3$, $r_4$ and $r_5 \neq 1$, the radicals $Q_1$ can be identical or different, each L is independently from each other a direct bond; —$SO_2$—; —O—; —$OR_{19}$—; —$OR_{19}O$—; —$OR_{19}N(R_{20})$—; —$N(R_{20})$—; —$(CH_2CH_2O—)_n$; —C(O)—; —C(O)N($R_{20}$)—; —N($R_{20}$)C(O)—; —OC(O)—; —C(O)O—; —S—; unsubstituted, linear or branched $C_1$-$C_{18}$alkylene; linear or branched $C_1$-$C_{18}$alkylene, which is substituted by at least one substituent selected from the group consisting of hydroxyl, cyano, $SO_3H$, —$NH_2$, carboxyl, carb-$C_1$-$C_4$alkoxy, $C_1$-$C_4$alkoxy, phenyl, naphthyl and pyridyl; unsubstituted $C_5$-$C_{18}$arylene; $C_5$-$C_{18}$arylene, which is substituted by at least one substituent selected from the group consisting of hydroxyl, cyano, carboxyl, carb-$C_1$-$C_4$alkoxy, $C_1$-$C_4$alkoxy and $C_1$-$C_4$alkyl; unsubstituted, linear or branched $C_1$-$C_{18}$alkylene-$C_5$-$C_{18}$aryl; linear or branched $C_1$-$C_{18}$alkylene-$C_5$-$C_{18}$aryl, which is substituted by at least one substituent selected from the group consisting of hydroxyl, cyano, $SO_3H$, —$NH_2$, carboxyl, carb-$C_1$-$C_4$alkoxy, $C_1$-$C_4$alkoxy, $C_1$-$C_4$alkyl, phenyl, naphthyl and pyridyl; unsubstituted, linear or branched $C_5$-$C_{18}$arylene-$C_1$-$C_{18}$alkyl or linear or branched $C_5$-$C_{18}$arylene-$C_1$-$C_{18}$alkyl, which is substituted by at least one substituent selected from the group consisting of hydroxyl, cyano, $SO_3H$, —$NH_2$, carboxyl, carb-$C_1$-$C_4$alkoxy, $C_1$-$C_4$alkoxy, $C_1$-$C_4$alkyl, phenyl, naphthyl and pyridyl, wherein $R_{19}$ is unsubstituted, linear or branched $C_1$-$C_{18}$alkylene; linear or branched $C_1$-$C_{18}$alkylene, which is substituted by at least one substituent selected from the group consisting of hydroxyl, cyano, $SO_3H$, —$NH_2$, carboxyl, carb-$C_1$-$C_4$alkoxy, $C_1$-$C_4$alkoxy, phenyl, naphthyl and pyridyl; unsubstituted $C_5$-$C_{18}$arylene; $C_5$-$C_{18}$arylene, which is substituted by at least one substituent selected from the group consisting of hydroxyl, cyano, $SO_3H$, —$NH_2$, carboxyl, carb-$C_1$-$C_4$alkoxy, $C_1$-$C_4$alkoxy and $C_1$-$C_4$alkyl; unsubstituted, linear or branched $C_1$-$C_{18}$alkylene-$C_5$-$C_{18}$aryl; linear or branched $C_1$-$C_{18}$alkylene-$C_5$-$C_{18}$aryl, which is substituted by at least one substituent selected from the group consisting of hydroxyl, cyano, $SO_3H$, —$NH_2$, carboxyl, carb-$C_1$-$C_4$alkoxy, $C_1$-$C_4$alkoxy, $C_1$-$C_4$alkyl, phenyl, naphthyl and pyridyl; unsubstituted, linear or branched $C_5$-$C_{18}$arylene-$C_1$-$C_{18}$alkyl or linear or branched $C_5$-$C_{18}$arylene-$C_1$-$C_{18}$alkyl, which is substituted by at least one substituent selected from the group consisting of hydroxyl, cyano, carboxyl, carb-$C_1$-$C_4$alkoxy, $C_1$-$C_4$alkoxy, $C_1$-$C_4$alkyl, phenyl, naphthyl and pyridyl, $R_{20}$ is unsubstituted, linear or branched $C_1$-$C_{18}$alkyl; linear or branched $C_1$-$C_{18}$alkyl, which is substituted by at least one substituent selected from the group consisting of hydroxyl, cyano, $SO_3H$, —$NH_2$, carboxyl, carb-$C_1$-$C_4$alkoxy, $C_1$-$C_4$alkoxy, phenyl, naphthyl and pyridyl; unsubstituted $C_5$-$C_{18}$aryl; $C_5$-$C_{18}$aryl, which is substituted by at least one substituent selected from the group consisting of hydroxyl, cyano, $SO_3H$, —$NH_2$, carboxyl, carb-$C_1$-$C_4$alkoxy, $C_1$-$C_4$alkoxy and $C_1$-$C_4$alkyl; unsubstituted, linear or branched $C_1$-$C_{18}$alkoxy or linear or branched $C_1$-$C_{18}$alkoxy, which is substituted by at least one substituent selected from the group consisting of hydroxyl, cyano, $SO_3H$, —$NH_2$, carboxyl, carb-$C_1$-$C_4$alkoxy, $C_1$-$C_4$alkyl, phenyl, naphthyl and pyridyl, N is 1; 2; 3 or 4, each D is independently from each other a dyestuff radical of formula (I), (II), (III), (IV), (V), (VI), (VII), (VIII), (IX), (X), (XI), (XII), (XIII), (XIV), (XV), (XVI), (XVII), (XVIII), (XIX), (XX), (XXI), (XXII), (XXIII), (XXIV), (XXV), (XXVI), (XXVIIa), (XXVIIb), (XXVIIc), (XXVIId), (XXVIII), (XXIX), (XXX), (XXXI), (XXXII), (XXXIII), (XXXIV) or (XXXV), $r_2$ is 0 or 1, $r_3$ is 0 or 1, and $r_4$ is 0 or 1.

7. The process according to claim 1, wherein the shading process is part of a laundry washing process.

8. A liquid or granule shading composition (A) comprising at least one compound of formula (1a) and /or (1b) according to claim 1.

9. The shading composition (A") comprising at least one compound of formula (1a) and /or (1b)

(1a)

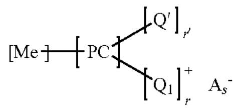

(1b)

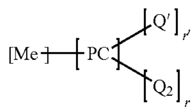

in which

PC is the phthalocyanine ring system,

Me is Zn; Ca; Mg; Na; K; Al—$Z_1$; Si(IV)-$(Z_1)_2$; Ti(IV)-$(Z_1)_2$; Ge(IV)-$(Z_1)_2$; Ga(III)-$Z_1$; Zr(IV)-$(Z_1)_2$; In(III)-$Z_1$ or Sn(IV)-$(Z_1)_2$, $Z_1$ is an alkanolate ion; a hydroxyl ion; $R_0COO^-$; $ClO_4^-$; $BF_4^-$;$PF_6^-$;$R_0SO_3^-$; $SO_4^{2-}$; $NO_3^-$; $F^-$; $Cl^-$; $Br^-$; $I^-$; citrate ion; tartrate ion or oxalate ion, wherein $R_0$ is hydrogen; or unsubstituted $C_1$-$C_{18}$alkyl; or $C_1$-$C_{18}$alkyl, which is substituted by at least one substituent selected from the group consisting of hydroxyl, cyano, carboxyl, $SO_3H$, —$NH_2$, carb-$C_1$-$C_6$alkoxy, $C_1$-$C_6$alkoxy, phenyl, naphthyl and pyridyl; unsubstituted aryl or aryl, which is substituted by at least one substituent selected from the group consisting of hydroxyl, cyano, carboxyl, $SO_3H$, —$NH_2$, carb-$C_1$-$C_6$alkoxy, $C_1$-$C_6$alkoxy and $C_1$-$C_4$-alkyl, r is 0; 1; 2; 3 or 4, r' is 1; 2; 3 or 4, each $Q_1$ is independently of each other a sulfo or carboxyl group or a radical of the formula —$SO_2X_2$—$R_1$—$X_3^+$; —O—$R_1$—$X_3^+$ or —$(CH_2)_t$—$Y_1^+$, in which $R_1$ is a branched or unbranched $C_1$-$C_8$alkylene; 1,3-phenylene or 1,4-phenylene, $X_2$ is —NH— or —N($C_1$-$C_5$alkyl)-, $X_3^+$is a group of the formula

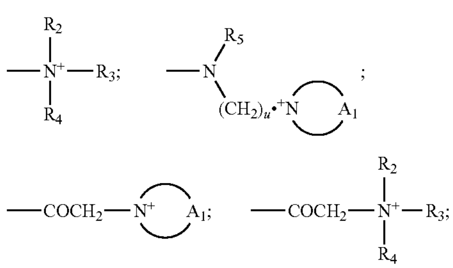

or, in the case where $R_1$=$C_1C_8$alkylene, also a group of the formula

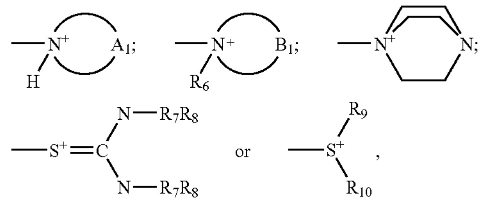

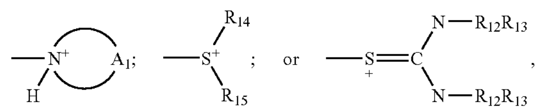

$Y_1^+$ is a group of the formula t is 0 or 1, wherein the above formulae $R_2$ and $R_3$ independently of one another are $C_1C_6$alkyl, $R_4$ is $C_1$-$C_6$alkyl; $C_5$-$C_7$cycloalkyl or $NR_7R_8$, $R_5$ and $R_6$ independently of one another are $C_1C_6$alkyl, $R_7$ and $R_8$ independently of one another are hydrogen or $C_1C_6$alkyl, $R_9$ and $R_{10}$ independently of one another are unsubstituted $C_1$-$C_6$alkyl or $C_1$-$C_6$alkyl substituted by at least one substituent selected from the group consisting of hydroxyl, cyano, carboxyl, $SO_3H$, —$NH_2$, carb-$C_1$-$C_6$alkoxy, $C_1C_6$alkoxy, phenyl, naphthyl and pyridyl, u is from 1 to 6, $A_1$ is a unit which completes an aromatic 5- to 7-membered nitrogen heterocycle, which may where appropriate also contain one or two further nitrogen atoms as ring members, and $B_1$ is a unit which completes a saturated 5- to 7-membered nitrogen heterocycle, which may where appropriate also contain 1 to 2 nitrogen, oxygen and/or sulfur atoms as ring members, each Q' is independently from each other a moiety of formula -L-D, wherein L is a direct bond or a bridging group and D is the radical of a dyestuff, each $Q_2$ is independently from each other hydroxyl; $C_1$-$C_{22}$alkyl; branched $C_3$-$C_{22}$alkyl; $C_2$-$C_{22}$alkenyl; branched $C_3$-$C_{22}$alkenyl and mixtures thereof; $C_1$-$C_{22}$alkoxy; a sulfo or carboxyl radical; a radical of the formula

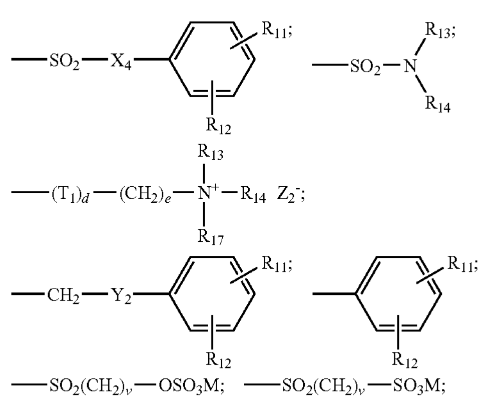

-continued

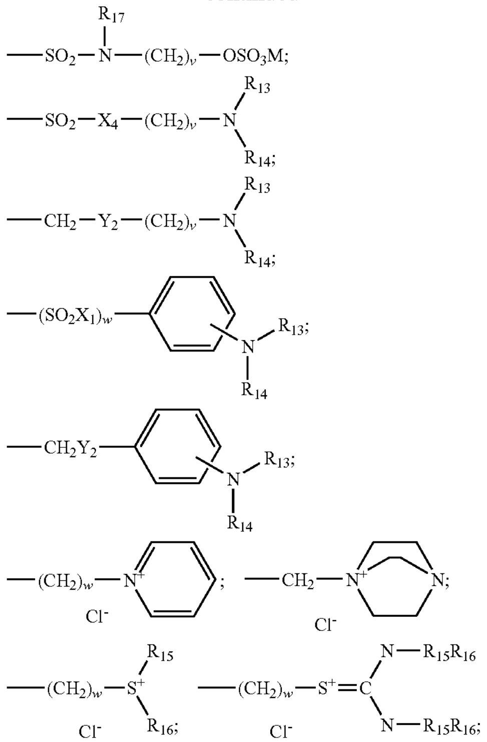

a branched alkoxy radical of the formula

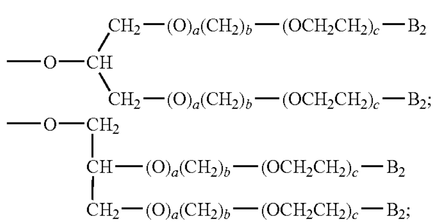

an alkylethyleneoxy unit of the formula $-(T_1)_d-(CH_2)_b(OCH_2CH_2)_a$—$B_3$ or an ester of the formula $COOR_{18}$, in which $B_2$ is hydrogen; hydroxyl; $C_1$-$C_{30}$alkyl; $C_1$-$C_{30}$alkoxy; —$CO_2H$; —$CH_2COOH$; —$SO_3^-M_1$; —$OSO_3^-M_1$; —$PO_3^{2-}M_1$; —$OPO_3^{2-}M_1$; and mixtures thereof, $B_3$ is hydrogen; hydroxyl; —COOH; -$SO_3^-M_1$; —$OSO_3^-M_1$ or $C_1$-$C_6$alkoxy, $M_1$ is a water-soluble cation, $T_1$ is —O— or —NH—, $X_1$ and $X_4$ independently of one another are —O—; —NH— or —N($C_1$-$C_5$alkyl)-, $R_{11}$ and $R_{12}$ independently of one another are hydrogen; a sulfo group and salts thereof; a carboxyl group and salts thereof or a hydroxyl group; at least one of the radicals $R_{11}$ and $R_{12}$ being a sulfo or carboxyl group or salts thereof, $Y_2$ is —O—; —S—; —NH— or —N($C_1$-$C_5$alkyl)-, $R_{13}$ and $R_{14}$ independently of one another other are hydrogen; $C_1$-$C_6$alkyl; hydroxy-$C_1$-$C_6$alkyl; cyano-$C_1$-$C_6$alkyl; sulfo-$C_1$-$C_6$alkyl; carboxy or halo-$C_1$-$C_6$alkyl; unsubstituted phenyl or phenyl substituted by at least one substituent selected from the group consisting of halogen, $C_1$-$C_4$alkyl, $C_1$-$C_4$alkoxy, sulfo or by carboxy; or $R_{18}$ and $R_{19}$, together with the nitrogen atom to which they are bonded, form a saturated 5- or 6-membered heterocyclic ring that may in addition contain a further nitrogen atom or an oxygen atom as ring member, $R_{15}$ and $R_{16}$ independently of one another are $C_1$-$C_6$alkyl or aryl-$C_1$-$C_6$alkyl radicals, $R_{17}$ is hydrogen; an unsubstituted $C_1$-$C_6$alkyl or $C_1$-$C_6$alkyl substituted by at least one substituent selected from the group consisting of halogen, hydroxyl, cyano, $SO_3H$, —$NH_2$, phenyl, carboxyl, carb-$C_1$-$C_6$alkoxy and $C_1$-$C_6$alkoxy, $R_{18}$ is $C_1$-$C_{22}$alkyl; branched $C_3$-$C_{22}$alkyl; $C_1$-$C_{22}$alkenyl or branched $C_3$-$C_{22}$alkenyl; $C_3$-$C_{22}$glycol; $C_1$-$C_{22}$alkoxy; branched $C_3$-$C_{22}$alkoxy; and mixtures thereof, M is hydrogen; or an alkali metal ion or ammonium ion, $Z_2$ is a is an alkanolate ion; a hydroxyl ion; $R_0COO^-$; $ClO_4^-$; $BF_4^-$;$PF_6^-$;$R_0SO_3^-$; $SO_4^{2-}$; $NO_3^-$; $F^-$; $Cl^-$; $Br^-$; $I^-$; citrate ion; tartrate ion or oxalate ion, wherein $R_0$ is hydrogen; or unsubstituted $C_1$-$C_{18}$alkyl; or $C_1$-$C_{18}$alkyl, which is substituted by at least one substituent selected from the group consisting of hydroxyl, cyano, carboxyl, $SO_3H$, —$NH_2$, carb-$C_1$-$C_6$alkoxy, $C_1$-$C_6$alkoxy, phenyl, naphthyl and pyridyl; unsubstituted aryl or aryl, which is substituted by at least one substituent selected from the group consisting of hydroxyl, cyano, carboxyl, $SO_3H$, —$NH_2$, carb-$C_1$-$C_6$alkoxy, $C_1$-$C_6$alkoxy and $C_1$-$C_4$-alkyl, a is 0 or 1, b is from 0 to 6, c is from 0 to 100, d is 0 or 1, e is from 0 to 22, v is an integer from 2 to 12, w is 0 or 1, and $A^-$ is an organic or inorganic anion, and s is equal to r in cases of monovalent anions $A^-$ and is ≤r in cases of polyvalent anions, it being necessary for $A_s^-$ to compensate the positive charge; where, when r≠1, the radicals $Q_1$ can be identical or different, and where the phthalocyanine ring system also comprise further solubilising groups comprising at least one compound of formula (8) and/or (9) according to claim 1.

10. The shading composition according to claim 8 in form of a granule comprising a) from 2 to 75% by weight (wt-%) of at least one shading composition (A) and/or (A") based on the total weight of the granulate, b) from 10 to 95 wt-% of at least one further additive, based on the total weight of the granulate, and c) from 0 to 15 wt-% water, based on the total weight of the granulate.

11. The shading composition according to claim 8 in liquid form comprising (a) 0.01-95 wt-% of at least one shading composition (A), based on the total weight of the liquid formulation, (b) 5-99.99 wt-%, based on the total weight of the liquid formulation, of at least one organic solvent and (c) 0-10 wt-%, based on the total weight of the liquid formulation, of at least one further additive.

12. A washing agent formulation (WAF) comprising

I) from 5 to 70 wt-% A) of at least one anionic surfactant and/or B) at least one non-ionic surfactant, based on the total weight of the washing agent formulation, II) from 5 to 60 wt-% C) of at least one builder substance, based on the total weight of the washing agent formulation, III) from 0 to 30 wt-% D) of at least one peroxide and, optionally, at least one activator and/or at least one catalyst, based on the total weight of the washing agent formulation, and IV) from 0.001 to 1 wt-% E) of a granulate, based on the total weight of the washing agent formulation, V) from 0 to 60 wt-% F) of at least one further additive, based on the total weight of the washing agent formulation, and VI) from 0 to 5 wt-% G) water, based on the total weight of the washing agent formulation, wherein the granulate comprises a) from 2 to 75% by weight (wt-%) of at least one shading composition (A) based on the total weight of the granulate, b) from 10 to 95 wt-% of at least one further additive, based on the total weight of the granulate, and c) from 0 to 15 wt-% water, based on the total weight of the granulate, and the shading composition (A) comprises at least one compound of formula (1a) and/or formula (1 b)

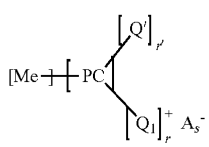

(1a)

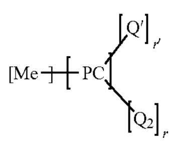

(1b)

in which

PC is the phthalocyanine ring system,

Me is Zn; Ca; Mg; Na; K; Al-$Z_1$; Si(IV)-$(Z_1)_2$; Ti(IV)-$(Z_1)_2$; Ge(IV)-$(Z_1)_2$; Ga(III)-$Z_1$; Zr(IV)-$(Z_1)_2$; In III -$Z_1$ or Sn(IV)-$(Z_1)_2$, $Z_1$ is an alkanolate ion; a hydroxyl ion; $R_0COO^-ClO_4^-$; $BF_4^-$; $PF_6^-$; $SO_3^-$; $SO_4^{2-}$; $NO_3^-$; $F^-$; $Cr^-$; $BC^-$; $I^-$; citrate ion; tartrate ion or oxalate ion wherein $R_0$ is hydrogen; or unsubstituted $C_1$-$C_{18}$alkyl; or $C_1$-$C_{1s}$alkyl, which is substituted by at least one substituent selected from the group consisting of hydroxyl, gcyano, carboxyl, $SO_3H$, $C_1$-$C_6$alkoxy, phenyl, naphthyl and pyridyl; unsubstituted aryl or aryl, which is substituted by at least one substituent selected from the group consisting of hydroxyl, cyano, carboxl $SO_3H$, —$NH_2$ carb-$C_1$-$C_6$alkoxy, $C_1$-$C_6$alkoxy and $C_1$-$C_4$-alkyl, r is 0; 1; 2; 3 or 4, r' is 1; 2; 3 or 4, each Q is independently of each other a sulfo or carboxl group or a radical of the formula —$SO_2X_2$—$R_1$—$X_3^+$; —O—$R_1$—$X_3^+$ or —$(CH_2)_t$—$Y_1^+$, in which $R_1$ is a branched or unbranched $C_1$-$C_8$alkylene; 1,3-phenylene or 1,4-phenylene, $X_2$ is —NH—or —N($C_1$-$C_5$alkyl)-, $X_3^+$ is a group of the formula

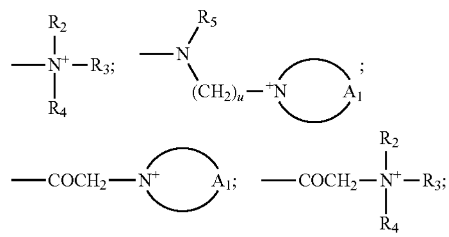

or in the case where $R_1$ =$C_1$-$C_8$alkylene also a group of the formula

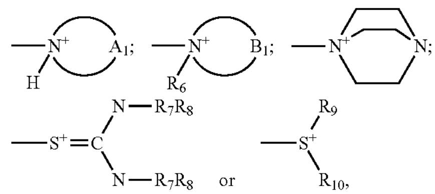

$Y_1^+$ is a group of the formula

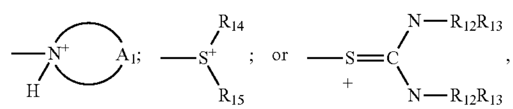

t is 0 or 1, wherein the above formulae $R_2$ and $R_3$ independently of one another are $C_1$-$C_6$alkyl, $R_4$ is $C_1$-$C_6$alkyl; $C_5$-$C_7$cycloalkyl or $NR_7R_8$, $R_6$ and $R_6$ independently of one another are $C_1$-$C_5$alkyl, $R_7$ and $R_8$ independently of one another are hydrogen or $C_1$-$C_5$alkyl, $R_9$ and $R_{10}$ independently of one another are unsubstituted $C_1$-$C_6$alkyl or $C_1$-$C_6$alkyl substituted by at least one substituent selected from the group consisting of hydroxyl, cyano, carboxyl, $SO_3H$, —$NH_2$, carb-$C_1$-$C_6$alkoxy, $C_1$-$C_6$alkoxy, phenyl, naphthyl and pyridyl, u is from 1 to 6, $A_1$ is a unit which completes an aromatic 5- to 7-membered nitrogen heterocycle, which may where appropriate also contain one or two further nitrogen atoms as ring members, and $B_1$ is a unit which completes a saturated 5- to 7-membered nitrogen heterocycle, which may where appropriate also contain 1 to 2 nitrogen, oxygen and/or sulfur atoms as ring members, each Q' is independently from each other a moiety of formula -L-D, wherein L is a direct bond or a bridging group and D is the radical of a dyestuff, each $Q_2$ is independently from each other hydroxyl; $C_1$-$C_{22}$alkyl; branched $C_3$-$C_{22}$alkyl; $C_2$-$C_{22}$alkenyl; branched $C_3$-$C_{22}$alkenyl and mixtures thereof; $C_1$-$C_{22}$alkoxy; a sulfo or carboxyl radical; a radical of the formula

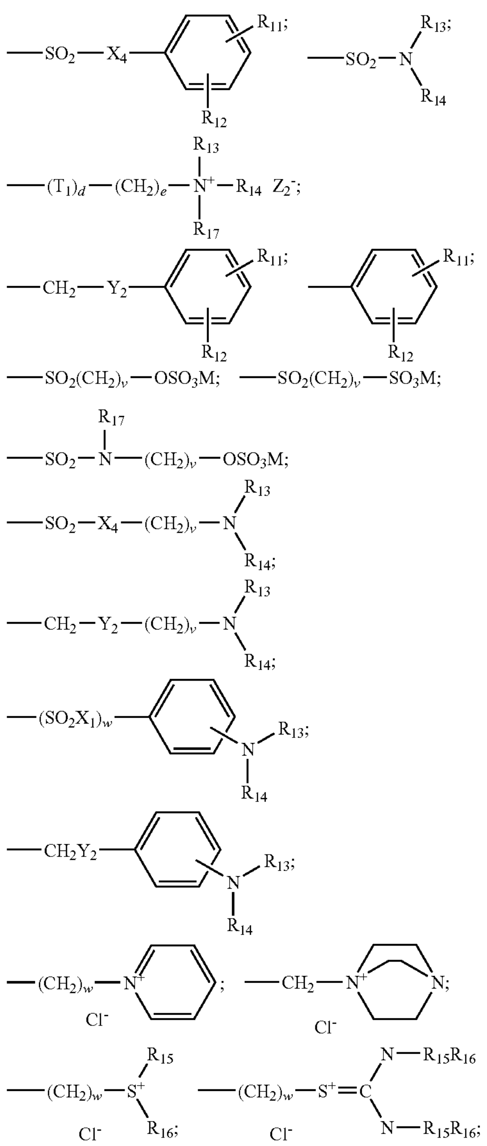

a branched alkoxy radical of the formula

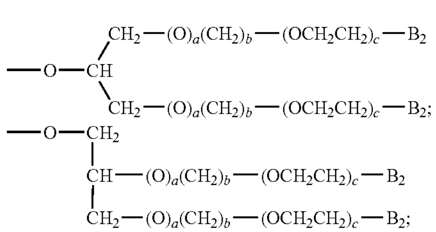

an alkylethyleneoxy unit of the formula $-(T_1)_d-(CH_2)_b(OCH_2CH_2)_a-B_b$ or an ester of the formula $COOR_{18}$ in which $B_2$ is hydrogen; hydroxyl; $C_1$-$C_{30}$alkyl; $C_1$-$C_{30}$alkoxy; —$CO_2H$; —$CH_2COOH$; —$SO_3^-M_1$; —$OSO_3^-M_1$; —$PO_3^{2-}M_1$; —$OPO_3^{2-}M_1$; and mixtures thereof, $B_3$ is hydrogen; hydroxyl; —COOH; —$SO_3^-M_1$; —$OSO_3^-M_1$ or $C_1$-$C_6$alkoxy, $M_1$ is a water-soluble cation, $T_1$ is —O— or —NH—, $X_1$ and $X_4$ independently of one another are —O—; —NH—or —N($C_1$-$C_5$alkyl)-, $R_{11}$ and $R_{12}$ independently of one another are hydrogen; a sulfo group and salts thereof; a carboxyl group and salts thereof or a hydroxyl group; at least one of the radicals $R_{11}$ and $R_{12}$ being a sulfo or carboxyl group or salts thereof, $Y_2$ is —O—; —S—; —NH— or —N($C_1$-$C_5$alkyl)-, $R_{13}$ and $R_{14}$ independently of one another other are hydrogen; $C_1$-$C_6$alkyl; hydroxy-$C_1$-$C_6$alkyl; cyano-$C_1$-$C_6$alkyl; sulfo-$C_1$-$C_6$alkyl; carboxy or halo-$C_1$-$C_6$alkyl; unsubstituted phenyl or phenyl substituted by at least one substituent selected from the group consisting of halogen, $C_1$-$C_4$alkyl, $C_1$-$C_4$alkyl, sulfo or by carboxy; or $R_{18}$ and $R_{19}$, together with the nitrogen atom to which they are bonded, form a saturated 5- or 6-membered heterocyclic ring that may in addition contain a further nitrogen atom or an oxygen atom as ring member, $R_{15}$ and $R_{16}$ independently of one another are $C_1$-$C_6$alkyl or aryl-$C_1$-$C_6$alkyl radicals, $R_{17}$ is hydrogen; an unsubstituted $C_1$-$C_6$alkyl or $C_1$-$C_6$alkyl substituted by at least one substituent selected from the group consisting of halogen, hydroxyl, cyano $SO_3H$, —$NH_2$, phenyl, carboxyl, carb-$C_1$-$C_6$alkoxy and $C_1$-$C_6$alkoxy, $R_{18}$ is $C_1$-$C_{22}$alkyl; branched $C_3$-$C_{22}$alkyl; $C_1$-$C_{22}$alkenyl or branched $C_3$-$C_{22}$alkenyl; $C_3$-$C_{22}$glycol; $C_1$-$C_{22}$alkoxy; branched $C_3$-$C_{22}$alkoxy; and mixtures thereof, M is hydrogen; or an alkali metal ion or ammonium ion, $Z_2$ is a is an alkanolate ion; a hydroxyl ion; $R_0COO^-$; $ClO_4^-$; $BF_4^-$;$PF_6^-$;$R_0SO_3^-$; $SO_4^{2-}$; $NO_3^-$; $F^-$; $Cl^-$; $Br^-$; $I^-$; citrate ion; tartrate ion or oxalate ion, wherein $R_0$ is hydrogen; or unsubstituted $C_1$-$C_{18}$alkyl; or $C_1$-$C_{18}$alkyl, which is substituted by at least one substituent selected from the group consisting of hydroxyl, cyano, carboxyl, $SO_3H$, —$NH_2$, carb-$C_1$-$C_6$alkoxy, $C_1$-$C_6$alkoxy, phenyl, naphthyl and pyridyl; unsubstituted aryl or aryl, which is substituted by at least one substituent selected from the group consisting of hydroxyl, cyano, carboxyl, $SO_3H$, —$NH_2$, carb-$C_1$-$C_6$alkoxy, $C_1$-$C_6$alkoxy and $C_1$-$C_4$-alkyl, a is 0 or 1, b is from 0 to 6, c is from 0 to 100, d is 0 or 1, e is from 0 to 22, v is an integer from 2 to 12, w is 0 or 1, and $A^-$ is an organic or inorganic anion, and s is equal to r in cases of monovalent anions $A^-$ and is ≤r in cases of polyvalent anions, it being necessary for $A_s^-$ to compensate the positive charge; where when r≠1 the radicals $Q_1$ can be identical or different, and where the phthalocyanine ring system may also comprise further solubilising groups and D is a radical of formulae (I)-(XXXII):
(I)
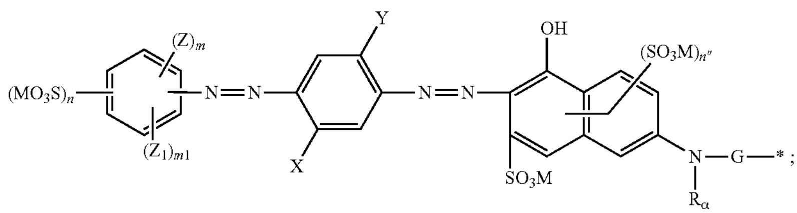
(II)
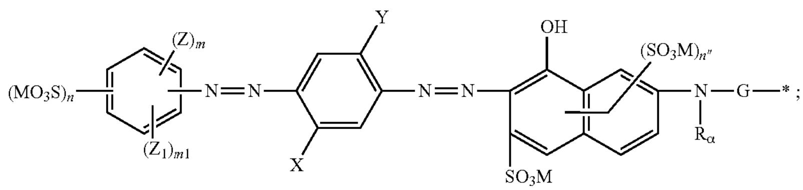
(III)
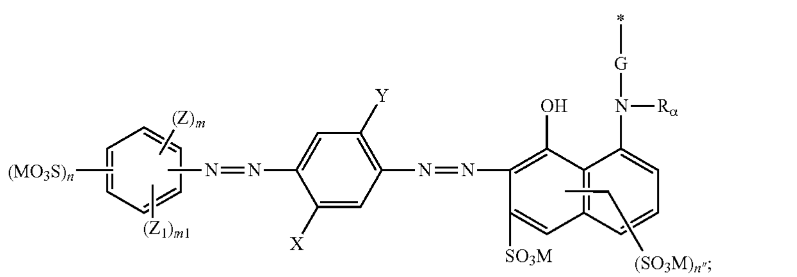
(IV)
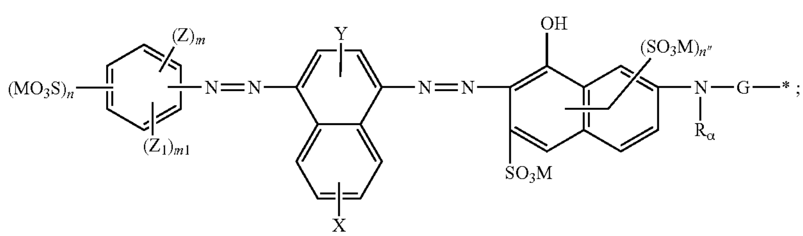
(V)
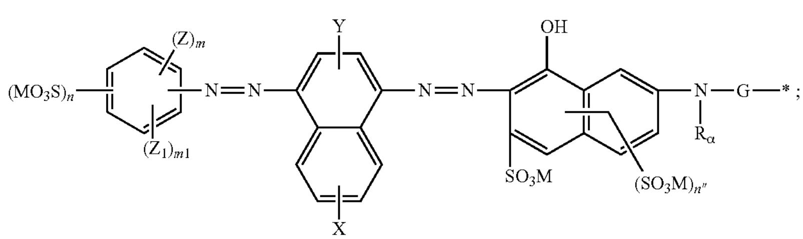
(VI)
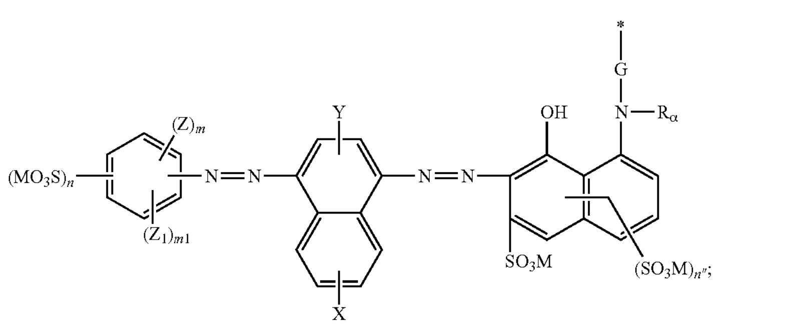

-continued
(VII)
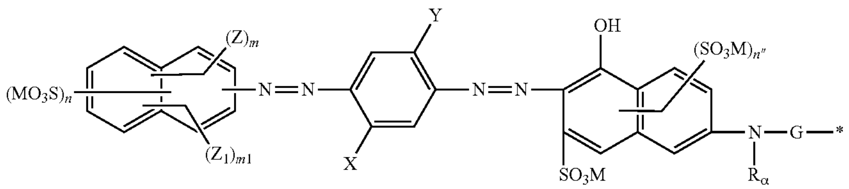
(VIII)
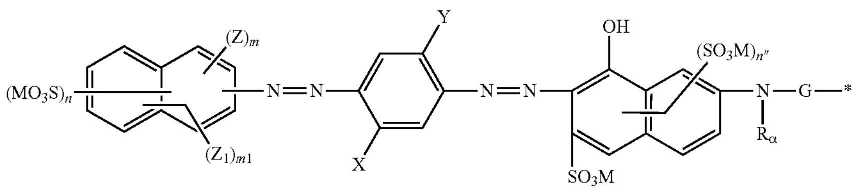
(IX)
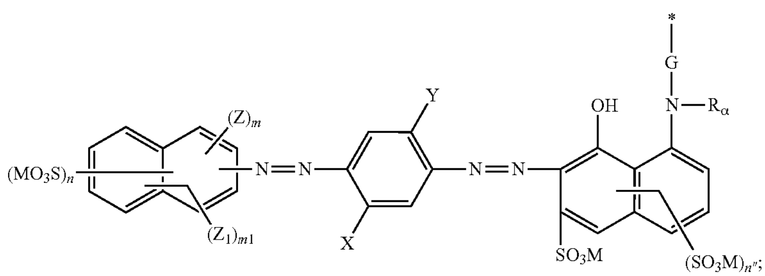
(X)
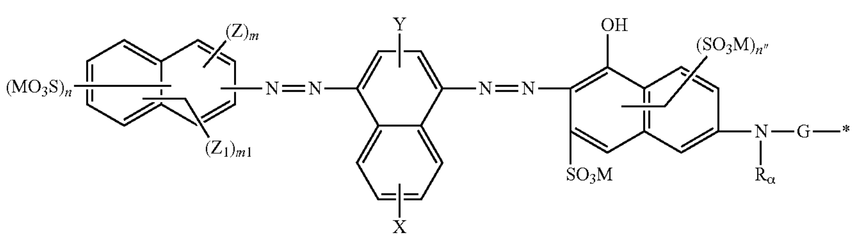
(XI)
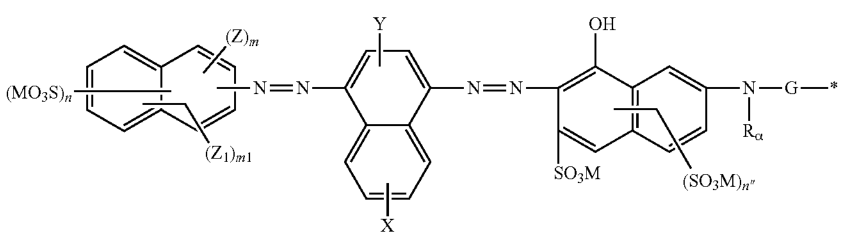
(XII)
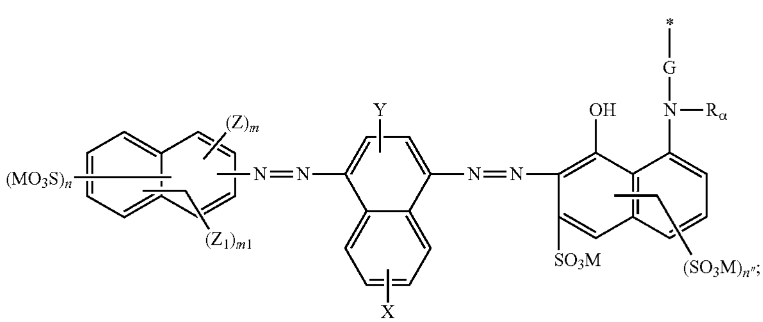

-continued
(XIII)
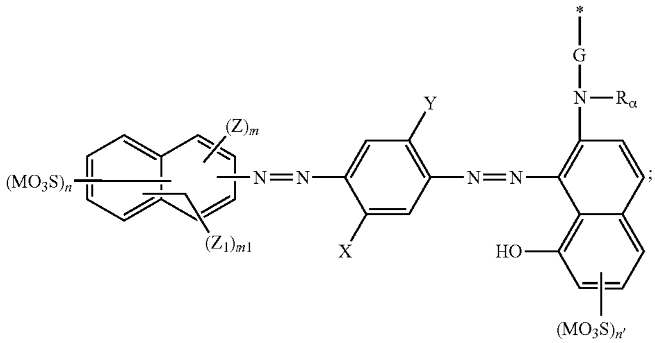
(XIV)
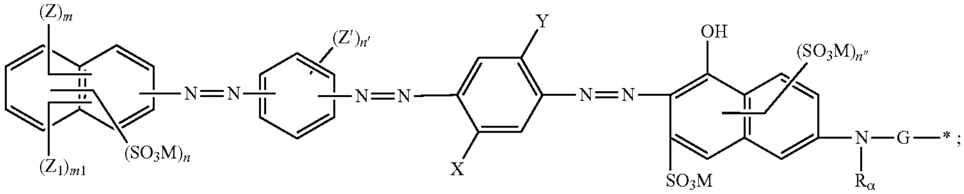
(XV)
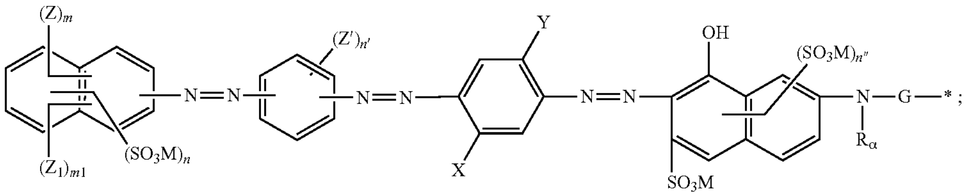
(XVI)
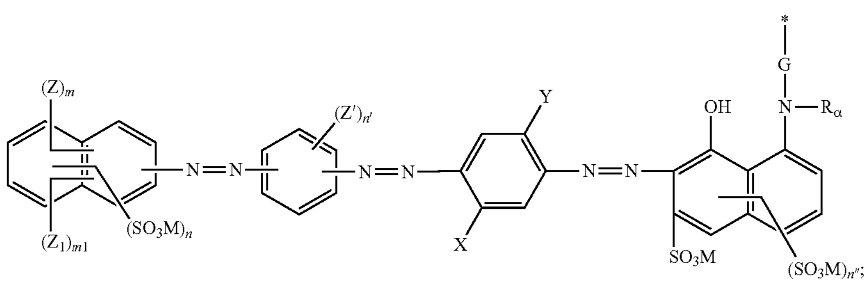
(XVII)
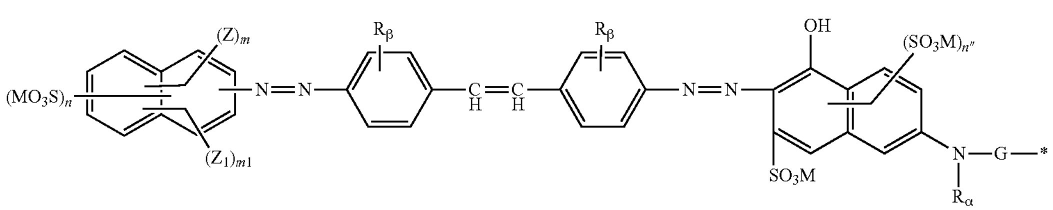
(XVIII)
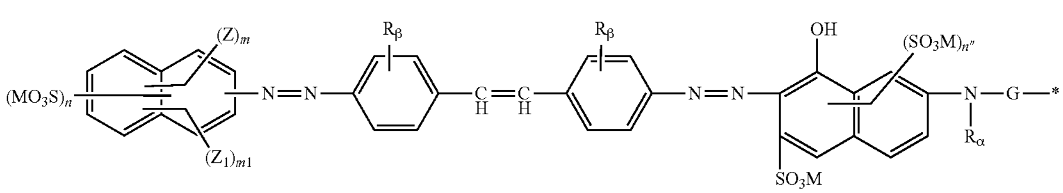

-continued
(XIX)
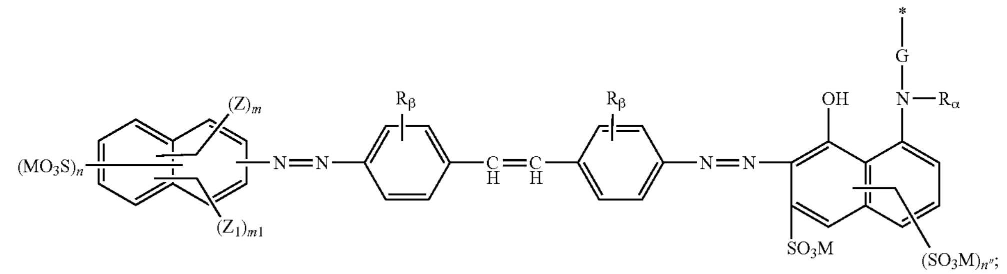
(XX)
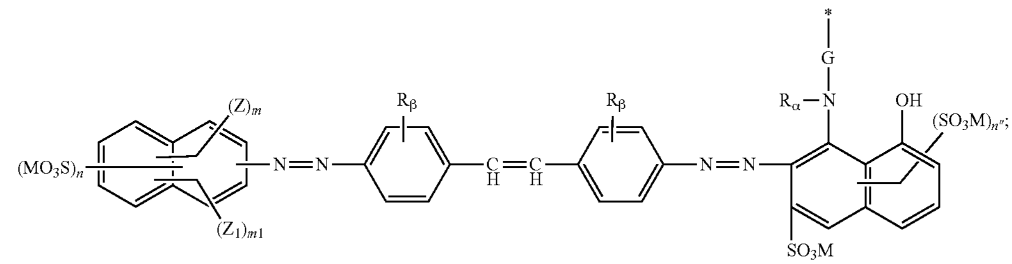
(XXI)
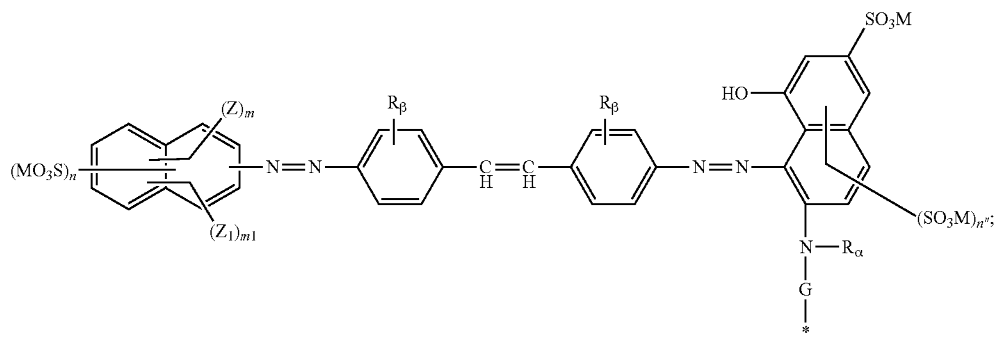
(XXII)
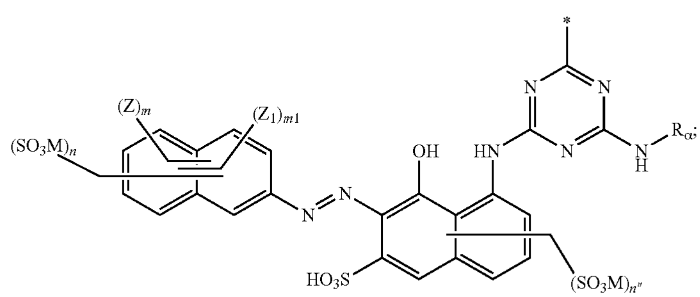
(XXIII)
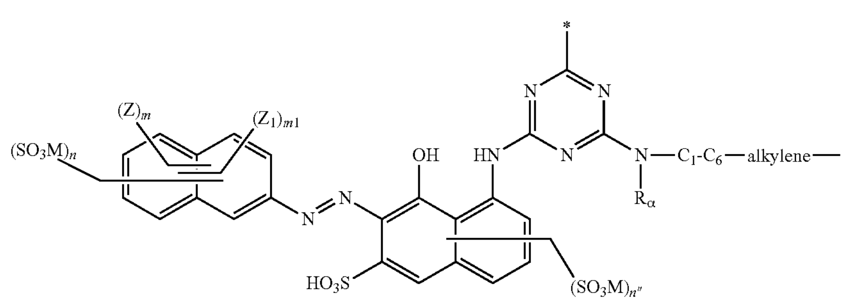

-continued
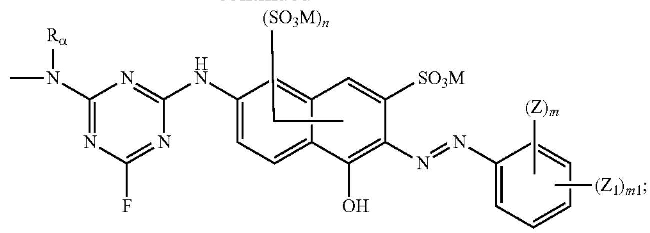
(XXIV)
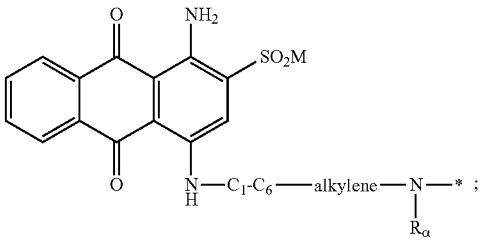
(XXV)
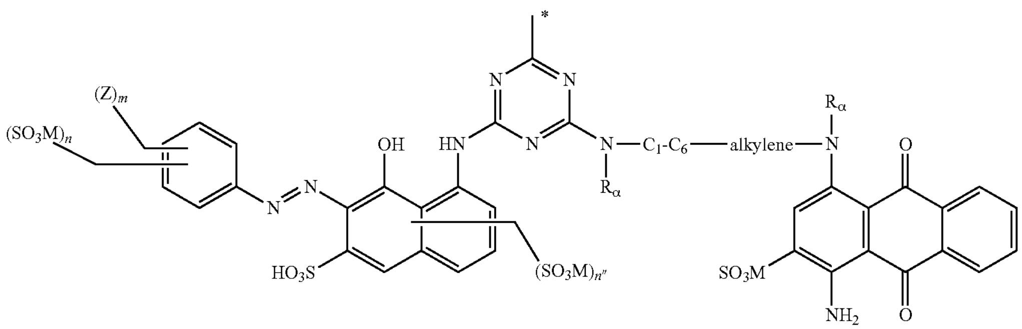
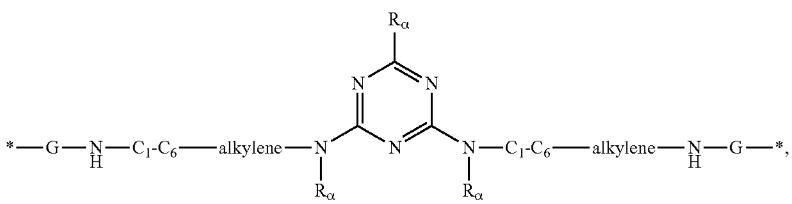
(XXVIIa)
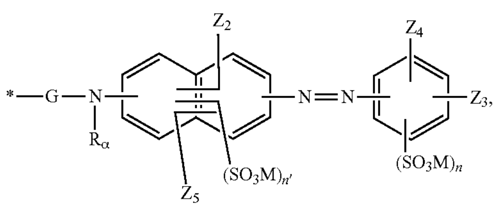
(XXVIIb)
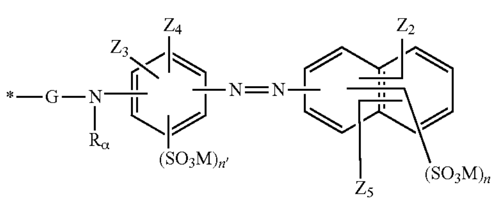
(XXVIIc)
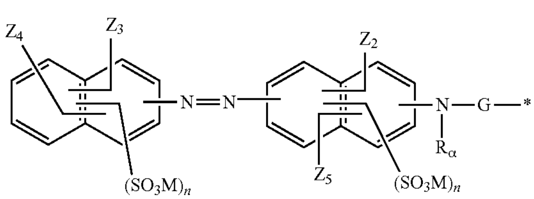

-continued (XXVIId)

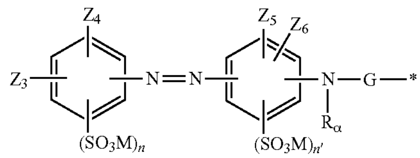

(XXVIII)

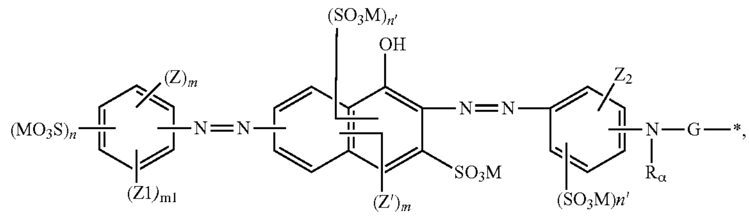

(XXIX)

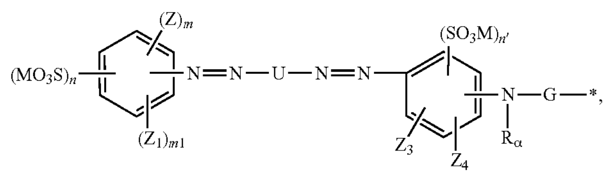

(XXX)

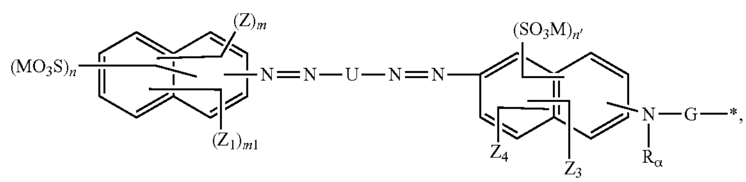

(XXXI)

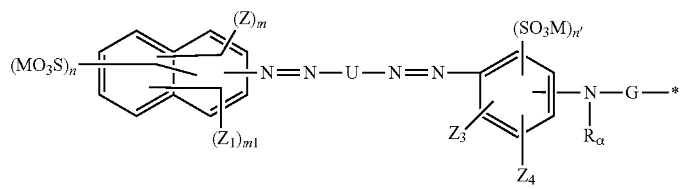

or (XXXII)

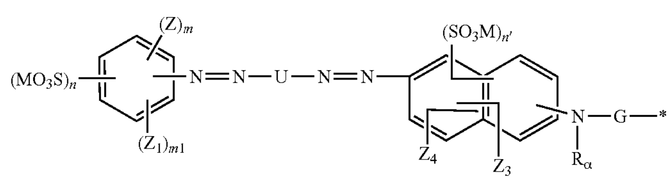

wherein

* marks the bond to the bridging group L,

X and Y independently of one another, are hydrogen; $SO_3M$; linear or branched, unsubstituted $C_1$-$C_4$-alkyl; linear or branched $C_1$-$C_4$-alkyl, which is substituted by at least one substituent selected from the group consisting of hydroxyl, cyano, $SO_3H$, —$NH_2$, carboxyl, carb-$C_1$-$C_4$alkoxy, $C_1$-$C_4$alkoxy, phenyl, naphthyl and pyridyl; linear or branched, unsubstituted $C_1$-$C_4$-alkoxy; linear or branched, $C_1$-$C_4$-alkoxy, which is substituted by at least one substituent selected from the group consisting of hydroxyl, cyano, $SO_3H$, —$NH_2$, carboxyl, carb-$C_1$-$C_4$alkoxy, $C_1$-$C_4$alkyl, phenyl, naphthyl and pyridyl; NHCOOH; NHCOO$C_1$-$C_4$alkyl; COOH or COO$C_1$-$C_4$alkyl;

U is a moiety of formula

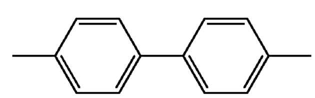

;

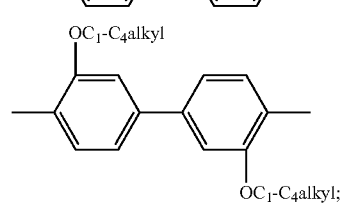

-continued

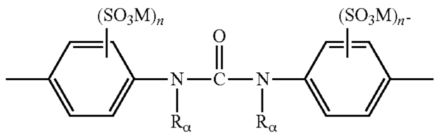

$R_\alpha$ is hydrogen; linear or branched, unsubstituted $C_1$-$C_4$-alkyl; linear or branched $C_1$-$C_4$-alkyl, which is substituted by at least one substituent selected from the group consisting of hydroxyl, cyano, $SO_3H$, —$NH_2$, carboxyl, carb-$C_1$-$C_4$alkoxy, $C_1$-$C_4$alkoxy, phenyl, naphthyl and pyridyl; unsubstituted aryl or aryl, which is substituted by at least one substituent selected from the group consisting of hydroxyl, cyano, $SO_3H$, —$NH_2$, carboxyl, carb-$C_1$-$C_4$alkoxy, $C_1$-$C_4$alkoxy and $C_1$-$C_4$alkyl, each $R_\beta$ independently of one another is hydrogen; $SO_3M$; linear or branched, unsubstituted $C_1$-$C_4$-alkyl; linear or branched $C_1$-$C_4$-alkyl, which is substituted by at least one substituent selected from the group consisting of hydroxyl, cyano, $SO_3H$, —$NH_2$, carboxyl, carb-$C_1$-$C_4$alkoxy, $C_1$-$C_4$alkoxy, phenyl, naphthyl and pyridyl; linear or branched, unsubstituted $C_1$-$C_4$-alkoxy or linear or branched, $C_1$-$C_4$-alkoxy, which is substituted by at least one substituent selected from the group consisting of hydroxyl, cyano, $SO_3H$, —$NH_2$, carboxyl, carb-$C_1$-$C_4$alkoxy, $C_1$-$C_4$alkyl, phenyl, naphthyl and pyridyl, Z is linear or branched, unsubstituted $C_1$-$C_4$-alkyl; linear or branched $C_1$-$C_4$-alkyl, which is substituted by at least one substituent selected from the group consisting of hydroxyl, cyano, $SO_3H$, —$NH_2$, carboxyl, carb-$C_1$-$C_4$alkoxy, $C_1$-$C_4$alkoxy, phenyl, naphthyl and pyridyl; linear or branched, unsubstituted $C_1$-$C_4$-alkoxy or linear or branched, $C_1$-$C_4$-alkoxy, which is substituted by at least one substituent selected from the group consisting of hydroxyl, cyano, $SO_3H$, —$NH_2$, carboxyl, carb-$C_1$-$C_4$alkoxy, $C_1$-$C_4$alkyl, phenyl, naphthyl and pyridyl; halogen; OH; $NO_2$; COOH; $COOC_1$-$C_4$alkyl; $NH_2$; $NHC_1$-$C_4$alkyl, wherein the alkyl group may be substituted by at least one substituent selected from the group consisting of OH, $NH_2$, $C_1$-$C_4$alkyl, CN and COOH; $N(C_1$-$C_4alkyl)C_1$-$C_4$alkyl, wherein the alkyl groups may independently of each other be substituted by at least one substituent selected from the group consisting of OH, $NH_2$, $C_1$-$C_4$alkyl, CN and COOH; NH-aryl; NH-aryl, wherein the aryl is substituted by at least one substituent selected from the group consisting of hydroxyl, cyano, $SO_3H$, —$NH_2$, carboxyl, carb-$C_1$-$C_4$alkoxy, $C_1$-$C_4$alkyl and $C_1$-$C_4$alkoxy; $NHCOC_1$-$C_4$alkyl and $NHCOOC_1$-$C_4$alkyl, Z' is $SO_3M$; linear or branched, unsubstituted $C_1$-$C_4$-alkyl; linear or branched $C_1$-$C_4$-alkyl, which is substituted by at least one substituent selected from the group consisting of hydroxyl, cyano, $SO_3H$, —$NH_2$, carboxyl, carb-$C_1$-$C_4$alkoxy, $C_1$-$C_4$alkoxy, phenyl, naphthyl and pyridyl; linear or branched, unsubstituted $C_1$-$C_4$-alkoxy or linear or branched, $C_1$-$C_4$-alkoxy, which is substituted by at least one substituent selected from the group consisting of hydroxyl, cyano, $SO_3H$, —$NH_2$, carboxyl, carb-$C_1$-$C_4$alkoxy, $C_1$-$C_4$alkyl, phenyl, naphthyl and pyridyl; halogen; OH; $NO_2$; COOH; $COOC_1$-$C_4$alkyl; $NH_2$; $NHC_1$-$C_4$alkyl, wherein the alkyl group may be substituted by at least one substituent selected from the group consisting of OH, $NH_2$, $C_1$-$C_4$alkyl, CN or COOH; $N(C_1$-$C_4alkyl)C_1$-$C_4$alkyl, wherein the alkyl groups may independently of each other be substituted by at least one substituent selected from the group consisting of OH, $NH_2$, $C_1$-$C_4$alkyl, CN and COOH; NH-aryl; NH-aryl, wherein the aryl is substituted by at least one substituent selected from the group consisting of hydroxyl, cyano, $SO_3H$, —$NH_2$, carboxyl, carb-$C_1$-$C_4$alkoxy, $C_1$-$C_4$alkyl and $C_1$-$C_4$alkoxy; $NHCOC_1$-$C_4$alkyl or $NHCOOC_1$-$C_4$alkyl, $Z_1$ is linear or branched, unsubstituted $C_1$-$C_4$-alkyl; linear or branched $C_1$-$C_4$-alkyl, which is substituted by at least one substituent selected from the group consisting of hydroxyl, cyano, $SO_3H$, —$NH_2$, carboxyl, carb-$C_1$-$C_4$alkoxy, $C_1$-$C_4$alkoxy, phenyl, naphthyl and pyridyl; linear or branched, unsubstituted $C_1$-$C_4$-alkoxy or linear or branched, $C_1$-$C_4$-alkoxy, which is substituted by at least one substituent selected from the group consisting of hydroxyl, cyano, $SO_3H$, —$NH_2$, carboxyl, carb-$C_1$-$C_4$alkoxy, $C_1$-$C_4$alkyl, phenyl, naphthyl and pyridyl; halogen; OH; $NO_2$; COOH; $COOC_1$-$C_4$alkyl; $NH_2$; $NHC_1$-$C_4$alkyl, wherein the alkyl group may be substituted by at least one substituent selected from the group consisting of OH, $NH_2$, $C_1$-$C_4$alkyl, CN or COOH; $N(C_1$-$C_4alkyl)C_1$-$C_4$alkyl, wherein the alkyl groups may independently of each other be substituted by at least one substituent selected from the group consisting of OH, $NH_2$, $C_1$-$C_4$alkyl, CN and COOH; NH-aryl; NH-aryl, wherein the aryl is substituted by at least one substituent selected from the group consisting of hydroxyl, cyano, $SO_3H$, —$NH_2$, carboxyl, carb-$C_1$-$C_4$alkoxy, $C_1$-$C_4$alkyl and $C_1$-$C_4$alkoxy; $NHCOC_1$-$C_4$alkyl or $NHCOOC_1$-$C_4$alkyl, $Z_2$, $Z_3$, $Z_4$, $Z_5$ and $Z_6$ are independently from each other hydrogen; linear or branched, unsubstituted $C_1$-$C_4$-alkyl; linear or branched $C_1$-$C_4$-alkyl, which is substituted by at least one substituent selected from the group consisting of hydroxyl, cyano, $SO_3H$, —$NH_2$, carboxyl, carb-$C_1$-$C_4$alkoxy, $C_1$-$C_4$alkoxy, phenyl, naphthyl and pyridyl; linear or branched, unsubstituted $C_1$-$C_4$-alkoxy or linear or branched, $C_1$-$C_4$-alkoxy, which is substituted by at least one substituent selected from the group consisting of hydroxyl, cyano, $SO_3H$, —$NH_2$, carboxyl, carb-$C_1$-$C_4$alkoxy, $C_1$-$C_4$alkyl, phenyl, naphthyl and pyridyl; halogen; OH; $SO_2CH_2CH_2SO_3H$; $NO_2$; COOH; $COOC_1$-$C_4$alkyl; $NH_2$; $NHC_1$-$C_4$alkyl, wherein the alkyl group may be substituted by at least one substituent selected from the group consisting of OH, $NH_2$, $C_1$-$C_4$alkyl, CN or COOH; $N(C_1$-$C_4alkyl)C_1$-$C_4$alkyl, wherein the alkyl groups may independently of each other be substituted by at least one substituent selected from the group consisting of OH, $NH_2$, $C_1$-$C_4$alkyl, CN and COOH; NH-aryl; NH-aryl, wherein the aryl is substituted by at least one substituent selected from the group consisting of hydroxyl, cyano, $SO_3H$, —$NH_2$, carboxyl, carb-$C_1$-$C_4$alkoxy, $C_1$-$C_4$alkyl and $C_1$-$C_4$alkoxy; $NHCOC_1$-$C_4$alkyl or $NHCOOC_1$-$C_4$alkyl, G is a direct bond; $COOC_1$-$C_4$alkylene; unsubstituted arylene; arylene which is substituted by at least one substituent selected from the group consisting of hydroxyl, cyano, $NO_2$, $SO_3H$, —$NH_2$, carboxyl, carb-$C_1$-$C_4$alkoxy, $C_1$-$C_4$alkoxy and $C_1$-$C_4$alkyl; unsubstituted $C_1$-$C_4$alkylene or $C_1$-$C_4$-alkylene which is substituted by at least one substituent selected from the group consisting of hydroxyl, cyano, $NO_2$, $SO_3H$, —$NH_2$, carboxyl, carb-$C_1$-$C_4$alkoxy, $C_1$-$C_4$alkoxy and $C_1$-$C_4$alkyl; or —CO-arylene, n is 0; 1; 2 or 3, n' is 0; 1 or 2, n" is 0 or 1, m is 0; 1 or 2, $m_1$ is 0; 1 or 2, each M is independently from each other hydrogen; an alkali metal ion or an ammonium ion.

13. A fabric softener formulation (FSF) comprising (a) at least one shading composition (A), and (b) at least one fabric softener, wherein composition (A) comprises at least one compound of formula (1a) and/or formula (1b)

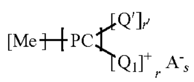

(1a)

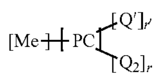

(1b)

in which

PC is the phthalocyanine ring system,

Me is Zn; Ca; Mg; Na; K; Al—$Z_1$; Si(IV)-$(Z_1)_2$; Ti(IV)-$(Z_1)_2$; Ge(IV)-$(Z_1)_2$; Ga(III)-$Z_1$; Zr(IV)-$(Z_1)_2$; In(III)-$Z_1$ or Sn(IV)-$(Z_1)_2$, $Z_1$ is an alkanolate ion; a hydroxyl ion; $R_0COO^-$; $ClO_4^-$; $BF_4^-$;$PF_6^-$;$R_0SO_3^-$; $SO_4^{2-}$; $NO_3^-$; $F^-$; $Cl^-$; $Br^-$; $I^-$; citrate ion; tartrate ion or oxalate ion, wherein $R_0$ is hydrogen; or unsubstituted $C_1$-$C_{18}$alkyl; or $C_1$-$C_{18}$alkyl, which is substituted by at least one substituent selected from the group consisting of hydroxyl, cyano, carboxyl, $SO_3H$, —$NH_2$, carb-$C_1$-$C_6$alkoxy, $C_1$-$C_6$alkoxy, phenyl, naphthyl and pyridyl; unsubstituted aryl or aryl, which is substituted by at least one substituent selected from the group consisting of hydroxyl, cyano, carboxyl, $SO_3H$, —$NH_2$, carb-$C_1$-$C_6$alkoxy, $C_1$-$C_6$alkoxy and $C_1$-$C_4$-alkyl, r is 0; 1; 2; 3 or 4, r' is 1; 2; 3 or 4, each $Q_1$ is independently of each other a sulfo or carboxyl group or a radical of the formula —$SO_2X_2$—$R_1$—$X_3^+$; —O—$R_1$—$X_3^+$ or —$(CH_2)_t$—$Y_1^+$, in which $R_1$ is a branched or unbranched $C_1$-$C_8$alkylene; 1,3-phenylene or 1,4-phenylene, $X_2$ is —NH— or —N($C_1$-$C_5$alkyl)-, $X_3^+$ is a group of the formula

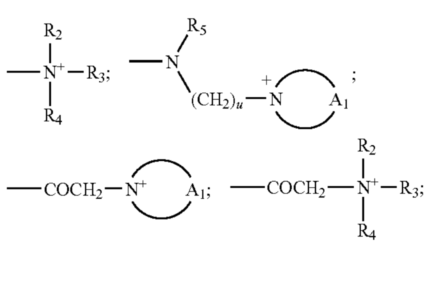

or, in the case where $R_1$=$C_1$-$C_8$alkylene, also a group of the formula

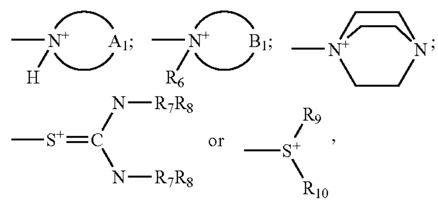

$Y_1^+$ is a group of the formula

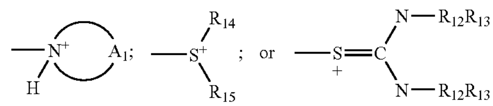

t is 0 or 1, wherein the above formulae $R_2$ and $R_3$ independently of one another are $C_1$-$C_6$alkyl, $R_4$ is $C_1$-$C_6$alkyl; $C_5$-$C_7$cycloalkyl or $NR_7R_8$, $R_5$ and $R_6$ independently of one another are $C_1$-$C_5$alkyl, $R_7$ and $R_8$ independently of one another are hydrogen or $C_1$-$C_6$alkyl, $R_9$ and $R_{10}$ independently of one another are unsubstituted $C_1$-$C_6$alkyl or $C_1$-$C_6$alkyl substituted by at least one substituent selected from the group consisting of hydroxyl, cyano, carboxyl, $SO_3H$, —$NH_2$, carb-$C_1$-$C_6$alkoxy, $C_1$-$C_6$alkoxy, phenyl, naphthyl and pyridyl, u is from 1 to 6, $A_1$ is a unit which completes an aromatic 5- to 7-membered nitrogen heterocycle, which may where appropriate also contain one or two further nitrogen atoms as ring members, and $B_1$ is a unit which completes a saturated 5- to 7-membered nitrogen heterocycle, which may where appropriate also contain 1 to 2 nitrogen, oxygen and/or sulfur atoms as ring members, each Q' is independently from each other a moiety of formula -L-D, wherein L is a direct bond or a bridging group and D is the radical of a dyestuff, each $Q_2$ is independently from each other hydroxyl; $C_1$-$C_{22}$alkyl; branched $C_3$-$C_{22}$alkyl; $C_2$-$C_{22}$alkenyl; branched $C_3$-$C_{22}$alkenyl and mixtures thereof; $C_1$-$C_{22}$alkoxy; a sulfo or carboxyl radical; a radical of the formula

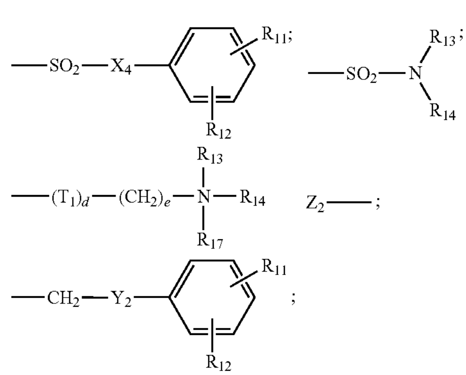

-continued

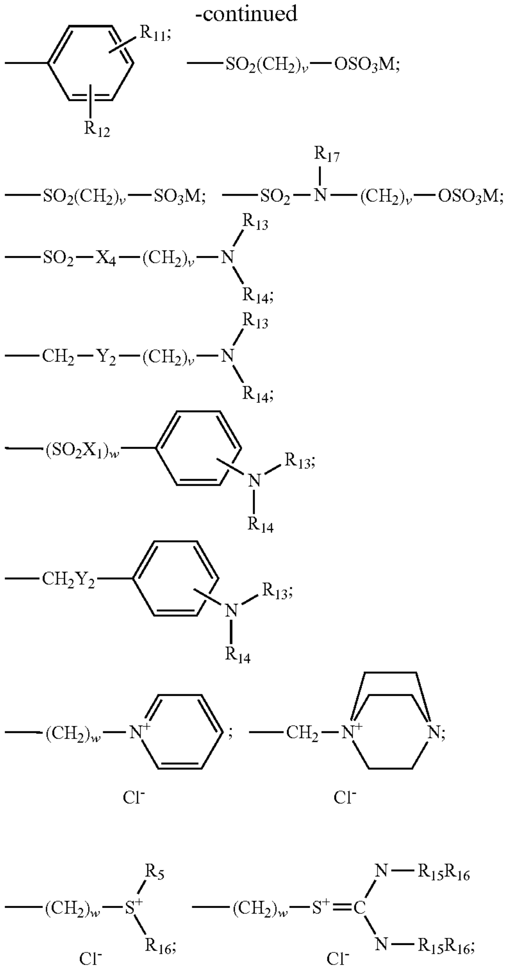

a branched alkoxy radical of the formula

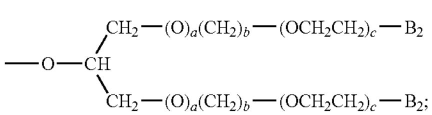

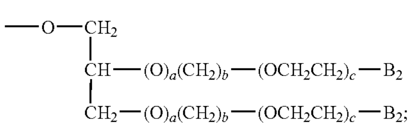

an alkylethyleneoxy unit of the formula $-(T_1)_d-(CH_2)_b(OCH_2CH_2)_a—B_3$ or an ester of the formula $COOR_{18}$, in which $B_2$ is hydrogen; hydroxyl; $C_1$-$C_{30}$alkyl; $C_1$-$C_{30}$alkoxy; —$CO_2H$; —$CH_2COOH$; —$SO_3^-M_1$; —$OSO_3^-M_1$; —$PO_3^{2-}M_1$; —$OPO_3^{2-}M_1$; and mixtures thereof, $B_3$ is hydrogen; hydroxyl; —COOH; -$SO_3^-M_1$; —$OSO_3^-M_1$ or $C_1$-$C_6$alkoxy, $M_1$ is a water-soluble cation, $T_1$ is —O— or —NH—, $X_1$ and $X_4$ independently of one another are —O—; —NH— or —N($C_1$-$C_5$alkyl)-, $R_{11}$ and $R_{12}$ independently of one another are hydrogen; a sulfo group and salts thereof; a carboxyl group and salts thereof or a hydroxyl group; at least one of the radicals $R_{11}$ and $R_{12}$ being a sulfo or carboxyl group or salts thereof, $Y_2$ is —O—; —S—; —NH— or —N($C_1$-$C_5$alkyl)-, $R_{13}$ and $R_{14}$ independently of one another other are hydrogen; $C_1$-$C_6$alkyl; hydroxy-$C_1$-$C_6$alkyl; cyano-$C_1$-$C_6$alkyl; sulfo-$C_1$-$C_6$alkyl; carboxy or halo-$C_1$-$C_6$alkyl; unsubstituted phenyl or phenyl substituted by at least one substituent selected from the group consisting of halogen, $C_1$-$C_4$alkyl, $C_1$-$C_4$alkoxy, sulfo or by carboxy; or $R_{18}$ and $R_{19}$, together with the nitrogen atom to which they are bonded, form a saturated 5- or 6-membered heterocyclic ring that may in addition contain a further nitrogen atom or an oxygen atom as ring member, $R_{15}$ and $R_{16}$ independently of one another are $C_1$-$C_6$alkyl or aryl-$C_1$-$C_6$alkyl radicals, $R_{17}$ is hydrogen; an unsubstituted $C_1$-$C_6$alkyl or $C_1$-$C_6$alkyl substituted by at least one substituent selected from the group consisting of halogen, hydroxyl, cyano, $SO_3H$, —$NH_2$, phenyl, carboxyl, carb-$C_1$-$C_6$alkoxy and $C_1$-$C_6$alkoxy, $R_{18}$ is $C_1$-$C_{22}$alkyl; branched $C_3$-$C_{22}$alkyl; $C_1$-$C_{22}$alkenyl or branched $C_3$-$C_{22}$alkenyl; $C_3$-$C_{22}$glycol; $C_1$-$C_{22}$alkoxy; branched $C_3$-$C_{22}$alkoxy; and mixtures thereof, M is hydrogen; or an alkali metal ion or ammonium ion, $Z_2$ is a is an alkanolate ion; a hydroxyl ion; $R_0COO^-$; $ClO_4^-$; $BF_4^-$;$PF_6^-$;$R_0SO_3^-$; $SO_4^{2-}$; $NO_3^-$; $F^-$; $Cl^-$; $Br^-$; $I^-$; citrate ion; tartrate ion or oxalate ion, wherein $R_0$ is hydrogen; or unsubstituted $C_1$-$C_{18}$alkyl; or $C_1$-$C_{18}$alkyl, which is substituted by at least on substituent selected from the group consisting of hydroxyl, cyano, carboxyl, $SO_3H$, —$NH_2$, carb-$C_1$-$C_6$alkoxy, $C_1$-$C_6$alkoxy, phenyl, naphthyl and pyridyl; unsubstituted aryl or aryl, which is substituted by at least one substituent selected from the group consisting of hydroxyl, cyano, carboxyl, $SO_3H$, —$NH_2$, carb-$C_1$-$C_6$alkoxy, $C_1$-$C_6$alkoxy and $C_1$-$C_4$-alkyl, a is 0 or 1, b is from 0 to 6, c is from 0 to 100, d is 0 or 1, e is from 0 to 22, v is an integer from 2 to 12, w is 0 or 1, and $A^-$ is an organic or inorganic anion, and s is equal to r in cases of monovalent anions $A^-$ and is ≤r in cases of polyvalent anions, it being necessary for $A_s^-$ to compensate the positive charge; where, when r≠1, the radicals $Q_1$ can be identical or different, and where the phthalocyanine ring system may also comprise further solubilising groups and comprising D is a radical of formulae (I)-(XXXII):
(I)
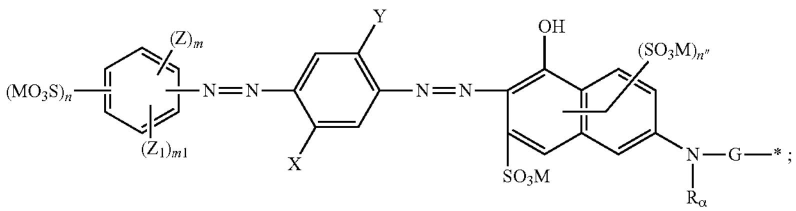
(II)
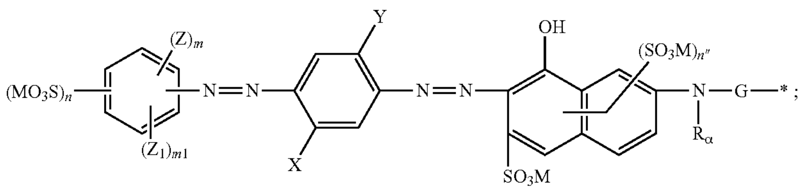
(III)
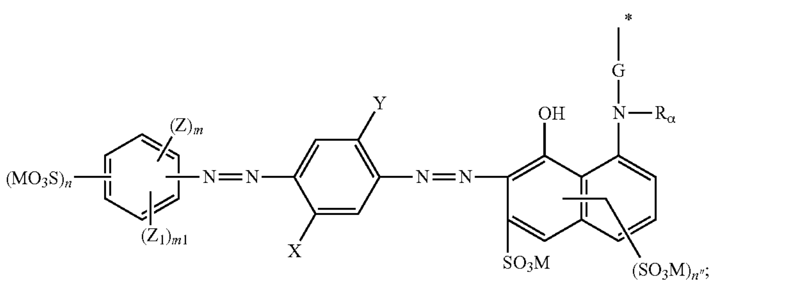
(IV)
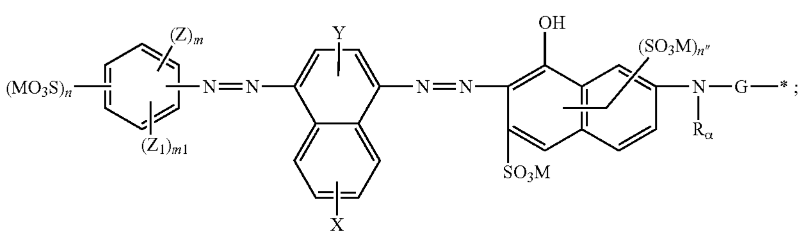
(V)
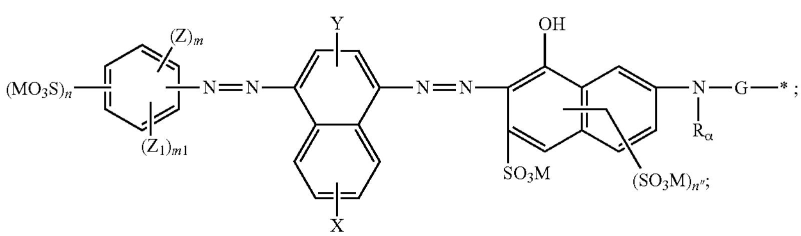
(VI)
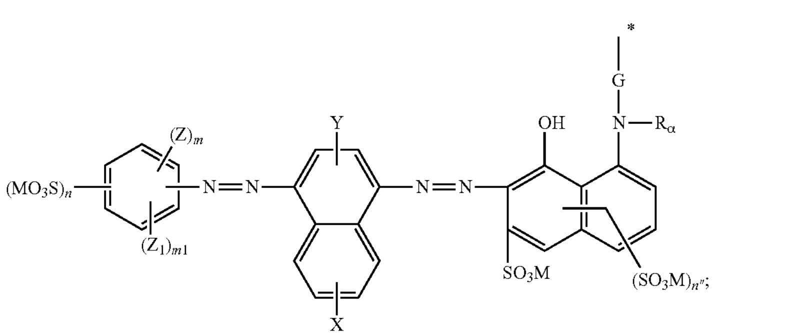

-continued
(VII)
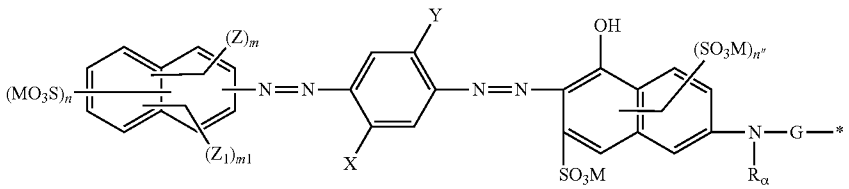
(VIII)
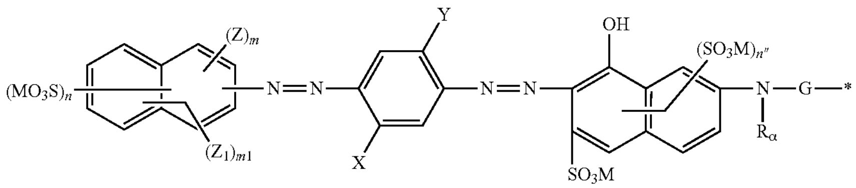
(IX)
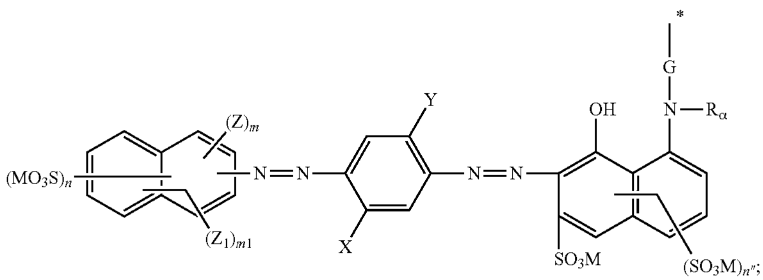
(X)
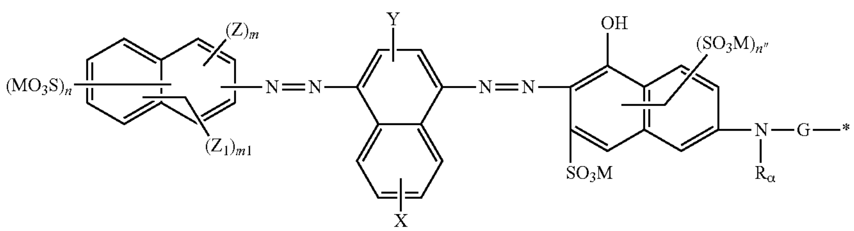
(XI)
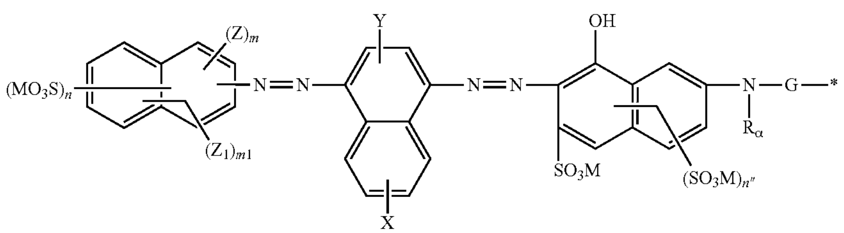
(XII)
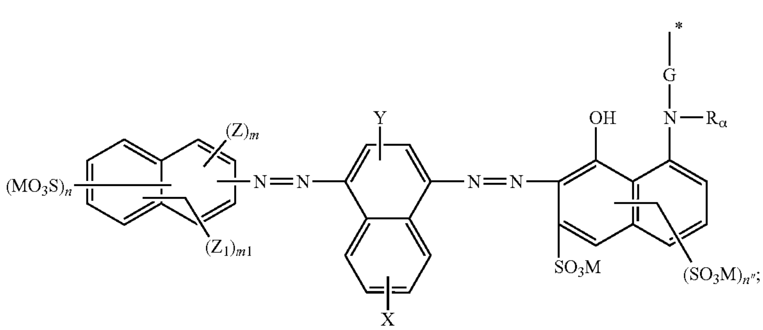

-continued
(XIII)
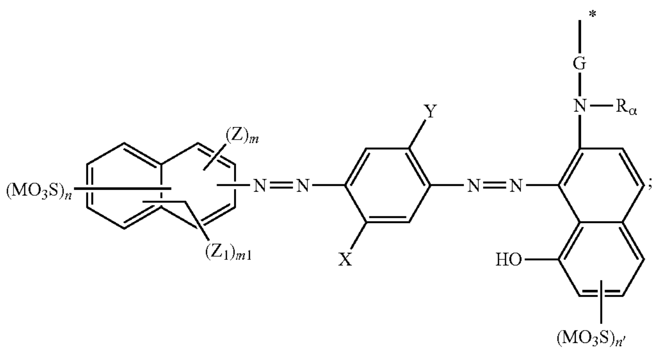
(XIV)
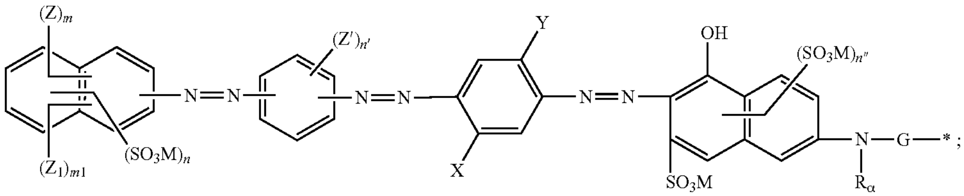
(XV)
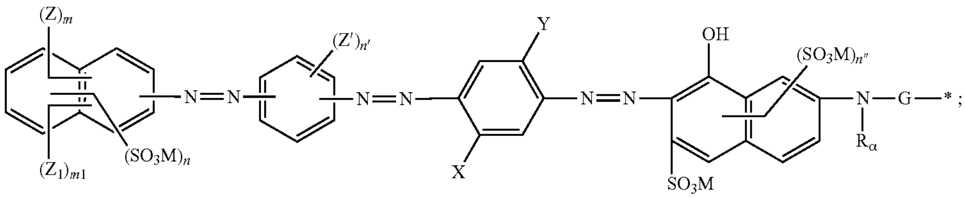
(XVI)
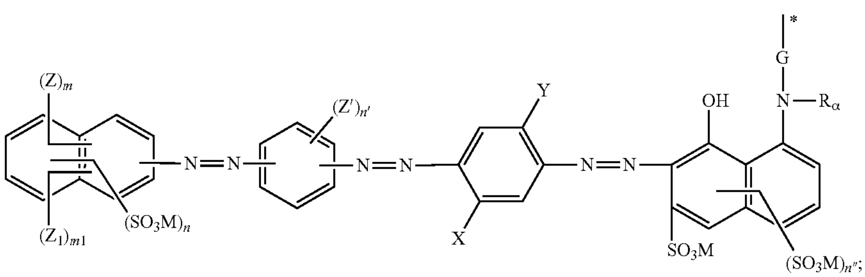
(XVII)
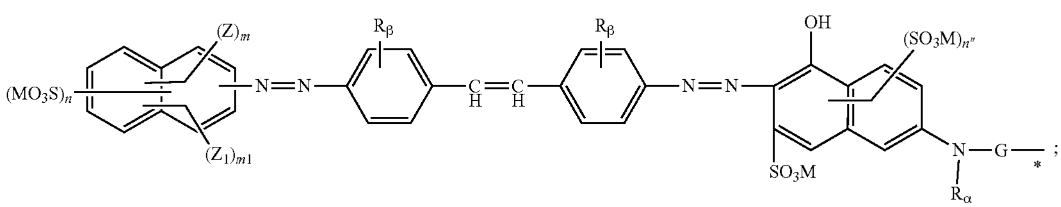
(XVIII)
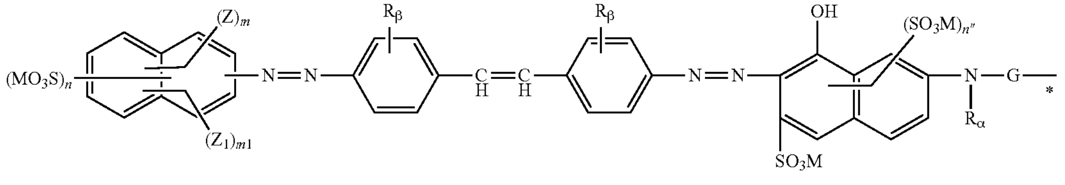

-continued
(XIX)
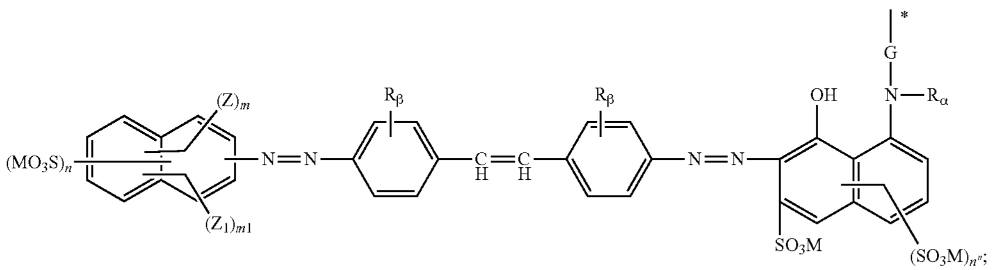
(XX)
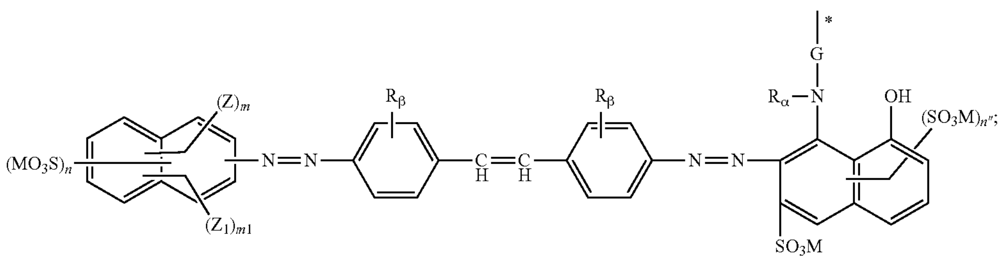
(XXI)
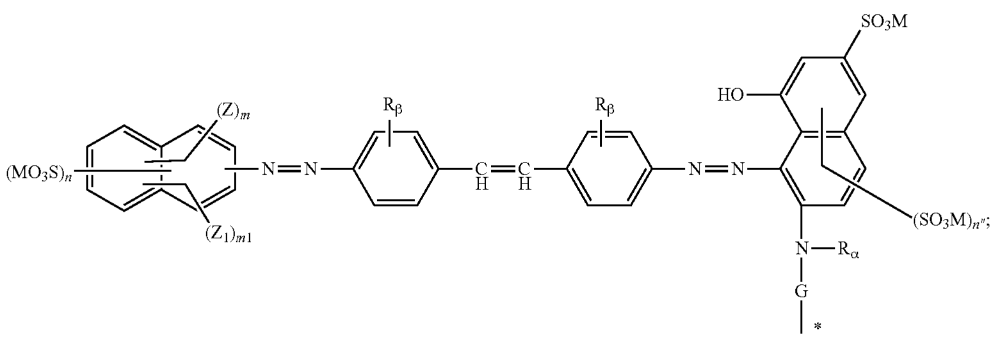
(XXII)
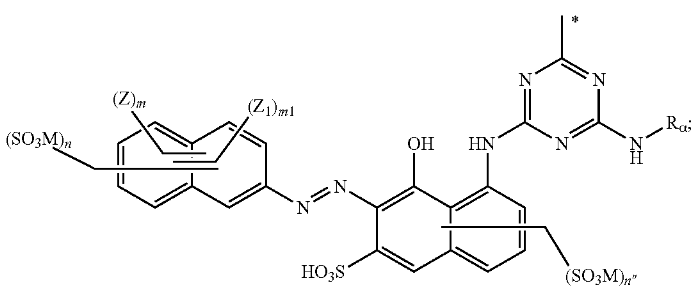
(XXXIII)
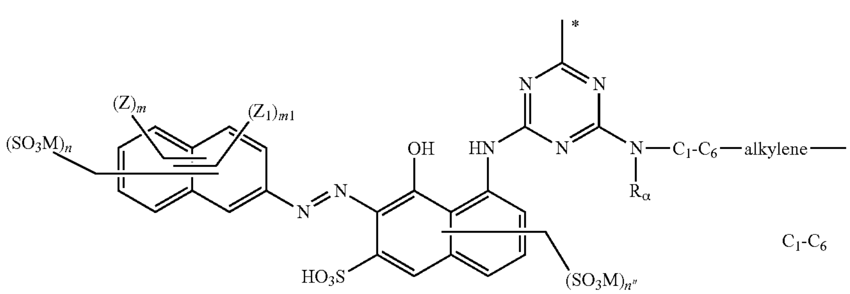

-continued
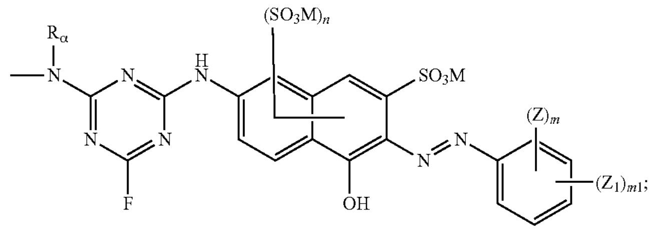
(XXIV)
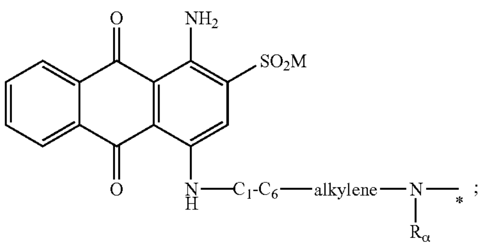
(XXV)
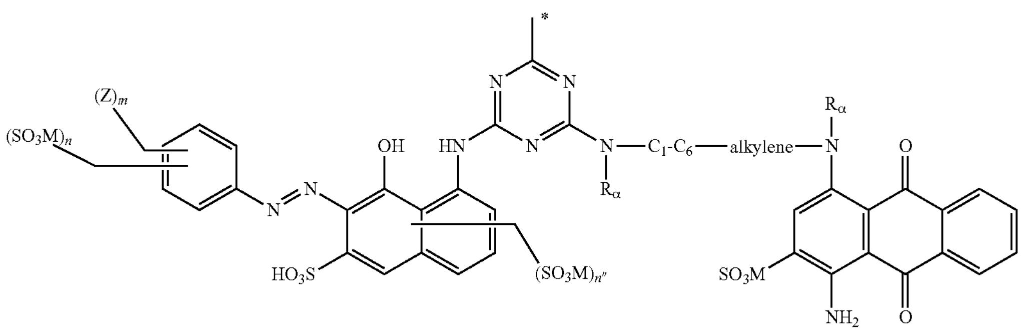
(XXVI)
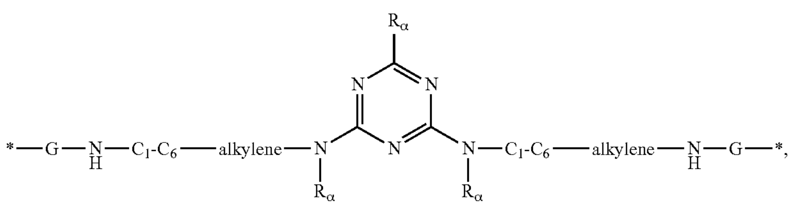
(XXVIIa)
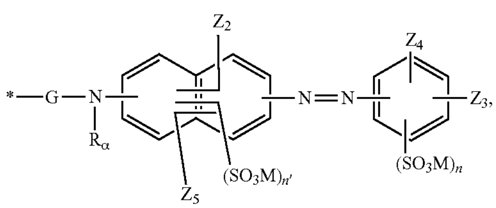
(XXVIIb)
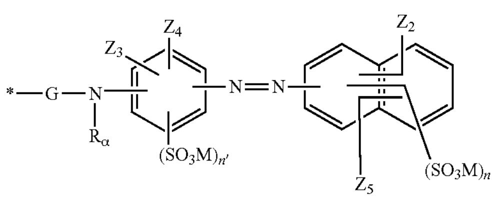
(XXVIIc)
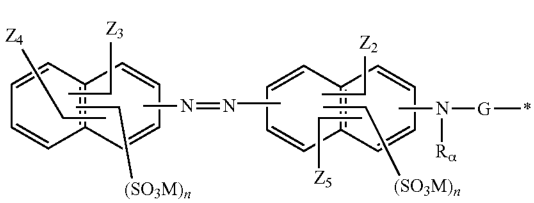

-continued (XXVIId)

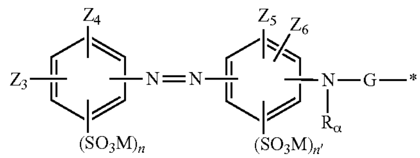

(XXVIII)

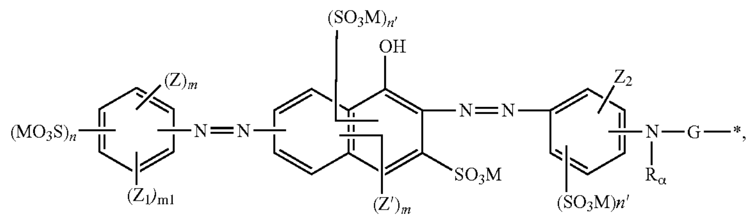

(XXIX)

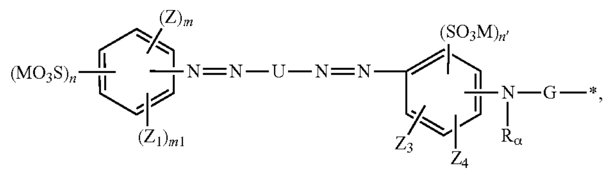

(XXX)

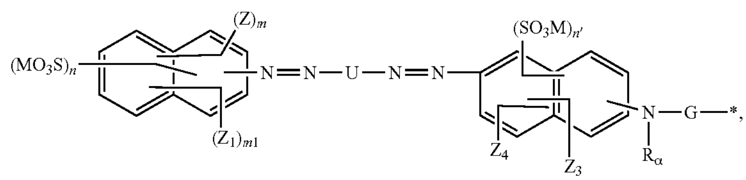

(XXXI)

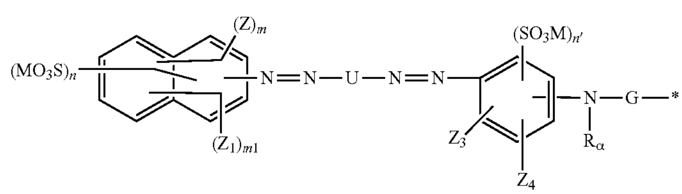

or (XXXII)

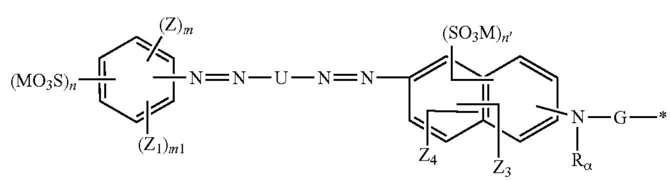

wherein

* marks the bond to the bridging group L,

X and Y independently of one another, are hydrogen; $SO_3M$; linear or branched, unsubstituted $C_1$-$C_4$-alkyl; linear or branched $C_1$-$C_4$-alkyl, which is substituted by at least one substituent selected from the group consisting of hydroxyl, cyano, $SO_3H$, —$NH_2$, carboxyl, carb-$C_1$-$C_4$alkoxy, $C_1$-$C_4$alkoxy, phenyl, naphthyl and pyridyl; linear or branched, unsubstituted $C_1$-$C_4$-alkoxy; linear or branched, $C_1$-$C_4$-alkoxy, which is substituted by at least one substituent selected from the group consisting of hydroxyl, cyano, $SO_3H$, —$NH_2$, carboxyl, carb-$C_1$-$C_4$alkoxy, $C_1$-$C_4$alkyl, phenyl, naphthyl and pyridyl; NHCOOH; NHCOO$C_1$-$C_4$alkyl; COOH or COO$C_1$-$C_4$alkyl;

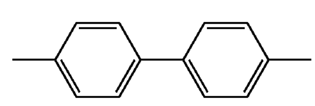

;

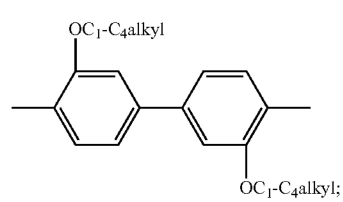

-continued

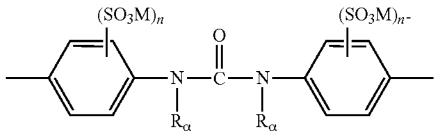

U is a moiety of formula $R_\alpha$ is hydrogen; linear or branched, unsubstituted $C_1$-$C_4$-alkyl; linear or branched $C_1$-$C_4$-alkyl, which is substituted by at least one substituent selected from the group consisting of hydroxyl, cyano, $SO_3H$, —$NH_2$, carboxyl, carb-$C_1$-$C_4$alkoxy, $C_1$-$C_4$alkoxy, phenyl, naphthyl and pyridyl; unsubstituted aryl or aryl, which is substituted by a least one substituent selected from the group consisting of hydroxyl, cyano, $SO_3H$, —$NH_2$, carboxyl, carb-$C_1$-$C_4$alkoxy, $C_1$-$C_4$alkoxy and $C_1$-$C_4$alkyl, each $R_\beta$ independently of one another is hydrogen; $SO_3M$; linear or branched, unsubstituted $C_1$-$C_4$-alkyl; linear or branched $C_1$-$C_4$-alkyl, which is substituted by at least one substituent selected from the group consisting of hydroxyl, cyano, $SO_3H$, —$NH_2$, carboxyl, carb-$C_1$-$C_4$alkoxy, $C_1$-$C_4$alkoxy, phenyl, naphthyl and pyridyl; linear or branched, unsubstituted $C_1$-$C_4$-alkoxy or linear or branched, $C_1$-$C_4$-alkoxy, which is substituted by at least one substituent selected from the group consisting of hydroxyl, cyano, $SO_3H$, —$NH_2$, carboxyl, carb-$C_1$-$C_4$alkoxy, $C_1$-$C_4$alkyl, phenyl, naphthyl and pyridyl, Z is linear or branched, unsubstituted $C_1$-$C_4$-alkyl; linear or branched $C_1$-$C_4$-alkyl, which is substituted by at least one substituent selected from the group consisting of hydroxyl, cyano, $SO_3H$, —$NH_2$, carboxyl, carb-$C_1$-$C_4$alkoxy, $C_1$-$C_4$alkoxy, phenyl, naphthyl and pyridyl; linear or branched, unsubstituted $C_1$-$C_4$-alkoxy or linear or branched, $C_1$-$C_4$-alkoxy, which is substituted by at least one substituent selected from the group consisting of hydroxyl, cyano, $SO_3H$, —$NH_2$, carboxyl, carb-$C_1$-$C_4$alkoxy, $C_1$-$C_4$alkyl, phenyl, naphthyl and pyridyl; halogen; OH; $NO_2$; COOH; $COOC_1$-$C_4$alkyl; $NH_2$; $NHC_1$-$C_4$alkyl, wherein the alkyl group may be substituted by at least one substituent selected from the group consisting of OH, $NH_2$, $C_1$-$C_4$alkyl, CN and COOH; $N(C_1$-$C_4alkyl)C_1$-$C_4$alkyl, wherein the alkyl groups may independently of each other be substituted by at least one substituent selected from the group consisting of OH, $NH_2$, $C_1$-$C_4$alkyl, CN and COOH; NH-aryl; NH-aryl, wherein the aryl is substituted by at least one substituent selected from the group consisting of hydroxyl, cyano, $SO_3H$, —$NH_2$, carboxyl, carb-$C_1$-$C_4$alkoxy, $C_1$-$C_4$alkyl and $C_1$-$C_4$alkoxy; $NHCOC_1$-$C_4$alkyl and $NHCOOC_1$-$C_4$alkyl, Z' is $SO_3M$; linear or branched, unsubstituted $C_1$-$C_4$-alkyl; linear or branched $C_1$-$C_4$-alkyl, which is substituted by at least one substituent selected from the group consisting of hydroxyl, cyano, $SO_3H$, —$NH_2$, carboxyl, carb-$C_1$-$C_4$alkoxy, $C_1$-$C_4$alkoxy, phenyl, naphthyl and pyridyl; linear or branched, unsubstituted $C_1$-$C_4$-alkoxy or linear or branched, $C_1$-$C_4$-alkoxy, which is substituted by at least one substituent selected from the group consisting of hydroxyl, cyano, $SO_3H$, —$NH_2$, carboxyl, carb-$C_1$-$C_4$alkoxy, $C_1$-$C_4$alkyl, phenyl, naphthyl and pyridyl; halogen; OH; $NO_2$; COOH; $COOC_1$-$C_4$alkyl; $NH_2$; $NHC_1$-$C_4$alkyl, wherein the alkyl group may be substituted by at least one substituent selected from the group consisting of OH, $NH_2$, $C_1$-$C_4$alkyl, CN or COOH; $N(C_1$-$C_4alkyl)C_1$-$C_4$alkyl, wherein the alkyl groups may independently of each other be substituted by at least one substituent selected from the group consisting of OH, $NH_2$, $C_1$-$C_4$alkyl, CN and COOH; NH-aryl; NH-aryl, wherein the aryl is substituted by at least one substituent selected from the group consisting of hydroxyl, cyano, $SO_3H$, —$NH_2$, carboxyl, carb-$C_1$-$C_4$alkoxy, $C_1$-$C_4$alkyl and $C_1$-$C_4$alkoxy; $NHCOC_1$-$C_4$alkyl or $NHCOOC_1$-$C_4$alkyl, $Z_1$ is linear or branched, unsubstituted $C_1$-$C_4$-alkyl; linear or branched $C_1$-$C_4$-alkyl, which is substituted by at least one substituent selected from the group consisting of hydroxyl, cyano, $SO_3H$, —$NH_2$, carboxyl, carb-$C_1$-$C_4$alkoxy, $C_1$-$C_4$alkoxy, phenyl, naphthyl and pyridyl; linear or branched, unsubstituted $C_1$-$C_4$-alkoxy or linear or branched, $C_1$-$C_4$-alkoxy, which is substituted by at least one substituent selected from the group consisting of hydroxyl, cyano, $SO_3H$, —$NH_2$, carboxyl, carb-$C_1$-$C_4$alkoxy, $C_1$-$C_4$alkyl, phenyl, naphthyl and pyridyl; halogen; OH; $NO_2$; COOH; $COOC_1$-$C_4$alkyl; $NH_2$; $NHC_1$-$C_4$alkyl, wherein the alkyl group may be substituted by at least one substituent selected from the group consisting of OH, $NH_2$, $C_1$-$C_4$alkyl, CN or COOH; $N(C_1$-$C_4alkyl)C_1$-$C_4$alkyl, wherein the alkyl groups may independently of each other be substituted by at least one substituent selected from the group consisting of OH, $NH_2$, $C_1$-$C_4$alkyl, CN and COOH; NH-aryl; NH-aryl, wherein the aryl is substituted by at least one substituent selected from the group consisting of hydroxyl, cyano, $SO_3H$, —$NH_2$, carboxyl, carb-$C_1$-$C_4$alkoxy, $C_1$-$C_4$alkyl and $C_1$-$C_4$alkoxy; $NHCOC_1$-$C_4$alkyl or $NHCOOC_1$-$C_4$alkyl, $Z_2$, $Z_3$, $Z_4$, $Z_5$ and $Z_6$ are independently from each other hydrogen; linear or branched, unsubstituted $C_1$-$C_4$-alkyl; linear or branched $C_1$-$C_4$-alkyl, which is substituted by at least one substituent selected from the group consisting of hydroxyl, cyano, $SO_3H$, —$NH_2$, carboxyl, carb-$C_1$-$C_4$alkoxy, $C_1$-$C_4$alkoxy, phenyl, naphthyl and pyridyl; linear or branched, unsubstituted $C_1$-$C_4$-alkoxy or linear or branched, $C_1$-$C_4$-alkoxy, which is substituted by at least one substituent selected from the group consisting of hydroxyl, cyano, $SO_3H$, —$NH_2$, carboxyl, carb-$C_1$-$C_4$alkoxy, $C_1$-$C_4$alkyl, phenyl naphthyl and pyridyl; halogen; OH; $SO_2CH_2CH_2SO_3H$; $NO_2$; COOH; $COOC_1$-$C_4$alkyl; $NH_2$; $NHC_1$-$C_4$alkyl, wherein the alkyl group may be substituted by at least one substituent selected from the group consisting of OH, $NH_2$, $C_1$-$C_4$alkyl, CN or COOH; $N(C_1$-$C_4alkyl)C_1$-$C_4$alkyl, wherein the alkyl groups may independently of each other be substituted by at least one substituent selected from the group consisting of OH, $NH_2$, $C_1$-$C_4$alkyl, CN and COOH; NH-aryl; NH-aryl, wherein the aryl is substituted by at least one substituent selected from the group consisting of hydroxyl, cyano, $SO_3H$, —$NH_2$, carboxyl, carb-$C_1$-$C_4$alkoxy, $C_1$-$C_4$alkyl and $C_1$-$C_4$alkoxy; $NHCOC_1$-$C_4$alkyl or $NHCOOC_1$-$C_4$alkyl, G is a direct bond; $COOC_1$-$C_4$alkylene; unsubstituted arylene; arylene which is substituted by at least one substituent selected from the group consisting of hydroxyl, cyano, $NO_2$, $SO_3H$, —$NH_2$, carboxyl, carb-$C_1$-$C_4$alkoxy, $C_1$-$C_4$alkoxy and $C_1$-$C_4$alkyl; unsubstituted $C_1$-$C_4$alkylene or $C_1$-$C_4$-alkylene which is substituted by at least one substituent selected from the group consisting of hydroxyl, cyano, $NO_2$, $SO_3H$, —$NH_2$, carboxyl, carb-$C_1$-$C_4$alkoxy, $C_1$-$C_4$alkoxy and $C_1$-$C_4$alkyl; or —CO-arylene, n is 0; 1; 2 or 3, n' is 0; 1 or 2, n'' is 0 or 1, m is 0; 1 or 2, $m_1$ is 0; 1 or 2, each M is independently from each other hydrogen; an alkali metal ion or an ammonium ion.

14. A Zn—, Ca—, Mg—, Na—, K—, Al, Si—, Ti—, Ge—, Ga—, Zr—, In— or Sn— phthalocyanine compound according to claim 1 to which at least one dyestuff is attached through covalent bonding.

15. A Compound of formula (1a) and/or formula (1b) according to claim 14

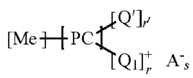

(1a)

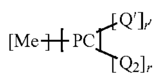

(1b)

wherein

PC is the phthalocyanine ring system,

Me is Zn; Ca; Mg; Na; K; Al—$Z_1$; Si(IV)-$(Z_1)_2$; Ti(IV)-$(Z_1)_2$; Ge(IV)-$(Z_1)_2$; Ga(III)-$Z_1$; Zr(IV)-$(Z_1)_2$; In(III)-$Z_1$ or Sn(IV)-$(Z_1)_2$, $Z_1$ is an alkanolate ion; a hydroxyl ion; $R_0COO^-$; $ClO_4^-$; $BF_4^-$;$PF_6^-$;$R_0SO_3^-$; $SO_4^{2-}$; $NO_3^-$; $F^-$; $Cl^-$; $Br^-$; $I^-$; citrate ion; tartrate ion or oxalate ion, wherein $R_0$ is hydrogen; or unsubstituted $C_1$-$C_{18}$alkyl; or $C_1$-$C_{18}$alkyl, which is substituted by at least one substituent selected from the group consisting of hydroxyl, cyano, carboxyl, $SO_3H$, —$NH_2$, carb-$C_1$-$C_6$alkoxy, $C_1$-$C_6$alkoxy, phenyl, naphthyl and pyridyl; unsubstituted aryl or aryl, which is substituted by at least one substituent selected from the group consisting of hydroxyl, cyano, carboxyl, $SO_3H$, —$NH_2$, carb-$C_1$-$C_6$alkoxy, $C_1$-$C_6$alkoxy phenyl, r is 0; 1; 2; 3 or 4, r' is 1; 2; 3 or 4, each $Q_1$ is independently of each other a sulfo or carboxyl group or a radical of the formula —$SO_2X_2$—$R_1$—$X_3^+$; —O—$R_1$—$X_3^+$ or —$(CH_2)_t$—$Y_1^+$, in which $R_1$ is a branched or unbranched $C_1$-$C_8$alkylene; 1,3-phenylene or 1,4-phenylene, $X_2$ is —NH— or —N($C_1$-$C_5$alkyl)-, $X_3^+$ is a group of the formula

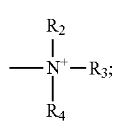

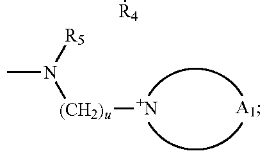

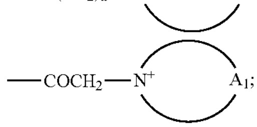

-continued

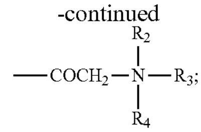

or, in the case where $R_1$=$C_1$-$C_8$alkylene, also a group of the formula

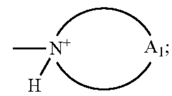

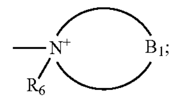

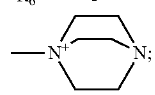

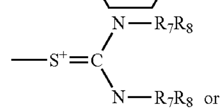

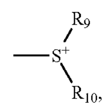

$Y_1^+$ is a group of the formula

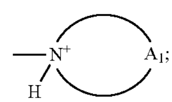

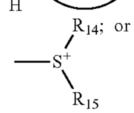

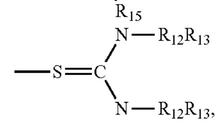

t is 0 or 1, wherein the above formulae $R_2$ and $R_3$ independently of one another are $C_1$-$C_6$alkyl, $R_4$ is $C_1$-$C_6$alkyl; $C_5$-$C_7$cycloalkyl or $NR_7R_8$, $R_5$ and $R_6$ independently of one another are $C_1$-$C_5$alkyl, $R_7$ and $R_8$ independently of one another are hydrogen or $C_1$-$C_6$alkyl, $R_9$ and $R_{10}$ independently of one another are unsubstituted $C_1$-$C_6$alkyl or $C_1$-$C_6$alkyl substituted by at least one substituent selected from the group consisting of hydroxyl, cyano, carboxyl, $SO_3H$, —$NH_2$, carb-$C_1$-$C_6$alkoxy, $C_1$-$C_6$alkoxy, phenyl, naphthyl and pyridyl, u is from 1 to 6, $A_1$ is a unit which completes an aromatic 5- to 7-membered nitrogen heterocycle, which may where appropriate also contain one or two further nitrogen atoms as ring members, and $B_1$ is a unit which completes a saturated 5- to 7-membered nitrogen heterocycle, which may where appropriate also contain 1 to 2 nitrogen, oxygen and/or sulfur atoms as ring members, each Q' is independently from each other a moiety of formula -L-D, wherein L is a direct bond or a bridging group and D is the radical of a dyestuff, each $Q_2$ is independently from each other hydroxyl; $C_1$-$C_{22}$alkyl; branched $C_3$-$C_{22}$alkyl; $C_2$-$C_{22}$alkenyl; branched $C_3$-$C_{22}$alkenyl and mixtures thereof; $C_1$-$C_{22}$alkoxy; a sulfo or carboxyl radical; a radical of the formula

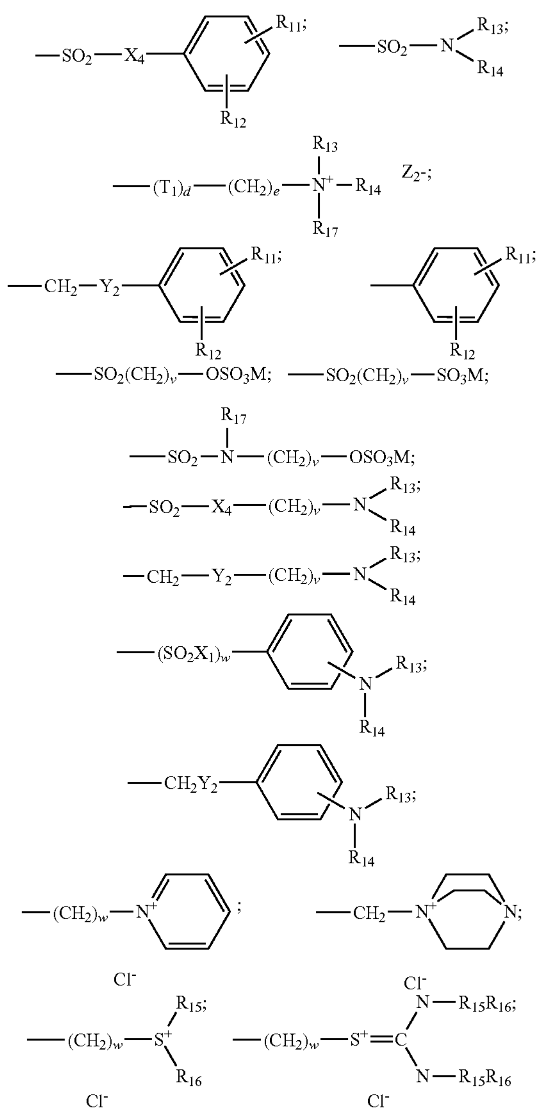

a branched alkoxy radical of the formula

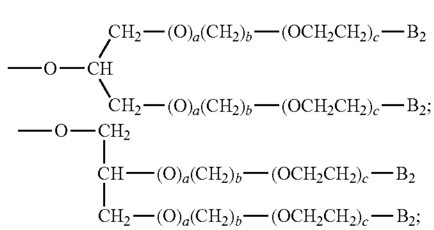

an alkylethyleneoxy unit of the formula $-(T_1)_d-(CH_2)_b(OCH_2CH_2)_a—B_3$ or an ester of the formula $COOR_{18}$, in which $B_2$ is hydrogen; hydroxyl; $C_1$-$C_{30}$alkyl; $C_1$-$C_{30}$alkoxy; $—CO_2H$; $—CH_2COOH$; $—SO_3^-M_1$; $—OSO_3^-M_1$; $—PO_3^{2-}M_1$; $—OPO_3^{2-}M_1$; and mixtures thereof, $B_3$ is hydrogen; hydroxyl; —COOH; $-SO_3^-M_1$; $—OSO_3^-M_1$ or $C_1$-$C_6$alkoxy, $M_1$ is a water-soluble cation, $T_1$ is —O— or —NH—, $X_1$ and $X_4$ independently of one another are —O—; —NH— or $—N(C_1$-$C_5alkyl)$-, $R_{11}$ and $R_{12}$ independently of one another are hydrogen; a sulfo group and salts thereof; a carboxyl group and salts thereof or a hydroxyl group; at least one of the radicals $R_{11}$ and $R_{12}$ being a sulfo or carboxyl group or salts thereof, $Y_2$ is —O—; —S—; —NH— or $—N(C_1$-$C_5alkyl)$-, $R_{13}$ and $R_{14}$ independently of one another other are hydrogen; $C_1$-$C_6$alkyl; hydroxy-$C_1$-$C_6$alkyl; cyano-$C_1$-$C_6$alkyl; sulfo-$C_1$-$C_6$alkyl; carboxy or halo-$C_1$-$C_6$alkyl; unsubstituted phenyl or phenyl substituted by at least one substituent selected from the group consisting of halogen, $C_1$-$C_4$alkyl, $C_1$-$C_4$alkoxy, sulfo or by carboxy; or $R_{18}$ and $R_{19}$, together with the nitrogen atom to which they are bonded, form a saturated 5- or 6-membered heterocyclic ring that may in addition contain a further nitrogen atom or an oxygen atom as ring member, $R_{15}$ and $R_{16}$ independently of one another are $C_1$-$C_6$alkyl or aryl-$C_1$-$C_6$alkyl radicals, $R_{17}$ is hydrogen; an unsubstituted $C_1$-$C_6$alkyl or $C_1$-$C_6$alkyl substituted by at least one substituent selected from the group consisting of halogen, hydroxyl, cyano, $SO_3H$, $—NH_2$, phenyl, carboxyl, carb-$C_1$-$C_6$alkoxy and $C_1$-$C_6$alkoxy, $R_{18}$ is $C_1$-$C_{22}$alkyl; branched $C_3$-$C_{22}$alkyl; $C_1$-$C_{22}$alkenyl or branched $C_3$-$C_{22}$alkenyl; $C_3$-$C_{22}$glycol; $C_1$-$C_{22}$alkoxy; branched $C_3$-$C_{22}$alkoxy; and mixtures thereof, M is hydrogen; or an alkali metal ion or ammonium ion, $Z_2$ is a is an alkanolate ion; a hydroxyl ion; $R_0COO^-$; $ClO_4^-$; $BF_4^-$;$PF_6^-$;$R_0SO_3^-$; $SO_4^{2-}$; $NO_3^-$; $F^-$; $Cl^-$; $Br^-$; $I^-$; citrate ion; tartrate ion or oxalate ion, wherein $R_0$ is hydrogen; or unsubstituted $C_1$-$C_{18}$alkyl; or $C_1$-$C_{18}$alkyl, which is substituted by at least one substituent selected from the group consisting of hydroxyl, cyano, carboxyl, $SO_3H$, $—NH_2$, carb-$C_1$-$C_6$alkoxy, $C_1$-$C_6$alkoxy, phenyl, naphthyl and pyridyl; unsubstituted aryl or aryl, which is substituted by at least one substituent selected from the group consisting of hydroxyl, cyano, carboxyl, $SO_3H$, $—NH_2$, carb-$C_1$-$C_6$alkoxy, $C_1$-$C_6$alkoxy and $C_1$-$C_4$-alkyl, a is 0 or 1, b is from 0 to 6, c is from 0 to 100, d is 0 or 1, e is from 0 to 22, v is an integer from 2 to 12, w is 0 or 1, and $A^-$ is an organic or inorganic anion, and s is equal to r in cases of monovalent anions $A^-$ and is ≤r in cases of polyvalent anions, it being necessary for $A_s^-$ to compensate the positive charge; where, when r≠1, the radicals $Q_1$ can be identical or different, and where the phthalocyanine ring system may also comprise further solubilising groups.

16. Compounds of (8) and (9) according to claim 14

(8)

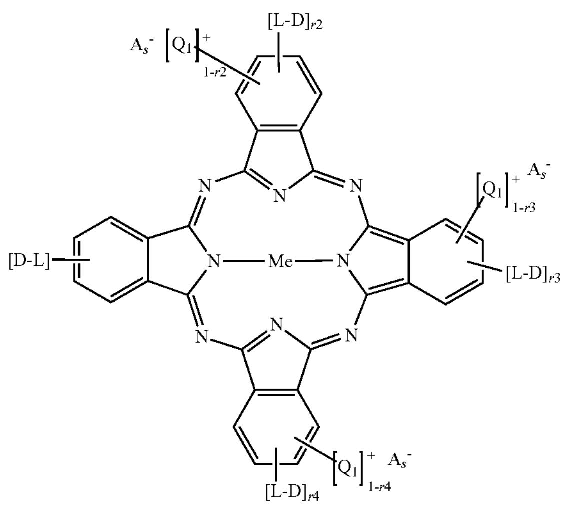

(9)

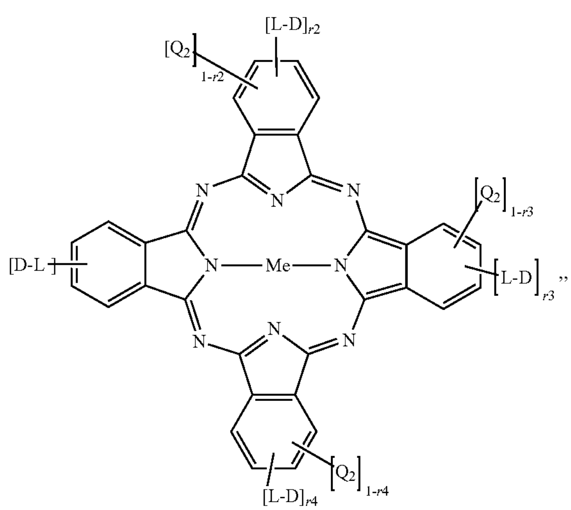

wherein

Me is Zn, $AlZ_1$, Si(IV)-$(Z_1)_2$ or Ti(IV)-$(Z_1)_2$, wherein $Z_1$ is chloride, fluorine, bromine or hydroxyl, each $Q_1$ is independently of each other a sulfo or carboxyl group; or a radical of the formula —$SO_2X_2$—$R_1$—$X_3^+$; —O—$R_1$—$X_3^+$ or —$(CH_2)_t$—$Y_1^+$, in which $R_1$ is a branched or unbranched $C_1$-$C_4$alkylene; 1,3-phenylene or 1,4-phenylene, $X_2$ is —NH— or —N($C_1$-$C_4$alkyl)-, $X_3^+$ is a group of the formula

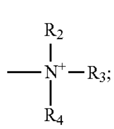

-continued

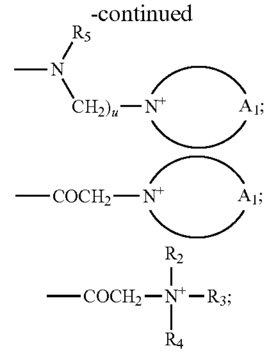

or, in the case where $R_1$=$C_1$-$C_4$alkylene, also a group of the formula

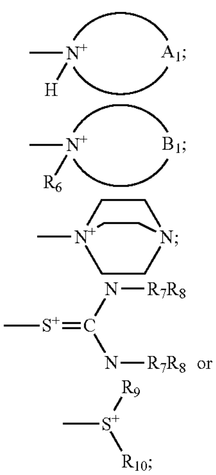

$Y_1^+$ is a group of the formula

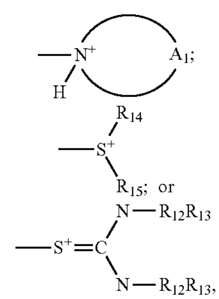

t is 0 or 1, wherein the above formulae $R_2$ and $R_3$ independently of one another are $C_1$-$C_6$alkyl, $R_4$ is $C_1$-$C_4$alkyl; pentyl; hexyl or $NR_7R_8$, $R_5$ and $R_6$ independently of one another are $C_1$-$C_4$alkyl, $R_7$ and $R_8$ independently of one another are hydrogen or $C_1$-$C_4$alkyl, $R_9$ and $R_{10}$ independently of one another are unsubstituted $C_1$-$C_4$alkyl or $C_1$-$C_4$alkyl substituted by at least one substituent selected from the group consisting of hydroxyl, cyano, carboxyl, $SO_3H$, —$NH_2$, carb-$C_1$-$C_4$alkoxy, $C_1$-$C_4$alkoxy, phenyl, naphthyl and pyridyl, u is from 1 to 6, $A_1$ is a unit which completes an pyrrole-; imidazol-; pyridine-; pyrazine-; pyrimidine-; pyridazine-ring, and $B_1$ is a unit which completes a morpholino-; pyrrolidine-; piperazine- or piperidine-ring, each $Q_2$ is independently from each other hydroxyl; $C_1$-$C_{10}$alkyl; branched $C_3$-$C_{10}$alkyl; $C_2$-$C_{10}$alkenyl; branched $C_3$-$C_{10}$alkenyl and mixtures thereof; $C_1$-$C_{10}$alkoxy; a sulfo or carboxyl radical; a radical of the formula

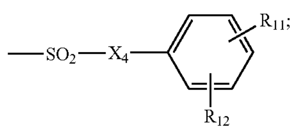

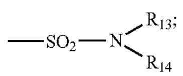

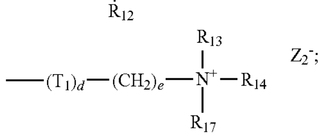

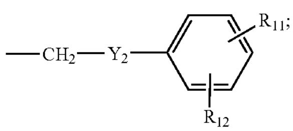

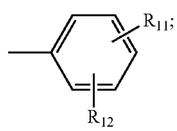

$—SO_2(CH_2)_v—OSO_3M$; $—SO_2(CH_2)_v—SO_3M$;

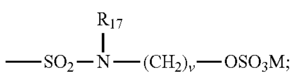

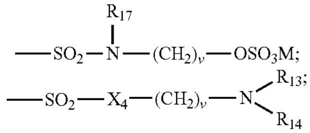

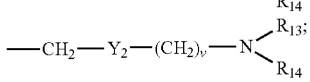

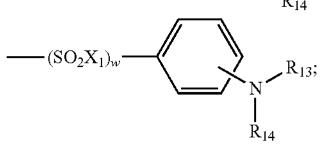

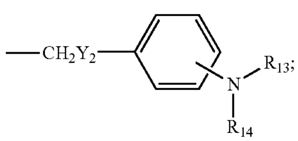

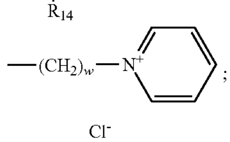

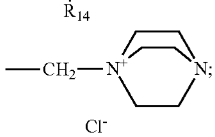

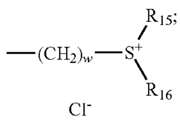

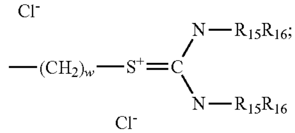

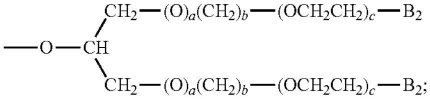

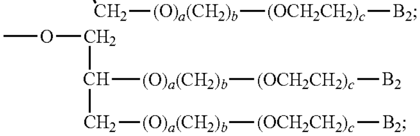

a branched alkoxy radical of the formula an alkylethyleneoxy unit of the formula $-(T_1)_d-(CH_2)_b(OCH_2CH_2)_a—B_3$ or an ester of the formula $COOR_{18}$, in which $B_2$ is hydrogen; hydroxyl; $C_1$-$C_{18}$alkyl; $C_1$-$C_{18}$alkoxy; $—CO_2H$; $—CH_2COOH$; $—SO_3^-M_1$; $—OSO_3^-M_1$; $—PO_3^{2-}M_1$; $—OPO_3^{2-}M_1$; and mixtures thereof, $B_3$ is hydrogen; hydroxyl; $—COOH$; $—SO_3^-M_1$; $—OSO_3^-M_1$ or $C_1$-$C_4$alkoxy, $M_1$ is hydrogen; alkalimetal-ion or an ammonium ion, $T_1$ is —O— or —NH—, $X_1$ and $X_4$ independently of one another are —O—; —NH— or —N($C_1$-$C_4$alkyl)-, $R_{11}$ and $R_{12}$ independently of one another are hydrogen; a sulfo group and salts thereof; a carboxyl group and salts thereof or a hydroxyl group; at least one of the radicals $R_{11}$ and $R_{12}$ being a sulfo or carboxyl group or salts thereof, $Y_2$ is —O—; —S—; —NH— or —N($C_1$-$C_4$alkyl)-, $R_{13}$ and $R_{14}$ independently of one another other are hydrogen; $C_1$-$C_4$alkyl; hydroxy-$C_1$-$C_4$alkyl; cyano-$C_1$-$C_4$alkyl; sulfo-$C_1$-$C_4$alkyl; carboxy or halogen-$C_1$-$C_4$alkyl; unsubstituted phenyl or phenyl substituted by at least one substituent selected from the group consisting of halogen, $C_1$-$C_4$alkyl and $C_1$-$C_4$alkoxy; sulfo or carboxyl or $R_{13}$ and $R_{14}$ together with the nitrogen atom to which they are bonded form a form morpholino, piperazine or piperidine ring, $R_{15}$ and $R_{16}$ independently of one another are $C_1$-$C_4$alkyl or aryl-$C_1$-$C_4$alkyl radicals, $R_{17}$ is hydrogen; an unsubstituted $C_1$-$C_4$alkyl or $C_1$-$C_4$alkyl substituted by at least one substituent selected from the group consisting of halogen, hydroxyl, cyano, $SO_3H$, $—NH_2$, phenyl, carboxyl, carb-$C_1$-$C_4$alkoxy or $C_1$-$C_6$alkoxy, $R_{18}$ is $C_1$-$C_{10}$alkyl; branched $C_3$-$C_{10}$alkyl; $C_1$-$C_{10}$alkenyl or branched $C_3$-$C_{10}$alkenyl; $C_3$-$C_{22}$glycol; $C_1$-$C_{10}$alkoxy; branched $C_3$-$C_{10}$alkoxy; and mixtures thereof, M is hydrogen; $Na^+$; $K^+$ or an ammonium ion, $Z_2^-$ a is a alkanolate; a hydroxyl ion; $R_0COO^-$; $ClO_4^-$; $BF_4^-$;$PF_6^-$;$R_0SO_3^-$; $SO_4^{2-}$; $NO_3^-$; $F^-$; $Cl^-$; $Br^-$; $I^-$; citrate ion; tartrate ion or oxalate ion, wherein $R_0$ is hydrogen; or unsubstituted $C_1$-$C_{18}$alkyl; or $C_1$-$C_{18}$alkyl, which is substituted by at least one substituent selected from the group consisting of hydroxyl, cyano, carboxyl, $SO_3H$, $—NH_2$, carb-$C_1$-$C_6$alkoxy, $C_1$-$C_6$alkoxy, phenyl, naphthyl and pyridyl; unsubstituted aryl or aryl, which is substituted by at least one substituent selected from the group consisting of hydroxyl, cyano, carboxyl, $SO_3H$, $—NH_2$, carb-$C_1$-$C_6$alkoxy, $C_1$-$C_6$alkoxy and $C_1$-$C_4$-alkyl, a is 0 or 1, b is from 0 to 6, c is from 0 to 100, d is 0; or 1, e is from 0 to 22, v is an integer from 2 to 12, w is 0 or 1, and $A^-$ is an organic or inorganic anion, and s is equal to $r_2$, $r_3$, $r_4$ and $r_5$ in cases of monovalent anions $A^-$ and is ≤$r_2$, $r_3$, $r_4$ and $r_5$ in cases of polyvalent anions, it being necessary for $A_s^-$ to compensate the positive charge; where, when $r_2$, $r_3$, $r_4$ and $r_5 \neq 1$, the radicals $Q_1$ can be identical or different, each L is independently from each other a direct bond; —$SO_2$—; —O—; —$OR_{19}$—; —$OR_{19}O$—; —$OR_{19}N(R_{20})$—; —$N(R_{20})$—; —$(CH_2CH_2O—)_n$—; —C(O)—; —$C(O)N(R_{20})$—; —$N(R_{20})C(O)$—; —OC(O)—; —C(O)O—; —S—; unsubstituted, linear or branched $C_1$-$C_{18}$alkylene; linear or branched $C_1$-$C_{18}$alkylene, which is substituted by at least one substituent selected from the group consisting of hydroxyl, cyano, $SO_3H$, —$NH_2$, carboxyl, carb-$C_1$-$C_4$alkoxy, $C_1$-$C_4$alkoxy, phenyl, naphthyl and pyridyl; unsubstituted $C_5$-$C_{18}$arylene; $C_5$-$C_{18}$arylene, which is substituted by at least one substituent selected from the group consisting of hydroxyl, cyano, carboxyl, carb-$C_1$-$C_4$alkoxy, $C_1$-$C_4$alkoxy and $C_1$-$C_4$alkyl; unsubstituted, linear or branched $C_1$-$C_{18}$alkylene-$C_5$-$C_{18}$aryl; linear or branched $C_1$-$C_{18}$alkylene-$C_5$-$C_{18}$aryl, which is substituted by at least one substituent selected from the group consisting of hydroxyl, cyano, $SO_3H$, —$NH_2$, carboxyl, carb-$C_1$-$C_4$alkoxy, $C_1$-$C_4$alkoxy, $C_1$-$C_4$alkyl, phenyl, naphthyl and pyridyl; unsubstituted, linear or branched $C_5$-$C_{18}$arylene-$C_1$-$C_{18}$alkyl or linear or branched $C_5$-$C_{18}$arylene-$C_1$-$C_{18}$alkyl, which is substituted by at least one substituent selected from the group consisting of hydroxyl, cyano, $SO_3H$, —$NH_2$, carboxyl, carb-$C_1$-$C_4$alkoxy, $C_1$-$C_4$alkoxy, $C_1$-$C_4$alkyl, phenyl, naphthyl and pyridyl, wherein $R_{19}$ is unsubstituted, linear or branched $C_1$-$C_{18}$alkylene; linear or branched $C_1$-$C_{18}$alkylene, which is substituted by at least one substituent selected from the group consisting of hydroxyl, cyano, $SO_3H$, —$NH_2$, carboxyl, carb-$C_1$-$C_4$alkoxy, $C_1$-$C_4$alkoxy, phenyl, naphthyl and pyridyl; unsubstituted $C_5$-$C_{18}$arylene; $C_5$-$C_{18}$arylene, which is substituted by at least one substituent selected from the group consisting of hydroxyl, cyano, $SO_3H$, —$NH_2$, carboxyl, carb-$C_1$-$C_4$alkoxy, $C_1$-$C_4$alkoxy and $C_1$-$C_4$alkyl; unsubstituted, linear or branched $C_1$-$C_{18}$alkylene-$C_5$-$C_{18}$aryl; linear or branched $C_1$-$C_{18}$alkylene-$C_5$-$C_{18}$aryl, which is substituted by at least one substituent selected from the group consisting of hydroxyl, cyano, $SO_3H$, —$NH_2$, carboxyl, carb-$C_1$-$C_4$alkoxy, $C_1$-$C_4$alkoxy, $C_1$-$C_4$alkyl, phenyl, naphthyl and pyridyl; unsubstituted, linear or branched $C_5$-$C_{18}$arylene-$C_1$-$C_{18}$alkyl or linear or branched $C_5$-$C_{18}$arylene-$C_1$-$C_{18}$alkyl, which is substituted by at least one substituent selected from the group consisting of hydroxyl, cyano, carboxyl, carb-$C_1$-$C_4$alkoxy, $C_1$-$C_4$alkoxy, $C_1$-$C_4$alkyl, phenyl, naphthyl and pyridyl, $R_{20}$ is unsubstituted, linear or branched $C_1$-$C_{18}$alkyl; linear or branched $C_1$-$C_{18}$alkyl, which is substituted by at least one substituent selected from the group consisting of hydroxyl, cyano, $SO_3H$, —$NH_2$, carboxyl, carb-$C_1$-$C_4$alkoxy, $C_1$-$C_4$alkoxy, phenyl, naphthyl and pyridyl; unsubstituted $C_5$-$C_{18}$aryl; $C_5$-$C_{18}$aryl, which is substituted by at least one substituent selected from the group consisting of hydroxyl, cyano, $SO_3H$, —$NH_2$, carboxyl, carb-$C_1$-$C_4$alkoxy, $C_1$-$C_4$alkoxy and $C_1$-$C_4$alkyl; unsubstituted, linear or branched $C_1$-$C_{18}$alkoxy or linear or branched $C_1$-$C_{18}$alkoxy, which is substituted by at least one substituent selected from the group consisting of hydroxyl, cyano, $SO_3H$, —$NH_2$, carboxyl, carb-$C_1$-$C_4$alkoxy, $C_1$-$C_4$alkyl, phenyl, naphthyl and pyridyl, N is 1; 2; 3 or 4, each D is independently from each other a dyestuff radical of formula (I), (II), (III), (IV), (V), (VI), (VII), (VIII), (IX), (X), (XI), (XII), (XIII), (XIV), (XV), (XVI), (XVII), (XVIII), (XIX), (XX), (XXI), (XXII), (XXIII), (XXIV), (XXV), (XXVI), (XXVIIa), (XXVIIb), (XXVIIc), (XXVIId), (XXVIII), (XXIX), (XXX), (XXXI), (XXXII), (XXXII), (XXXIV) or (XXXV), $r_2$ is 0 or 1, $r_3$ is 0 or 1, and $r_4$ is 0 or 1.

* * * * *